(12) United States Patent
Hardeman et al.

(10) Patent No.: US 12,528,792 B2
(45) Date of Patent: Jan. 20, 2026

(54) SULFONAMIDE COMPOUNDS AND THE USE THEREOF IN THE TREATMENT OF CANCER

(71) Applicant: TROBIO THERAPEUTICS PTY LTD, Beecroft (AU)

(72) Inventors: Edna Hardeman, Beecroft (AU); Peter Gunning, Beecroft (AU); Eleanor Eiffe, Beecroft (AU)

(73) Assignee: TROBIO THERAPEUTICS PTY LTD, Beecroft (AU)

(*) Notice: Subject to any disclaimer, the term of this patent is extended or adjusted under 35 U.S.C. 154(b) by 535 days.

(21) Appl. No.: 17/767,547

(22) PCT Filed: Oct. 13, 2020

(86) PCT No.: PCT/AU2020/051099
§ 371 (c)(1),
(2) Date: Apr. 8, 2022

(87) PCT Pub. No.: WO2021/072487
PCT Pub. Date: Apr. 22, 2021

(65) Prior Publication Data
US 2024/0317717 A1    Sep. 26, 2024

(30) Foreign Application Priority Data
Oct. 15, 2019 (AU) .............................. 2019903886

(51) Int. Cl.
| | |
|---|---|
| *C07D 403/12* | (2006.01) |
| *A61K 31/337* | (2006.01) |
| *A61K 31/4025* | (2006.01) |
| *A61K 31/404* | (2006.01) |
| *A61K 31/4155* | (2006.01) |
| *A61K 31/437* | (2006.01) |
| *A61K 31/4439* | (2006.01) |
| *A61K 31/454* | (2006.01) |
| *A61K 31/4545* | (2006.01) |
| *A61K 31/475* | (2006.01) |
| *A61K 31/496* | (2006.01) |
| *A61P 35/00* | (2006.01) |
| *C07D 207/48* | (2006.01) |
| *C07D 401/12* | (2006.01) |
| *C07D 471/04* | (2006.01) |

(52) U.S. Cl.
CPC .......... *C07D 403/12* (2013.01); *A61K 31/337* (2013.01); *A61K 31/4025* (2013.01); *A61K 31/404* (2013.01); *A61K 31/4155* (2013.01); *A61K 31/437* (2013.01); *A61K 31/4439* (2013.01); *A61K 31/454* (2013.01); *A61K 31/4545* (2013.01); *A61K 31/475* (2013.01); *A61K 31/496* (2013.01); *A61P 35/00* (2018.01); *C07D 207/48* (2013.01); *C07D 401/12* (2013.01); *C07D 471/04* (2013.01)

(58) Field of Classification Search
None
See application file for complete search history.

(56) References Cited

U.S. PATENT DOCUMENTS

| | | |
|---|---|---|
| 2011/0071146 A1 | 3/2011 | Niimi et al. |
| 2011/0086853 A1 | 4/2011 | Brown et al. |

FOREIGN PATENT DOCUMENTS

| | | | |
|---|---|---|---|
| EP | 1258480 A1 | 11/2002 | |
| WO | WO 2004/080999 | 9/2004 | |
| WO | WO-2004080999 A1 * | 9/2004 | .............. A61P 37/08 |
| WO | WO 2006/032852 | 3/2006 | |
| WO | WO 2010/129596 | 11/2010 | |
| WO | WO 2014/167446 | 10/2014 | |

OTHER PUBLICATIONS

Guo, H. et al. Photoactivation provides a mechanistic explanation for pan-assay interference behaviour of 2-aminopyrroles in lipoxygenase inhibition. European Journal of Medicinal Chemistry, 2017, 139, 633-643 (Year: 2017).*
Huan, X. et al. Design, synthesis, and biological evaluations of substituted pyrazoles as pyrrolomycin analogues against staphylococcal biofilm. European Journal of Medicinal Chemistry, 2022, 236, 114309 (Year: 2022).*
Orafaie, A. et al. The importance of 15-lipoxygenase inhibitors in cancer treatment. Cancer Metastasis Rev. 2018, 37, 397-408 (Year: 2018).*
Guo, H. et al. European Journal of Medicinal Chemistry, 2017, 139, 633-643 (Year: 2017).*
Extended European Search Report issued in corresponding European Application No. 20876068.6, dated Aug. 17, 2023.
Examination Report, EP Pat App. No. 20876068.6, mailed Mar. 31, 2025, 5 pages.
Anglin et al., "Discovery and optimization of aspartate aminotransferase 1 inhibitors to target redox balance in pancreatic ductal adenocarcinoma" *Bioorganic Med. Chem. Lett.* 2018, 28(16): 2675-2678.
CAS Registry No. 1039905-65-1, Entry Date: Aug. 10, 2008.
CAS Registry No. 1050647-11-4, Entry Date: Sep. 19, 2008.
CAS Registry No. 1090885-73-6, Entry Date: Dec. 28, 2008.
CAS Registry No. 1197576-26-3, Entry Date: Dec. 16, 2009.
CAS Registry No. 1349971-00-1, Entry Date: Dec. 7, 2011.
CAS Registry No. 1837504-96-7, Entry Date: Dec. 27, 2015.
CAS Registry No. 949396-03-6, Entry Date: Oct. 5, 2007.
De Savi et al., "Orally active achiral N-hydroxyformamide inhibitors of ADAM-TS4 (aggrecanase-1) and ADAM-TS5 (aggrecanase-2) for the treatment of osteoarthritis" *Bioorganic Med. Chem. Lett.* 2011, 21(11), 3301-3306.
International Search Report and Written Opinion issued in Corresponding PCT Application No. PCT/AU2020/051099, dated Dec. 17, 2020.

\* cited by examiner

*Primary Examiner* — Clinton A Brooks
*Assistant Examiner* — Nicola Maria Bauer
(74) *Attorney, Agent, or Firm* — NORTON ROSE FULBRIGHT US LLP

(57) ABSTRACT

The present disclosure relates generally to a class of sulfonamide-based compounds, compositions containing the same and the therapeutic use of the compounds in the treatment of cancer.

6 Claims, 7 Drawing Sheets

A

B

C

A

B

C

SULFONAMIDE COMPOUNDS AND THE USE THEREOF IN THE TREATMENT OF CANCER

CROSS-REFERENCE TO RELATED APPLICATIONS

This application is a national phase application under 35 U.S.C. § 371 of International Application No. PCT/AU2020/051099, filed Oct. 13, 2020, which claims priority to and the benefit of Australian Application No. 2019903886, filed Oct. 15, 2019. The contents of the referenced patent applications are incorporated into the present application by reference.

FIELD OF THE DISCLOSURE

The present disclosure relates generally to a class of sulfonamide-based compounds, compositions containing the same and the therapeutic use of the compounds in the treatment of cancer.

BACKGROUND OF THE DISCLOSURE

Cancer continues to kill many thousands of people annually throughout the world and is fast becoming a global pandemic. The global cancer burden is expected to increase to 21.7 million cases and 13 million deaths worldwide by 2030. There is therefore an ever present need to develop new and improved cancer therapies in an effort to arrest cancer burden on society.

Against this background the present inventors have developed a new class of sulfonamide compounds that show promise in the treatment of a number of cancers.

SUMMARY OF THE DISCLOSURE

In a first aspect there is provided a compound having the following formula (I):

R—(SO$_2$)-T-X—Y—Z  (I)

or a pharmaceutically acceptable salt, hydrate, derivative, solvate or prodrug thereof, wherein:

R is selected from the group consisting of: $C_1$-$C_6$ alkyl, phenyl, a heteroaryl group having between 5 and 14 ring atoms in which one or more of the ring atoms are nitrogen and a heterocyclyl group having between 5 and 14 ring atoms in which one or more of the ring atoms are nitrogen, wherein the phenyl, heteroaryl and heterocyclyl groups are optionally substituted with one or more substituents independently selected from the group consisting of: $C_1$-$C_6$ alkyl and —C(=O)—NR$_1$R$_2$;

T is selected from the group consisting of: a heteroaryl group having 5 or 6 ring atoms in which one or more of the ring atoms are nitrogen and a heterocyclyl group having 5 or 6 ring atoms in which one or more of the ring atoms are nitrogen;

X is selected from the group consisting of: C=O and a straight-chain or branched-chain alkanediyl group having between 1 and 4 carbon atoms;

Y is selected from the group consisting of: NH, O, S and a straight-chain or branched-chain alkanediyl group having between 1 and 4 carbon atoms;

Z is selected from the group consisting of: $C_1$-$C_6$ alkyl, $C_3$-$C_6$ cycloalkyl, phenyl, methylenedioxyphenyl, —(CH$_2$)$_n$ phenyl, pyridyl, pyrimidinyl, pyridazinyl and pyrazinyl, wherein the $C_3$-$C_6$ cycloalkyl, phenyl, —(CH$_2$)$_n$ phenyl, pyridyl, pyrimidinyl, pyridazinyl and pyrazinyl groups are optionally substituted with one or more substituents independently selected from the group consisting of: $C_1$-$C_6$ alkyl, $C_2$-$C_6$ alkenyl, OH, halo$C_1$-$C_6$ alkyl, halo, CN, NH$_2$ and $C_1$-$C_6$ alkoxy;

n is an integer between 1 and 6; and

R$_1$ and R$_2$ are independently selected from the group consisting of: H and $C_1$-$C_6$ alkyl, with the proviso that the following compounds are disclaimed:

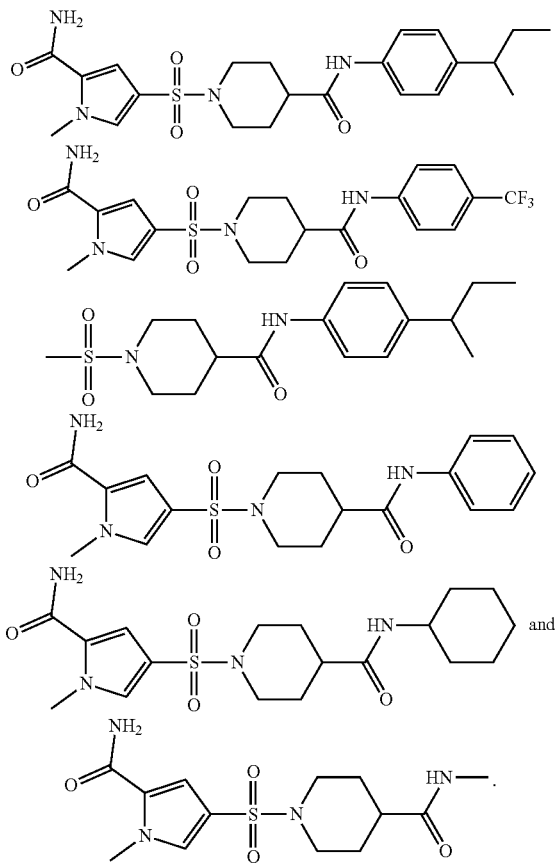

In a second aspect there is provided a pharmaceutical composition comprising a compound of formula (I) according to the first aspect together with a pharmaceutically acceptable carrier, diluent or excipient.

The composition may further comprise a vinca alkaloid or a taxane.

The vinca alkaloid may be vinorelbine and the taxane may be paclitaxel.

The composition may be a synergistic composition.

In a third aspect there is provided a method for the treatment of cancer in a subject in need thereof, the method comprising administration to the subject of a therapeutically effective amount of a compound of formula (I) according to the first aspect or a composition of the second aspect.

The method may further comprise administration of a vinca alkaloid or a taxane.

The vinca alkaloid may be vinorelbine and the taxane may be paclitaxel.

The cancer may be neuroblastoma, ovarian cancer, lung cancer, colorectal cancer, prostate cancer or pancreatic cancer.

In a fourth aspect there is provided use of a compound of formula (I) according to the first aspect in the manufacture of medicament for the treatment of cancer.

The medicament may further comprise, or may be administered with, a vinca alkaloid or a taxane.

The vinca alkaloid may be vinorelbine and the taxane may be paclitaxel.

In a fifth aspect there is provided a compound of formula (I) according to the first aspect for use in the treatment of cancer.

In a sixth aspect there is provided a method for reducing incidences of, or risk of, cancer recurrence in a subject deemed to be at risk of cancer recurrence, the method comprising administration to the subject of an effective amount of a compound of formula (I) according to the first aspect, or a composition of the second aspect.

In a seventh aspect there is provided use of a compound of formula (I) according to the first aspect in the manufacture of a medicament for reducing incidences of, or risk of, cancer recurrence in a subject deemed to be at risk of cancer recurrence.

In an eighth aspect there is provided a compound of formula (I) according to the first aspect for use in reducing incidences of, or risk of, cancer recurrence in a subject deemed to be at risk of cancer recurrence.

Definitions

The following are some definitions that may be helpful in understanding the description of the present disclosure. These are intended as general definitions and should in no way limit the scope of the present disclosure to those terms alone, but are put forth for a better understanding of the following description.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

The terms "a" and "an" are used herein to refer to one or to more than one (i.e. to at least one) of the grammatical object of the article. By way of example, "an element" means one element or more than one element.

In the context of this specification, the term "alkyl" is taken to mean straight-chain or branched-chain monovalent saturated hydrocarbon groups having the recited number of carbon atoms. Examples of alkyl groups include, but are not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl and the like.

In the context of this specification, the term "alkenyl" is taken to mean straight-chain or branched-chain monovalent hydrocarbon groups having at least one carbon-carbon double bond and the recited number of carbon atoms. Examples of alkenyl groups include, but are not limited to, vinyl, allyl, 1-methylethenyl, 2-butenyl and the like.

In the context of this specification, the term "alkoxy" is taken to mean O-alkyl groups in which alkyl is as defined herein. Examples of alkoxy groups include, but are not limited to, methoxy, ethoxy, n-propoxy, isopropoxy, sec-butoxy and tert-butoxy.

In the context of this specification, the terms "halo" and "halogen" are used interchangeably and refer to fluorine, chlorine, bromine and iodine.

In the context of this specification, the term "haloalkyl" is taken to mean alkyl groups as defined herein which are substituted with one or more halo substituents as defined herein. Examples of haloalkyl groups include, but are not limited to, chloromethyl, dibromomethyl, trifluoromethyl, 2,2,2-trifluoroethyl, 1,2-diiodoethyl and the like.

In the context of this specification, the term "heteroaryl" refers to a monocyclic, bicyclic, or tricyclic aromatic ring system having the recited total number of ring atoms, wherein the ring system contains at least one nitrogen atom, the remaining ring atoms being carbon. Examples of heteroaryl include, but are not limited to pyridyl, pyrrolyl, indolyl, quinolinyl and the like.

In the context of this specification, the term "heterocyclyl" refers to a non-aromatic, saturated or partially unsaturated ring system having the recited total number of ring atoms, wherein the ring system contains at least one nitrogen atom, the remaining ring atoms being carbon. The term also includes substituents in which the heterocyclyl group is fused with an aromatic ring. Examples of heterocyclyl include, but are not limited to pyrrolidinyl, piperazinyl, 2,3-dihydroindolyl, piperidinyl, azetidinyl, pyrazolinyl and the like.

In the context of this specification the term "cycloalkyl" refers to a saturated carbocyclic ring having the recited number of carbon atoms.

In the context of this specification the term "alkanediyl" is understood to refer to a bivalent saturated branched-chain or straight-chain hydrocarbon group conforming to the formula $C_nH_{2n}$.

In the context of this specification, the term "prodrug" means a compound which is able to be converted in vivo by metabolic means (e.g. by hydrolysis, reduction or oxidation) to a compound of the formula (I).

In the context of this specification, the term "effective amount" includes a non-toxic but sufficient amount of an active compound to provide the stated effect. When used in reference to cancer recurrence, "effective amount" means an amount of a compound of formula (I) that is required to reduce the incidence of, or risk of an individual experiencing cancer recurrence. Those skilled in the art will appreciate that the exact amount of a compound required will vary based on a number of factors and thus it is not possible to specify an exact "effective amount". However, for any given case an appropriate "effective amount" may be determined by one of ordinary skill in the art.

In the context of this specification, the term "therapeutically effective amount" includes a non-toxic but sufficient amount of an active compound to provide the desired therapeutic effect. Those skilled in the art will appreciate that the exact amount of a compound required will vary based on a number of factors and thus it is not possible to specify an exact "therapeutically effective amount". However, for any given case an appropriate "therapeutically effective amount" may be determined by one of ordinary skill in the art.

In the context of this specification, the terms "treating", "treatment", "preventing" and "prevention" refer to any and all uses that remedy cancer or symptoms thereof, prevent the establishment of cancer, or otherwise prevent, hinder, retard or reverse the progression of cancer or other undesirable symptoms in any way whatsoever. Thus, the terms "treating", "treatment", "preventing" and "prevention" and the like are to be considered in their broadest context. For example, treatment does not necessarily imply that a subject is treated until total recovery.

In the context of this specification, the term "subject" includes human and also non-human animals. As such, in addition to being useful in the treatment of cancer in humans, the compounds of the present disclosure also find use in the treatment of cancer in non-human animals, for example mammals such as companion animals and farm animals. Non-limiting examples of companion animals and farm animals include dogs, cats, horses, cows, sheep and pigs. Preferably, the subject is a human.

In the context of this specification the term "recurrence" as it relates to cancer is understood to mean the return of cancerous cells and/or a cancerous tumour after cancerous cells and/or a cancerous tumour have been successfully treated previously.

In the context of this specification the term "administering" and variations of that term including "administer" and "administration", includes contacting, applying, delivering or providing a compound or composition to an organism by any appropriate means.

DETAILED DESCRIPTION

Figure 1:
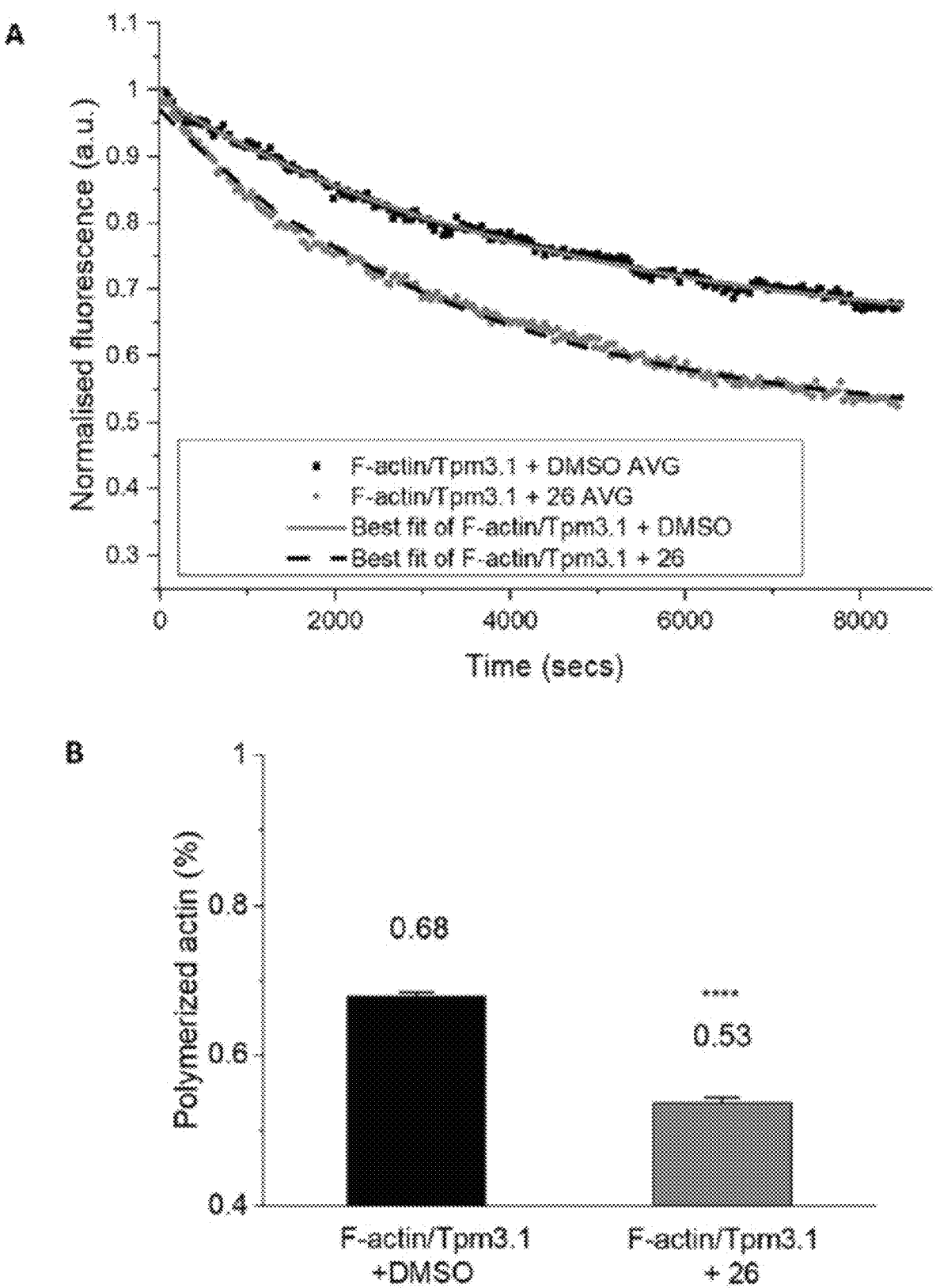
FIG. 1: Actin depolymerisation data for compound 26.

In one aspect of the present disclosure there is provided a compound having the following formula (I):

R—(SO₂)-T-X—Y—Z    (I)

or a pharmaceutically acceptable salt, hydrate, derivative, solvate or prodrug thereof, wherein:

R is selected from the group consisting of: $C_1$-$C_6$ alkyl, phenyl, a heteroaryl group having between 5 and 14 ring atoms in which one or more of the ring atoms are nitrogen and a heterocyclyl group having between 5 and 14 ring atoms in which one or more of the ring atoms are nitrogen, wherein the phenyl, heteroaryl and heterocyclyl groups are optionally substituted with one or more substituents independently selected from the group consisting of: $C_1$-$C_6$ alkyl and —C(=O)—NR₁R₂;

T is selected from the group consisting of: a heteroaryl group having 5 or 6 ring atoms in which one or more of the ring atoms are nitrogen and a heterocyclyl group having 5 or 6 ring atoms in which one or more of the ring atoms are nitrogen;

X is selected from the group consisting of: C=O and a straight-chain or branched-chain alkanediyl group having between 1 and 4 carbon atoms;

Y is selected from the group consisting of: NH, O, S and a straight-chain or branched-chain alkanediyl group having between 1 and 4 carbon atoms;

Z is selected from the group consisting of: $C_1$-$C_6$ alkyl, $C_3$-$C_6$ cycloalkyl, phenyl, methylenedioxyphenyl, —(CH₂)ₙ phenyl, pyridyl, pyrimidinyl, pyridazinyl and pyrazinyl, wherein the $C_3$-$C_6$ cycloalkyl, phenyl, —(CH₂)ₙ phenyl, pyridyl, pyrimidinyl, pyridazinyl and pyrazinyl groups are optionally substituted with one or more substituents independently selected from the group consisting of: $C_1$-$C_6$ alkyl, $C_2$-$C_6$ alkenyl, OH, halo$C_1$-$C_6$ alkyl, halo, CN, NH₂ and $C_1$-$C_6$ alkoxy, n is an integer between 1 and 6; and R₁ and R₂ are independently selected from the group consisting of: H and $C_1$-$C_6$ alkyl, with the proviso that the following compounds are disclaimed:

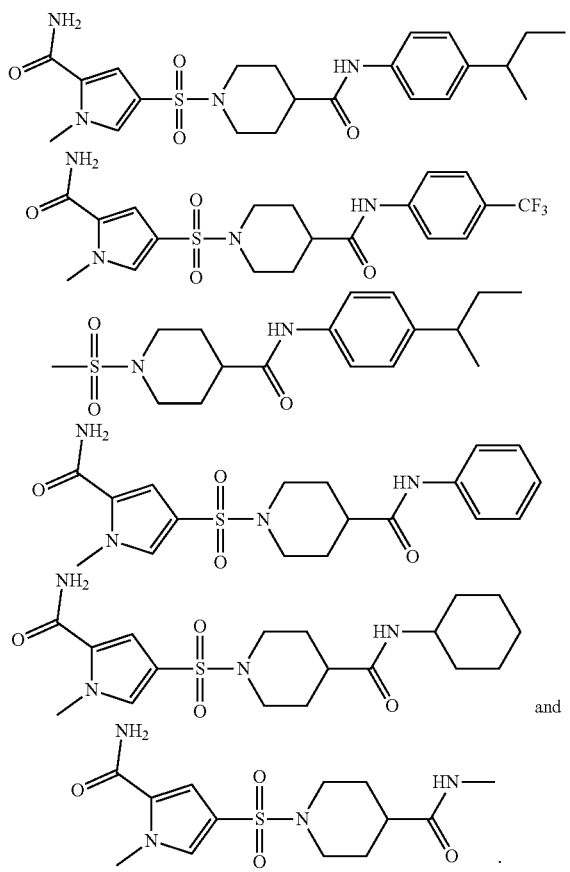

In one embodiment X is C=O or a straight-chain or branched-chain alkanediyl group having between 1 and 3 carbon atoms.

In another embodiment X is C=O, —CH₂— or —CH₂CH₂—.

In a further embodiment X is C=O or —CH₂—.

In one embodiment Y is NH, O, S or a straight-chain or branched-chain alkanediyl group having between 1 and 3 carbon atoms.

In another embodiment Y is NH, O or —CH₂—.

In a further embodiment Y is NH or —CH₂.

In one embodiment T is selected from the group consisting of: a heteroaryl group having 5 or 6 ring atoms in which between one and three of the ring atoms are nitrogen and a heterocyclyl group having 5 or 6 ring atoms in which between one and three of the ring atoms are nitrogen.

In another embodiment T is selected from the group consisting of: a heteroaryl group having 5 or 6 ring atoms in which one or two of the ring atoms are nitrogen and a heterocyclyl group having 5 or 6 ring atoms in which one or two of the ring atoms are nitrogen.

In a further embodiment T is selected from the group consisting of: a heteroaryl group having 5 ring atoms in which one or two of the ring atoms are nitrogen and a heterocyclyl group having 6 ring atoms in which one or two of the ring atoms are nitrogen.

In the above embodiments for T, T may be connected to X or $SO_2$ via a nitrogen atom of T.

In yet another embodiment T may be selected from the group consisting of:

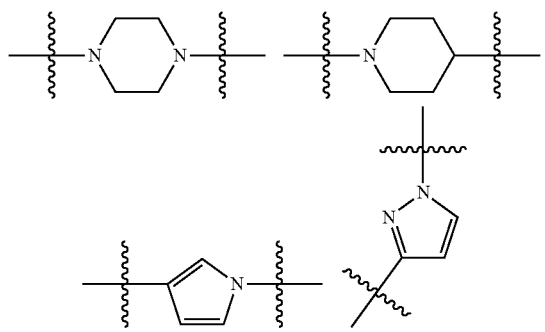

In one embodiment Z is selected from the group consisting of: $C_1$-$C_6$ alkyl, $C_3$-$C_6$ cycloalkyl, phenyl, —$(CH_2)_n$ phenyl, pyridyl, pyrimidinyl, pyridazinyl and pyrazinyl, wherein the $C_3$-$C_6$ cycloalkyl, phenyl, —$(CH_2)_n$ phenyl, pyridyl, pyrimidinyl, pyridazinyl and pyrazinyl groups are optionally substituted with one or more substituents independently selected from the group consisting of: $C_1$-$C_6$ alkyl, $C_2$-$C_6$ alkenyl, OH, halo$C_1$-$C_6$ alkyl, halo, CN, $NH_2$ and $C_1$-$C_6$ alkoxy.

In another embodiment Z is selected from the group consisting of: $C_1$-$C_6$ alkyl, $C_3$-$C_6$ cycloalkyl, phenyl, methylenedioxyphenyl, —$(CH_2)_n$ phenyl, pyridyl, pyrimidinyl, pyridazinyl and pyrazinyl, wherein the $C_3$-$C_6$ cycloalkyl, phenyl, —$(CH_2)_n$ phenyl, pyridyl, pyrimidinyl, pyridazinyl and pyrazinyl groups are optionally substituted with one or more substituents independently selected from the group consisting of: $C_1$-$C_6$ alkyl, OH, halo$C_1$-$C_6$ alkyl, halo, CN and OMe.

In another embodiment Z is selected from the group consisting of: $C_1$-$C_6$ alkyl, $C_3$-$C_6$ cycloalkyl, phenyl, methylenedioxyphenyl, —$(CH_2)_n$ phenyl, pyridyl, pyrimidinyl, pyridazinyl and pyrazinyl, wherein the $C_3$-$C_6$ cycloalkyl, phenyl, —$(CH_2)_n$ phenyl, pyridyl, pyrimidinyl, pyridazinyl and pyrazinyl groups are optionally substituted with one or more substituents independently selected from the group consisting of: $C_1$-$C_6$ alkyl, OH, halo$C_1$-$C_3$ alkyl, halo, CN and OMe.

In a further embodiment Z is selected from the group consisting of: $C_1$-$C_6$ alkyl, $C_3$-$C_6$ cycloalkyl, phenyl, methylenedioxyphenyl, —$(CH_2)_n$ phenyl, pyridyl, pyrimidinyl, pyridazinyl and pyrazinyl, wherein the $C_3$-$C_6$ cycloalkyl, phenyl, —$(CH_2)_n$ phenyl, pyridyl, pyrimidinyl, pyridazinyl and pyrazinyl groups are optionally substituted with one or more substituents independently selected from the group consisting of: $C_1$-$C_4$ alkyl, OH, $CF_3$, halo and CN.

In yet another embodiment Z is selected from the group consisting of: $C_1$-$C_6$ alkyl, $C_3$-$C_6$ cycloalkyl, phenyl, methylenedioxyphenyl, —$(CH_2)_n$ phenyl, pyridyl, pyrimidinyl, pyridazinyl and pyrazinyl, wherein the $C_3$-$C_6$ cycloalkyl, phenyl, —$(CH_2)_n$ phenyl, pyridyl, pyrimidinyl, pyridazinyl and pyrazinyl groups are optionally substituted with one or more substituents independently selected from the group consisting of: $C_1$-$C_4$ alkyl, OH, $CF_3$, F, Cl and CN.

In still a further embodiment Z is selected from the group consisting of: $C_1$-$C_3$ alkyl, $C_3$-$C_6$ cycloalkyl, phenyl, methylenedioxyphenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or more substituents independently selected from the group consisting of: $C_1$-$C_6$ alkyl, OH, halo$C_1$-$C_6$ alkyl, halo, CN and OMe.

In yet another embodiment Z is selected from the group consisting of: $C_1$-$C_3$ alkyl, $C_3$-$C_6$ cycloalkyl, phenyl, methylenedioxyphenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or more substituents independently selected from the group consisting of: $C_1$-$C_6$ alkyl, OH, halo$C_1$-$C_3$ alkyl, halo, CN and OMe.

In a further embodiment Z is selected from the group consisting of: $C_1$-$C_3$ alkyl, $C_3$-$C_6$ cycloalkyl, phenyl, methylenedioxyphenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or more substituents independently selected from the group consisting of: $C_1$-$C_4$ alkyl, OH, $CF_3$, halo and CN.

In another embodiment Z is selected from the group consisting of: $C_1$-$C_3$ alkyl, $C_3$-$C_6$ cycloalkyl, phenyl, methylenedioxyphenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or more substituents independently selected from the group consisting of: $C_1$-$C_4$ alkyl, OH, $CF_3$, F, Cl and CN.

In still a further embodiment Z is selected from the group consisting of: $C_1$-$C_3$ alkyl, $C_3$-$C_6$ cycloalkyl, phenyl, methylenedioxyphenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or two substituents independently selected from the group consisting of: $C_1$-$C_6$ alkyl, OH, halo$C_1$-$C_6$ alkyl, halo, CN and OMe.

In another embodiment Z is selected from the group consisting of: $C_1$-$C_3$ alkyl, $C_3$-$C_6$ cycloalkyl, phenyl, methylenedioxyphenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or two substituents independently selected from the group consisting of: $C_1$-$C_6$ alkyl, OH, halo$C_1$-$C_3$ alkyl, halo, CN and OMe.

In a further embodiment Z is selected from the group consisting of: $C_1$-$C_3$ alkyl, $C_3$-$C_6$ cycloalkyl, phenyl, methylenedioxyphenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or two substituents independently selected from the group consisting of: $C_1$-$C_4$ alkyl, OH, $CF_3$, halo and CN.

In yet another embodiment Z is selected from the group consisting of: $C_1$-$C_3$ alkyl, $C_3$-$C_6$ cycloalkyl, phenyl, methylenedioxyphenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or two substituents independently selected from the group consisting of: $C_1$-$C_4$ alkyl, OH, $CF_3$, F, Cl and CN.

In a further embodiment Z is selected from the group consisting of: methyl, ethyl, $C_3$-$C_6$ cycloalkyl, phenyl, methylenedioxyphenyl and pyridyl, wherein the $C_3$-$C_6$ cycloalkyl, phenyl and pyridyl groups are optionally substituted with one or more substituents independently selected from the group consisting of: $C_1$-$C_6$ alkyl, OH, halo$C_1$-$C_6$ alkyl, halo, CN and OMe.

In another embodiment Z is selected from the group consisting of: methyl, ethyl, $C_5$-$C_6$ cycloalkyl, phenyl, methylenedioxyphenyl and pyridyl, wherein the $C_5$-$C_6$ cycloalkyl, phenyl and pyridyl groups are optionally substituted with one or more substituents independently selected from the group consisting of: $C_1$-$C_6$ alkyl, OH, halo$C_1$-$C_3$ alkyl, halo, CN and OMe.

In a further embodiment Z is selected from the group consisting of: methyl, ethyl, $C_5$-$C_6$ cycloalkyl, phenyl, methylenedioxyphenyl and pyridyl, wherein the $C_5$-$C_6$ cycloalkyl, phenyl and pyridyl groups are optionally substituted with one or more substituents independently selected from the group consisting of: $C_1$-$C_4$ alkyl, OH, $CF_3$, halo and CN.

In still another embodiment Z is selected from the group consisting of: methyl, ethyl, $C_5$-$C_6$ cycloalkyl, phenyl, methylenedioxyphenyl and pyridyl, wherein the $C_5$-$C_6$ cycloalkyl, phenyl and pyridyl groups are optionally substituted with one or more substituents independently selected from the group consisting of: $C_1$-$C_4$ alkyl, OH, $CF_3$, F, Cl and CN.

In a further embodiment Z is selected from the group consisting of: methyl, cyclohexyl, phenyl, methylenedioxyphenyl and pyridyl, wherein the cyclohexyl, phenyl and pyridyl groups are optionally substituted with one or more substituents independently selected from the group consisting of: $C_1$-$C_6$ alkyl, OH, halo$C_1$-$C_6$ alkyl, halo, CN and OMe.

In yet another embodiment Z is selected from the group consisting of: methyl, cyclohexyl, phenyl, methylenedioxyphenyl and pyridyl, wherein the cyclohexyl, phenyl and pyridyl groups are optionally substituted with one or more substituents independently selected from the group consisting of: $C_1$-$C_6$ alkyl, OH, halo$C_1$-$C_3$ alkyl, halo, CN and OMe.

In a further embodiment Z is selected from the group consisting of: methyl, cyclohexyl, phenyl, methylenedioxyphenyl and pyridyl, wherein the cyclohexyl, phenyl and pyridyl groups are optionally substituted with one or more substituents independently selected from the group consisting of: $C_1$-$C_4$ alkyl, OH, $CF_3$, halo and CN.

In another embodiment Z is selected from the group consisting of: methyl, cyclohexyl, phenyl, methylenedioxyphenyl and pyridyl, wherein the cyclohexyl, phenyl and pyridyl groups are optionally substituted with one or more substituents independently selected from the group consisting of: $C_1$-$C_4$ alkyl, OH, $CF_3$, F, Cl and CN.

In a further embodiment Z is selected from the group consisting of: methyl, cyclohexyl, phenyl, methylenedioxyphenyl and pyridyl, wherein the cyclohexyl, phenyl and pyridyl groups are optionally substituted with one or two substituents independently selected from the group consisting of: $C_1$-$C_6$ alkyl, OH, halo$C_1$-$C_6$ alkyl, halo, CN and OMe.

In yet another embodiment Z is selected from the group consisting of: methyl, cyclohexyl, phenyl, methylenedioxyphenyl and pyridyl, wherein the cyclohexyl, phenyl and pyridyl groups are optionally substituted with one or two substituents independently selected from the group consisting of: $C_1$-$C_6$ alkyl, OH, halo$C_1$-$C_3$ alkyl, halo, CN and OMe.

In still a further embodiment Z is selected from the group consisting of: methyl, cyclohexyl, phenyl, methylenedioxyphenyl and pyridyl, wherein the cyclohexyl, phenyl and pyridyl groups are optionally substituted with one or two substituents independently selected from the group consisting of: $C_1$-$C_4$ alkyl, OH, $CF_3$, halo and CN.

In another embodiment Z is selected from the group consisting of: methyl, cyclohexyl, phenyl, methylenedioxyphenyl and pyridyl, wherein the cyclohexyl, phenyl and pyridyl groups are optionally substituted with one or two substituents independently selected from the group consisting of: $C_1$-$C_4$ alkyl, OH, $CF_3$, F, Cl and CN.

In a further embodiment Z is selected from the group consisting of: phenyl, methylenedioxyphenyl and pyridyl, wherein the phenyl and pyridyl groups are optionally substituted with one or more substituents independently selected from the group consisting of: $C_1$-$C_6$ alkyl, OH, halo$C_1$-$C_6$ alkyl, halo, CN and OMe.

In yet another embodiment Z is selected from the group consisting of: phenyl, methylenedioxyphenyl and pyridyl, wherein the phenyl and pyridyl groups are optionally substituted with one or more substituents independently selected from the group consisting of: $C_1$-$C_6$ alkyl, OH, halo$C_1$-$C_3$ alkyl, halo, CN and OMe.

In a further embodiment Z is selected from the group consisting of: phenyl, methylenedioxyphenyl and pyridyl, wherein the phenyl and pyridyl groups are optionally substituted with one or more substituents independently selected from the group consisting of: $C_1$-$C_4$ alkyl, OH, $CF_3$, halo and CN.

In yet another embodiment Z is selected from the group consisting of: phenyl, methylenedioxyphenyl and pyridyl, wherein the phenyl and pyridyl groups are optionally substituted with one or more substituents independently selected from the group consisting of: $C_1$-$C_4$ alkyl, OH, $CF_3$, F, Cl and CN.

In a further embodiment Z is selected from the group consisting of: phenyl, methylenedioxyphenyl and pyridyl, wherein the phenyl and pyridyl groups are optionally substituted with one or two substituents independently selected from the group consisting of: $C_1$-$C_6$ alkyl, OH, halo$C_1$-$C_6$ alkyl, halo, CN and OMe.

In still another embodiment Z is selected from the group consisting of: phenyl, methylenedioxyphenyl and pyridyl, wherein the phenyl and pyridyl groups are optionally substituted with one or two substituents independently selected from the group consisting of: $C_1$-$C_6$ alkyl, OH, halo$C_1$-$C_3$ alkyl, halo, CN and OMe.

In yet another embodiment Z is selected from the group consisting of: phenyl, methylenedioxyphenyl and pyridyl, wherein the phenyl and pyridyl groups are optionally substituted with one or two substituents independently selected from the group consisting of: $C_1$-$C_4$ alkyl, OH, $CF_3$, halo and CN.

In a further embodiment Z is selected from the group consisting of: phenyl, methylenedioxyphenyl and pyridyl, wherein the phenyl and pyridyl groups are optionally substituted with one or two substituents independently selected from the group consisting of: $C_1$-$C_4$ alkyl, OH, $CF_3$, F, Cl and CN.

In yet another embodiment Z is selected from the group consisting of:

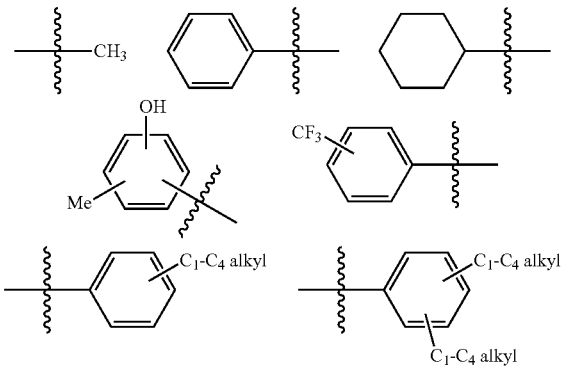

-continued

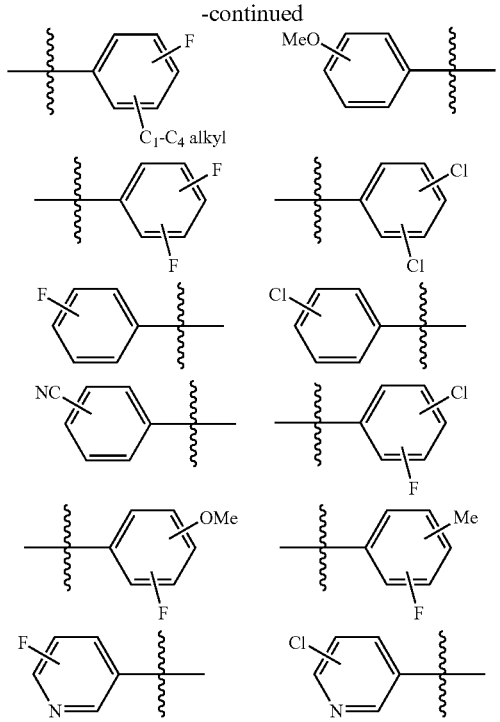

and 3,4-methylenedioxyphenyl.

In still a further embodiment Z is selected from the group consisting of:

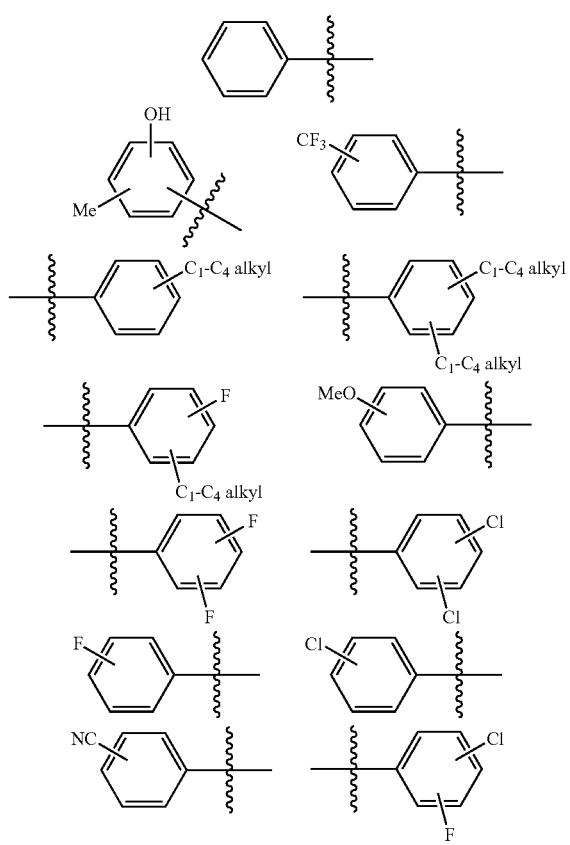

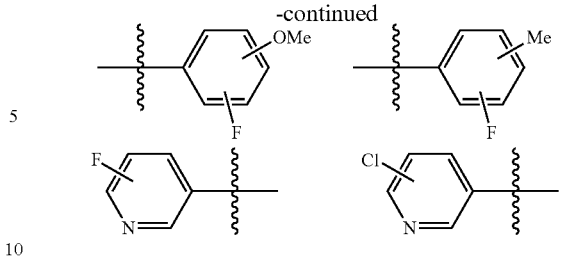

and 3,4-methylenedioxyphenyl.

In one embodiment R is selected from the group consisting of: $C_1$-$C_6$ alkyl, phenyl, a heteroaryl group having between 5 and 14 ring atoms in which one or more of the ring atoms are nitrogen and a heterocyclyl group having between 5 and 14 ring atoms in which one or more of the ring atoms are nitrogen, wherein the phenyl, heteroaryl and heterocyclyl groups are optionally substituted with one or more substituents independently selected from the group consisting of: $C_1$-$C_6$ alkyl and —C(═O)—NR$_1$R$_2$.

In a further embodiment R is selected from the group consisting of: $C_1$-$C_4$ alkyl, phenyl, a heteroaryl group having between 5 and 10 ring atoms in which one or more of the ring atoms are nitrogen and a heterocyclyl group having between 5 and 10 ring atoms in which one or more of the ring atoms are nitrogen, wherein the phenyl, heteroaryl and heterocyclyl groups are optionally substituted with one or more substituents independently selected from the group consisting of: $C_1$-$C_4$ alkyl and —C(═O)—NR$_1$R$_2$.

In yet another embodiment R is selected from the group consisting of: methyl, phenyl, a heteroaryl group having between 5 and 10 ring atoms in which between one and three of the ring atoms are nitrogen and a heterocyclyl group having between 5 and 10 ring atoms in which between one and three of the ring atoms are nitrogen, wherein the phenyl, heteroaryl and heterocyclyl groups are optionally substituted with one or more substituents independently selected from the group consisting of: $C_1$-$C_4$ alkyl and —C(═O)—NR$_1$R$_2$.

In still a further embodiment R is selected from the group consisting of: methyl, phenyl, a heteroaryl group having between 5 and 10 ring atoms in which one or two of the ring atoms are nitrogen and a heterocyclyl group having between 5 and 10 ring atoms in which one or two of the ring atoms are nitrogen, wherein the phenyl, heteroaryl and heterocyclyl groups are optionally substituted with one or more substituents independently selected from the group consisting of: $C_1$-$C_4$ alkyl and —C(═O)—NR$_1$R$_2$.

In another embodiment R is selected from the group consisting of: methyl, phenyl, a heteroaryl group having between 5 and 10 ring atoms in which one or two of the ring atoms are nitrogen and a heterocyclyl group having 9 or 10 ring atoms in which one or two of the ring atoms are nitrogen, wherein the phenyl, heteroaryl and heterocyclyl groups are optionally substituted with one or more substituents independently selected from the group consisting of: $C_1$-$C_4$ alkyl and —C(═O)—NR$_1$R$_2$.

In a further embodiment R is selected from the group consisting of: $C_1$-$C_6$ alkyl, a heteroaryl group having between 5 and 14 ring atoms in which one or more of the ring atoms are nitrogen and a heterocyclyl group having between 5 and 14 ring atoms in which one or more of the ring atoms are nitrogen, wherein the heteroaryl and heterocyclyl groups are optionally substituted with one or more substituents independently selected from the group consisting of: $C_1$-$C_6$ alkyl and —C(═O)—NR$_1$R$_2$.

In yet another embodiment R is selected from the group consisting of: $C_1$-$C_4$ alkyl, a heteroaryl group having between 5 and 10 ring atoms in which one or more of the ring atoms are nitrogen and a heterocyclyl group having between 5 and 10 ring atoms in which one or more of the ring atoms are nitrogen, wherein the heteroaryl and heterocyclyl groups are optionally substituted with one or more substituents independently selected from the group consisting of: $C_1$-$C_4$ alkyl and —C(=O)—NR$_1$R$_2$.

In a further embodiment R is selected from the group consisting of: methyl, a heteroaryl group having between 5 and 10 ring atoms in which between one and three of the ring atoms are nitrogen and a heterocyclyl group having between 5 and 10 ring atoms in which between one and three of the ring atoms are nitrogen, wherein the heteroaryl and heterocyclyl groups are optionally substituted with one or more substituents independently selected from the group consisting of: $C_1$-$C_4$ alkyl and —C(=O)—NR$_1$R$_2$.

In another embodiment R is selected from the group consisting of: methyl, a heteroaryl group having between 5 and 10 ring atoms in which one or two of the ring atoms are nitrogen and a heterocyclyl group having between 5 and 10 ring atoms in which one or two of the ring atoms are nitrogen, wherein the heteroaryl and heterocyclyl groups are optionally substituted with one or more substituents independently selected from the group consisting of: $C_1$-$C_4$ alkyl and —C(=O)—NR$_1$R$_2$.

In still a further embodiment R is selected from the group consisting of: methyl, a heteroaryl group having between 5 and 10 ring atoms in which one or two of the ring atoms are nitrogen and a heterocyclyl group having 9 or 10 ring atoms in which one or two of the ring atoms are nitrogen, wherein the heteroaryl and heterocyclyl groups are optionally substituted with one or more substituents independently selected from the group consisting of: $C_1$-$C_4$ alkyl and —C(=O)—NR$_1$R$_2$.

In a further embodiment R is selected from the group consisting of: $C_1$-$C_6$ alkyl, a heteroaryl group having between 5 and 14 ring atoms in which one or more of the ring atoms are nitrogen and a heterocyclyl group having between 5 and 14 ring atoms in which one or more of the ring atoms are nitrogen, wherein the heteroaryl and heterocyclyl groups are optionally substituted with one or two substituents independently selected from the group consisting of: $C_1$-$C_6$ alkyl and —C(=O)—NR$_1$R$_2$.

In yet another embodiment R is selected from the group consisting of: $C_1$-$C_4$ alkyl, a heteroaryl group having between 5 and 10 ring atoms in which one or more of the ring atoms are nitrogen and a heterocyclyl group having between 5 and 10 ring atoms in which one or more of the ring atoms are nitrogen, wherein the heteroaryl and heterocyclyl groups are optionally substituted with one or two substituents independently selected from the group consisting of: $C_1$-$C_4$ alkyl and —C(=O)—NR$_1$R$_2$.

In a further embodiment R is selected from the group consisting of: methyl, a heteroaryl group having between 5 and 10 ring atoms in which between one and three of the ring atoms are nitrogen and a heterocyclyl group having between 5 and 10 ring atoms in which between one and three of the ring atoms are nitrogen, wherein the heteroaryl and heterocyclyl groups are optionally substituted with one or two substituents independently selected from the group consisting of: $C_1$-$C_4$ alkyl and —C(=O)—NR$_1$R$_2$.

In another embodiment R is selected from the group consisting of: methyl, a heteroaryl group having between 5 and 10 ring atoms in which one or two of the ring atoms are nitrogen, wherein the heteroaryl and heterocyclyl groups are optionally substituted with one or two substituents independently selected from the group consisting of: $C_1$-$C_4$ alkyl and —C(=O)—NR$_1$R$_2$.

In still a further embodiment R is selected from the group consisting of: methyl, a heteroaryl group having between 5 and 10 ring atoms in which one or two of the ring atoms are nitrogen and a heterocyclyl group having 9 or 10 ring atoms in which one or two of the ring atoms are nitrogen, wherein the heteroaryl and heterocyclyl groups are optionally substituted with one or two substituents independently selected from the group consisting of: $C_1$-$C_4$ alkyl and —C(=O)—NR$_1$R$_2$.

In yet another embodiment R is selected from the group consisting of: a heteroaryl group having between 5 and 14 ring atoms in which one or more of the ring atoms are nitrogen and a heterocyclyl group having between 5 and 14 ring atoms in which one or more of the ring atoms are nitrogen, wherein the heteroaryl and heterocyclyl groups are optionally substituted with one or more substituents independently selected from the group consisting of: $C_1$-$C_6$ alkyl and —C(=O)—NR$_1$R$_2$.

In still a further embodiment R is selected from the group consisting of: a heteroaryl group having between 5 and 10 ring atoms in which one or more of the ring atoms are nitrogen and a heterocyclyl group having between 5 and 10 ring atoms in which one or more of the ring atoms are nitrogen, wherein the heteroaryl and heterocyclyl groups are optionally substituted with one or more substituents independently selected from the group consisting of: $C_1$-$C_4$ alkyl and —C(=O)—NR$_1$R$_2$.

In yet another embodiment R is selected from the group consisting of: a heteroaryl group having between 5 and 10 ring atoms in which between one and three of the ring atoms are nitrogen and a heterocyclyl group having between 5 and 10 ring atoms in which between one and three of the ring atoms are nitrogen, wherein the heteroaryl and heterocyclyl groups are optionally substituted with one or more substituents independently selected from the group consisting of: $C_1$-$C_4$ alkyl and —C(=O)—NR$_1$R$_2$.

In a further embodiment R is selected from the group consisting of: a heteroaryl group having between 5 and 10 ring atoms in which one or two of the ring atoms are nitrogen and a heterocyclyl group having between 5 and 10 ring atoms in which one or two of the ring atoms are nitrogen, wherein the heteroaryl and heterocyclyl groups are optionally substituted with one or more substituents independently selected from the group consisting of: $C_1$-$C_4$ alkyl and —C(=O)—NR$_1$R$_2$.

In another embodiment R is selected from the group consisting of: a heteroaryl group having between 5 and 10 ring atoms in which one or two of the ring atoms are nitrogen and a heterocyclyl group having 9 or 10 ring atoms in which one or two of the ring atoms are nitrogen, wherein the heteroaryl and heterocyclyl groups are optionally substituted with one or more substituents independently selected from the group consisting of: $C_1$-$C_4$ alkyl and —C(=O)—NR$_1$R$_2$.

In a further embodiment R is selected from the group consisting of: a heteroaryl group having between 5 and 10 ring atoms in which one or two of the ring atoms are nitrogen and a heterocyclyl group having between 5 and 10 ring atoms in which one or two of the ring atoms are nitrogen, wherein the heteroaryl and heterocyclyl groups are optionally substituted with one or two substituents independently selected from the group consisting of: $C_1$-$C_4$ alkyl and —C(=O)—$NR_1R_2$.

In another embodiment R is selected from the group consisting of: a heteroaryl group having between 5 and 10 ring atoms in which one or two of the ring atoms are nitrogen and a heterocyclyl group having 9 or 10 ring atoms in which one or two of the ring atoms are nitrogen, wherein the heteroaryl and heterocyclyl groups are optionally substituted with one or two substituents independently selected from the group consisting of: $C_1$-$C_4$ alkyl and —C(=O)—$NR_1R_2$.

In a further embodiment R is selected from the group consisting of: $C_1$-$C_6$ alkyl, a heteroaryl group having between 5 and 14 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

In another embodiment R is selected from the group consisting of: $C_1$-$C_4$ alkyl, a heteroaryl group having between 5 and 10 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

In still a further embodiment R is selected from the group consisting of: methyl, a heteroaryl group having between 5 and 10 ring atoms in which between one and three of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

In yet another embodiment R is selected from the group consisting of: methyl, a heteroaryl group having between 5 and 10 ring atoms in which one or two of the ring atoms are nitrogen and 2,3-dihydroindolyl, wherein the heteroaryl and 2,3-dihydroindolyl groups are optionally substituted with one or more substituents independently selected from the group consisting of: $C_1$-$C_2$ alkyl and —C(=O)—$NR_1R_2$.

In a further embodiment R is selected from the group consisting of: methyl, a heteroaryl group having between 5 and 10 ring atoms in which one or two of the ring atoms are nitrogen and 2,3-dihydroindolyl, wherein the heteroaryl and 2,3-dihydroindolyl groups are optionally substituted with one or more substituents independently selected from the group consisting of: $C_1$-$C_2$ alkyl and —C(=O)—$NR_1R_2$.

In another embodiment R is selected from the group consisting of: a heteroaryl group having between 5 and 14 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

In still a further embodiment R is selected from the group consisting of: a heteroaryl group having between 5 and 10 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

In another embodiment R is selected from the group consisting of: a heteroaryl group having between 5 and 10 ring atoms in which between one and three of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

In a further embodiment R is selected from the group consisting of: a heteroaryl group having between 5 and 10 ring atoms in which one or two of the ring atoms are nitrogen and 2,3-dihydroindolyl, wherein the heteroaryl and 2,3-dihydroindolyl groups are optionally substituted with one or more substituents independently selected from the group consisting of: $C_1$-$C_2$ alkyl and —C(=O)—$NR_1R_2$.

In another embodiment R is selected from the group consisting of: a heteroaryl group having between 5 and 10 ring atoms in which one or two of the ring atoms are nitrogen and 2,3-dihydroindolyl, wherein the heteroaryl and 2,3-dihydroindolyl groups are optionally substituted with one or more substituents independently selected from the group consisting of: $C_1$-$C_2$ alkyl and —C(=O)—$NR_1R_2$.

In still a further embodiment R is selected from the group consisting of: $C_1$-$C_6$ alkyl, a heteroaryl group having between 5 and 14 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: methyl, —C(=O)—$NH_2$ and —C(=O)—$NMe_2$.

In yet another embodiment R is selected from the group consisting of: $C_1$-$C_4$ alkyl, a heteroaryl group having between 5 and 9 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: methyl, —C(=O)—$NH_2$ and —C(=O)—$NMe_2$.

In a further embodiment R is selected from the group consisting of: methyl, a heteroaryl group having between 5 and 9 ring atoms in which between one and three of the ring atoms are nitrogen and 2,3-dihydroindolyl, wherein the heteroaryl and 2,3-dihydroindolyl groups are optionally substituted with one or two substituents independently selected from the group consisting of: methyl, —C(=O)—$NH_2$ and —C(=O)—$NMe_2$.

In yet another embodiment R is selected from the group consisting of: methyl, a heteroaryl group having between 5 and 9 ring atoms in which one or two of the ring atoms are nitrogen and 2,3-dihydroindolyl, wherein the heteroaryl and 2,3-dihydroindolyl groups are optionally substituted with one or two substituents independently selected from the group consisting of: methyl, —C(=O)—$NH_2$ and —C(=O)—$NMe_2$.

In a further embodiment R is selected from the group consisting of:

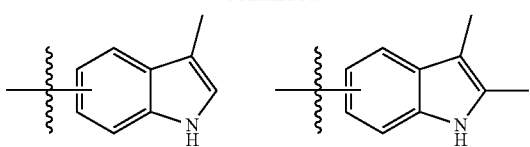
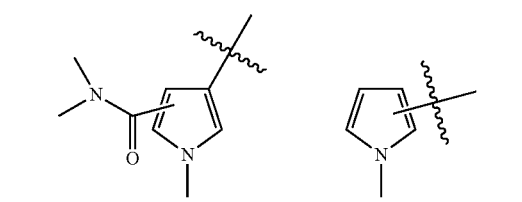
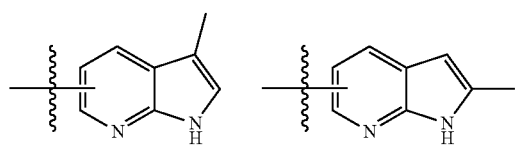
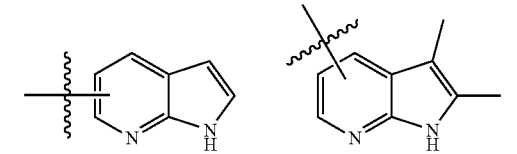
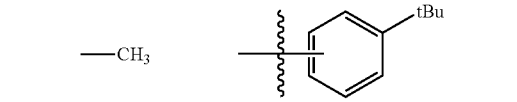
—CH₃
In another embodiment R is selected from the group consisting of:
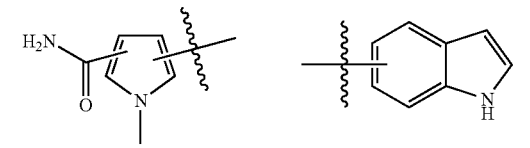
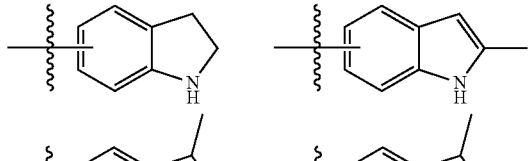
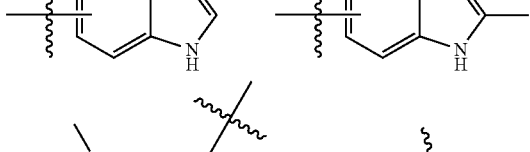
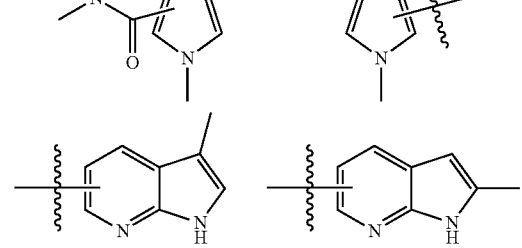
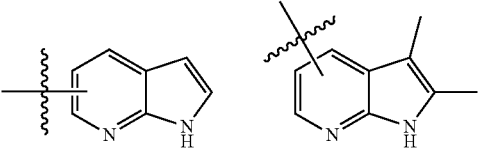
in still a further embodiment R is selected from the group consisting of:
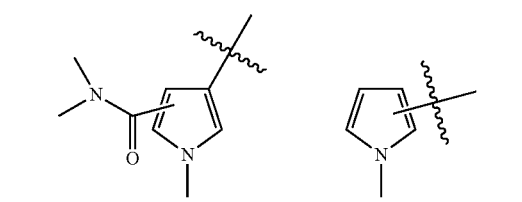
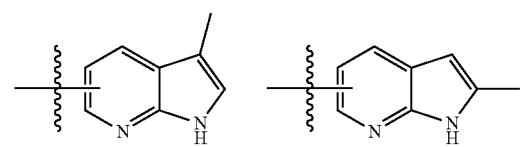
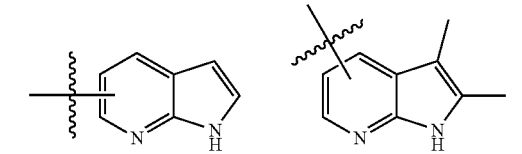
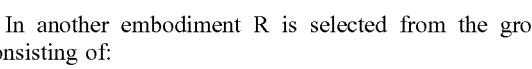
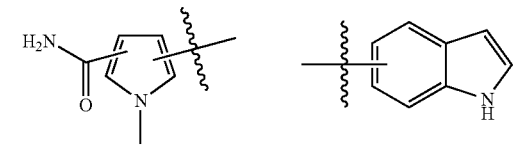
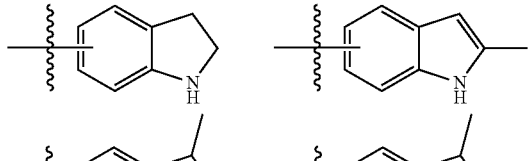
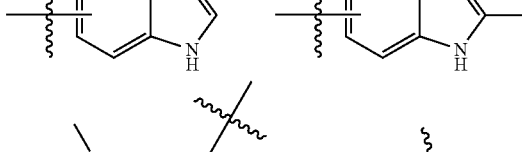
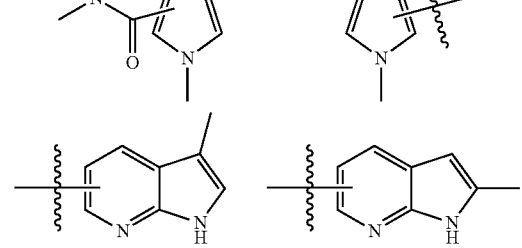
—CH₃
In yet another embodiment R is selected from the group consisting of:

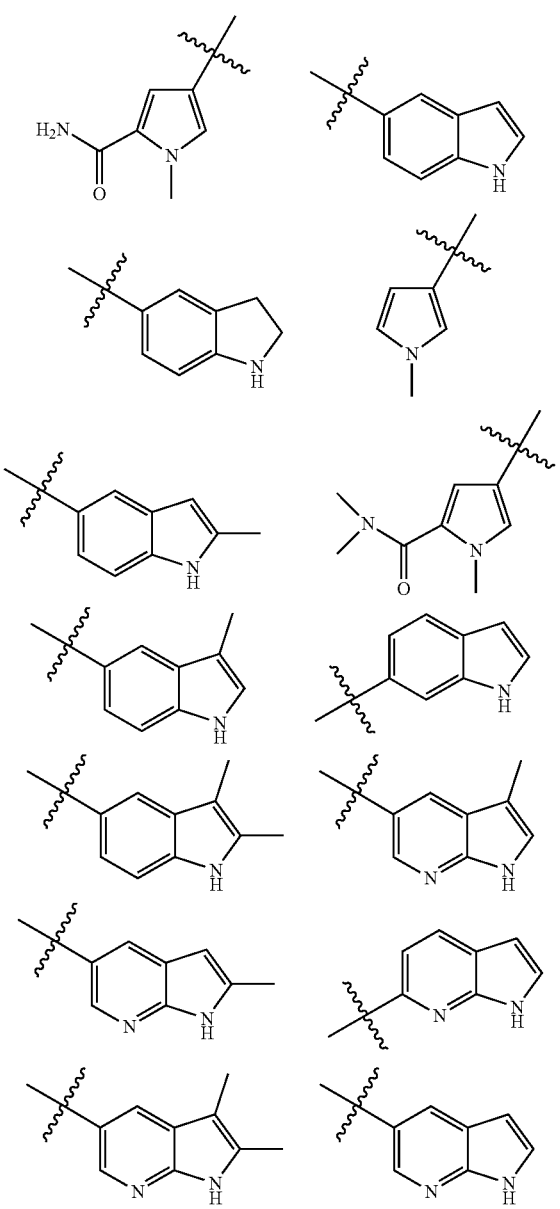
In some embodiments n is an integer between 1 and 5, 1 and 4, 1 and 3, or 1 or 2.
In one embodiment n is 1 or 2.
In further embodiments $R_1$ and $R_2$ may be independently selected from H and methyl.
In yet another embodiment $R_1$ and $R_2$ may both be H.
Exemplary compounds according to formula (I) include:
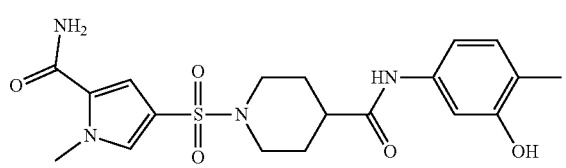
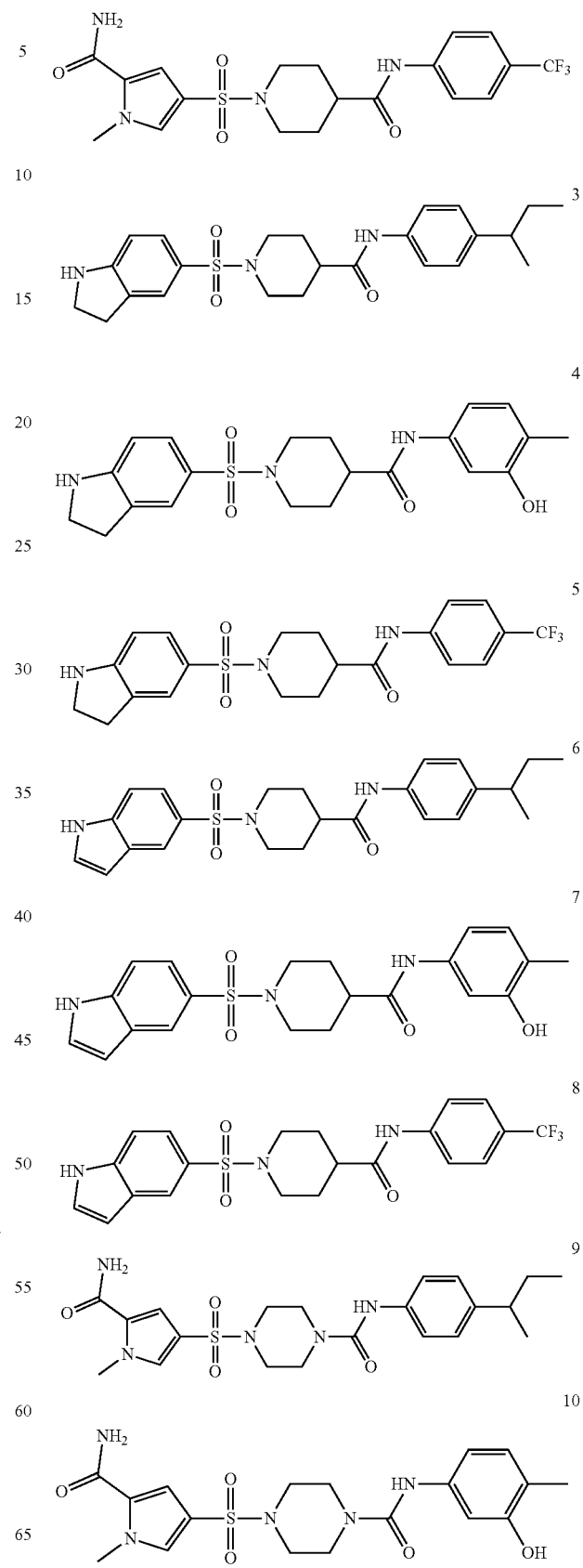
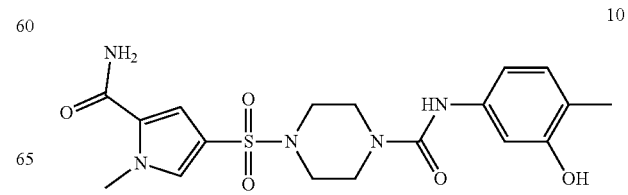

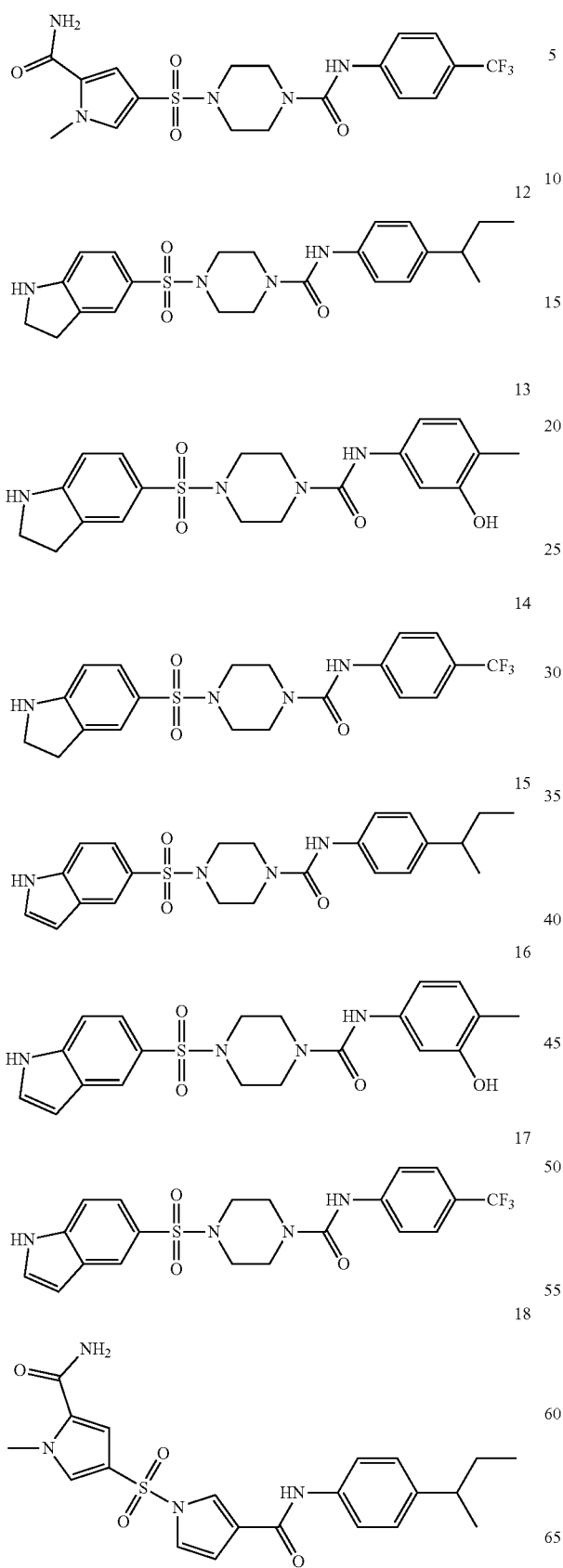
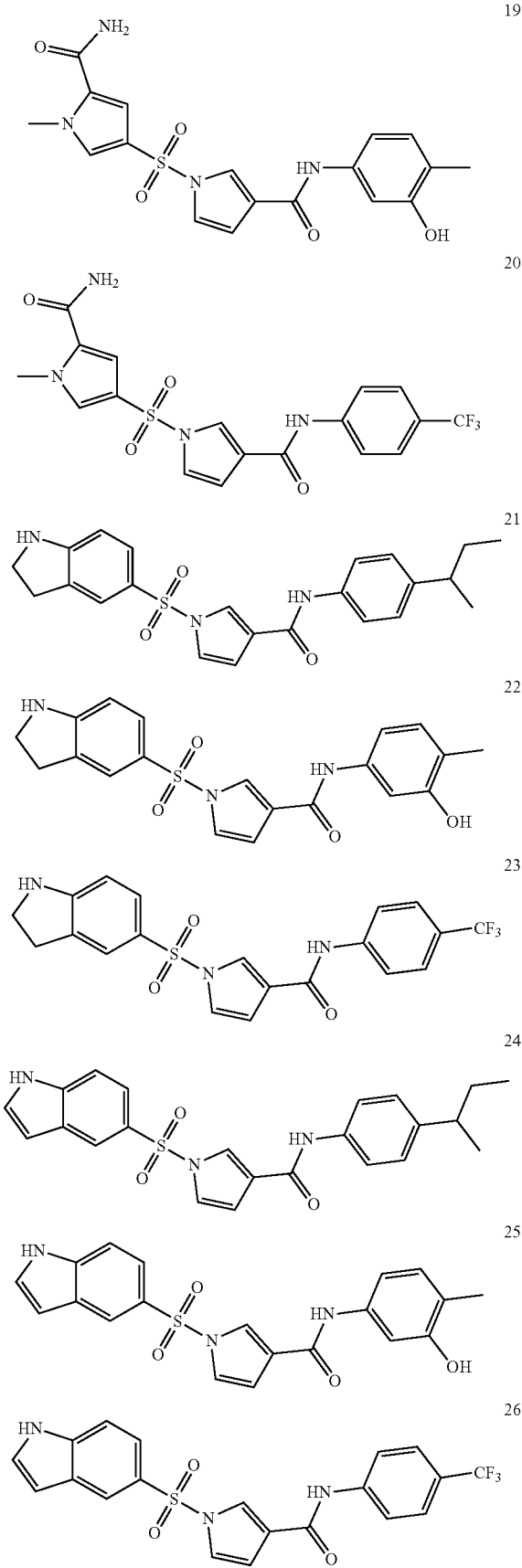

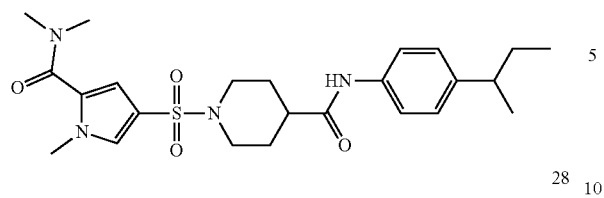
27
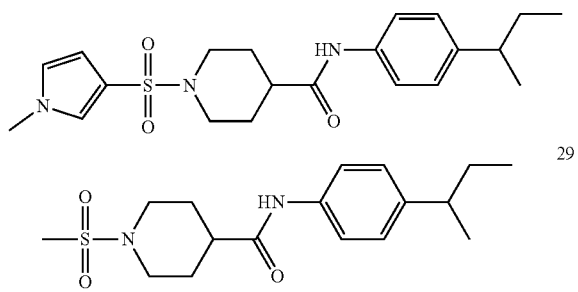
28
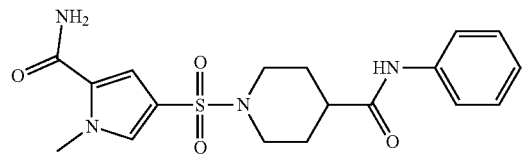
29
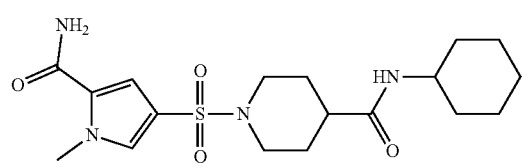
30
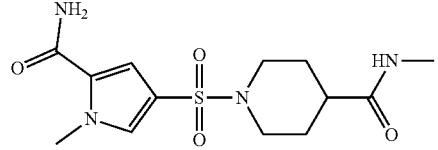
31
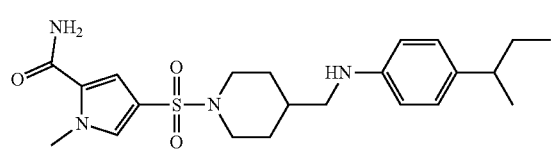
32
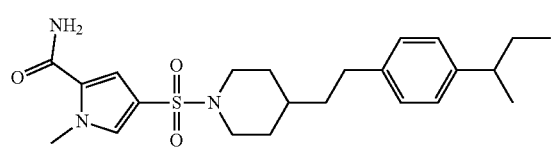
33
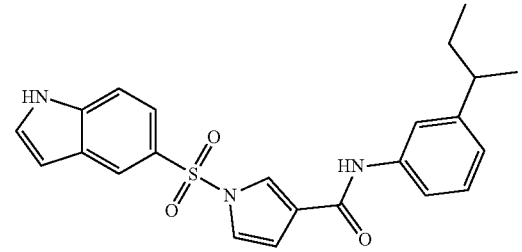
34
35
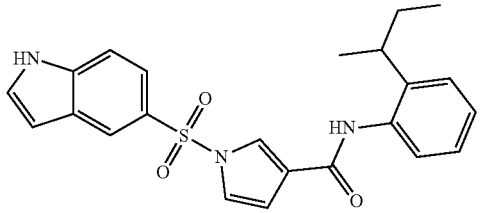
36
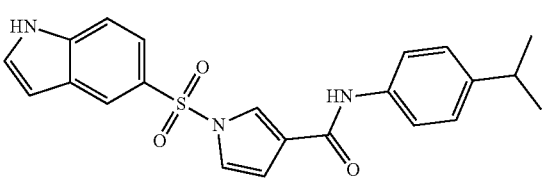
37
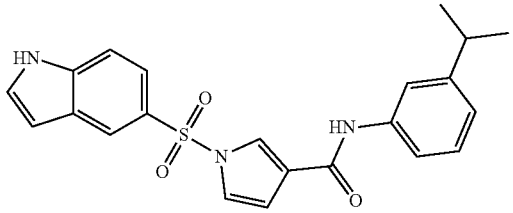
38
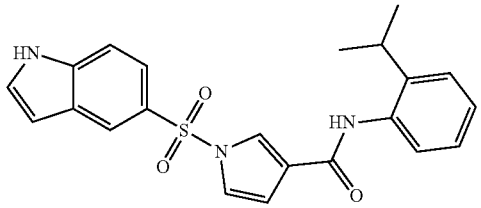
39
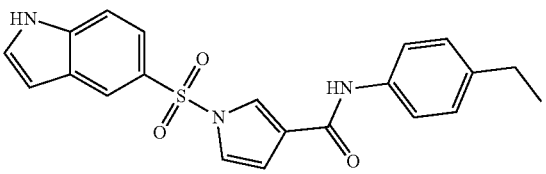
40
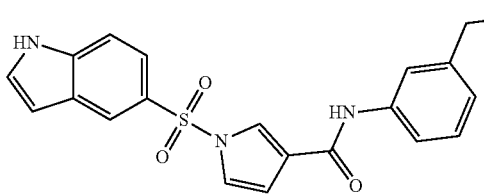
41
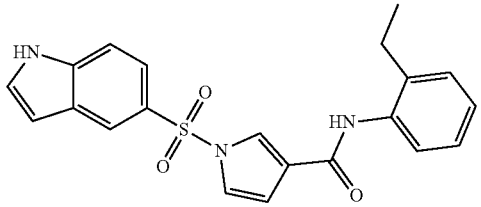
42

-continued

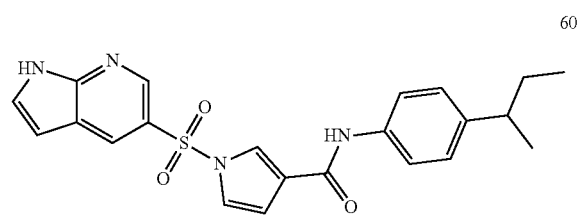
60
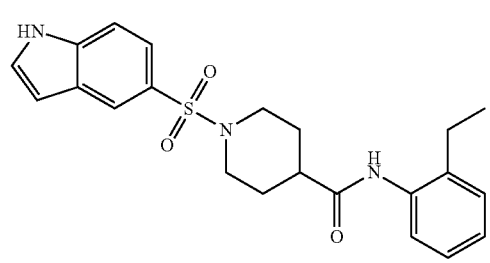
61
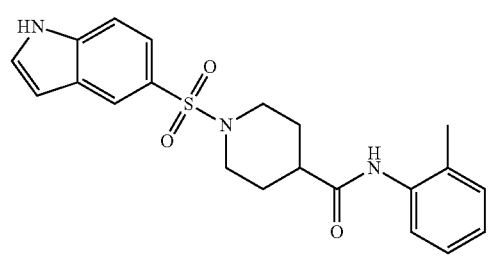
62
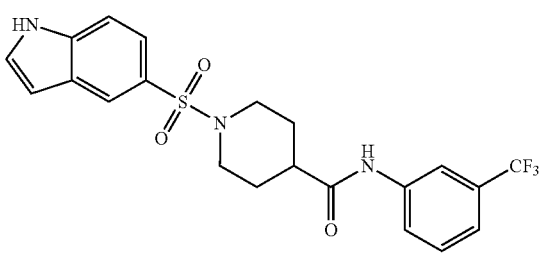
63
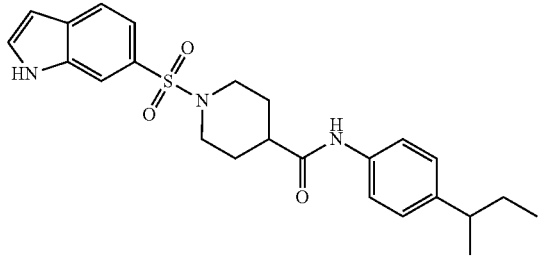
64
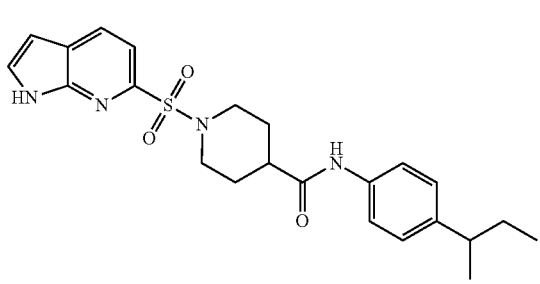
65
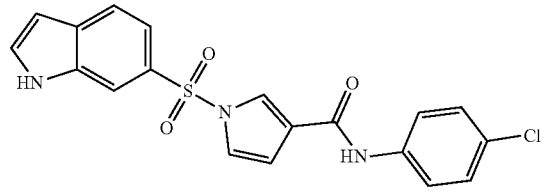
66
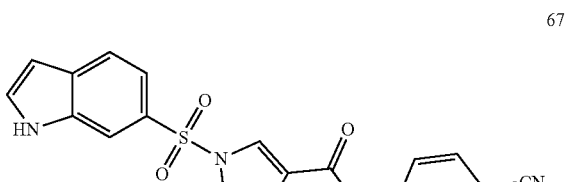
67
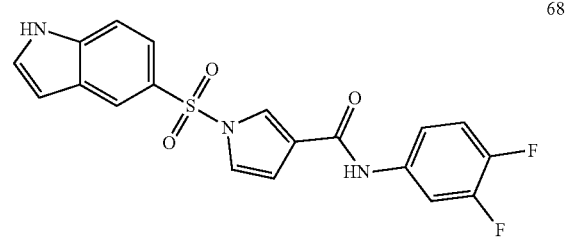
68
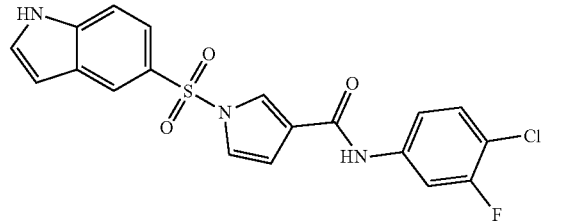
69
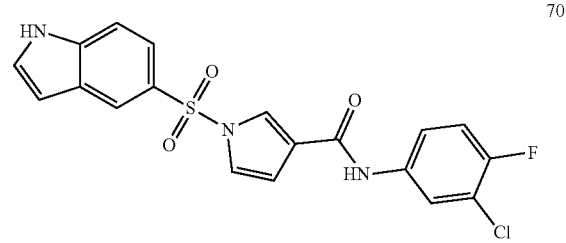
70
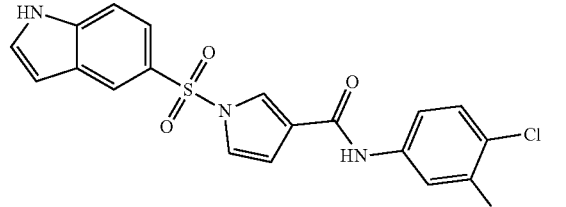
71
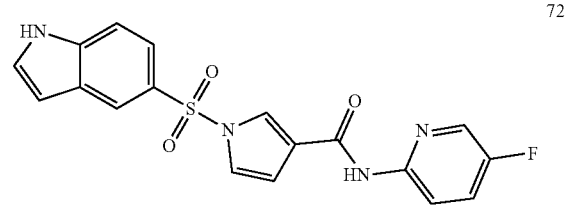
72

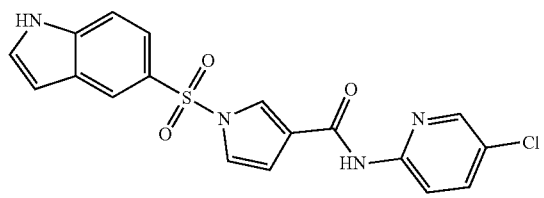
73
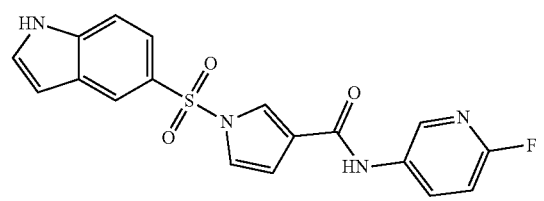
74
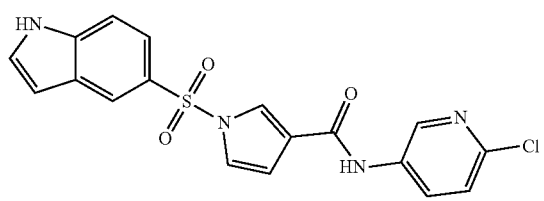
75
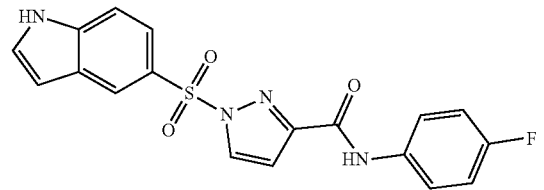
76
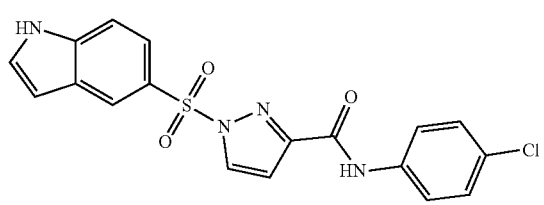
77
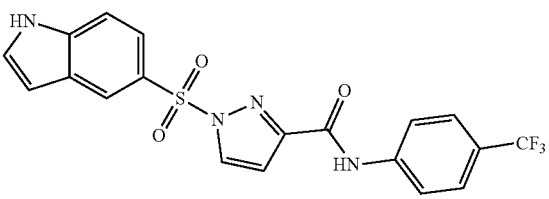
78
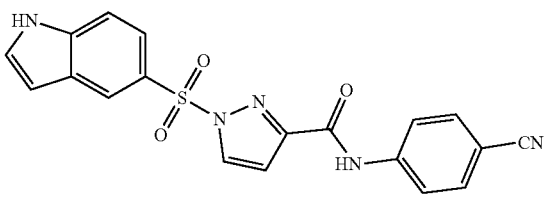
79
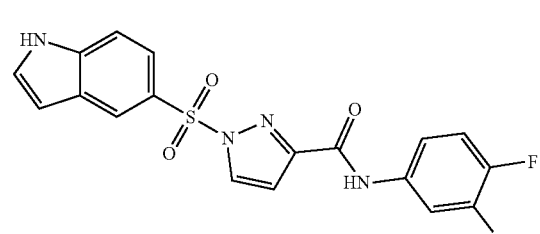
80
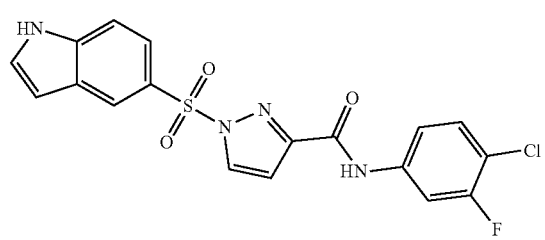
81
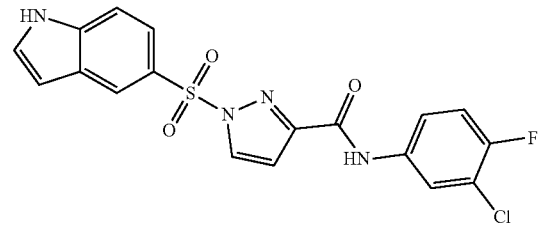
82
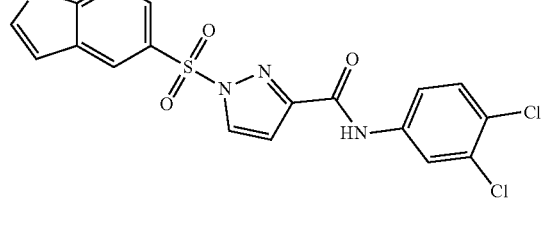
83
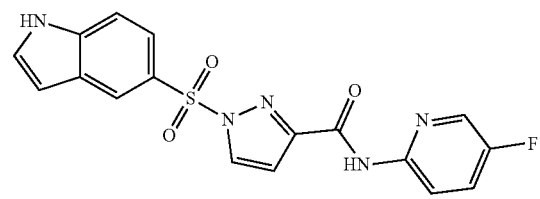
84
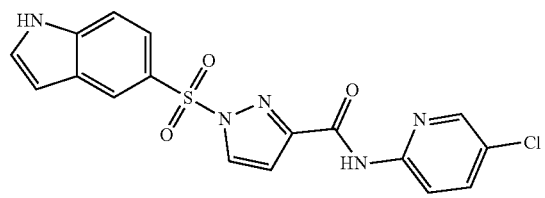
85
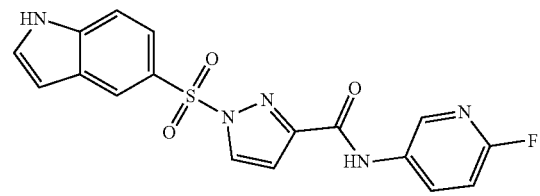
86

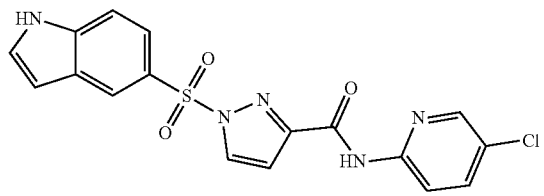
87
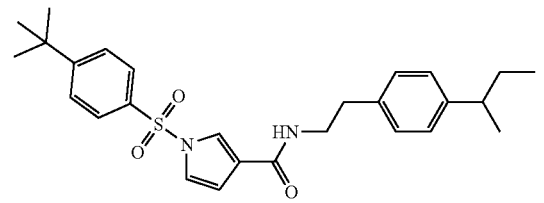
88
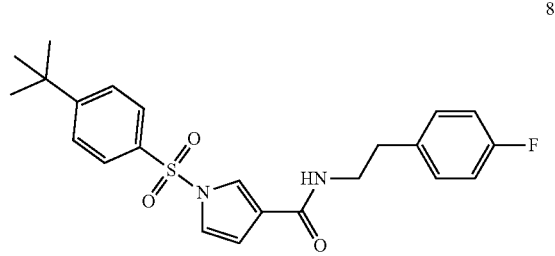
89
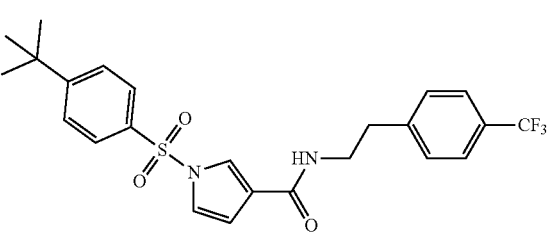
90
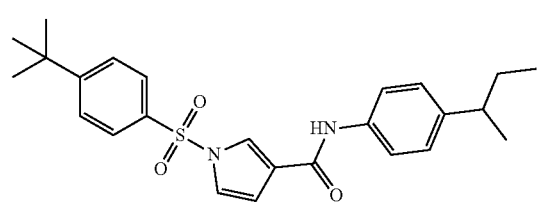
91
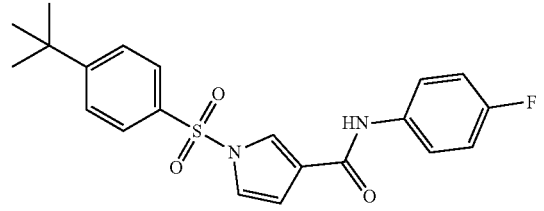
92
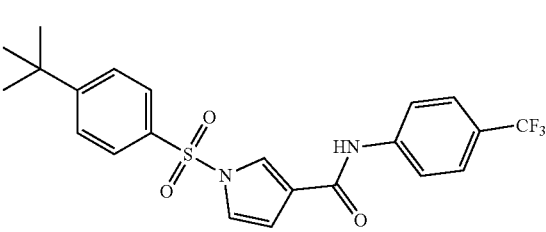
93
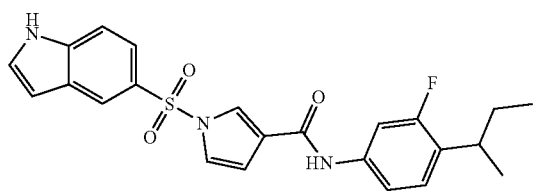
94

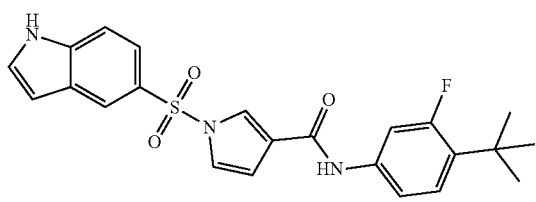
101
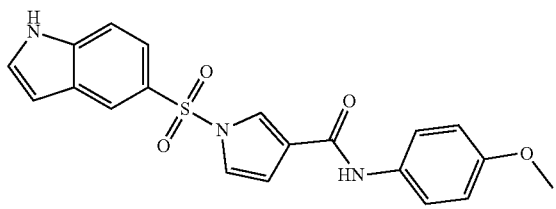
102
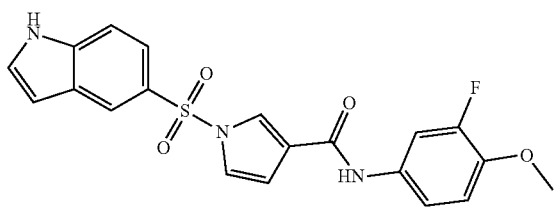
103
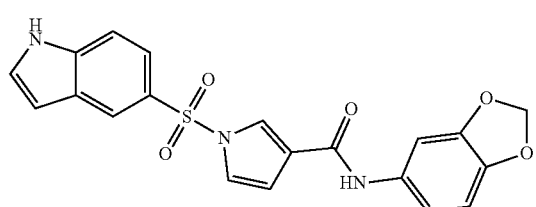
104
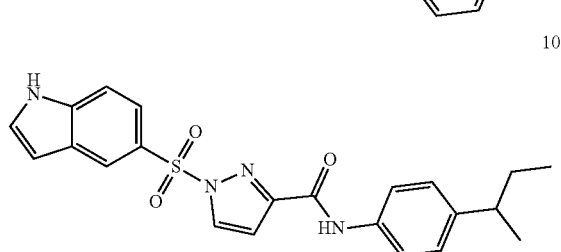
105
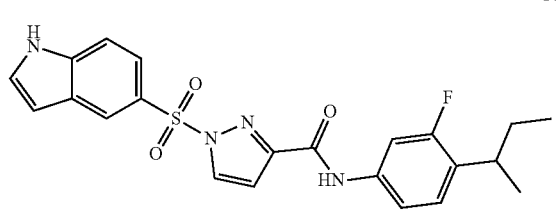
106
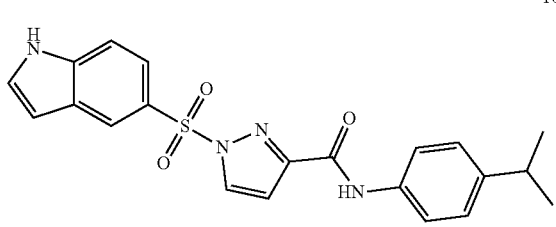
107
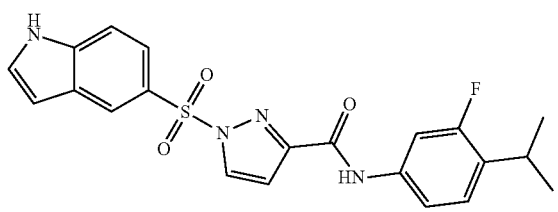
108
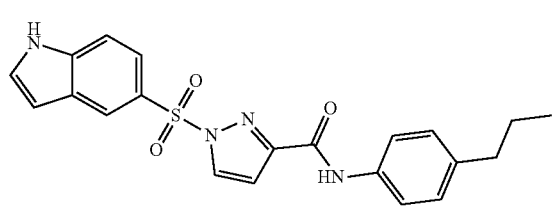
109
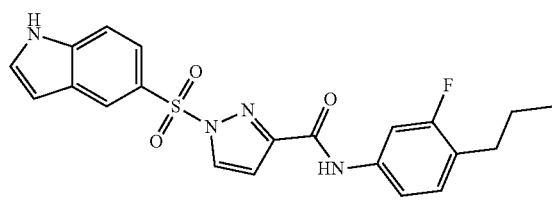
110
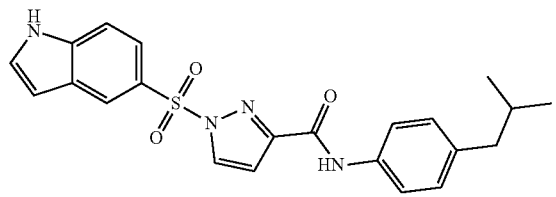
111
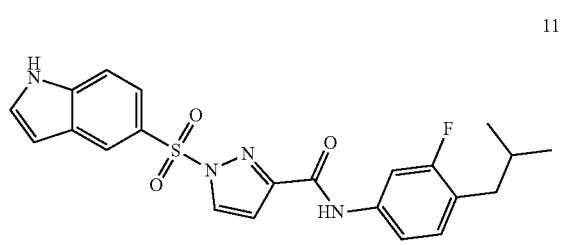
112
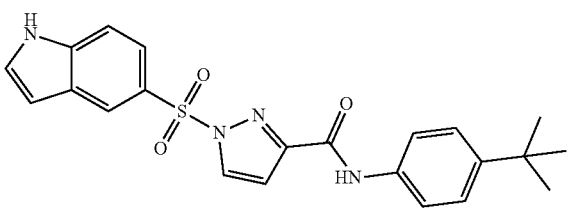
113
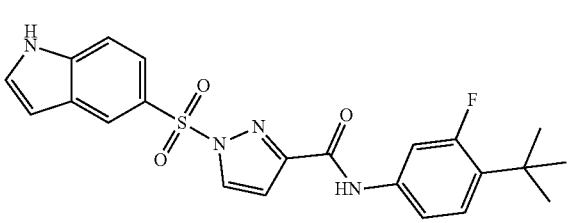
114

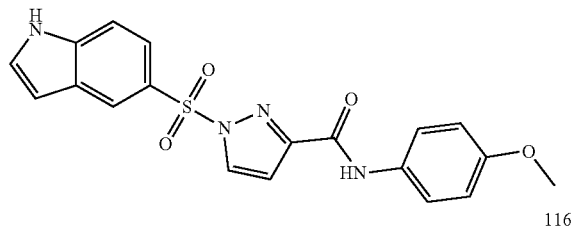

115

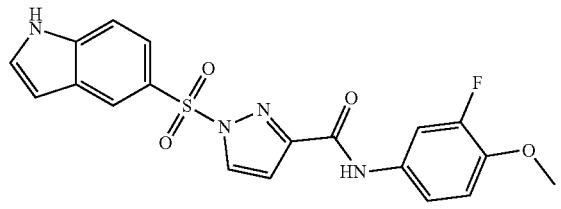

116

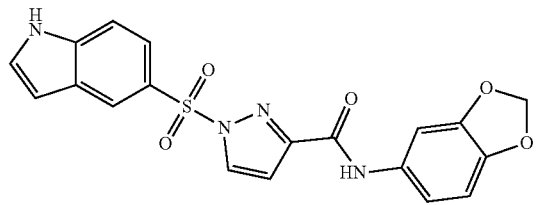

117

In one embodiment the compound of formula (I) is selected from any one or more of the above compounds 1 to 117.

In one embodiment the compound of formula (I) is selected from any one or more of the above compounds 1 to 93.

In another embodiment the compound of formula (I) is selected from any one or more of compounds 1, 3 to 28 and 33 to 93.

Selected compounds of formula (I) may include one or more chiral centres. The present disclosure extends to all enantiomers and diastereoisomers as well as mixtures thereof in any proportions. The disclosure also extends to isolated enantiomers or pairs of enantiomers. Methods of separating enantiomers and diastereoisomers are well known to persons skilled in the art. In some embodiments compounds of the formula (I) are racemic mixtures. In other embodiments compounds of the formula (I) are present in optically pure form.

Compounds of the formula (I) are also taken to include hydrates and solvates. Solvates are complexes formed by association of molecules of a solvent with a compound of the formula (I). In the case of compounds of the formula (I) that are solids, it will be understood by those skilled in the art that such compounds may exist in different crystalline or polymorphic forms, all of which are intended to be within the scope of the present disclosure.

The compounds of formula (I) may be in the form of pharmaceutically acceptable salts. Such salts are well known to those skilled in the art. S. M. Berge et al. describe pharmaceutically acceptable salts in detail in *J. Pharmaceutical Sciences,* 1977, 66: 1-19. Pharmaceutically acceptable salts can be prepared in situ during the final isolation and purification of compounds of the formula (I), or separately by reacting the free base compound with a suitable organic acid. Suitable pharmaceutically acceptable acid addition salts of the compounds of the present disclosure may be prepared from an inorganic acid or from an organic acid. Examples of such inorganic acids are hydrochloric, hydrobromic, hydroiodic, nitric, carbonic, sulfuric, and phosphoric acid. Appropriate organic acids may be selected from aliphatic, cycloaliphatic, aromatic, heterocyclic carboxylic and sulfonic classes of organic acids, examples of which are formic, acetic, propionic, succinic, glycolic, gluconic, lactic, malic, tartaric, citric, ascorbic, glucoronic, fumaric, maleic, pyruvic, alkyl sulfonic, arylsulfonic, aspartic, glutamic, benzoic, anthranilic, mesylic, salicylic, p-hydroxybenzoic, phenylacetic, pamoic, pantothenic, sulfanilic, cyclohexylaminosulfonic, stearic, algenic, β-hydroxybutyric and galacturonic acids. Suitable pharmaceutically acceptable base addition salts of the compounds of the present disclosure include metallic salts made from lithium, sodium, potassium, magnesium, calcium, aluminium and zinc, and organic salts made from organic bases such as choline, diethanolamine and morpholine. Alternatively, organic salts made from N,N'-dibenzylethylenediamine, chloroprocaine, choline, diethanolamine, ethylenediamine, meglumine (N-methylglucamine), procaine, ammonium salts, quaternary salts, such as tetramethylammonium salt, amino acid addition salts, such as salts with glycine and arginine.

The compounds of formula (I) also extend to include all derivatives with physiologically cleavable leaving groups that can be cleaved in vivo to provide the compounds of formula (I).

Compounds of the formula (I) may be synthesised as described in the Examples section below. Armed with these synthetic procedures and the common general knowledge, those skilled in the art will readily be able to prepare all compounds embraced by formula (I).

After purification, compounds of formula (I) may be substantially pure. For example, the compounds of formula (I) may be isolated in a form which is at least about 80%, 81%, 82%, 83%, 84%, 85%, 86%, 87%, 88%, 89%, 90%, 91%, 92%, 93%, 94%, 95%, 96%, 97%, 98%, 99%, 99.5% or 99.9% pure.

Compounds of the formula (I) may be obtained as racemic mixtures. Enantiomers may be isolated using techniques known to those skilled in the art, including chiral resolution, supercritical fluid chromatography and enantioselective syntheses. Individual enantiomers may be isolated in a substantially pure form or in an enantiomeric excess (ee). For example, in preferred embodiments an enantiomer may be isolated in an enantiomeric excess of about 70%, 75%, 80%, 85%, 90%, 91%, 92%, 93%, 94%, 95%, 96%, 97%, 98%, 99% or greater than 99%.

The compounds of formula (I) find use in the treatment of cancer. The compounds of formula (I) may be used in conjunction with, or alternatively in the absence of, other chemotherapeutic agents. In some embodiments the compounds of formula (I) may be used in the treatment of cancer that is resistant to one or more chemotherapeutic agents.

The compounds of formula (I) may find use in treating cancer that has recurred in a subject and in reducing the incidence of, or the risk of, recurrence of cancer in a subject deemed to be at risk of cancer recurrence, for example a subject who is in cancer remission. Compounds of the formula (I) may also find use in preventing or slowing cancer spread, such as for example, preventing or slowing metastasis.

The cancer may be a solid tumour, such as for example, neuroblastoma, sarcoma, breast cancer, lung cancer, prostate cancer, ovarian cancer, bone cancer, uterine cancer, peritoneal cancer, brain cancer, skin cancer, colon cancer, testicular cancer, colorectal cancer, cervical cancer, renal cancer, bladder cancer, gastric cancer, pancreatic cancer, gall bladder cancer, liver cancer, head and neck cancer, throat cancer and esophageal cancer. The cancer may be one or any combination of the above cancers.

In some embodiments the cancer is colorectal cancer, prostate cancer, pancreatic cancer, lung cancer, ovarian cancer or neuroblastoma. In one embodiment the lung cancer may be non-small cell lung cancer Those skilled in the art will recognise that compounds and pharmaceutical compositions of the disclosure may be administered via any route which delivers an effective amount of the compounds to the tissue or site to be treated. In general, the compounds and compositions may be administered by the parenteral (for example intravenous, intraspinal, subcutaneous or intramuscular), oral, rectal or topical route. Administration may be systemic, regional or local.

The particular route of administration to be used in any given circumstance will depend on a number of factors, including the nature of the cancer to be treated, the severity and extent of the cancer, the required dosage of the particular compound to be delivered and the potential side-effects of the compound.

In general, suitable compositions may be prepared according to methods that are known to those of ordinary skill in the art and may include pharmaceutically acceptable carriers, diluents and/or excipients. The carriers, diluents and excipients must be "acceptable" in terms of being compatible with the other ingredients of the composition, and not deleterious to the recipient thereof.

Examples of pharmaceutically acceptable carriers or diluents are demineralised or distilled water; saline solution; vegetable-based oils such as peanut oil, safflower oil, olive oil, cottonseed oil, maize oil or coconut oil; silicone oils, including polysiloxanes, such as methyl polysiloxane, phenyl polysiloxane and methylphenyl polysiloxane: volatile silicones; mineral oils such as liquid paraffin, soft paraffin or squalane; cellulose derivatives such as methyl cellulose, ethyl cellulose, carboxymethylcellulose, sodium carboxymethylcellulose or hydroxypropylmethylcellulose; Cremophor®; cyclodextrins; lower alcohols, for example ethanol or i-propanol; lower polyalkylene glycols or lower alkylene glycols, for example polyethylene glycol, polypropylene glycol, ethylene glycol, propylene glycol, 1,3-butylene glycol or glycerin; fatty acid esters such as isopropyl palmitate, isopropyl myristate or ethyl oleate; polyvinylpyrrolidone; agar; carrageenan; gum tragacanth or gum acacia and petroleum jelly. Typically, the carrier or carriers will form from about 10% to about 99.9% by weight of the compositions.

Pharmaceutical compositions may be in a form suitable for administration by injection, in the form of a formulation suitable for oral ingestion (such as capsules, tablets, caplets, elixirs, for example), in the form of an ointment, cream or lotion suitable for topical administration, in a form suitable for delivery as an eye drop, in an aerosol form suitable for administration by inhalation, such as by intranasal inhalation or oral inhalation, in a form suitable for parenteral administration, that is, subcutaneous, intramuscular or intravenous injection.

For administration as an injectable solution or suspension, non-toxic parenterally acceptable diluents or carriers can include cyclodextrins (for example Captisol®) Cremophor®, Ringer's solution, isotonic saline, phosphate buffered saline, ethanol and 1,2 propylene glycol. To aid injection and delivery, the compounds may also be added to PEG and non-PEGylated liposomes or micelles with specific targeting tags attached to PEG moieties, such as the RGD peptide or glutathione, for aiding passage across the blood brain barrier.

Some examples of suitable carriers, diluents, excipients and adjuvants for oral use include cyclodextrins, Cremaphore, peanut oil, liquid paraffin, sodium carboxymethylcellulose, methylcellulose, sodium alginate, gum acacia, gum tragacanth, dextrose, sucrose, sorbitol, mannitol, gelatine and lecithin. In addition, these oral formulations may contain suitable flavouring and colourings agents. When used in capsule form, the capsules may be coated with compounds such as glyceryl monostearate or glyceryl distearate that delay disintegration.

Adjuvants typically include emollients, emulsifiers, thickening agents, preservatives, bactericides and buffering agents.

Solid forms for oral administration may contain binders acceptable in human and veterinary pharmaceutical practice, sweeteners, disintegrating agents, diluents, flavourings, coating agents, preservatives, lubricants and/or time delay agents. Suitable binders include gum acacia, gelatine, corn starch, gum tragacanth, sodium alginate, carboxymethylcellulose, or polyethylene glycol. Suitable sweeteners include sucrose, lactose, glucose, aspartame or saccharin. Suitable disintegrating agents include corn starch, methylcellulose, polyvinylpyrrolidone, guar gum, xanthan gum, bentonite, alginic acid or agar. Suitable diluents include lactose, sorbitol, mannitol, dextrose, kaolin, cellulose, calcium carbonate, calcium silicate or dicalcium phosphate. Suitable flavouring agents include peppermint oil, oil of wintergreen, cherry, orange or raspberry flavouring. Suitable coating agents include polymers or copolymers of acrylic acid and/or methacrylic acid and/or their esters, waxes, fatty alcohols, zein, shellac or gluten. Suitable preservatives include sodium benzoate, vitamin E, alpha-tocopherol, ascorbic acid, methyl paraben, propyl paraben or sodium bisulphite. Suitable lubricants include magnesium stearate, stearic acid, sodium oleate, sodium chloride or talc. Suitable time delay agents include glyceryl monostearate or glyceryl distearate.

Liquid forms suitable for oral administration may contain, in addition to the above agents, a liquid carrier. Suitable liquid carriers include water, oils such as olive oil, peanut oil, sesame oil, sunflower oil, safflower oil, coconut oil, liquid paraffin, ethylene glycol, propylene glycol, polyethylene glycol, ethanol, propanol, isopropanol, glycerol, fatty alcohols, triglycerides or mixtures thereof.

Suspensions for oral administration may further comprise dispersing agents and/or suspending agents. Suitable suspending agents include sodium carboxymethylcellulose, methylcellulose, hydroxypropylmethylcellulose, polyvinylpyrrolidone, sodium alginate or cetyl alcohol. Suitable dispersing agents include lecithin, polyoxyethylene esters of fatty acids such as stearic acid, polyoxyethylene sorbitol mono- or di-oleate, -stearate or -laurate, polyoxyethylene sorbitan mono- or di-oleate, -stearate or -laurate and the like.

Emulsions for oral administration may further comprise one or more emulsifying agents. Suitable emulsifying agents include dispersing agents as exemplified above or natural gums such as guar gum, gum acacia or gum tragacanth.

Methods for preparing parenterally administrable compositions are apparent to those skilled in the art, and are described in more detail in, for example, Remington's Pharmaceutical Science, 15th ed., Mack Publishing Company, Easton, PA, the entirety of which is hereby incorporated by reference.

Topical formulations may comprise an active ingredient together with one or more acceptable carriers, and optionally any other therapeutic ingredients. Formulations suitable for topical administration include liquid or semi-liquid preparations suitable for penetration through the skin to the site where treatment is required, such as liniments, lotions, creams, ointments or pastes, and drops suitable for administration to the eye, ear or nose.

Drops may comprise sterile aqueous or oily solutions or suspensions. These may be prepared by dissolving the active ingredient in an aqueous solution of a bactericidal and/or fungicidal agent and/or any other suitable preservative, and optionally including a surface active agent. The resulting solution may then be clarified by filtration, transferred to a suitable container and sterilised. Sterilisation may be achieved by autoclaving or maintaining at 90° C. to 100° C. for half an hour, or by filtration, followed by transfer to a container by an aseptic technique. Examples of bactericidal and fungicidal agents suitable for inclusion in the drops are phenylmercuric nitrate or acetate (0.002%), benzalkonium chloride (0.01%) and chlorhexidine acetate (0.01%). Suitable solvents for the preparation of an oily solution include glycerol, diluted alcohol and propylene glycol.

Lotions include those suitable for application to the skin or eye. An eye lotion may comprise a sterile aqueous solution optionally containing a bactericide and may be prepared by methods similar to those described above in relation to the preparation of drops. Lotions or liniments for application to the skin may also include an agent to hasten drying and to cool the skin, such as an alcohol or acetone, and/or a moisturiser such as glycerol, or oil such as olive oil.

Creams, ointments or pastes are typically semi-solid formulations of the active ingredient for external application. They may be made by mixing the active ingredient in finely divided or powdered form, alone or in solution or suspension in an aqueous or non-aqueous fluid, with a greasy or non-greasy basis. The basis may comprise hydrocarbons such as hard, soft or liquid paraffin, glycerol, beeswax, a metallic soap; a mucilage; an oil of natural origin such as almond, corn, *arachis*, castor or olive oil; wool fat or its derivatives, or a fatty acid such as stearic or oleic acid together with an alcohol, such as propylene glycol or macrogols.

The composition may incorporate any suitable surfactant such as an anionic, cationic or non-ionic surfactant, such as sorbitan esters or polyoxyethylene derivatives thereof. Suspending agents such as natural gums, cellulose derivatives or inorganic materials such as siliceous silicas, and other ingredients such a lanolin, may also be included.

In some embodiments the compositions are administered in the form of suppositories suitable for rectal administration of the compounds of formula (I). These compositions are prepared by mixing the compound of formula (I) with a suitable non-irritating excipient which is solid at ordinary temperatures but liquid at the rectal temperature and will therefore melt in the rectum to release the compound of formula (I). Such materials include cocoa butter, glycerinated gelatin, hydrogenated vegetable oils, mixtures of polyethylene glycols of various molecular weights and fatty acid esters of polyethylene glycol.

The compositions may also be administered or delivered to target cells in the form of liposomes. Liposomes are generally derived from phospholipids or other lipid substances and are formed by mono- or multi-lamellar hydrated liquid crystals that are dispersed in an aqueous medium. Specific examples of liposomes used in administering or delivering a composition to target cells are synthetic cholesterol (Sigma), the phospholipid 1,2-distearoyl-sn-glycero-3-phosphocholine (DSPC, Avanti Polar Lipids), the PEG lipid 3-N-[(-methoxy poly(ethylene glycol)2000)carbamoyl]-1,2-dimyrestyloxy-propylamine (PEG-cDMA), and the cationic lipid 1,2-di-o-octadecenyl-3-(N.N-dimethyl)aminopropane (DODMA) or 1,2-dilinoleyloxy-3-(N, N-dimethylaminopropane (DLinDMA) in the molar ratios 55:20:10:15 or 48:20:2:30, respectively, PEG-CDMA, DODMA and DLinDMA. The liposome may be constructed from 1,2-distearoyl-sn-glycero-3-phosphoethanolamine-N-[methoxy(polyethyleneglycol)-2000] (DSPE PEG2000) and phosphatidylcholine derived from soy and hydrogenated between 50-100%, for example Soy PC-75 or Soy PC-100. Differing MW PEG's may be used and covalently bound with various specific targeting agents such as glutathione, RGD peptides or other recognized liposome targeting agents. Any non-toxic, physiologically acceptable and metabolisable lipid capable of forming liposomes can be used. The compositions in liposome form may contain stabilisers, preservatives, excipients and the like. The preferred lipids are the phospholipids and the phosphatidyl cholines (lecithins), both natural and synthetic. Methods to form liposomes are known in the art, and in relation to this, specific reference is made to: Prescott, Ed., *Methods in Cell Biology*, Volume XIV, Academic Press, New York, N Y. (1976), p. 33 et seq., the contents of which is incorporated herein by reference.

The compositions may also be administered in the form of microparticles or nanoparticles. Biodegradable microparticles formed from polylactide (PLA), polylactide-co-glycolide (PLGA), and epsilon-caprolactone (ε-caprolactone) have been extensively used as drug carriers to increase plasma half-life and thereby prolong efficacy (R. Kumar, M. 2000. *J. Pharm. Pharmaceut. Sci.* 3(2) 234-258). Microparticles have been formulated for the delivery of a range of drug candidates including vaccines, antibiotics, and DNA. Moreover, these formulations have been developed for various delivery routes including parenteral subcutaneous injection, intravenous injection and inhalation.

The compositions may incorporate a controlled release matrix that is composed of sucrose acetate isobutyrate (SAIB) and an organic solvent or organic solvents mixture. Polymer additives may be added to the vehicle as a release modifier to further increase the viscosity and slow down the release rate. SAIB is a well-known food additive. It is a very hydrophobic, fully esterified sucrose derivative, at a nominal ratio of six isobutyrate to two acetate groups. As a mixed ester, SAIB does not crystallise but rather exists as a clear viscous liquid. Mixing SAIB with a pharmaceutically acceptable organic solvent, such as ethanol or benzyl alcohol decreases the viscosity of the mixture sufficiently to allow for injection. An active pharmaceutical ingredient may be added to the SAIB delivery vehicle to form SAIB solution or suspension formulations. When the formulation is injected subcutaneously. the solvent differs from the matrix allowing the SAIB-drug or SAIB-drug-polymer mixtures to set up as an in situ forming depot.

For the purposes of the present disclosure, compounds and compositions may be administered to subjects either therapeutically or preventively. In a therapeutic application compositions are administered to a patient already suffering from cancer in an amount sufficient to cure, or at least partially arrest the cancer and its complications. The composition should provide a quantity of the compound sufficient to effectively treat the subject.

The therapeutically effective amount for any particular subject will depend upon a variety of factors including: the cancer being treated and the severity thereof; the activity of the compound administered; the composition in which the compound is present; the age, body weight, general health, sex and diet of the subject; the time of administration; the route of administration; the rate of sequestration of the compound; the duration of the treatment; drugs used in combination or coincidental with the compound, together with other related factors well known in medicine.

One skilled in the art would be able, by routine experimentation, to determine an effective, non-toxic amount of a compound that would be required to treat or prevent a particular cancer.

Generally, an effective dosage is expected to be in the range of about 0.0001 mg to about 1000 mg per kg body weight per 24 hours; typically, about 0.001 mg to about 750 mg per kg body weight per 24 hours; about 0.01 mg to about 500 mg per kg body weight per 24 hours; about 0.1 mg to about 500 mg per kg body weight per 24 hours; about 0.1 mg to about 250 mg per kg body weight per 24 hours about 1.0 mg to about 250 mg per kg body weight per 24 hours. More typically, an effective dose range is expected to be in the range about 1.0 mg to about 200 mg per kg body weight per 24 hours; about 1.0 mg to about 100 mg per kg body weight per 24 hours; about 1.0 mg to about 50 mg per kg body weight per 24 hours; about 1.0 mg to about 25 mg per kg body weight per 24 hours; about 5.0 mg to about 50 mg per kg body weight per 24 hours; about 5.0 mg to about 20 mg per kg body weight per 24 hours; about 5.0 mg to about 15 mg per kg body weight per 24 hours.

Alternatively, an effective dosage may be up to about 500 mg/m$^2$. Generally, an effective dosage is expected to be in the range of about 25 to about 500 mg/m$^2$, preferably about 25 to about 350 mg/m$^2$, more preferably about 25 to about 300 mg/m$^2$, still more preferably about 25 to about 250 mg/m$^2$, even more preferably about 50 to about 250 mg/m$^2$, and still even more preferably about 75 to about 150 mg/m$^2$.

Typically, in therapeutic applications, the treatment would be for the duration of the cancer.

Further, it will be apparent to one of ordinary skill in the art that the optimal quantity and spacing of individual dosages will be determined by the nature and extent of the cancer being treated, the form, route and site of administration, and the nature of the particular individual being treated. Also, such optimum conditions can be determined by conventional techniques.

The compounds of formula (I) may be used alone in the treatment of cancer, or alternatively in combination with radiotherapy and/or surgery and/or other therapeutic agents, for example chemotherapeutic agents and immunostimulatory agents, as part of a combination therapy. The compounds of formula (I) may sensitise cancer cells to other chemotherapeutic agents and/or radiotherapy.

In some embodiments the compounds of formula (I) may be administered in combination with anti-microtubule agents as a combination therapy. Anti-microtubule agents interfere with microtubule function, particularly within the mitotic spindle and include the vinca alkaloids (such as for example vincristine, vinorelbine, vinblastine and the like) and the taxanes (such as for example paclitaxel and docetaxel).

The terms "combination therapy" and "adjunct therapy" are intended to embrace administration of multiple therapeutic agents in a sequential manner in a regimen that will provide beneficial effects and is intended to embrace administration of these agents in either a single formulation or in separate formulations.

Combination therapy may involve the active agents being administered together, sequentially, or spaced apart as appropriate in each case. Combinations of active agents including compounds of the disclosure may be synergistic.

The co-administration of compounds of the formula (I) with other therapeutic agent(s) may be effected by a compound of the formula (I) being in the same unit dose form as the other therapeutic agent(s), or the compound of the formula (I) and the other therapeutic agent(s) may be present in individual and discrete unit dosage forms that are administered sequentially, at the same, or at a similar time. Sequential administration may be in any order as required, and may require an ongoing physiological effect of the first or initial agent to be current when the second or later agent is administered, especially where a cumulative or synergistic effect is desired. When administered separately, it may be preferred for the compound of formula (I) and the other agent to be administered by the same route of administration, although it is not necessary for this to be so.

In accordance with various embodiments of the present disclosure one or more compounds of formula (I) may be included in combination therapy with surgery and/or radiotherapy and/or one or more chemotherapeutic agents.

There are large numbers of chemotherapeutic agents that are currently in use, in clinical evaluation and in pre-clinical development, which could be selected for treatment of cancers in combination with compounds of the formula (I).

EXAMPLES

The present disclosure is further described below by reference to the following non-limiting examples.

Example 1—Synthesis of Compounds of Formula (I)

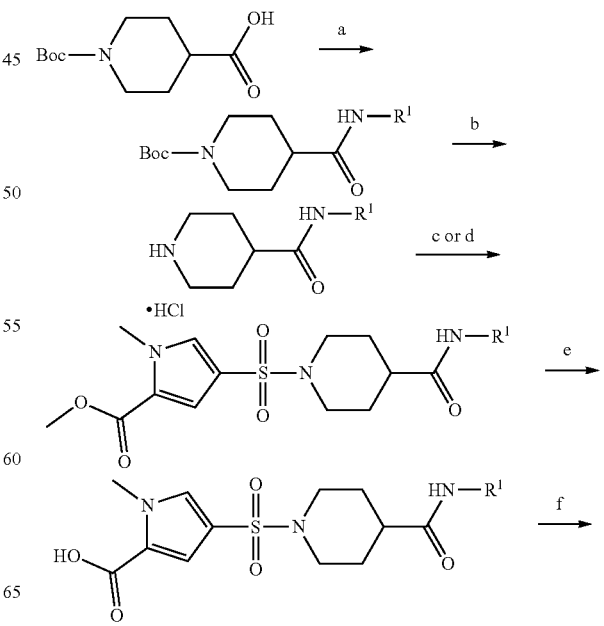

-continued

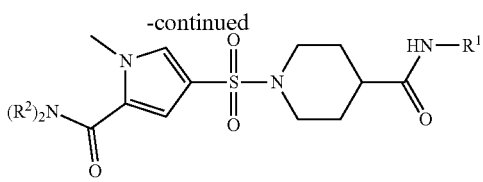

1: R¹ = 3-OH-4-Me-Ph; R² = H
2: R¹ = 4-CF₃-Ph; R² = H
27: R¹ = 4-secBu-Ph; R² = Me
30: R¹ = Ph; R² = H
31: R¹ = cyclohexyl; R² = H
32: R¹ = Me; R² = H Reagents and conditions:
a) R¹NH₂, HATU, DIPEA, DMF, rt;
b) 4M HCl, 1,4-dioxane, rt;
c) methyl 4-(chlorosulfonyl)-1-methyl-1H-pyrrole-2-carboxylate, pyridine, DMAP, rt;
d) methyl 4-(chlorosulfonyl)-1-methyl-1H-pyrrole-2-carboxylate, Et₃N, DMAP, DCM, 0° C. to rt;
e) LiOH, MeOH/THF/H₂O, 0° C. to rt;
f) (R₂)₂NH or NH₄Cl, HATU, DIPEA, DMF, rt.

Preparation of tert-butyl 4-((3-hydroxy-4-methylphenyl)carbamoyl)piperidine-1-carboxylate To a stirred solution of 1-(tert-butoxycarbonyl)piperidine-4-carboxylic acid (5.0 g, 21.81 mmol) in DMF (50 mL), was added 5-amino-2-methylphenol (2.69 g, 21.81 mmol) and DIPEA (11.4 mL, 65.42 mmol) followed by HATU (16.58 g, 43.61 mmol) at room temperature. The resulting reaction mixture was stirred at room temperature for 3 h. The progress of the reaction was monitored by TLC. After complete consumption of the starting material, the reaction mixture was quenched with H₂O (30 mL) and the precipitated solid was filtered off and dried under vacuum to obtain the crude compound. Trituration with ethyl acetate and petroleum ether gave the title compound as an off-white solid (5.5 g, 75%). LCMS: m/z 333.32 [M−H]⁻

Other analogues prepared by this method:
tert-Butyl 4-((4-(trifluoromethyl)phenyl)carbamoyl)piperidine-1-carboxylate (53%). LCMS: m/z 371.3 [M−H]⁻.

tert-Butyl 4-((4-(sec-butyl)phenyl)carbamoyl)piperidine-1-carboxylate (45%). LCMS: m/z 359.2 [M−H]⁻.

tert-Butyl 4-(phenylcarbamoyl)piperidine-1-carboxylate (64%). LCMS: m/z 303.28 [M−H]⁻.

tert-Butyl 4-(cyclohexylcarbamoyl)piperidine-1-carboxylate (85%). LCMS: m/z 309.2 [M−H]⁻. tert-Butyl 4-(methylcarbamoyl)piperidine-1-carboxylate (86%).

Preparation of N-(3-hydroxy-4-methylphenyl) piperidine-4-carboxamide Hydrochloride To a stirred solution of tert-butyl 4-((3-hydroxy-4-methylphenyl)carbamoyl)piperidine-1-carboxylate (1.0 g, 2.99 mmol) in 1,4-dioxane (5 mL), was added 4 M HCl (5 mL) at 0° C. and stirred for 2 h at room temperature. The progress of the reaction was monitored by TLC. After complete consumption of the starting material, the reaction mixture was concentrated under reduced pressure to obtain the title compound as an off-white solid (0.76 g, 90%), which was used in the next step without further purification. LCMS: m/z 235.21 [M+H]⁺.

Other analogues prepared by this method:
N-(4-(Trifluoromethyl)phenyl)piperidine-4-carboxamide hydrochloride (97%). LCMS: m/z 273.1 [M+H]⁺.
N-(4-(sec-Butyl)phenyl)piperidine-4-carboxamide hydrochloride (81%). LCMS: m/z 261.1 [M+H]⁺.
N-Phenylpiperidine-4-carboxamide hydrochloride (95%). LCMS: m/z 205.1 [M+H]⁺.
N-Cyclohexylpiperidine-4-carboxamide hydrochloride (98%). LCMS: m/z 211.2 [M+H]⁺.
N-Methylpiperidine-4-carboxamide hydrochloride (97%).

Preparation of methyl 4-((4-((3-hydroxy-4-methylphenyl)carbamoyl)piperidin-1-yl) sulfonyl)-1-methyl-1H-pyrrole-2-carboxylate To a stirred solution of N-(3-hydroxy-4-methylphenyl) piperidine-4-carboxamide hydrochloride (1.0 g, 3.69 mmol) in pyridine (10 mL) was added DMAP (451 mg, 3.69 mmol) followed by methyl 4-(chlorosulfonyl)-1-methyl-1H-pyrrole-2-carboxylate (878 mg, 3.69 mmol) at room temperature. The resultant reaction mixture was stirred at room temperature for 16 h. The progress of the reaction was monitored by TLC. After complete consumption of starting material, reaction mixture was cooled to 0° C. then quenched with H₂O (100 mL) and the precipitated solid was filtered off and dried under vacuum to obtain the title compound as an off-white solid (220 mg, 14%). LCMS: m/z 436.35 [M+H]⁺.

Other analogues prepared by this method:
Methyl 1-methyl-4-((4-(phenylcarbamoyl)piperidin-1-yl) sulfonyl)-1H-pyrrole-2-carboxylate (22%). LCMS: m/z 406.35 [M+H]⁺.
Methyl 4-((4-(cyclohexylcarbamoyl)piperidin-1-yl)sulfonyl)-1-methyl-1H-pyrrole-2-carboxylate (58%). LCMS: m/z 412.1 [M+H]⁺.
Methyl 1-methyl-4-((4-(methylcarbamoyl)piperidin-1-yl) sulfonyl)-1H-pyrrole-2-carboxylate (15%). LCMS: m/z 344.33 [M+H]⁺.

Preparation of methyl 1-methyl-4-((4-((4-(trifluoromethyl)phenyl)carbamoyl) piperidin-1-yl)sulfonyl)-1H-pyrrole-2-carboxylate To a stirred solution of N-(4-(trifluoromethyl)phenyl) piperidine-4-carboxamide hydrochloride (0.25 g, 0.80 mmol) in DCM (5 mL) was added Et₃N (0.33 mL, 2.42 mmol) followed by DMAP (0.098 g, 0.80 mmol) at room temperature. The reaction mixture was cooled to 0° C., methyl 4-(chlorosulfonyl)-1-methyl-1H-pyrrole-2-carboxylate (0.19 g, 0.80 mmol) was added and the resulting mixture was stirred for 3 h at room temperature. The progress of the reaction was monitored by TLC. After complete consumption of the starting material, the reaction mixture was cooled to 0° C. then quenched with H₂O (5 mL) and extracted with EtOAc (2×10 mL). The organic layer was dried over anhydrous Na₂SO₄ and concentrated under reduced pressure to give the crude product. The crude compound was purified by 100-200 mesh silica-gel column chromatography, eluting with 70% EtOAc in petroleum ether to obtain the title compound (300 mg, 78%). LCMS: m/z 474.0 [M+H]⁺.

Other analogues prepared by this method:
Methyl 4-((4-((4-(sec-butyl)phenyl) carbamoyl)piperidin-1-yl) sulfonyl)-1-methyl-1H-pyrrole-2-carboxylate (65%). LCMS: m/z 462.4 [M+H]⁺.

Preparation of 4-((4-((3-hydroxy-4-methylphenyl)carbamoyl)piperidin-1-yl) sulfonyl)-1-methyl-1H-pyrrole-2-carboxylic Acid To a stirred solution of methyl 4-((4-((3-hydroxy-4-methylphenyl)carbamoyl)piperidin-1-yl) sulfonyl)-1-methyl-1H-pyrrole-2-carboxylate (0.22 g, 0.51 mmol) in THF/Water/MeOH (3:2:1, 2.5 mL), was added LiOH (32 mg, 0.76 mmol) at 0° C. The resulting mixture was stirred for 16 h at room temperature. The progress of the reaction was monitored by TLC. After complete consumption of the starting material, the reaction mixture was diluted with water (5 mL) and washed with ethyl acetate. The aqueous layer was collected and acidified with 1N HCl. The precipitated solid was filtered off and dried under vacuum to obtain the title compound as an off-white solid (120 mg, 56%), which was used in the next step without any further purification. LCMS: m/z 422.32 [M+H]$^+$.

Other analogues prepared by this method:

1-Methyl-4-((4-((4-(trifluoromethyl)phenyl)carbamoyl)piperidin-1-yl)sulfonyl)-1H-pyrrole-2-carboxylic acid (86%). LCMS: m/z 458.1 [M–H]$^-$.

4-((4-((4-(sec-Butyl)phenyl)carbamoyl)piperidin-1-yl)sulfonyl)-1-methyl-1H-pyrrole-2-carboxylic acid (77%). LCMS: m/z 447.36 [M+H]$^+$.

1-Methyl-4-((4-(phenylcarbamoyl)piperidin-1-yl)sulfonyl)-1H-pyrrole-2-carboxylic acid (80%). LCMS: m/z 392.32 [M+H]$^+$.

4-((4-(Cyclohexylcarbamoyl)piperidin-1-yl)sulfonyl)-1-methyl-1H-pyrrole-2-carboxylic acid (78%). LCMS: m/z 398.23 [M+H]$^+$.

1-Methyl-4-((4-(methylcarbamoyl)piperidin-1-yl)sulfonyl)-1H-pyrrole-2-carboxylic acid (76%). LCMS: m/z 328.49 [M–H]$^-$.

Preparation of Compound 1, 1-((5-carbamoyl-1-methyl-1H-pyrrol-3-yl)sulfonyl)-N-(3-hydroxy-4-methylphenyl)piperidine-4-carboxamide To a stirred solution of 4-((4-((3-hydroxy-4-methylphenyl)carbamoyl)piperidin-1-yl)sulfonyl)-1-methyl-1H-pyrrole-2-carboxylic acid (120 mg, 0.28 mmol) in DMF (1 mL), was added NH$_4$Cl (152 mg, 2.85 mmol) and DIPEA (0.15 ml, 0.85 mmol), followed by HATU (216 mg, 0.57 mmol) at room temperature. The resulting reaction mixture was stirred at room temperature for 2 h. The progress of the reaction was monitored by TLC. After complete consumption of the starting material, the reaction mixture was quenched with H$_2$O (30 mL) and the precipitated solid was filtered off and dried under vacuum to obtain the title compound as an off-white solid (27 mg, 23%).

$^1$H NMR (400 MHZ, DMSO-d$_6$): δ 9.57 (s, 1H), 9.23 (s, 1H), 7.76 (br s, 1H), 7.55 (d, J=2.0 Hz, 1H), 7.19 (d, J=2.0 Hz, 2H), 7.13 (d, J=1.6 Hz, 1H), 6.91 (d, J=8.4 Hz, 1H), 6.81 (dd, J=8.0 Hz, 1.2 Hz, 1H), 3.90 (s, 3H), 3.54 (br d, J=11.6 Hz, 2H), 2.27 (t, J=10.8 Hz, 3H), 2.03 (s, 3H), 1.86 (d, J=10.8 Hz, 2H), 1.71-1.61 (m, 2H). LCMS: m/z 421.31 [M+H]$^+$.

Other analogues prepared by this method:

Compound 2, 1-((5-carbamoyl-1-methyl-1H-pyrrol-3-yl)sulfonyl)-N-(4-(trifluoromethyl)phenyl)piperidine-4-carboxamide (20%)

$^1$H NMR (400 MHZ, DMSO-d$_6$): δ 10.18 (s, 1H), 7.78 (d, J=8.4 Hz, 3H), 7.65 (d, J=8.8 Hz, 2H), 7.56 (d, J=1.6 Hz, 1H), 7.19 (br s, 1H), 7.13 (d, J=1.6 Hz, 1H), 3.90 (s, 3H), 3.58-3.54 (m, 2H), 2.35-2.25 (m, 3H), 1.92 (br d, J=10.8 Hz, 2H), 1.74-1.63 (m, 2H). LCMS: m/z 459.33 [M+H]$^+$.

Compound 27, N-(4-(sec-butyl)phenyl)-1-((5-(dimethylcarbamoyl)-1-methyl-1H-pyrrol-3-yl)sulfonyl)piperidine-4-carboxamide (19%)

$^1$H NMR (400 MHZ, DMSO-d$_6$): δ 9.70 (s, 1H), 7.53 (d, J=1.6 Hz, 1H), 7.46 (d, J=8.4 Hz, 2H), 7.09 (d, J=8.4 Hz, 2H), 6.62 (d, J=2.0 Hz, 1H), 3.72 (s, 3H), 3.57 (br d, J=11.6 Hz, 2H), 3.04 (br s, 6H), 2.54-2.52 (m, 1H), 2.32-2.24 (m, 3H), 1.86 (br d, J=10.4 Hz, 2H), 1.69-1.64 (m, 2H), 1.53-1.44 (m, 2H), 1.14 (d, J=6.8 Hz, 3H), 0.73 (t, J=7.2 Hz, 3H). LCMS: m/z 475.24 [M+H]$^+$.

Compound 30, 1-((5-carbamoyl-1-methyl-1H-pyrrol-3-yl)sulfonyl)-N-phenylpiperidine-4-carboxamide (44%)

$^1$H NMR (400 MHZ, DMSO-d$_6$): δ 9.79 (s, 1H), 7.76 (br s, 1H), 7.57-7.53 (m, 3H), 7.28 (t, J=8.4 Hz, 2H), 7.19 (br s, 1H), 7.13 (d, J=2.0 Hz, 1H), 7.04-6.99 (m, 1H), 3.90 (s, 3H), 3.56 (br d, J=11.6 Hz, 2H), 2.34-2.25 (m, 3H), 1.89 (d, J=10.4 Hz, 2H), 1.73-1.64 (m, 2H). LCMS: m/z 389.0 [M–H]$^-$.

Compound 31, 1-((5-carbamoyl-1-methyl-1H-pyrrol-3-yl)sulfonyl)-N-cyclohexylpiperidine-4-carboxamide (50%)

$^1$H NMR (400 MHZ, DMSO-d$_6$): δ 7.75 (br s, 1H), 7.53-7.50 (m, 2H), 7.17 (br s, 1H), 7.10 (d, J=1.6 Hz, 1H), 3.88 (s, 3H), 3.49-3.46 (m, 3H), 2.22 (t, J=9.2 Hz, 2H), 2.09-2.03 (m, 1H), 1.74-1.49 (m, 9H), 1.24-1.14 (m, 2H), 1.13-1.04 (m, 3H). LCMS: m/z 397.23 [M+H]$^+$.

Compound 32, 1-((5-carbamoyl-1-methyl-1H-pyrrol-3-yl)sulfonyl)-N-methylpiperidine-4-carboxamide (7%)

$^1$H NMR (400 MHZ, DMSO-d$_6$): δ 7.75 (br s, 1H), 7.67-7.63 (m, 1H), 7.51 (d, J=1.6 Hz, 1H), 7.18 (br s, 1H), 7.09 (d, J=2.0 Hz, 1H), 3.88 (s, 3H), 3.49 (br d, J=11.6 Hz, 2H), 2.54 (d, J=4.8 Hz, 3H), 2.22 (td, J=11.6 Hz, 2.4 Hz, 2H), 2.10-2.01 (m, 1H), 1.80-1.74 (m, 2H), 1.63-1.55 (m, 2H). LCMS: m/z 329.29 [M+H]$^+$.

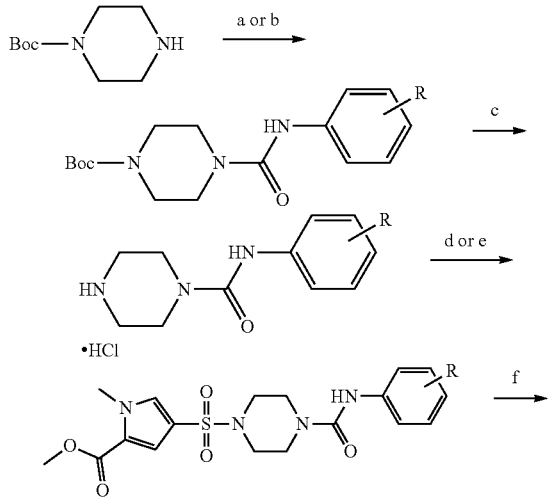

Scheme 2. Preparation of Compounds 9-11

-continued

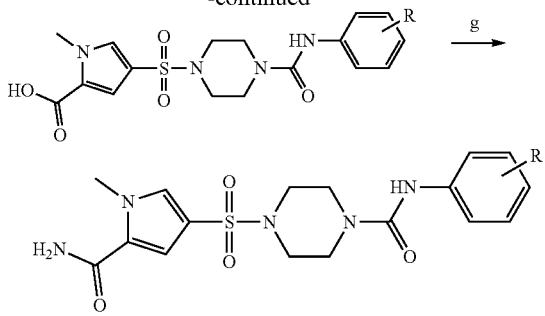

9: R = 4-secBu
10: R = 3-OH-4-Me
11: R = 4-CF₃

Reagents and conditions:
a) RPhNH₂, Triphosgene, DCM, -10° C. to rt;
b) RPhNCO, THF, rt;
c) 4M HCl, 1,4-dioxane, rt;
d) methyl 4-(chlorosulfonyl)-1-methyl-1H-pyrrole-2-carboxylate, pyridine, DMAP, rt;
e) methyl 4-(chlorosulfonyl)-1-methyl-1H-pyrrole-2-carboxylate, Et₃N, DCM, 0° C. to rt;
f) LiOH, THF/H₂O, 0° C. to rt;
g) NH₄Cl, HATU, DIPEA, DMF, rt.

Preparation of tert-butyl 4-((4-(sec-butyl)phenyl) carbamoyl)piperazine-1-carboxylate To a stirred solution of 4-sec-butylaniline (1.0 g, 6.7 mmol) and tert-butyl piperazine-1-carboxylate (1.2 g, 6.7 mmol) in acetonitrile (10 mL), triphosgene (5.90 g, 20.13 mmol) in acetonitrile was added dropwise at −10° C. The resultant reaction mixture was stirred for 2 h at room temperature. The progress of the reaction was monitored by TLC. After complete consumption of the starting material, the reaction mixture was cooled to 0° C., quenched with saturated NaHCO₃ solution (100 mL) and extracted with EtOAc (2×150 mL). The combined organic layer was dried over anhydrous Na₂SO₄ and concentrated under reduced pressure to obtain the crude product, which was purified by silica gel column chromatography eluting with 15% EtOAc in petroleum ether to obtain the title compound as a white solid (700 mg, 29%). LCMS: m/z 360.38 [M−H]⁻.

Other analogues prepared by this method:

tert-Butyl 4-((3-hydroxy-4-methylphenyl)carbamoyl)piperazine-1-carboxylate (37%).

Preparation of tert-butyl 4-((4-(trifluoromethyl)phenyl)carbamoyl)piperazine-1-carboxylate To a stirred solution of 1-isocyanato-4-(trifluoromethyl) benzene (1.0 g, 5.34 mmol) in THF (10 mL) was added tert-butyl piperazine-1-carboxylate (1.0 g, 5.34 mmol). The resulting mixture was stirred for 2 h at room temperature. The progress of the reaction was monitored by TLC. After complete consumption of the starting material, reaction mixture was cooled to 0° C., quenched with H₂O (100 mL) and extracted with EtOAc (2×150 mL). The combined organic layer was dried over anhydrous Na₂SO₄ and concentrated under reduced pressure to obtain the crude product. Trituration with diethyl ether and pentane gave the title compound as a white solid (1.8 g, 91%). LCMS: m/z 372.28 [M−H]⁻.

Preparation of N-(4-(sec-butyl)phenyl)piperazine-1-carboxamide Hydrochloride

To a stirred solution of tert-butyl 4-((4-(sec-butyl)phenyl) carbamoyl)piperazine-1-carboxylate (0.70 g 1.9 mmol) in 1,4-dioxane (5 mL) was added 4 M HCl (5 mL) at 0° C. the resulting mixture was stirred for 2 h at room temperature. The progress of the reaction was monitored by TLC. After complete consumption of the starting material, the reaction mixture was concentrated under reduced pressure to obtain crude product. Trituration with diethyl ether and pentane gave the title compound as a white solid (0.54 g, 94%). LCMS: m/z 262.31 [M+H]⁺.

Other analogues prepared by this method:

N-(3-Hydroxy-4-methylphenyl)piperazine-1-carboxamide hydrochloride (71%). LCMS: m/z 236.1 [M+H]⁺.

N-(4-(Trifluoromethyl)phenyl)piperazine-1-carboxamide hydrochloride (87%). LCMS: m/z 272.23 [M−H]⁻.

Preparation of methyl 4-((4-((4-(sec-butyl)phenyl) carbamoyl)piperazin-1-yl)sulfonyl)-1-methyl-1H-pyrrole-2-carboxylate To a stirred solution of N-(4-(sec-butyl)phenyl)piperazine-1-carboxamide hydrochloride (0.10 g, 0.34 mmol) in pyridine (2 mL), was added methyl 4-(chlorosulfonyl)-1-methyl-1H-pyrrole-2-carboxylate (0.10 g, 0.42 mmol) and DMAP (43 mg, 0.35 mmol). The reaction mixture was stirred for 2 h at room temperature. The progress of the reaction was monitored by TLC. After complete consumption of the starting material, the reaction mixture was cooled to 0° C., quenched with saturated NaHCO₃ solution (100 mL) and extracted with EtOAc (2×150 mL). The combined organic layer was dried over anhydrous Na₂SO₄ and concentrated under reduced pressure to obtain the crude product. The crude compound was purified by 100-200 silica gel column chromatography eluting with 100% ethyl acetate to obtain the title compound as a white solid (0.16 g, 100%). LCMS: m/z 463.36 [M+H]⁺.

Other analogues prepared by this method:
Methyl 1-methyl-4-((4-((4-(trifluoromethyl)phenyl)carbamoyl)piperazin-1-yl)sulfonyl)-1H-pyrrole-2-carboxylate (52%). LCMS: m/z 475.25 [M+H]⁺.

Preparation of methyl 4-((4-((3-hydroxy-4-methylphenyl)carbamoyl) piperazin-1-yl)sulfonyl)-1-methyl-1H-pyrrole-2-carboxylate To a stirred solution of N-(3-hydroxy-4-methylphenyl) piperazine-1-carboxamide hydrochloride (500 mg, 2.12 mmol) in DCM (50 mL) was added TEA (645 mg, 6.37 mmol) at 0° C. The mixture was stirred at 0° C. for 10 min. Methyl 4-(chlorosulfonyl)-1-methyl-1H-pyrrole-2-carboxylate (505 mg, 2.12 mmol) was added to the reaction portionwise, and the resultant mixture was stirred at room temperature for 1 h. The progress of the reaction was monitored by TLC. After complete consumption of the starting material, the reaction mixture was quenched with ice and the precipitated solid was filtered off, washed with water and dried under vacuum to obtain the title compound as an off-white solid (300 mg, 32%), which was used in the next step without further purification. LCMS: m/z 437.0 [M+H]⁺.

Preparation of 4-((4-((4-(sec-butyl)phenyl) carbamoyl)piperazin-1-yl) sulfonyl)-1-methyl-1H-pyrrole-2-carboxylic Acid To a stirred solution of methyl 4-((4-((4-(sec-butyl)phenyl)carbamoyl)piperazin-1-yl)sulfonyl)-1-methyl-1H-pyrrole-2-carboxylate (0.16 g, 0.35 mmol) in THF/H$_2$O (2.5 mL, 4:1 by volume), was added lithium hydroxide (0.044 g, 1.05 mmol) at 0° C. The reaction mixture was stirred at room temperature for 16 h. The progress of the reaction was monitored by TLC. After complete consumption of the starting material, the reaction mixture was acidified with 1N HCl and extracted with EtOAc (2×25 mL). The combined organic layer was dried over anhydrous Na$_2$SO$_4$ and concentrated under reduced pressure to obtain the crude product. Trituration with diethyl ether and pentane gave the title compound as a white solid (100 mg, 65%). LCMS: m/z 449.33 [M+H]$^+$.

Other analogues prepared by this method:
4-((4-((3-Hydroxy-4-methylphenyl)carbamoyl)piperazin-1-yl)sulfonyl)-1-methyl-1H-pyrrole-2-carboxylic acid (69%). LCMS: m/z 423.06 [M+H]$^+$.
1-Methyl-4-((4-((4-(trifluoromethyl)phenyl)carbamoyl) piperazin-1-yl)sulfonyl)-1H-pyrrole-2-carboxylic acid (82%). LCMS: m/z 461.26 [M+H]$^+$.

Preparation of Compound 9, N-(4-(sec-butyl)phenyl)-4-((5-carbamoyl-1-methyl-1H-pyrrol-3-yl)sulfonyl)piperazine-1-carboxamide To a stirred solution of 4-((4-((4-(sec-butyl)phenyl)carbamoyl)piperazin-1-yl)sulfonyl)-1-methyl-1H-pyrrole-2-carboxylic acid (0.20 g, 0.44 mmol) in DMF (2 mL) at room temperature, was added HATU (0.339 g, 0.89 mmol), DIPEA (0.62 mL, 3.52 mmol) and NH$_4$Cl (0.118 g, 2.2 mmol). The resultant mixture was stirred for at room temperature for 2 h. The progress of the reaction was monitored by TLC. After completion of starting material, reaction mixture was cooled to 0° C., quenched with water (5 mL) and extracted with EtOAc (2×15 mL). The combined organic layer was dried over anhydrous Na$_2$SO$_4$ and concentrated under reduced pressure to obtain the crude product. Trituration with diethyl ether and pentane gave the title compound as an off-white solid (39 mg, 20%).
$^1$H NMR (400 MHZ, DMSO-d$_6$) δ 8.49 (s, 1H), 7.76 (br s, 1H), 7.55 (d, J=2.0 Hz, 1H), 7.28 (d, J=8.8 Hz, 2H), 7.19 (br s, 1H), 7.11 (d, J=2.0 Hz, 1H), 7.03 (d, J=8.4 Hz, 2H), 3.88 (s, 3H), 3.54 (t, J=4.8 Hz, 4H), 2.84 (t, J=4.8 Hz, 4H), 2.49-2.45 (m, 1H), 1.52-1.47 (m, 2H), 1.14 (d, J=6.8 Hz, 3H), 0.74 (t, J=7.2 Hz, 3H). LCMS: m/z 448.17 [M+H]$^+$.

Other analogues prepared by this method:

Compound 10, 4-((5-carbamoyl-1-methyl-1H-pyrrol-3-yl)sulfonyl)-N-(3-hydroxy-4-methylphenyl) piperazine-1-carboxamide (27%)

$^1$H NMR (400 MHZ, DMSO-d$_6$) δ 9.09 (s, 1H), 8.37 (s, 1H), 7.75 (br s, 1H), 7.55 (d, J=1.6 Hz, 1H), 7.19 (br s, 1H), 7.11 (d, J=1.6 Hz, 1H), 6.98 (d, J=2.0 Hz, 1H), 6.84 (d, J=8.0 Hz, 1H), 6.66 (dd, J=8.0 Hz, 2.0 Hz, 1H), 3.88 (s, 3H), 3.51 (t, J=4.8 Hz, 4H), 2.84 (t, J=4.4 Hz, 4H), 2.01 (s, 3H). LCMS: m/z 422.11 [M+H]$^+$.

Compound 11, 4-((5-carbamoyl-1-methyl-1H-pyrrol-3-yl)sulfonyl)-N-(4-(trifluoromethyl)phenyl) piperazine-1-carboxamide (67%)

$^1$H NMR (400 MHZ, DMSO-d$_6$) δ 8.96 (s, 1H), 7.76 (br s, 1H), 7.63-7.55 (m, J=7.5 Hz, 5H), 7.19 (br s, 1H), 7.11 (d, J=2.0 Hz, 1H), 3.88 (s, 3H), 3.58 (t, J=4.8 Hz, 4H), 2.86 (t, J=4.8 Hz, 4H). LCMS: m/z 460.0 [M+H]$^+$.

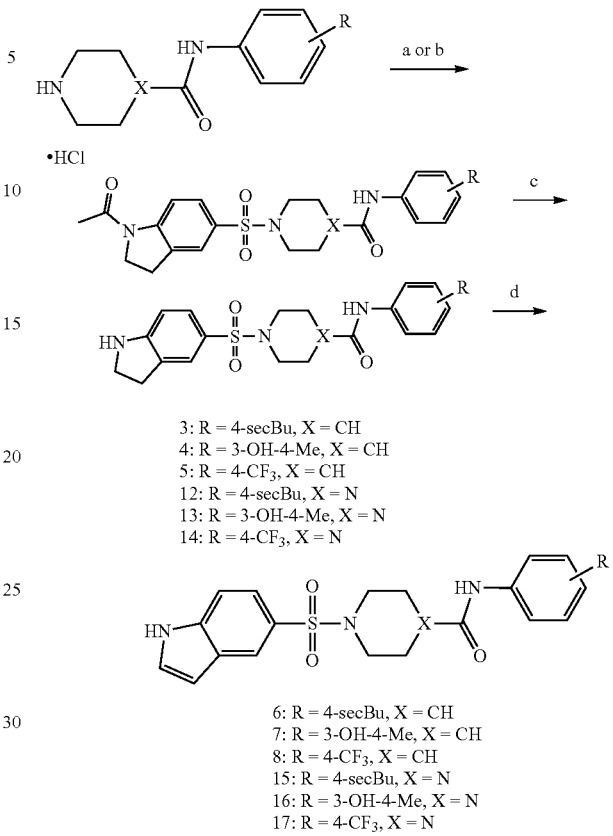

Scheme 3. Preparation of Compounds 3-8 and 12-17

3: R = 4-secBu, X = CH
4: R = 3-OH-4-Me, X = CH
5: R = 4-CF$_3$, X = CH
12: R = 4-secBu, X = N
13: R = 3-OH-4-Me, X = N
14: R = 4-CF$_3$, X = N 6: R = 4-secBu, X = CH
7: R = 3-OH-4-Me, X = CH
8: R = 4-CF$_3$, X = CH
15: R = 4-secBu, X = N
16: R = 3-OH-4-Me, X = N
17: R = 4-CF$_3$, X = N Reagents and conditions: a) 1-acetylindoline-5-sulfonyl chloride, pyridine, DMAP, rt; b) 1-acetylindoline-5-sulfonyl chloride, Et$_3$N, DCM, 0° C. to rt; c) conc. HCl, MeOH, 0° C. to rt; d) MnO$_2$, THF, rt.

Preparation of 1-((1-acetylindolin-5-yl)sulfonyl)-N-(4-(sec-butyl)phenyl)piperidine-4-carboxamide To a stirred solution of N-(4-(sec-butyl)phenyl)piperidine-4-carboxamide hydrochloride (0.50 g, 1.68 mmol) in pyridine (4 mL), was added DMAP (0.2 g, 1.68 mmol) at room temperature. The reaction mixture was cooled to 0° C. and 1-acetylindoline-5-sulfonyl chloride (0.47 g, 1.85 mmol) was added. The resulting mixture was stirred for 2 h at room temperature. The progress of the reaction was monitored by TLC. After complete consumption of the starting material, the reaction mixture was cooled to 0° C., quenched with H$_2$O (50 mL) and extracted with EtOAc (2×75 mL). The combined organic layer was dried over anhydrous Na$_2$SO$_4$ and concentrated under reduced pressure to obtain the crude product. The crude compound was purified by 100-200 mesh silica-gel column chromatography eluting with 70% EtOAc in petroleum ether to obtain the title compound as an off-white solid (250 mg, 31%). LCMS: m/z 482.1 [M–H]$^-$.

Other analogues prepared by this method:
5-(1-((1-Acetylindolin-5-yl)sulfonyl)piperidine-4-carboxamido)-2-methylphenyl acetate (36%). LCMS: m/z 500.38 [M+H]$^+$.
1-((1-Acetylindolin-5-yl)sulfonyl)-N-(4-(trifluoromethyl)phenyl) piperidine-4-carboxamide (19%). LCMS: m/z 494.0 [M–H]$^-$.

4-((1-Acetylindolin-5-yl)sulfonyl)-N-(4-(sec-butyl)phenyl)piperazine-1-carboxamide (27%).

LCMS: m/z 485.38 [M+H]$^+$.

4-((1-Acetylindolin-5-yl)sulfonyl)-N-(4-(trifluoromethyl)phenyl)piperazine-1-carboxamide (37%). LCMS: m/z 497.31 [M+H]$^+$.

Preparation of 4-((1-acetylindolin-5-yl)sulfonyl)-N-(3-hydroxy-4-methylphenyl) piperazine-1-carboxamide To a stirred solution of N-(3-hydroxy-4-methylphenyl) piperazine-1-carboxamide hydrochloride (1.30 g, 4.78 mmol) in DCM (20 mL) was added Et$_3$N (1.45 g, 14.35 mmol) followed by 1-acetylindoline-5-sulfonyl chloride (1.24 g, 4.78 mmol) at 0° C. under an atmosphere of nitrogen. The resultant reaction mixture was stirred for 16 h at room temperature. The progress of the reaction was monitored by TLC. After complete consumption of the starting material, the reaction mixture was cooled to 0° C., then quenched with H$_2$O (20 mL) and extracted with EtOAc (2×50 mL). The combined organic layer was dried over anhydrous Na$_2$SO$_4$ and concentrated under reduced pressure to obtain the title compound as an off-white solid (1.1 g, 50%), which was used in the next step without further purification. LCMS: m/z 459.13 [M+H]$^+$.

Preparation of Compound 3, N-(4-(sec-butyl)phenyl)-1-(indolin-5-ylsulfonyl) piperidine-4-carboxamide To a stirred solution of 1-((1-acetylindolin-5-yl)sulfonyl)-N-(4-(sec-butyl)phenyl)piperidine-4-carboxamide (0.20 g, 0.41 mmol) in MeOH (5 mL), was added conc. HCl (1.5 mL) at 0° C. The resulting mixture was stirred at room temperature for 2 h. The progress of the reaction was monitored by TLC. After complete consumption of the starting material, the reaction mixture was concentrated under reduced pressure to obtain the crude product, which was purified by preparative HPLC to obtain the title compound as an off-white solid (50 mg, 27%).

$^1$H NMR (400 MHz, DMSO-d$_6$) δ 9.68 (s, 1H), 7.45 (d, J=8.4 Hz, 2H), 7.30-7.26 (m, 2H), 7.09 (d, J=8.4 Hz, 2H), 6.53 (d, J=8.0 Hz, 1H), 6.47 (br s, 1H), 3.56 (t, J=8.4 Hz, 4H), 3.01 (t, J=8.4 Hz, 2H), 2.54-2.50 (m, 1H), 2.29-2.20 (m, 3H), 1.84 (br d, J=10.8 Hz, 2H), 1.68-1.61 (m, 2H), 1.54-1.46 (m, 2H), 1.14 (d, J=6.8 Hz, 3H), 0.73 (t, J=7.2 Hz, 3H). LCMS: m/z 442.44 [M+H]$^+$.

Other analogues prepared by this method:

Compound 4, N-(3-hydroxy-4-methylphenyl)-1-(indolin-5-ylsulfonyl)piperidine-4-carboxamide (4%)

$^1$H NMR (400 MHZ, DMSO-d$_6$) δ 9.55 (s, 1H), 9.24 (br s, 1H), 7.29-7.26 (m, 2H), 7.18 (d, J=1.6 Hz, 1H), 6.90 (d, J=8.4 Hz, 1H), 6.80 (dd, J=8.0 Hz, 1.6 Hz, 1H), 6.53 (d, J=8.4 Hz, 1H), 6.46 (br s, 1H), 3.58-3.54 (m, 4H), 3.01 (t, J=8.8 Hz, 2H), 2.27-2.19 (m, 3H), 2.03 (s, 3H), 1.86-1.80 (m, 2H), 1.66-1.60 (m, 2H). LCMS: m/z 416.31 [M+H]$^+$.

Compound 5, 1-(indolin-5-ylsulfonyl)-N-(4-(trifluoromethyl)phenyl)piperidine-4-carboxamide (18%)

$^1$H NMR (400 MHZ, DMSO-d$_6$) δ 10.16 (s, 1H), 7.77 (d, J=8.4 Hz, 2H), 7.64 (d, J=8.8 Hz, 2H), 7.30-7.27 (m, 2H), 6.54 (d, J=8.4 Hz, 1H), 6.47 (br s, 1H), 3.58-3.53 (m, 4H), 3.01 (t, J=8.8 Hz, 2H), 2.35-2.22 (m, 3H), 1.90-1.86 (m, 2H), 1.70-1.65 (m, 2H). LCMS: m/z 454.15 [M+H]$^+$.

Compound 12, N-(4-(sec-butyl)phenyl)-4-(indolin-5-ylsulfonyl)piperazine-1-carboxamide (22%)

$^1$H NMR (400 MHZ, DMSO-d$_6$) δ 8.49 (s, 1H), 7.30-7.26 (m, 4H), 7.02 (d, J=8.4 Hz, 2H), 6.56 (d J=8.4 Hz, 1H), 3.58-3.49 (m, 6H), 3.01 (t, J=8.8 Hz, 2H), 2.81 (t, J=4.8 Hz, 4H), 2.49-2.46 (m, 1H), 1.53-1.45 (m, 2H), 1.13 (d, J=7.2 Hz, 3H), 0.73 (t, J=7.6 Hz, 3H). LCMS: m/z 443.14 [M+H]$^+$.

Compound 13, N-(3-hydroxy-4-methylphenyl)-4-(indolin-5-ylsulfonyl)piperazine-1-carboxamide (6%)

$^1$H NMR (400 MHZ, DMSO-d$_6$) δ 9.09 (s, 1H), 8.34 (s, 1H), 7.29-7.26 (m, 2H), 6.97 (d, J=2.0 Hz, 1H), 6.84 (d, J=8.4 Hz, 1H), 6.65 (dd, J=8.0 Hz, 2.0 Hz, 1H), 6.54-6.50 (m, 2H), 3.55 (t, J=8.8 Hz, 2H), 3.48 (t, J=4.8 Hz, 4H), 3.00 (t, J=8.8 Hz, 2H), 2.80 (t, J=4.8 Hz, 4H), 2.00 (s, 3H). LCMS: m/z 417.27 [M+H]$^+$.

Compound 14, 4-(indolin-5-ylsulfonyl)-N-(4-(trifluoromethyl)phenyl)piperazine-1-carboxamide (9%)

$^1$H NMR (400 MHZ, DMSO-d$_6$) δ 8.94 (s, 1H), 7.61 (d, J=8.8 Hz, 2H), 7.56 (d, J=8.8 Hz, 2H), 7.29-7.27 (m, 2H), 6.54-6.50 (m, 2H), 3.57-3.25 (m, 6H), 3.00 (t, J=8.4 Hz, 2H), 2.83 (t, J=4.8 Hz, 4H). LCMS: m/z 455.05 [M+H]$^+$.

Preparation of Compound 6, 1-((1H-indol-5-yl)sulfonyl)-N-(4-(sec-butyl)phenyl)piperidine-4-carboxamide To a stirred solution of Compound 3 (0.10 g, 0.23 mmol) in THF (2 mL) was added MnO$_2$ (1.0 g, 12 mmol) at room temperature. The resultant reaction mixture was stirred at room temperature for 16 h. The progress of the reaction was monitored by TLC. After complete consumption of the starting material, the reaction mixture was filtered through Celite and washed with EtOAc (50 mL). The filtrate was concentrated under reduced pressure to obtain the crude product, which was purified by preparative HPLC to obtain the title compound as an off-white solid (50 mg, 50%).

$^1$H NMR (400 MHZ, DMSO-d$_6$) δ 11.65 (s, 1H), 9.66 (s, 1H), 8.02 (d, J=1.2 Hz, 1H), 7.62-7.56 (m, 2H), 7.46-7.41 (m, 3H), 7.07 (d, J=8.8 Hz, 2H), 6.67 (t, J=1.2 Hz, 1H), 3.66 (br d, J=11.6 Hz, 2H), 2.54-2.50 (m, 1H), 2.28-2.20 (m, 3H), 1.86-1.82 (m, 2H), 1.68-1.62 (m, 2H), 1.52-1.46 (m, 2H), 1.13 (d, J=7.2 Hz, 3H), 0.72 (t, J=7.6 Hz, 3H). LCMS: m/z 440.38 [M+H]$^+$.

Other analogues prepared by this method:

Compound 7, 1-((1H-indol-5-yl)sulfonyl)-N-(3-hydroxy-4-methylphenyl)piperidine-4-carboxamide (25%)

$^1$H NMR (400 MHZ, DMSO-d$_6$) δ 11.65 (s, 1H), 9.53 (s, 1H), 9.21 (s, 1H), 8.01 (d, J=1.2 Hz, 1H), 7.62-7.57 (m, 2H), 7.45 (dd, J=8.4 Hz, 1.6 Hz, 1H), 7.16 (d, J=1.6 Hz, 1H), 6.89 (d, J=8.0 Hz, 1H), 6.77 (dd, J=8.0 Hz, 1.6 Hz, 1H), 6.67 (d, J=2.4 Hz, 1H), 3.64 (br d, J=11.8 Hz, 2H), 2.27-2.17 (m, 3H), 2.01 (s, 3H), 1.82 (br d, J=10.4 Hz, 2H), 1.68-1.62 (qm, 2H). LCMS: m/z 412.00 [M−H]$^−$.

Compound 8, 1-((1H-indol-5-yl)sulfonyl)-N-(4-(trifluoromethyl)phenyl)piperidine-4-carboxamide (10%)

¹H NMR (400 MHz, DMSO-d₆) δ 11.65 (s, 1H), 10.13 (s, 1H), 8.02 (d, J=1.6 Hz, 1H), 7.75 (d, J=8.4 Hz, 2H), 7.63-7.60 (m, 3H), 7.58 (t, J=2.8 Hz, 1H), 7.45 (dd, J=8.4 Hz, 2.0 Hz, 1H), 6.68-6.66 (m, 1H), 3.68-3.65 (m, 2H), 2.31-2.25 (m, 3H), 1.90-1.86 (m, 2H), 1.67-1.60 (m, 2H). LCMS: m/z 452.13 [M+H]⁺.

Compound 15, 4-((1H-indol-5-yl)sulfonyl)-N-(4-(sec-butyl)phenyl)piperazine-1-carboxamide (8%)

¹H NMR (400 MHZ, DMSO-d₆) δ 11.67 (s, 1H), 8.42 (s, 1H), 8.02 (d, J=1.2 Hz, 1H), 7.61 (d, J=8.8 Hz, 1H), 7.57 (d, J=3.2 Hz, 1H), 7.44 (dd, J=8.4 Hz, 2.0 Hz, 1H), 7.22 (d, J=8.4 Hz, 2H), 6.99 (d, J=8.4 Hz, 2H), 6.67 (d, J=2.4 Hz, 1H), 3.50 (t, J=4.8 Hz, 4H), 2.86 (t, J=4.8 Hz, 4H), 2.49-2.44 (m, 1H), 1.49-1.45 (m, 2H), 1.11 (d, J=6.8 Hz, 3H), 0.71 (t, J=7.6 Hz, 3H). LCMS: m/z 439.1 [M−H]⁻.

Compound 16, 4-((1H-indol-5-yl)sulfonyl)-N-(3-hydroxy-4-methylphenyl)piperazine-1-carboxamide (6%)

¹H NMR (400 MHZ, DMSO-d₆) δ 11.67 (s, 1H), 9.04 (s, 1H), 8.30 (s, 1H), 8.02 (d, J=1.2 Hz, 1H), 7.61 (d, J=8.8 Hz, 1H), 7.57 (t, J=2.8 Hz, 1H), 7.44 (dd, J=8.8 Hz, 1.6 Hz, 1H), 6.92 (d, J=2.0 Hz, 1H), 6.81 (d, J=8.0 Hz, 1H), 6.67 (br s, 1H), 6.60 (dd, J=8.0 Hz, 2.0 Hz, 1H), 3.48 (t, J=4.8 Hz, 4H), 2.85 (t, J=4.8 Hz, 4H), 1.98 (s, 3H). LCMS: m/z 415.26 [M+H]⁺.

Compound 17, 4-((1H-indol-5-yl)sulfonyl)-N-(4-(trifluoromethyl)phenyl)piperazine-1-carboxamide (13%)

¹H NMR (400 MHZ, DMSO-d₆) δ 11.68 (s, 1H), 8.90 (s, 1H), 8.02 (d, J=1.6 Hz, 1H), 7.61 (d, J=8.4 Hz, 1H), 7.58-7.51 (m, 5H), 7.44 (dd, J=8.8 Hz, 2.0 Hz, 1H), 6.67 (t, J=2.0 Hz, 1H), 3.54 (t, J=4.8 Hz, 4H), 2.88 (t, J=4.8 Hz, 4H). LCMS: m/z 453.08 [M+H]⁺.

Scheme 4. Preparation of Compounds 18-20

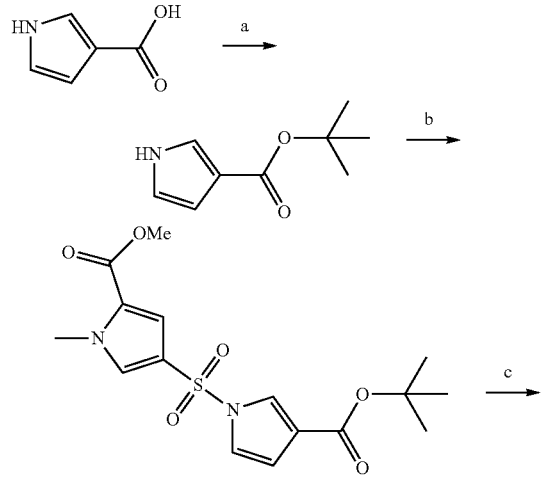

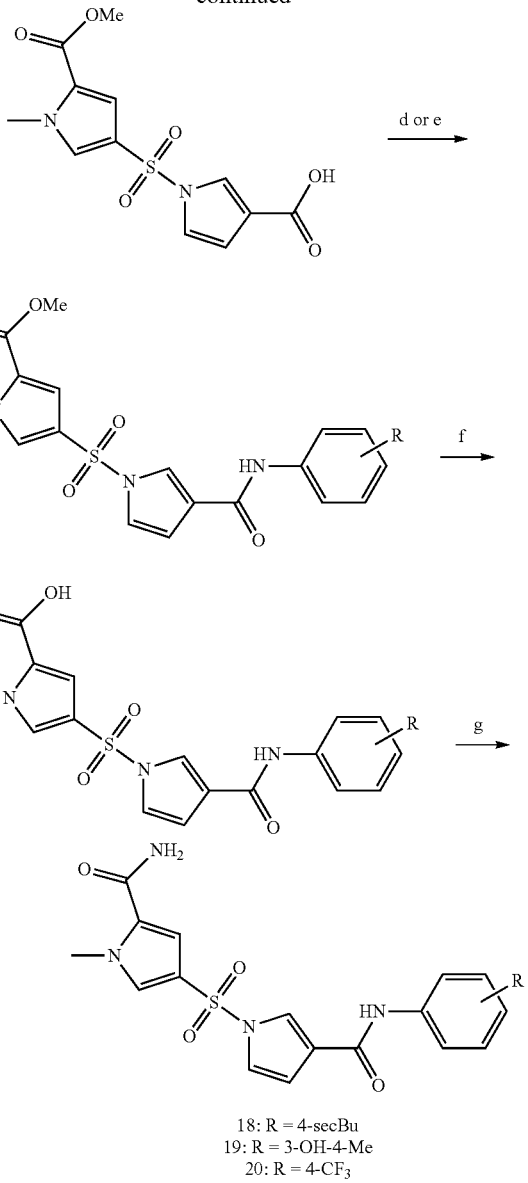

18: R = 4-secBu
19: R = 3-OH-4-Me
20: R = 4-CF₃

Reagents and conditions:
a) 1,1-di-tert-butoxy-N,N-dimethylmethanamine, toluene, reflux;
b) methyl 4-(chlorosulfonyl)-1-methyl-1H-pyrrole-2-carboxylate, NaH, DMF, 0° C. to rt;
c) TFA, DCM, rt;
d) RPhNH₂, T3P, Et₃N, EtOAc, 0° C. to rt;
e) RPhNH₂, HATU, DIPEA, DMF, rt;
f) LiOH, THF/H₂O/MeOH, 0° C. to rt;
g) NH₄Cl, HATU, DIPEA, DMF, rt.

Preparation of tert-butyl 1H-pyrrole-3-carboxylate

A stirred solution of 1H-pyrrole-3-carboxylic acid (0.20 g, 1.80 mmol) and 1,1-di-tert-butoxy-N,N-dimethylmethanamine (1.46 g, 7.20 mmol) in toluene (2 mL) was heated at 110° C. for 2 h. The progress of the reaction was monitored by TLC. After complete consumption of the starting material, the reaction mixture was diluted with EtOAc, washed with water and evaporated under reduced pressure to obtain the title compound as a brown solid (0.3 g, 99%).

Preparation of methyl 4-((3-(tert-butoxycarbonyl)-1H-pyrrol-1-yl)sulfonyl)-1-methyl-1H-pyrrole-2-carboxylate To a stirred solution of tert-butyl 1H-pyrrole-3-carboxylate (280 mg, 1.674 mmol) in DMF (2 mL), was added NaH (60% dispersion in mineral oil, 81 mg, 2.00 mmol) at 0° C. The reaction mixture was stirred for 10 min at 0° C., after which methyl 4-(chlorosulfonyl)-1-methyl-1H-pyrrole-2-carboxylate (400 mg, 1.674 mmol) was added portion-wise. The resultant reaction mixture was stirred at room temperature for 3 h. The progress of the reaction was monitored by TLC. After complete consumption of the starting material, the reaction mixture was quenched with ice/water. The precipitated solid was filtered off, washed with water, and dried under vacuum to obtain the crude product. Trituration with diethyl ether and pentane gave the title compound as an off-white solid (480 mg, 78%). LCMS: m/z 367.32 [M−H]$^-$.

Preparation of 1-((5-(methoxycarbonyl)-1-methyl-1H-pyrrol-3-yl)sulfonyl)-1H-pyrrole-3-carboxylic Acid To a stirred solution of methyl 4-((3-(tert-butoxycarbonyl)-1H-pyrrol-1-yl)sulfonyl)-1-methyl-1H-pyrrole-2-carboxylate (480 mg, 1.302 mmol) in DCM (5 mL), was added TFA (0.48 mL) at 0° C. The reaction mixture was stirred at room temperature for 1 h. The progress of the reaction was monitored by TLC. After complete consumption of the starting material, the reaction mixture was concentrated under reduced pressure to obtain the crude product. Trituration with diethyl ether gave the title compound as an off-white solid (200 mg, 49%). LCMS: m/z 310.9 [M−H]$^-$.

Preparation of methyl 4-((3-((4-(sec-butyl)phenyl) carbamoyl)-1H-pyrrol-1-yl)sulfonyl)-1-methyl-1H-pyrrole-2-carboxylate To a stirred solution of 1-((5-(methoxycarbonyl)-1-methyl-1H-pyrrol-3-yl)sulfonyl)-1H-pyrrole-3-carboxylic acid (130 mg, 0.416 mmol) and 4-sec-butylaniline (62 mg, 0.416 mmol) in EtOAc (5 mL) was added Et$_3$N (126 mg, 1.245 mmol) followed by T3P (0.5 mL, 0.832 mmol) at 0° C. under an atmosphere of nitrogen. The resultant reaction mixture was stirred for 2 h at room temperature. The progress of the reaction was monitored by TLC. After complete consumption of the starting material, the reaction mixture was cooled to 0° C., then quenched with H$_2$O (20 mL) and extracted with EtOAc (2×50 mL). The combined organic layer was dried over anhydrous Na$_2$SO$_4$ and concentrated under reduced pressure to obtain the title compound as a pale brown solid (100 mg, 54%), which was used in the next step without further purification. LCMS: m/z 444.1 [M+H]$^+$.

Other analogues prepared by this method:
Methyl 4-((3-((3-hydroxy-4-methylphenyl)carbamoyl)-1H-pyrrol-1-yl) sulfonyl)-1-methyl-1H-pyrrole-2-carboxylate (54%). LCMS: m/z 418.21 [M+H]$^+$.

Preparation of methyl 1-methyl-4-((3-((4-(trifluoromethyl)phenyl) carbamoyl)-1H-pyrrol-1-yl) sulfonyl)-1H-pyrrole-2-carboxylate To a stirred solution of 1-((5-(methoxycarbonyl)-1-methyl-1H-pyrrol-3-yl)sulfonyl)-1H-pyrrole-3-carboxylic acid (500 mg, 1.601 mmol) and 4-trifluoromethylaniline (283 mg, 1.76 mmol), in DMF (3 mL) was added DIPEA (620 mg, 4.80 mmol) followed by HATU (913 mg, 2.40 mmol) at 0° C. under an atmosphere of nitrogen. The resultant reaction mixture was stirred for 5 h at room temperature. The progress of the reaction was monitored by TLC. After complete consumption of the starting material, the reaction mixture was cooled to 0° C., then quenched with H$_2$O (20 mL) and extracted with EtOAc (2×50 mL). The combined organic layer was dried over anhydrous Na$_2$SO$_4$ and concentrated under reduced pressure to obtain the crude product. The crude compound was purified by column chromatography (100-200 mesh silica-gel) eluting with 30% EtOAc in petroleum ether to obtain the title compound as an off-white solid (300 mg, 41%). LCMS: m/z 455.9 [M+H]$^+$.

Preparation of 4-((3-((4-(sec-butyl)phenyl) carbamoyl)-1H-pyrrol-1-yl) sulfonyl)-1-methyl-1H-pyrrole-2-carboxylic Acid To a stirred solution of methyl 4-((3-((4-(sec-butyl)phenyl)carbamoyl)-1H-pyrrol-1-yl)sulfonyl)-1-methyl-1H-pyrrole-2-carboxylate (0.100 g, 0.225 mmol) in THF/Water/MeOH (1:1:1 by volume, 3 mL), was added LiOH (18 mg, 0.451 mmol) at 0° C. The reaction mixture was stirred for 4 h at room temperature. The progress of the reaction was monitored by TLC. After complete consumption of the starting material, the reaction mixture was acidified with 1N HCl and concentrated under reduced pressure to obtain the crude product. Trituration with diethyl ether gave the title compound as an off-white solid (80 mg, 83%). LCMS: m/z 430.30 [M+H]$^+$.

Other analogues prepared by this method:
4-((3-((3-Hydroxy-4-methylphenyl)carbamoyl)-1H-pyrrol-1-yl)sulfonyl)-1-methyl-1H-pyrrole-2-carboxylic acid (80%). LCMS: m/z 404.21 [M+H]$^+$. 1-Methyl-4-((3-((4-(trifluoromethyl)phenyl)carbamoyl)-1H-pyrrol-1-yl)sulfonyl)-1H-pyrrole-2-carboxylic acid (57%). LCMS: m/z 441.90 [M+H]$^+$.

Preparation of Compound 18, 4-((3-((4-(sec-butyl) phenyl)carbamoyl)-1H-pyrrol-1-yl) sulfonyl)-1-methyl-1H-pyrrole-2-carboxamide To a stirred solution of 4-((3-((4-(sec-butyl)phenyl)carbamoyl)-1H-pyrrol-1-yl)sulfonyl)-1-methyl-1H-pyrrole-2-carboxylic acid (80 mg, 0.180 mmol) in DMF (0.5 mL) was added NH$_4$Cl (95 mg, 1.79 mmol) and DIPEA (69.8 mg, 0.541 mmol), followed by HATU (102 mg, 0.278 mmol) at room temperature. The resulting reaction mixture was stirred at room temperature for 2 h. The progress of the reaction was monitored by TLC. After complete consumption of the starting material, the reaction mixture was quenched with H$_2$O (30 mL) and extracted with EtOAc (2×50 mL). The combined organic layer was dried over anhydrous Na$_2$SO$_4$ and concentrated under reduced pressure to obtain the crude product. The crude compound was purified by Grace column chromatography eluting with 70% EtOAc in petroleum ether to obtain the title compound as a pale brown solid (46 mg, 58%).

$^1$H NMR (400 MHZ, DMSO-d$_6$) δ 9.82 (s, 1H), 8.00 (t, J=2.0 Hz, 1H), 7.92 (d, J=1.6 Hz, 1H), 7.81 (br s, 1H), 7.60 (d, J=8.4 Hz, 2H), 7.29-7.26 (m, 3H), 7.14 (d, J=8.4 Hz, 2H), 6.82 (dd, J=3.2 Hz, 1.6 Hz, 1H), 3.87 (s, 3H), 2.57-2.50 (m, 1H), 1.55-1.51 (m, 2H), 1.17 (d, J=6.8 Hz, 3H), 0.76 (t, J=7.2 Hz, 3H). LCMS: m/z 429.23 [M+H]$^+$.

Other analogues prepared by this method:

Compound 19, 4-((3-((3-hydroxy-4-methylphenyl)carbamoyl)-1H-pyrrol-1-yl) sulfonyl)-1-methyl-1H-pyrrole-2-carboxamide (58%)

$^1$H NMR (400 MHZ, DMSO-d$_6$) δ 9.70 (s, 1H), 9.28 (s, 1H), 7.98 (t, J=2.0 Hz, 1H), 7.91 (d, J=1.6 Hz, 1H), 7.81 (br s, 1H), 7.31-7.26 (m, 4H), 6.96 (s, 2H), 6.81 (dd, J=3.2 Hz, 1.6 Hz, 1H), 3.87 (s, 3H), 2.06 (s, 3H). LCMS: m/z 403.24 [M+H]$^+$.

Compound 20, 1-methyl-4-((3-((4-(trifluoromethyl)phenyl)carbamoyl)-1H-pyrrol-1-yl) sulfonyl)-1H-pyrrole-2-carboxamide (21%)

$^1$H NMR (400 MHZ, DMSO-d$_6$) δ 10.22 (s, 1H), 8.08 (br s, 1H), 7.95-7.93 (m, 3H), 7.82 (br s, 1H), 7.70 (d, J=8.4 Hz, 2H), 7.32-7.27 (m, 3H), 6.84 (br d, J=1.2 Hz, 1H), 3.87 (s, 3H). LCMS: m/z 441.18 [M+H]$^+$.

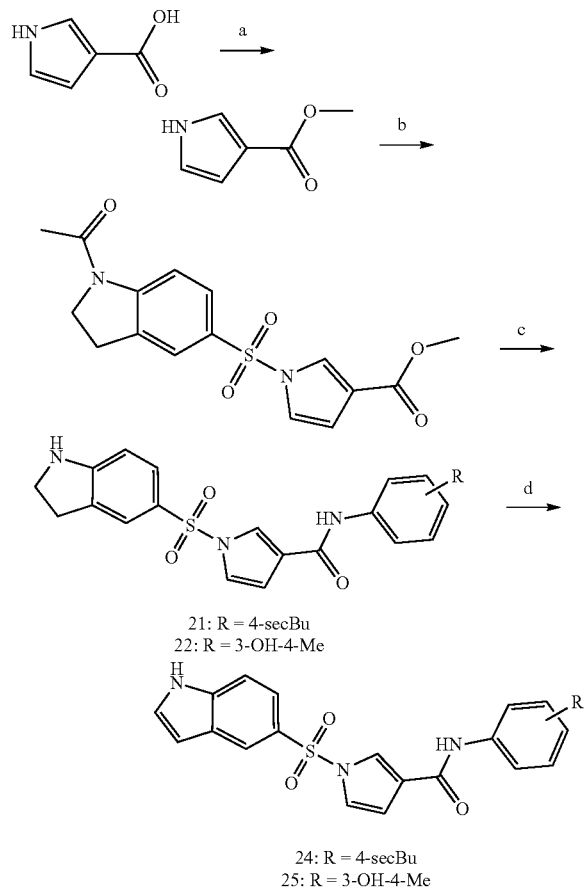

Scheme 5. Preparation of Compounds 21, 22, 24 and 25

21: R = 4-secBu
22: R = 3-OH-4-Me

24: R = 4-secBu
25: R = 3-OH-4-Me

Reagents and conditions:
a) SOCl$_2$, MeOH, 70° C.;
b) 1-acetylindoline-5-sulfonyl chloride, NaH, DMF, 0° C. to rt;
c) RPhNH$_2$, DABAL-Me$_3$, Et$_3$N, toluene, 0° C. to 120° C.;
d) MnO$_2$, THF, rt.

Preparation of methyl 1H-pyrrole-3-carboxylate

To a stirred solution of 1H-pyrrole-3-carboxylic acid (10.0 g, 90.00 mmol) in methanol (100 mL), was added SOCl$_2$ (19.59 ml, 270.03 mmol) at room temperature. The reaction mixture was heated to 70° C. and stirred for 3 h. The progress of the reaction was monitored by TLC. After complete consumption of the starting material, the reaction mixture was cooled to room temperature and then concentrated under reduced pressure. The residue was diluted in EtOAc (100 mL) and washed with saturated sodium bicarbonate solution (2×50 mL). The organic layer was dried over anhydrous Na$_2$SO$_4$ and concentrated under reduced pressure to obtain the title compound as an off-white solid (8.0 g, 71%). LCMS: m/z 125.94 [M+H]$^+$.

Preparation of methyl 1-((1-acetylindolin-5-yl)sulfonyl)-1H-pyrrole-3-carboxylate To a stirred solution of methyl 1H-pyrrole-3-carboxylate (5.0 g, 40 mmol) in DMF (50 mL), was added NaH (60% dispersion in mineral oil, 2.23 g, 55.93 mmol) at 0° C. The reaction mixture was stirred for 10 min, after which 1-acetylindoline-5-sulfonyl chloride (10.4 g, 40.0 mmol) was added to the reaction mixture portion-wise. The reaction mixture was stirred at room temperature for 2 h. The progress of the reaction was monitored by TLC. After complete consumption of the starting material, the reaction mixture was quenched with ice. The precipitated solid was filtered off, washed with water, and dried under vacuum to obtain the title compound as an off-white solid (8.0 g, 57%), which was used in the next step without further purification. LCMS: m/z 349.0 [M+H]$^+$.

Preparation of Compound 21, N-(4-(sec-butyl)phenyl)-1-(indolin-5-ylsulfonyl)-1H-pyrrole-3-carboxamide To a stirred solution of methyl 1-((1-acetylindolin-5-yl)sulfonyl)-1H-pyrrole-3-carboxylate (0.40 g, 1.15 mmol) and 4-sec-butylaniline (0.17 g, 1.15 mmol) in toluene (5 mL) was added Et$_3$N (0.349 mg, 3.45 mmol), followed by DABAL-Me$_3$ (0.58 g, 2.29 mmol) at 0° C. under an atmosphere of nitrogen. The resultant reaction mixture was heated and stirred for 2 h at 120° C. The progress of the reaction was monitored by TLC. After complete consumption of the starting material, the reaction mixture was cooled to 0° C., then quenched with H$_2$O (20 mL) and extracted with EtOAc (2×50 mL). The combined organic layer was dried over anhydrous Na$_2$SO$_4$ and concentrated under reduced pressure to obtain the crude product. The crude compound was purified by column chromatography (100-200 mesh silica-gel) by eluting with 60% EtOAc in petroleum ether to obtain the title compound as an off-white solid (400 mg, 82%).

$^1$H NMR (400 MHZ, DMSO-d$_6$) δ 9.76 (s, 1H), 8.01 (t, J=2.0 Hz, 1H), 7.60-7.55 (m, 3H), 7.53 (br s, 1H), 7.31 (dd, J=3.2 Hz, 2.4 Hz, 1H), 7.14 (d, J=8.8 Hz, 2H), 6.91 (br s, 1H), 6.76 (dd, J=3.2 Hz, 1.6 Hz, 1H), 6.50 (d, J=8.8 Hz, 1H), 3.57 (t, J=8.8 Hz, 2H), 3.00 (t, J=8.8 Hz, 2H), 2.57-2.50 (m, 1H), 1.55-1.50 (m, 2H), 1.17 (d, J=6.8 Hz, 3H), 0.76 (t, J=7.2 Hz, 3H). LCMS: m/z 424.28 [M+H]$^+$.

Other analogues prepared by this method:

Compound 22, N-(3-hydroxy-4-methylphenyl)-1-(indolin-5-ylsulfonyl)-1H-pyrrole-3-carboxamide (11%)

$^1$H NMR (400 MHZ, DMSO-d$_6$) δ 9.63 (s, 1H), 9.28 (s, 1H), 7.99 (t, J=2.0 Hz, 1H), 7.56 (dd, J=8.4 Hz, 2.0 Hz, 1H), 7.52 (br s, 1H), 7.31-7.28 (m, 2H), 6.95 (s, 2H), 6.90 (br s,

1H), 6.75 (dd, J=3.2 Hz, 2.0 Hz, 1H), 6.49 (d, J=8.4 Hz, 1H), 3.57 (t, J=8.8 Hz, 2H), 3.00 (t, J=8.8 Hz, 2H), 2.06 (s, 3H). LCMS: m/z 398.33 [M+H]$^+$.

Preparation of Compound 24, 1-((1H-indol-5-yl)sulfonyl)-N-(4-(sec-butyl)phenyl)-1H-pyrrole-3-carboxamide To a stirred solution of Compound 21 (0.20 g, 0.47 mmol) in DCM (5 mL) was added MnO$_2$ (0.62 g, 7.09 mmol) at room temperature. The resultant reaction mixture was stirred for 16 h. The progress of the reaction was monitored by TLC. After complete consumption of the starting material, the reaction mixture diluted with DCM (20 mL) and filtered through Celite, which was then washed with DCM (20 mL). The combined organic layer was dried over anhydrous Na$_2$SO$_4$ and concentrated under vacuum to obtain the crude product, which was purified by reverse phase preparative HPLC to give the title compound as an off-white solid (60 mg, 30%).

$^1$H NMR (400 MHZ, DMSO-d$_6$) δ 11.82 (s, 1H), 9.77 (s, 1H), 8.35 (d, J=2.0 Hz, 1H), 8.11 (t, J=2.0 Hz, 1H), 7.69 (dd, J=8.8 Hz, 2.0 Hz, 1H), 7.64-7.62 (m, 2H), 7.58 (d, J=8.4 Hz, 2H), 7.42 (dd, J=3.2 Hz, 2.4 Hz, 1H), 7.13 (d, J=8.4 Hz, 2H), 6.77 (dd, J=3.2 Hz, 2.0 Hz, 1H), 6.71 (d, J=2.8 Hz, 1H), 2.56-2.50 (m, 1H), 1.55-1.50 (m, 2H), 1.16 (d, J=6.8 Hz, 3H), 0.75 (t, J=7.2 Hz, 3H). LCMS: m/z 422.30 [M+H]$^+$.

Other analogues prepared by this method:

Compound 25, 1-((1H-indol-5-yl)sulfonyl)-N-(3-hydroxy-4-methylphenyl)-1H-pyrrole-3-carboxamide (36%)

$^1$H NMR (400 MHZ, DMSO-d$_6$) δ 9.65 (br s, 2H), 8.35 (d, J=1.6 Hz, 1H), 8.09 (t, J=2.0 Hz, 1H), 7.69-7.57 (m, 3H), 7.40 (dd, J=3.2 Hz, 2.4 Hz, 1H), 7.29 (br s, 1H), 6.94 (br s, 2H), 6.76 (dd, J=3.2 Hz, 1.6 Hz, 1H), 6.70 (d, J=2.8 Hz, 1H), 2.05 (s, 3H). LCMS: m/z 396.45 [M+H]$^+$.

Scheme 6. Preparation of Compounds 23 and 26

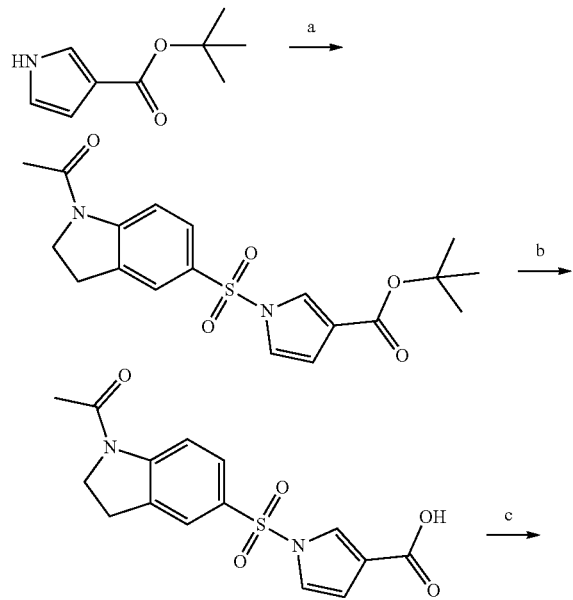

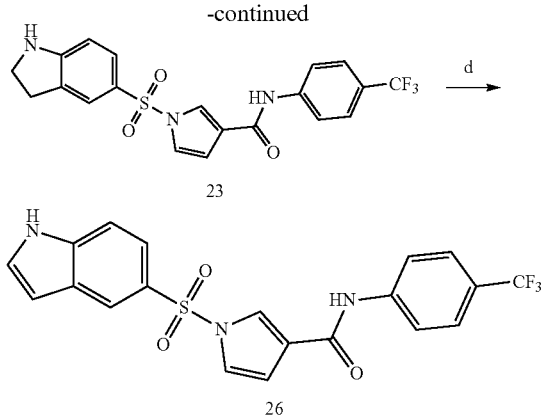

Reagents and conditions:
a) 1-acetylindoline-5-sulfonyl chloride, NaH, DMF, 0° C. to rt;
b) TFA, DCM, 0° C. to rt;
c) i) 4-trifluoromethylaniline, HATU, DIPEA, DMF, rt; ii) conc. HCl, MeOH, reflux;
d) MnO2, THF, rt.

Preparation of tert-butyl 1-((1-acetylindolin-5-yl)sulfonyl)-1H-pyrrole-3-carboxylate To a stirred solution of tert-butyl 1H-pyrrole-3-carboxylate (500 mg, 2.99 mmol) in DMF (5 mL), was added NaH (60% dispersion in mineral oil, 150 mg, 3.59 mmol) at 0° C. the reaction mixture was and stirred for 10 min, after which 1-acetylindoline-5-sulfonyl chloride (932 mg, 3.59 mmol) was added portion-wise to the reaction mixture at 0° C. The reaction mixture was stirred for 1 h at room temperature. The progress of the reaction was monitored by TLC. After completion of starting material, reaction mixture was quenched with crushed ice, extracted with EtOAc (2×50 mL). The combined organic layer was dried over anhydrous Na$_2$SO$_4$ and concentrated under reduced pressure to obtain the title compound as a brown solid (400 mg, 34%), which was used in the next step without further purification. LCMS: m/z 389.28 [M–H]$^-$.

Preparation of 1-((1-acetylindolin-5-yl)sulfonyl)-1H-pyrrole-3-carboxylic Acid

To a stirred solution of tert-butyl 1-((1-acetylindolin-5-yl)sulfonyl)-1H-pyrrole-3-carboxylate (0.39 g, 1.02 mmol) in DCM (10 mL) was added TFA (1 mL) at 0° C. under an atmosphere of nitrogen. The resultant reaction mixture was stirred for 2 h at room temperature. The progress of the reaction was monitored by TLC. After complete consumption of the starting material, the reaction mixture was concentrated under reduced pressure to obtain the title compound as a brown solid (300 mg, 88%), which was used in the next step without further purification. LCMS: m/z 335.01 [M+H]$^+$.

Preparation of 1-((1-acetylindolin-5-yl)sulfonyl)-N-(4-(trifluoromethyl)phenyl)-1H-pyrrole-3-carboxamide To a stirred solution of 1-((1-acetylindolin-5-yl)sulfonyl)-1H-pyrrole-3-carboxylic acid (400 mg, 1.20 mmol) and 4-trifluoromethylaniline (232 mg, 1.44 mmol) in DMF (5 mL) was added DIPEA (465 mg, 3.60 mmol), followed by HATU (912 mg, 2.40 mmol) at 0° C. under an atmosphere of nitrogen. The resultant reaction mixture was stirred for 16 h at room temperature. The progress of the reaction was monitored by TLC. After complete consumption of the starting material, the reaction mixture was quenched with H₂O (20 mL) and extracted with EtOAc (2×50 mL). The combined organic layer was dried over anhydrous Na₂SO₄ and concentrated under reduced pressure to obtain the title compound as a brown solid (400 mg, 70%), which was used in the next step without further purification. LCMS: m/z 478.13 [M+H]⁺.

Preparation of Compound 23, 1-(indolin-5-ylsulfonyl)-N-(4-(trifluoromethyl)phenyl)-1H-pyrrole-3-carboxamide To a stirred solution of 1-((1-acetylindolin-5-yl)sulfonyl)-N-(4-(trifluoromethyl)phenyl)-1H-pyrrole-3-carboxamide (0.40 g, 0.84 mmol), in MeOH (2 mL) was added conc. HCl (2 mL) at 0° C. The resultant reaction mixture was heated to 90° C. and stirred for 1 h. The progress of the reaction was monitored by TLC. After complete consumption of the starting material, the reaction mixture was cooled to room temperature and concentrated under reduced pressure to obtain the crude product. The crude compound was purified by reverse phase preparative HPLC to give the title compound as a brown solid (60 mg, 16%).

¹H NMR (400 MHZ, DMSO-d₆) δ 10.15 (s, 1H), 8.09 (t, J=2.0 Hz, 1H), 7.93 (d, J=8.4 Hz, 2H), 7.70 (d, J=8.8 Hz, 2H), 7.58 (dd, J=8.4 Hz, 2.0 Hz, 1H), 7.54 (br s, 1H), 7.34 (dd, J=3.2 Hz, 2.4 Hz, 1H), 6.93 (br s, 1H), 6.79 (dd, J=3.6 Hz, 1.6 Hz, 1H), 6.50 (d, J=8.4 Hz, 1H), 3.58 (t, J=8.8 Hz, 2H), 3.00 (t, J=8.8 Hz, 2H). LCMS: m/z 436.15 [M+H]⁺.

Preparation of Compound 26, 1-((1H-indol-5-yl)sulfonyl)-N-(4-(trifluoromethyl)phenyl)-1H-pyrrole-3-carboxamide To a stirred solution of Compound 23 (30 mg, 0.07 mmol) in DCM (5 mL) was added MnO₂ (89 mg, 1.03 mmol) at room temperature. The resultant reaction mixture was stirred at room temperature for 16 h. The progress of the reaction was monitored by TLC. After complete consumption of the starting material, the reaction mixture was diluted with DCM (20 mL) and filtered through a bed of Celite, which was washed with DCM (20 mL). The combined organic layer was dried over anhydrous Na₂SO₄ and concentrated under reduced pressure to obtain the crude product. Trituration with diethyl ether and pentane gave the title compound as a brown solid (20 mg, 67%).

¹H NMR (400 MHZ, DMSO-d₆) δ 11.84 (s, 1H), 10.17 (s, 1H), 8.37 (d, J=2.0 Hz, 1H), 8.19 (t, J=2.0 Hz, 1H), 7.92 (d, J=8.8 Hz, 2H), 7.71-7.64 (m, 5H), 7.45 (dd, J=3.2 Hz, 2.4 Hz, 1H), 6.79 (dd, J=3.2 Hz, 1.6 Hz, 1H), 6.71 (d, J=2.8 Hz, 1H). LCMS: m/z 434.16 [M+H]⁺.

Scheme 7. Preparation of Compound 28

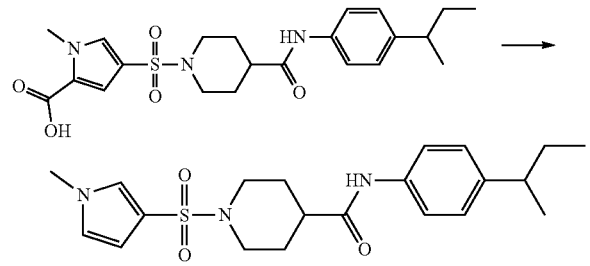

Reagents and conditions: LiBr, DMF, 160° C. (MW).

Preparation of Compound 28, N-(4-(sec-butyl)phenyl)-1-((1-methyl-1H-pyrrol-3-yl) sulfonyl)piperidine-4-carboxamide To a stirred solution of 4-((4-((4-(sec-butyl)phenyl) carbamoyl)piperidin-1-yl)sulfonyl)-1-methyl-1H-pyrrole-2-carboxylic acid (100 mg, 0.22 mmol) in DMF (1.0 mL) in a microwave vial was added LiBr (97 mg, 1.17 mmol). The reaction mixture was heated under microwave conditions at 160° C. for 1 h. The progress of the reaction was monitored by TLC. After complete consumption of the starting material, the reaction mixture was quenched with H₂O (30 mL) and extracted with EtOAc (2×50 mL). The combined organic layer was dried over anhydrous Na₂SO₄ and concentrated under reduced pressure to obtain the crude product. Trituration with diethyl ether and pentane gave the title compound as an off-white solid (24 mg, 27%).

¹H NMR (400 MHZ, DMSO-d₆) δ 9.70 (s, 1H), 7.46 (d, J=8.4 Hz, 2H), 7.34 (t, J=2.0 Hz, 1H), 7.09 (d, J=8.4 Hz, 2H), 6.92 (t, J=2.4 Hz, 1H), 6.28 (dd, J=2.8 Hz, 2.0 Hz, 1H), 3.70 (s, 3H), 3.54 (br d, J=11.6 Hz, 2H), 2.54-2.50 (m, 1H), 2.29-2.20 (m, 3H), 1.87-1.84 (m, 2H), 1.71-1.64 (m, 2H), 1.53-1.48 (m, 2H), 1.14 (d, J=6.4 Hz, 3H), 0.74 (t, J=7.2 Hz, 3H). LCMS: m/z 404.15 [M+H]⁺.

Scheme 8. Preparation of Compound 29

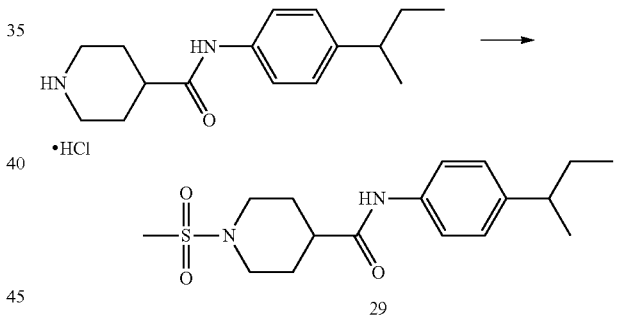

Reagents and conditions: Methanesulfonyl chloride, Et₃N, DMAP, DCM, 0° C. to rt.

Preparation of Compound 29, N-(4-(sec-butyl)phenyl)-1-(methylsulfonyl) piperidine-4-carboxamide To a stirred solution of N-(4-(sec-butyl)phenyl)piperidine-4-carboxamide hydrochloride (0.10 g, 0.33 mmol) in DCM (3 mL) was added Et₃N (0.13 mL, 1.01 mmol), followed by DMAP (0.041 g, 0.33 mmol) at room temperature. The reaction mixture was then cooled to 0° C. and methanesulfonyl chloride (0.033 mL, 0.43 mmol) was added dropwise. The reaction mixture was stirred for 2 h at room temperature. The progress of the reaction was monitored by TLC. After complete consumption of the starting material, the reaction mixture was cooled to 0° C., quenched with H₂O (10 mL) and extracted with DCM (2×10 mL). The combined organic layer was dried over anhydrous Na₂SO₄ and concentrated under reduced pressure to obtain the crude product, which was purified by 100-200 silica-gel column chromatography eluting with 60% EtOAc in petroleum ether to give the title compound as an off-white solid (24 mg, 21%).

$^1$H NMR (400 MHZ, DMSO-d$_6$) δ 9.83 (s, 1H), 7.50 (d, J=8.4 Hz, 2H), 7.11 (d, J=8.4 Hz, 2H), 3.61 (br d, J=8.8 Hz, 2H), 2.89 (s, 3H), 2.78-2.71 (m, 2H), 2.54-2.50 (m, 1H), 2.48-2.44 (m, 1H), 1.89 (dd, J=13.2 Hz, 2.4 Hz, 2H), 1.71-1.63 (m, 2H), 1.53-1.49 (m, 2H), 1.15 (d, J=6.8 Hz, 3H), 0.74 (t, J=7.2 Hz, 3H). LCMS: m/z 339.1 [M+H]$^+$.

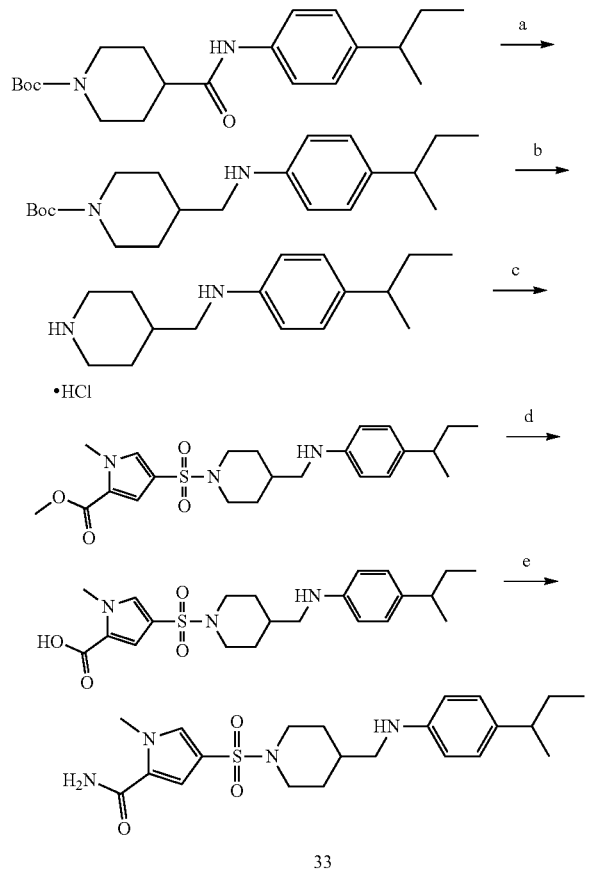

Scheme 9. Preparation of Compound 33

Reagents and conditions:
a) BH$_3$·Me$_2$S, THF, reflux;
b) 4M HCl, DCM, 1,4-dioxane, 0° C. to rt;
c) methyl 4-(chlorosulfonyl)-1-methyl-1H-pyrrole-2-carboxylate, pyridine, DCM, rt;
d) LiOH, MeOH/THF/H$_2$O, 0° C. to rt;
e) NH$_4$Cl, HATU, DIPEA, DMF, rt.

Preparation of tert-butyl 4-(((4-(sec-butyl)phenyl) amino)methyl) piperidine-1-carboxylate To a stirred solution of tert-butyl 4-((4-(sec-butyl)phenyl) carbamoyl)piperidine-1-carboxylate (2.0 g, 5.54 mmol) in THF (20 mL) was added BH$_3$·Me$_2$S (5.7 mL) at 0° C. The mixture was heated to 60° C. and stirred at that temperature for 2 h. The progress of the reaction was monitored by TLC. After complete consumption of the starting material, the reaction mass was cooled to 0° C., quenched with methanol, then again stirred at 60° C. for 2 h. After that the reaction mixture was concentrated and treated with ice. The precipitate thus formed was filtered, washed with water and dried under vacuum to obtain the title compound as an off-white solid (1.8 g, 94%), which was used in the next step without further purification. LCMS: m/z 347.40 [M+H]$^+$.

Preparation of 4-(sec-butyl)-N-(piperidin-4-ylmethyl) aniline Hydrochloride

To a stirred solution of tert-butyl 4-(((4-(sec-butyl)phenyl)amino)methyl) piperidine-1-carboxylate (500 mg, 1.44 mmol) in DCM (10 mL) was added 4 M HCl in dioxane (2.5 mL, 10 vol) at 0° C. The reaction mixture was stirred for 2 h at room temperature. The progress of the reaction was monitored by TLC. After complete consumption of the starting material, the reaction mixture was concentrated under reduced pressure to obtain the crude product. The crude compound was dissolved in 10% MeOH/CH$_2$Cl$_2$ (15 mL) and washed with saturated NaHCO$_3$ solution. The organic layer was separated, dried over anhydrous Na$_2$SO$_4$, filtered and concentrated under reduced pressure. Trituration with ether gave the title compound as an off-white solid (400 mg, 98%). LCMS: m/z 247.31 [M+H]$^+$.

Preparation of methyl 4-((4-(((4-(sec-butyl)phenyl) amino)methyl)piperidin-1-yl) sulfonyl)-1-methyl-1H-pyrrole-2-carboxylate To a stirred solution of 4-(sec-butyl)-N-(piperidin-4-ylmethyl)aniline hydrochloride (500 mg, 2.03 mmol) and methyl 4-(chlorosulfonyl)-1-methyl-1H-pyrrole-2-carboxylate (0.48 g, 2.03 mmol) in DCM (15 mL) was added pyridine (0.32 mL, 4.06 mmol) at 0° C. The reaction mixture was stirred at room temperature for 30 min. The progress of the reaction was monitored by TLC. After complete consumption of the starting material, the reaction mixture was concentrated under reduced pressure to obtain the crude product. Trituration with diethyl ether gave the title compound as an off-white solid (300 mg, 35%). LCMS: m/z 448.18 [M+H]$^+$.

Preparation of 4-((4-(((4-(sec-butyl)phenyl)amino) methyl) piperidin-1-yl) sulfonyl)-1-methyl-1H-pyrrole-2-carboxylic Acid To a stirred solution of methyl 4-((4-(((4-(sec-butyl)phenyl)amino)methyl)piperidin-1-yl) sulfonyl)-1-methyl-1H-pyrrole-2-carboxylate (300 mg, 6.70 mmol) in THF/Water/MeOH (1:1:1, 6 mL) was added LiOH·H$_2$O (56 mg, 13.40 mmol) at 0° C. The resulting mixture was stirred for 3 h at room temperature. The progress of the reaction was monitored by TLC. After complete consumption of the starting material, the reaction mixture was concentrated and then acidified with 1N HCl. The precipitated solid thus obtained was filtered off and dried under vacuum to give the title compound as an off-white solid (220 mg, 76%), which was used in the next step without further purification. LCMS: m/z 434.71 [M+H]$^+$.

Preparation of Compound 33, 4-((4-(((4-(sec-butyl) phenyl)amino)methyl) piperidin-1-yl) sulfonyl)-1-methyl-1H-pyrrole-2-carboxamide To a stirred solution of 4-((4-(((4-(sec-butyl)phenyl) amino)methyl)piperidin-1-yl)sulfonyl)-1-methyl-1H-pyrrole-2-carboxylic acid (220 mg, 0.51 mmol) in DMF (5 mL) was added NH$_4$Cl (135 mg, 2.54 mmol) and DIPEA (0.265 mL, 2.06 mmol), followed by HATU (289 mg, 0.76 mmol) at room temperature. The resulting reaction mixture was stirred at room temperature for 3 h. The progress of the reaction was monitored by TLC. After complete consumption of the starting material, the reaction mixture was quenched with H$_2$O (30 mL). The solid precipitate thus obtained was filtered off and dried under vacuum. Trituration with diethyl ether and pentane gave the title compound as an off-white solid (144 mg, 66%).

$^1$H NMR (400 MHZ, DMSO-d$_6$) δ 7.73 (br s, 1H), 7.49 (d, J=1.6 Hz, 1H), 7.16 (br s, 1H), 7.08 (d, J=2.0 Hz, 1H), 6.86 (d, J=8.4 Hz, 2H), 6.45 (d, J=8.8 Hz, 2H), 5.37 (t, J=5.6 Hz, 1H), 3.87 (s, 3H), 3.53 (br d, J=11.2 Hz, 2H), 2.85 (t, J=6.0 Hz, 2H), 2.41-2.35 (m, 1H), 2.18 (t, J=10.8 Hz, 2H), 1.82 (br d, J=11.2 Hz, 2H), 1.46-1.42 (m, 3H), 1.27-1.22 (m, 2H), 1.10 (d, J=7.2 Hz, 3H), 0.73 (t, J=7.2 Hz, 3H). LCMS: m/z 433.37 [M+H]$^+$.

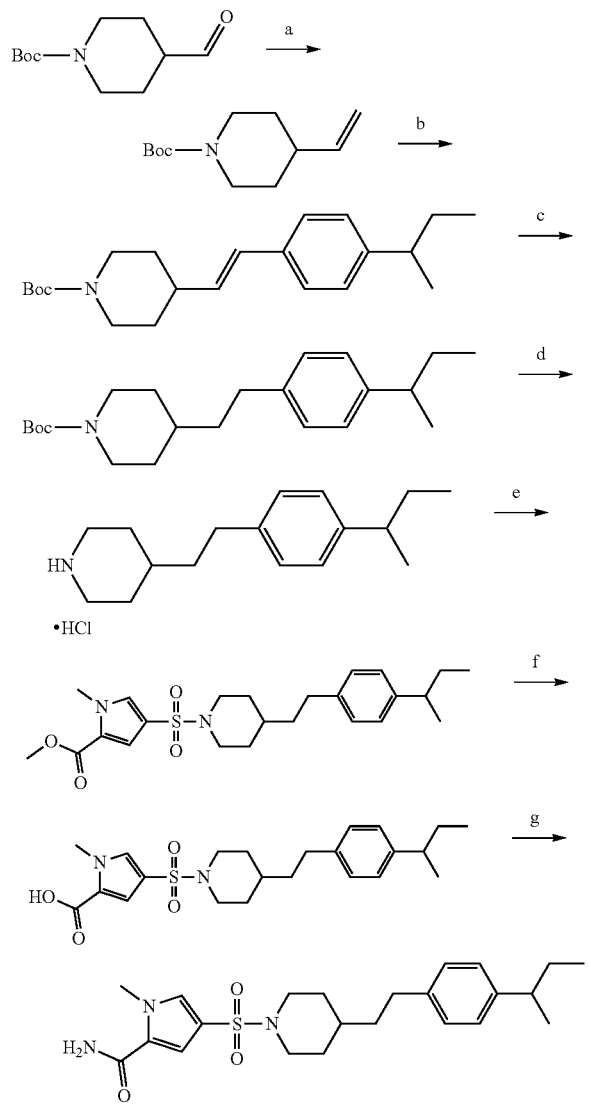

Scheme 10. Preparation of Compound 34

34

Reagents and conditions:
a) MePPh$_3$I, t-BuOK, THF, 0° C. to rt;
b) 1-bromo-4-(sec-butyl)benzene, bis(tri-tertbutylphosphine)palladium(0), dicyclohexylmethyl amine, 1,4-dioxane, 130° C.;
c) H$_2$, Pd/C, EtOH, rt;
d) 4M HCl, DCM, 1,4-dioxane, 0° C. to rt;
e) methyl 4-(chlorosulfonyl)-1-methyl-1H-pyrrole-2-carboxylate, Et$_3$N, DCM, 0° C. to rt;
f) LiOH, MeOH/THF/H$_2$O, 0° C. to rt;
g) NH$_4$Cl, HATU, DIPEA, DMF, rt.

Preparation of tert-butyl 4-vinylpiperidine-1-carboxylate

To a stirred solution of tert-butyl 4-formylpiperidine-1-carboxylate (450 mg, 2.10 mmol) and methyltriphenylphosphonium iodide (852 mg, 2.10 mmol) in THF (15 mL) was added t-BuOK, (473 mg, 4.21 mmol) at 0° C. under an atmosphere of nitrogen. The resultant reaction mixture was stirred for 2 h at room temperature. The progress of the reaction was monitored by TLC. After complete consumption of the starting material, the reaction mixture was cooled to 0° C. then quenched with H$_2$O (20 mL) and extracted with EtOAc (2×50 mL). The combined organic layer was dried over anhydrous Na$_2$SO$_4$ and concentrated under reduced pressure to obtain the title compound as a colourless liquid (250 mg, 56%), which was used in the next step without further purification. LCMS: m/z 156.1 [M+H−$^t$Bu]$^+$.

Preparation of tert-butyl (E)-4-(4-(sec-butyl)styryl) piperidine-1-carboxylate

To a microwave vial containing 1-bromo-4-(sec-butyl) benzene (200 mg, 0.94 mmol) and tert-butyl 4-vinylpiperidine-1-carboxylate (237 mg, 1.13 mmol) in 1,4-dioxane (2 mL) was added dicyclohexylmethyl amine (366 mg, 1.87 mmol). The reaction mass was degassed with argon for 10 min, after which bis(tri-tertbutylphosphine)palladium(0) (14 mg, 0.3 mmol) was added and the reaction mixture was further degassed with argon for 5 min. Then the reaction mixture was heated under microwave conditions at 130° C. for 30 min. The progress of the reaction was monitored by TLC. After complete consumption of the starting material, the reaction mixture was cooled to 0° C., quenched with H$_2$O (20 mL) and extracted with EtOAc (2×30 mL). The combined organic layer was dried over anhydrous Na$_2$SO$_4$ and concentrated under reduced pressure to obtain the crude product. The crude compound was purified by using the Biotage purification method, eluting in 10% EAOAc in petroleum ether to give the title compound as a colourless liquid (360 mg. 94%). LCMS: m/z 288.1 [M+H−$^t$Bu]$^+$.

Preparation of tert-butyl 4-(4-(sec-butyl)phenethyl)piperidine-1-carboxylate

To a stirred solution of tert-butyl (E)-4-(4-(sec-butyl) styryl)piperidine-1-carboxylate (360 mg, 1.05 mmol) in ethanol (10 mL) was added Pd/C (10 wt %, 40 mg) at 0° C. The reaction mixture was stirred at room temperature for 12 h under an atmosphere of hydrogen. The progress of the reaction was monitored by TLC. After complete consumption of the starting material, the reaction mass was filtered through a bed of Celite, washed with methanol and concentrated under reduced pressure to obtain the title compound as a colourless liquid (300 mg. 83%), which was used in the next step without further purification. LCMS: m/z 290.19 [M+H−$^t$Bu]$^+$.

Preparation of 4-(4-(sec-butyl) phenethyl)piperidine Hydrochloride

To a stirred solution of tert-butyl 4-(4-(sec-butyl)phenethyl)piperidine-1-carboxylate (300 mg, 0.87 mmol) in DCM (10 mL) was added 4 M HCl in 1,4-dioxane (1.5 mL, 5 Vol) at 0° C. The reaction mixture was stirred for 3 h at room temperature. The progress of the reaction was monitored by TLC. After complete consumption of the starting material, the reaction mixture was concentrated under reduced pressure. The residue was dissolved in 10% MeOH/DCM (15 mL) and washed with saturated NaHCO$_3$ solution. The organic layer was separated, dried over anhydrous Na$_2$SO$_4$, filtered and concentrated under reduced pressure to obtain the crude product. Trituration with ether gave the title compound as an off-white solid (200 mg. 94%), which was used in the next step without further purification.

Preparation of methyl 4-((4-(4-(sec-butyl)phenethyl)piperidin-1-yl) sulfonyl)-1-methyl-1H-pyrrole-2-carboxylate To a stirred solution of 4-(4-(sec-butyl)phenethyl)piperidine hydrochloride (200 mg, 0.815 mmol) in DCM (20 mL) was added Et$_3$N (247 mg, 2.44 mmol) and methyl 4-(chlorosulfonyl)-1-methyl-1H-pyrrole-2-carboxylate (193 mg, 0.815 mmol) at 0° C. The reaction mixture was and stirred for 2 h at room temperature. The progress of the reaction was monitored by TLC. After complete consumption of the starting material, the reaction mixture was concentrated under reduced pressure. The residue was triturated with diethyl ether to obtain the title compound as an off-white solid (200 mg, 55%). LCMS: m/z 447.61 [M+H]$^+$.

Preparation of 4-((4-(4-(sec-butyl)phenethyl)piperidin-1-yl)sulfonyl)-1-methyl-1H-pyrrole-2-carboxylic Acid To a stirred solution of methyl 4-((4-(4-(sec-butyl)phenethyl)piperidin-1-yl)sulfonyl)-1-methyl-1H-pyrrole-2-carboxylate (200 mg, 0.45 mmol) in THF/Water/MeOH (1:1:1, 6 mL), was added LiOH·H$_2$O (37 mg, 0.89 mmol) at 0° C. The reaction mixture was stirred for 4 h at room temperature. The progress of the reaction was monitored by TLC. After complete consumption of the starting material, the reaction mixture was acidified with 1N HCl. The resulting was filtered off and dried to obtain the title compound as an off-white solid (160 mg, 82%). LCMS: m/z 433.37 [M+H]$^+$.

Preparation of Compound 34, 4-((4-(4-(sec-butyl)phenethyl)piperidin-1-yl)sulfonyl)-1-methyl-1H-pyrrole-2-carboxamide To a stirred solution of 4-((4-(4-(sec-butyl)phenethyl)piperidin-1-yl)sulfonyl)-1-methyl-1H-pyrrole-2-carboxylic acid (160 mg, 0.37 mmol) in DMF (3 mL) was added NH$_4$Cl (99 mg, 1.85 mmol) and DIPEA (143 mg, 1.11 mmol), followed by HATU (210 mg, 0.55 mmol) at room temperature. The resulting reaction mixture was stirred at room temperature for 3 h. The progress of the reaction was monitored by TLC. After complete consumption of the starting material, the reaction mixture was quenched with H$_2$O (30 mL) and extracted with EtOAc (2×30 mL). The combined organic layer was dried over anhydrous Na$_2$SO$_4$ and concentrated under reduced pressure to obtain the crude product. Trituration with diethyl ether and pentane gave the title compound as an off-white solid (48 mg, 30%).

$^1$H NMR (400 MHZ, DMSO-d$_6$) δ 7.74 (br s, 1H), 7.49 (d, J=1.6 Hz, 1H), 7.16 (br s, 1H), 7.10-7.04 (m, 5H), 3.87 (s, 3H), 3.51 (br d, J=10.8 Hz, 2H), 2.53-2.50 (m, 3H), 2.15 (br t, J=10.8 Hz, 2H), 1.78 (br d, J=9.2 Hz, 2H), 1.54-1.44 (m, 4H), 1.21-1.17 (m, 3H), 1.15 (d, J=7.2 Hz, 6H), 0.74 (t, J=7.2 Hz, 3H). LCMS: m/z 432.1 [M+H]$^+$.

Scheme 11. Preparation of Compounds 35-56, 66-75 and 94-104

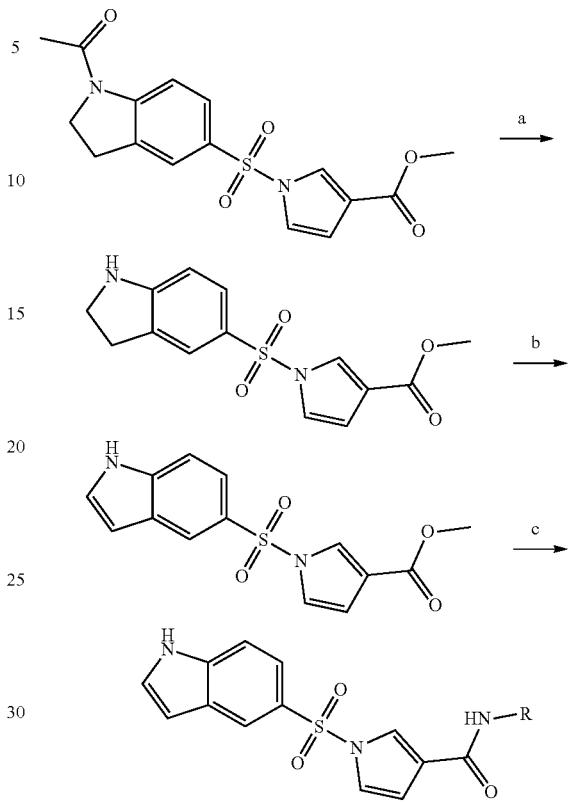

35: R = 3-secBu-Ph
36: R = 2-secBu-Ph
37: R = 4-iPr-Ph
38: R = 3-iPr-Ph
39: R = 2-iPr-Ph
40: R = 4-Et-Ph
41: R = 3-Et-Ph
42: R = 2-Et-Ph
43: R = 4-Me-Ph
44: R = 3-Me-Ph
45: R = 2-Me-Ph
46: R = 3-CF$_3$-Ph
47: R = 2-CF$_3$-Ph
48: R = 4-F-Ph
49: R = 3-F-Ph 50: R = 2-F-Ph
51: R = 2,6-diMe-Ph
52: R = 3,5-diMe-Ph
53: R = 2,6-diF-Ph
54: R = 3,5-diF-Ph
55: R = 2-F-6-Me-Ph
56: R = 3-F-5-Me-Ph
66: R = 4-Cl-Ph
67: R = 4-CN-Ph
68: R = 3,4-diF-Ph
69: R = 4-Cl-3-F-Ph
70: R = 3-Cl-4-F-Ph
71: R = 3,4-diCl-Ph
72: R = 5-F-pyridin-2-yl
73: R = 5-Cl-pyridin-2-yl 74: R = 6-F-pyridin-4-yl
75: R = 6-Cl-pyridin-4-yl
94: R = 4-secBu-3-F-Ph
95: R = 3-F-4-iPr-Ph
96: R = 4-nPr-Ph
97: R = 3-F-4-nPr-Ph
98: R = r-iBu-Ph
99: R = 4-iBu-3-F-Ph
100: R = r-tBu-Ph
101: R = 4-tBu-3-F-Ph
102: R = 4-OMe-Ph
103: R = 3-F-4-OMe-Ph
104: R = 3,4-OCH$_2$O-Ph Reagents and conditions:
a) conc. HCl, MeOH, reflux;
b) MnO$_2$, THF, rt;
c) RNH$_2$, DABAL-Me$_3$, Et$_3$N, toluene, 0° C. to 120° C.

Preparation of methyl 1-(indolin-5-ylsulfonyl)-1H-pyrrole-3-carboxylate

To a stirred solution of methyl 1-((1-acetylindolin-5-yl)sulfonyl)-1H-pyrrole-3-carboxylate (2.0 g, 5.74 mmol) in methanol (20 mL) was added conc. HCl (4 mL) at 0° C. The reaction mixture was heated to 90° C. and stirred for 1 h. The progress of the reaction was monitored by TLC. After complete consumption of the starting material, the reaction mixture was concentrated under reduced pressure to afford the title compound as an off-white solid (1.5 g, 76%), which was used in the next step without further purification. LCMS: m/z 432.1 [M+H]$^+$.

Preparation of methyl 1-((1H-indol-5-yl)sulfonyl)-1H-pyrrole-3-carboxylate

To a stirred solution of methyl 1-(indolin-5-ylsulfonyl)-1H-pyrrole-3-carboxylate (1.5 g, 4.38 mmol) in THF (15 mL) was added $MnO_2$ (3.8 g, 43.76 mmol) at room temperature. The resultant reaction mixture was stirred at room temperature for 16 h. The progress of the reaction was monitored by TLC. After complete consumption of the starting material, the reaction mixture was filtered through Celite and washed with THF (20 mL). The combined filtrate was dried over anhydrous $Na_2SO_4$ and concentrated under reduced pressure to obtain the crude product. Trituration using ethyl acetate and petroleum ether gave the title compound as an off-white solid (900 mg, 68%). LCMS: m/z 305.17 [M+H]$^+$.

Preparation of Compound 35, 1-((1H-indol-5-yl)sulfonyl)-N-(3-(sec-butyl)phenyl)-1H-pyrrole-3-carboxamide To a stirred solution of methyl 1-((1H-indol-5-yl)sulfonyl)-1H-pyrrole-3-carboxylate (150 mg, 0.49 mmol) and 3-sec-butylaniline (96 mg, 0.64 mmol) in toluene (2 mL) was added $Et_3N$ (0.14 mL, 0.99 mmol) followed by DABAl-$Me_3$ (190 mg, 0.74 mmol) at 0° C. under an atmosphere of nitrogen. The resultant reaction mixture was heated for 2 h at 120° C. The progress of the reaction was monitored by TLC. After complete consumption of the starting material, the reaction mixture was cooled to 0° C. then quenched with 1N HCl (10 mL) and extracted with EtOAc (2×50 mL). The combined organic layer was dried over anhydrous $Na_2SO_4$ and concentrated under reduced pressure to obtain the crude product. The crude compound was purified by column chromatography (100-200 mesh silica-gel) eluting with 30% EtOAc in petroleum ether to obtain the title compound as an off-white solid (53 mg, 25%).

$^1$H NMR (400 MHZ, DMSO-$d_6$) δ 11.82 (s, 1H), 9.78 (s, 1H), 8.35 (d, J=1.6 Hz, 1H), 8.14 (t, J=2.0 Hz, 1H), 7.69 (dd, J=8.8 Hz, 2.0 Hz, 1H), 7.64-7.62 (m, 2H), 7.56 (dd, J=8.0 Hz, 1.2 Hz, 1H), 7.48 (d, J=1.6 Hz, 1H), 7.42 (dd, J=3.2 Hz, 2.0 Hz, 1H), 7.22 (t, J=8.0 Hz, 1H), 6.90 (br d, J=7.6 Hz, 1H), 6.77 (dd, J=3.2, 1.6 Hz, 1H), 6.71 (d, J=2.8 Hz, 1H), 2.57-2.54 (m, 1H), 1.56-1.52 (m, 2H), 1.18 (d, J=7.2 Hz, 3H), 0.77 (t, J=7.2 Hz, 3H). LCMS: m/z 420.38 [M−H]$^-$.

Other analogues prepared by this method:

Compound 36, 1-((1H-indol-5-yl)sulfonyl)-N-(2-(sec-butyl)phenyl)-1H-pyrrole-3-carboxamide (43%)

$^1$H NMR (400 MHZ, DMSO-$d_6$) δ 11.82 (s, 1H), 9.52 (s, 1H), 8.37 (d, J=1.2 Hz, 1H), 8.02 (br s, 1H), 7.70 (dd, J=8.4 Hz, 1.6 Hz, 1H), 7.65-7.54 (m, 2H), 7.43 (dd, J=3.2 Hz, 2.4 Hz, 1H), 7.29-7.21 (m, 2H), 7.18-7.12 (m, 2H), 6.77 (br s, 1H), 6.71 (br s, 1H), 2.87-2.82 (m, 1H), 1.50-1.42 (m, 2H), 1.10 (d, J=6.8 Hz, 3H), 0.69 (t, J=7.2 Hz, 3H). LCMS: m/z 422.1 [M+H]$^+$.

Compound 37, 1-((1H-indol-5-yl)sulfonyl)-N-(4-isopropylphenyl)-1H-pyrrole-3-carboxamide (37%)

$^1$H NMR (400 MHZ, DMSO-$d_6$) δ 11.82 (s, 1H), 9.77 (s, 1H), 8.35 (d, J=1.6 Hz, 1H), 8.11 (t, J=2.0 Hz, 1H), 7.69 (dd, J=8.4 Hz, 2.0 Hz, 1H), 7.64-7.62 (m, 2H), 7.57 (d, J=8.4 Hz, 2H), 7.42 (dd, J=3.2 Hz, 2.0 Hz, 1H), 7.18 (d, J=8.4 Hz, 2H), 6.77 (dd, J=3.2 Hz, 1.6 Hz, 1H), 6.71 (dd, J=3.2 Hz, 1.6 Hz, 1H), 2.87-2.80 (m, 1H), 1.18 (d, J=6.8 Hz, 6H). LCMS: m/z 408.25 [M+H]$^+$.

Compound 38, 1-((1H-indol-5-yl)sulfonyl)-N-(3-isopropylphenyl)-1H-pyrrole-3-carboxamide (44%)

$^1$H NMR (400 MHZ, DMSO-$d_6$) δ 11.82 (s, 1H), 9.78 (s, 1H), 8.35 (d, J=2.0 Hz, 1H), 8.14 (t, J=2.0 Hz, 1H), 7.69 (dd, J=8.8, 2.0 Hz, 1H), 7.64-7.62 (m, 2H), 7.57-7.52 (m, 2H), 7.42 (dd, J=3.2 Hz, 2.4 Hz, 1H), 7.22 (t, J=8.0 Hz, 1H), 6.94 (br d, J=7.6 Hz, 1H), 6.77 (dd, J=3.2 Hz, 1.6 Hz, 1H), 6.71-6.70 (m, 1H), 2.88-2.81 (m, 1H), 1.19 (d, J=6.8 Hz, 6H). LCMS: m/z 408.24 [M+H]$^+$.

Compound 39, 1-((1H-indol-5-yl)sulfonyl)-N-(2-isopropylphenyl)-1H-pyrrole-3-carboxamide (52%)

$^1$H NMR (400 MHZ, DMSO-$d_6$) δ 11.83 (s, 1H), 9.54 (s, 1H), 8.37 (d, J=1.6 Hz, 1H), 8.02 (br s, 1H), 7.71 (dd, J=8.8 Hz, 2.0 Hz, 1H), 7.65-7.63 (m, 2H), 7.43 (dd, J=3.2 Hz, 2.4 Hz, 1H), 7.33 (dd, J=8.0 Hz, 1.6 Hz, 1H), 7.25 (td, J=7.6 Hz, 1.6 Hz, 1H), 7.19-7.12 (m, 2H), 6.77 (br s, 1H), 6.71 (d, J=3.2 Hz, 1H), 3.13-3.06 (m, 1H), 1.10 (d, J=7.2 Hz, 6H). LCMS: m/z 408.30 [M+H]$^+$.

Compound 40, 1-((1H-indol-5-yl)sulfonyl)-N-(4-ethylphenyl)-1H-pyrrole-3-carboxamide (76%)

$^1$H NMR (400 MHZ, DMSO-$d_6$) δ 11.82 (s, 1H), 9.78 (s, 1H), 8.35 (d, J=1.6 Hz, 1H), 8.11 (t, J=2.0 Hz, 1H), 7.68 (dd, J=8.8 Hz, 2.0 Hz, 1H), 7.64-7.62 (m, 2H), 7.57 (d, J=8.4 Hz, 2H), 7.42 (dd, J=3.2 Hz, 2.0 Hz, 1H), 7.14 (d, J=8.4 Hz, 2H), 6.77 (dd, J=3.2 Hz, 1.6 Hz, 1H), 6.71 (d, J=2.8 Hz, 1H), 2.56 (q, J=7.6 Hz, 2H), 1.16 (t, J=7.6 Hz, 3H). LCMS: m/z 394.24 [M+H]$^+$.

Compound 41, 1-((1H-indol-5-yl)sulfonyl)-N-(3-ethylphenyl)-1H-pyrrole-3-carboxamide (44%)

$^1$H NMR (400 MHZ, DMSO-$d_6$) δ 11.82 (s, 1H), 9.77 (s, 1H), 8.35 (d, J=1.6 Hz, 1H), 8.13 (t, J=2.0 Hz, 1H), 7.69 (dd, J=8.4 Hz, 2.0 Hz, 1H), 7.64-7.62 (m, 2H), 7.54-7.51 (m, 2H), 7.42 (dd, J=3.2 Hz, 2.0 Hz, 1H), 7.21 (t, J=8.0 Hz, 1H), 6.91 (br d, J=7.6 Hz, 1H), 6.77 (dd, J=3.2 Hz, 1.6 Hz, 1H), 6.71 (d, J=3.2 Hz, 1H), 2.58 (q, J=7.6 Hz, 2H), 1.17 (t, J=7.6 Hz, 3H). LCMS: m/z 392.30 [M−H]$^-$.

Compound 42, 1-((1H-indol-5-yl)sulfonyl)-N-(2-ethylphenyl)-1H-pyrrole-3-carboxamide (36%)

$^1$H NMR (400 MHZ, DMSO-$d_6$) δ 11.83 (s, 1H), 9.51 (s, 1H), 8.37 (d, J=2.0 Hz, 1H), 8.02 (br s, 1H), 7.70 (dd, J=8.4 Hz, 1.6 Hz, 1H), 7.65-7.62 (m, 2H), 7.43 (dd, J=3.2 Hz, 2.4 Hz, 1H), 7.28-7.25 (m, 1H), 7.22-7.16 (m, 3H), 6.77 (br d, J=1.2 Hz, 1H), 6.72-6.70 m, 1H), 2.55 (q, J=7.6 Hz, 2H), 1.07 (t, J=7.6 Hz, 3H). LCMS: m/z 394.29 [M+H]$^+$.

Compound 43, 1-((1H-indol-5-yl)sulfonyl)-N-(p-tolyl)-1H-pyrrole-3-carboxamide (61%)

$^1$H NMR (400 MHZ, DMSO-$d_6$) δ 11.82 (s, 1H), 9.77 (s, 1H), 8.35 (d, J=2.0 Hz, 1H), 8.10 (t, J=2.0 Hz, 1H), 7.68 (dd, J=8.4 Hz, 1.6 Hz, 1H), 7.64-7.61 (m, 2H), 7.55 (d, J=8.4 Hz, 2H), 7.42 (dd, J=3.2 Hz, 2.4 Hz, 1H), 7.11 (d, J=8.4 Hz, 2H), 6.76 (dd, J=3.2 Hz, 1.6 Hz, 1H), 6.71-6.99 (m, 1H), 2.25 (s, 3H). LCMS: m/z 380.25 [M+H]⁺.

Compound 44, 1-((1H-indol-5-yl)sulfonyl)-N-(m-tolyl)-1H-pyrrole-3-carboxamide (54%)

¹H NMR (400 MHZ, DMSO-$d_6$) δ 11.82 (s, 1H), 9.76 (s, 1H), 8.35 (d, J=1.6 Hz, 1H), 8.13 (t, J=2.0 Hz, 1H), 7.69 (dd, J=8.8 Hz, 2.0 Hz, 1H), 7.64-7.62 (m, 2H), 7.49-7.48 (m, 2H), 7.42 (dd, J=3.2 Hz, 2.4 Hz, 1H), 7.19 (t, J=8.0 Hz, 1H), 6.88 (d, J=7.6 Hz, 1H), 6.77 (dd, J=3.6 Hz, 1.6 Hz, 1H), 6.71 (d, J=3.2 Hz, 1H), 2.28 (s, 3H). LCMS: m/z 380.0 [M+H]⁺.

Compound 45, 1-((1H-indol-5-yl)sulfonyl)-N-(o-tolyl)-1H-pyrrole-3-carboxamide (51%)

¹H NMR (400 MHZ, DMSO-$d_6$) δ 11.82 (s, 1H), 9.51 (s, 1H), 8.37 (d, J=2.0 Hz, 1H), 8.03 (br s, 1H), 7.70 (dd, J=8.8, 2.0 Hz, 1H), 7.65-7.63 (m, 2H), 7.43 (dd, J=3.2 Hz, 2.0 Hz, 1H), 7.25-7.22 (m, 2H), 7.19-7.11 (m, 2H), 6.77 (dd, J=3.2 Hz, 1.6 Hz, 1H), 6.71 (t, J=1.2 Hz, 1H), 2.17 (s, 3H). LCMS: m/z 378.22 [M−H]⁻.

Compound 46, 1-((1H-indol-5-yl)sulfonyl)-N-(3-(trifluoromethyl)phenyl)-1H-pyrrole-3-carboxamide (11%)

¹H NMR (400 MHZ, DMSO-$d_6$) δ 11.83 (s, 1H), 10.14 (s, 1H), 8.36 (d, J=2.0 Hz, 1H), 8.17 (t, J=2.0 Hz, 1H), 8.12 (br s, 1H), 7.98 (br d, J=8.8 Hz, 1H), 7.69 (dd, J=8.8 Hz, 2.0 Hz, 1H), 7.64-7.63 (m, 2H), 7.56 (t, J=8.0 Hz, 1H), 7.46 (dd, J=3.2 Hz, 2.0 Hz, 1H), 7.42-7.40 (m, 1H), 6.78 (dd, J=3.2 Hz, 1.6 Hz, 1H), 6.71 (dd, J=3.2 Hz, 0.8 Hz, 1H). LCMS: m/z 432.23 [M−H]⁻.

Compound 47, 1-((1H-indol-5-yl)sulfonyl)-N-(2-(trifluoromethyl)phenyl)-1H-pyrrole-3-carboxamide (45%)

¹H NMR (400 MHZ, DMSO-$d_6$) δ 11.83 (s, 1H), 9.76 (s, 1H), 8.37 (d, J=1.6 Hz, 1H), 8.04 (t, J=2.0 Hz, 1H), 7.77-7.75 (m, 1H), 7.72-7.63 (m, 4H), 7.50 (t, J=7.6 Hz, 1H), 7.46-7.44 (m, 2H), 6.74 (dd, J=3.2 Hz, 1.6 Hz, 1H), 6.71 (dd, J=3.2 Hz, 0.8 Hz, 1H). LCMS: m/z 432.20 [M−H]⁻.

Compound 1-((1H-indol-5-yl)sulfonyl)-N-(4-fluorophenyl)-1H-pyrrole-3-carboxamide (61%)

¹H NMR (400 MHZ, DMSO-$d_6$) δ 11.82 (s, 1H), 9.90 (s, 1H), 8.36 (d, J=1.6 Hz, 1H), 8.11 (t, J=2.0 Hz, 1H), 7.71-7.67 (m, 3H), 7.64-7.62 (m, 2H), 7.43 (dd, J=3.2 Hz, 2.4 Hz, 1H), 7.16 (t, J=8.8 Hz, 2H), 6.77 (dd, J=3.2 Hz, 1.6 Hz, 1H), 6.71 (d, J=3.2 Hz, 1H). LCMS: m/z 384.20 [M+H]⁺.

Compound 49, 1-((1H-indol-5-yl)sulfonyl)-N-(3-fluorophenyl)-1H-pyrrole-3-carboxamide (63%)

¹H NMR (400 MHZ, DMSO-$d_6$) δ 11.82 (s, 1H), 10.02 (s, 1H), 8.36 (d, J=2.0 Hz, 1H), 8.15 (t, J=2.0 Hz, 1H), 7.68-7.62 (m, 4H), 7.46-7.44 (m, 2H), 7.38-7.32 (m, 1H), 6.91-6.87 (m, 1H), 6.77 (dd, J=3.6 Hz, 2.0 Hz, 1H), 6.72-6.70 (m, 1H). LCMS: m/z 384.20 [M+H]⁺.

Compound 50, 1-((1H-indol-5-yl)sulfonyl)-N-(2-fluorophenyl)-1H-pyrrole-3-carboxamide (58%)

¹H NMR (400 MHZ, DMSO-$d_6$) δ 11.83 (s, 1H), 9.76 (s, 1H), 8.37 (d, J=1.6 Hz, 1H), 8.12 (t, J=2.0 Hz, 1H), 7.69 (dd, J=8.8 Hz, 2.0 Hz, 1H), 7.65-7.62 (m, 2H), 7.54 (td, J=8.0 Hz, 2.0 Hz, 1H), 7.43 (dd, J=3.2 Hz, 2.0 Hz, 1H), 7.27-7.15 (m, 3H), 6.76 (dd, J=3.2 Hz, 1.6 Hz, 1H), 6.71 (dd, J=3.2 Hz, 0.8 Hz, 1H). LCMS: m/z 384.0 [M+H]⁺.

Compound 51, 1-((1H-indol-5-yl)sulfonyl)-N-(2,6-dimethylphenyl)-1H-pyrrole-3-carboxamide (46%)

¹H NMR (400 MHZ, DMSO-$d_6$) δ 11.83 (s, 1H), 9.41 (s, 1H), 8.38 (d, J=2.0 Hz, 1H), 7.99 (t, J=2.0 Hz, 1H), 7.72 (dd, J=8.8 Hz, 2.0 Hz, 1H), 7.66-7.63 (m, 2H), 7.44 (dd, J=3.2 Hz, 2.4 Hz, 1H), 7.08 (br s, 3H), 6.79 (dd, J=3.2 Hz, 1.6 Hz, 1H), 6.71 (d, J=3.2 Hz, 1H), 2.11 (s, 6H). LCMS: m/z 394.0 [M+H]⁺.

Compound 52, 1-((1H-indol-5-yl)sulfonyl)-N-(3,5-dimethylphenyl)-1H-pyrrole-3-carboxamide (32%)

¹H NMR (400 MHZ, DMSO-$d_6$) δ 11.82 (s, 1H), 9.68 (s, 1H), 8.36 (d, J=1.2 Hz, 1H), 8.13 (t, J=2.0 Hz, 1H), 7.69 (dd, J=8.4 Hz, 1.6 Hz, 1H), 7.65-7.63 (m, 2H), 7.42 (dd, J=3.2 Hz, 2.0 Hz, 1H), 7.32 (s, 2H), 6.76 (dd, J=3.2 Hz, 1.6 Hz, 1H), 6.72-6.71 (m, 2H), 2.24 (s, 6H). LCMS: m/z 394.29 [M+H]⁺.

Compound 53, 1-((1H-indol-5-yl)sulfonyl)-N-(2,6-difluorophenyl)-1H-pyrrole-3-carboxamide (64%)

¹H NMR (400 MHZ, DMSO-$d_6$) δ 11.82 (br s, 1H), 9.82 (br s, 1H), 8.38 (d, J=2.0 Hz, 1H), 8.07 (t, J=2.0 Hz, 1H), 7.70 (dd, J=8.8 Hz, 2.0 Hz, 1H), 7.66-7.63 (m, 2H), 7.46 (dd, J=3.2 Hz, 2.4 Hz, 1H), 7.40-7.33 (m, 1H), 7.20-7.15 (m, 2H), 6.76 (dd, J=3.2 Hz, 1.6 Hz, 1H), 6.72-6.71 (m, 1H). LCMS: m/z 402.16 [M+H]⁺.

Compound 54, 1-((1H-indol-5-yl)sulfonyl)-N-(3,5-difluorophenyl)-1H-pyrrole-3-carboxamide (61%)

¹H NMR (400 MHZ, DMSO-$d_6$) δ 11.83 (s, 1H), 10.16 (s, 1H), 8.37 (d, J=1.6 Hz, 1H), 8.15 (t, J=2.0 Hz, 1H), 7.69 (dd, J=8.8 Hz, 2.0 Hz, 1H), 7.65-7.62 (m, 2H), 7.48-7.42 (m, 3H), 6.91 (tt, J=9.2 Hz, 2.4 Hz, 1H), 6.76 (dd, J=3.2 Hz, 1.6 Hz, 1H), 6.71 (dd, J=3.2 Hz, 0.4 Hz, 1H). LCMS: m/z 402.16 [M+H]⁺.

Compound 55, 1-((1H-indol-5-yl)sulfonyl)-N-(2-fluoro-6-methylphenyl)-1H-pyrrole-3-carboxamide (48%)

¹H NMR (400 MHZ, DMSO-$d_6$) δ 11.83 (s, 1H), 9.56 (s, 1H), 8.38 (d, J=1.6 Hz, 1H), 8.03 (br s, 1H), 7.71 (dd, J=8.8 Hz, 2.0 Hz, 1H), 7.66-7.63 (m, 2H), 7.45 (dd, J=3.2 Hz, 2.4 Hz, 1H), 7.25-7.19 (m, 1H), 7.10-7.08 (m, 2H), 6.77-6.76 (m, 1H), 6.72-6.71 (m, 1H), 2.17 (s, 3H). LCMS: m/z 398.21 [M+H]⁺.

Compound 56, 1-((1H-indol-5-yl)sulfonyl)-N-(3-fluoro-5-methylphenyl)-1H-pyrrole-3-carboxamide (60%)

¹H NMR (400 MHZ, DMSO-$d_6$) δ 11.83 (s, 1H), 9.93 (s, 1H), 8.36 (d, J=1.6 Hz, 1H), 8.15 (t, J=2.0 Hz, 1H), 7.69 (dd, J=8.8 Hz, 2.0 Hz, 1H), 7.65-7.63 (m, 2H), 7.48 (dt, J=9.6 Hz, 2.0 Hz, 1H), 7.44 (dd, J=3.2 Hz, 2.0 Hz, 1H), 7.28 (br s, 1H), 6.77-6.71 (m, 3H), 2.30 (s, 3H). LCMS: m/z 398.21 [M+H]⁺.

Compound 66, 1-((1H-indol-5-yl)sulfonyl)-N-(4-chlorophenyl)-1H-pyrrole-3-carboxamide (36%)

$^1$H NMR (400 MHZ, DMSO-d$_6$) δ 11.83 (s, 1H), 9.97 (s, 1H), 8.36 (d, J=1.6 Hz, 1H), 8.13 (t, J=2.0 Hz, 1H), 7.73-7.67 (m, 3H), 7.64-7.62 (m, 2H), 7.44 (t, J=2.4 Hz, 1H), 7.37 (d, J=8.8 Hz, 2H), 6.77 (dd, J=3.2 Hz, 1.6 Hz, 1H), 6.71 (br s, 1H). LCMS: m/z 398.24 [M−H]$^−$.

Compound 67, 1-((1H-indol-5-yl)sulfonyl)-N-(4-cyanophenyl)-1H-pyrrole-3-carboxamide (25%)

$^1$H NMR (400 MHZ, DMSO-d$_6$) δ 11.83 (s, 1H), 10.22 (s, 1H), 8.37 (d, J=1.6 Hz, 1H), 8.19 (t, J=2.0 Hz, 1H), 7.90 (d, J=8.8 Hz, 2H), 7.78 (d, J=8.8 Hz, 2H), 7.69 (dd, J=8.8 Hz, 2.0 Hz, 1H), 7.64-7.62 (m, 2H), 7.46 (dd, J=3.2 Hz, 2.4 Hz, 1H), 6.78 (dd, J=3.2 Hz, 1.6 Hz, 1H), 6.71 (br s, 1H). LCMS: m/z 391.21 [M+H]$^+$.

Compound 68, 1-((1H-indol-5-yl)sulfonyl)-N-(3,4-difluorophenyl)-1H-pyrrole-3-carboxamide (28%)

$^1$H NMR (400 MHZ, DMSO-d$_6$) δ 11.82 (s, 1H), 10.05 (s, 1H), 8.36 (d, J=1.2 Hz, 1H), 8.12 (t, J=2.0 Hz, 1H), 7.87-7.81 (m, 1H), 7.69 (dd, J=8.8 Hz, 2.0 Hz, 1H), 7.64-7.62 (m, 2H), 7.45-7.38 (m, 3H), 6.76 (dd, J=3.2 Hz, 1.6 Hz, 1H), 6.71 (br s, 1H). LCMS: m/z 402.17 [M+H]$^+$.

Compound 69, 1-((1H-indol-5-yl)sulfonyl)-N-(4-chloro-3-fluorophenyl)-1H-pyrrole-3-carboxamide (10%)

$^1$H NMR (400 MHZ, DMSO-d$_6$) δ 11.82 (s, 1H), 10.13 (s, 1H), 8.36 (d, J=1.2 Hz, 1H), 8.15 (t, J=2.0 Hz, 1H), 7.86 (dd, J=9.0 Hz, 2.0 Hz, 1H), 7.69 (dd, J=8.8 Hz, 2.0 Hz, 1H), 7.64-7.62 (m, 2H), 7.55-7.44 (m, 3H), 6.77 (dd, J=3.2 Hz, 1.6 Hz, 1H), 6.71 (br s, 1H). LCMS: m/z 418.23 [M+H]$^+$.

Compound 70, 1-((1H-indol-5-yl)sulfonyl)-N-(3-chloro-4-fluorophenyl)-1H-pyrrole-3-carboxamide (23%)

$^1$H NMR (400 MHZ, DMSO-d$_6$) δ 11.82 (s, 1H), 10.03 (s, 1H), 8.36 (d, J=1.6 Hz, 1H), 8.12 (t, J=2.0 Hz, 1H), 7.98 (dd, J=6.8 Hz, 2.4 Hz, 1H), 7.69 (dd, J=8.8 Hz, 2.0 Hz, 1H), 7.64-7.60 (m, 3H), 7.45 (dd, J=3.2 Hz, 2.4 Hz, 1H), 7.38 (t, J=9.2 Hz, 1H), 6.76 (dd, J=3.2 Hz, 1.6 Hz, 1H), 6.71 (br s, 1H). LCMS: m/z 418.17 [M+H]$^+$.

Compound 71, 1-((1H-indol-5-yl)sulfonyl)-N-(3,4-dichlorophenyl)-1H-pyrrole-3-carboxamide (12%)

$^1$H NMR (400 MHZ, DMSO-d$_6$) δ 11.83 (s, 1H), 10.09 (s, 1H), 8.36 (d, J=1.6 Hz, 1H), 8.14 (t, J=2.0 Hz, 1H), 8.05 (d, J=2.0 Hz, 1H), 7.70-7.62 (m, 4H), 7.58 (d, J=8.8 Hz, 1H), 7.45 (dd, J=2.8 Hz, 2.4 Hz, 1H), 6.76 (dd, J=3.2 Hz, 1.6 Hz, 1H), 6.71 (br s, 1H). LCMS: m/z 434.19 [M+H]$^+$.

Compound 74, 1-((1H-indol-5-yl)sulfonyl)-N-(6-fluoropyridin-3-yl)-1H-pyrrole-3-carboxamide (27%)

$^1$H NMR (400 MHZ, DMSO-d$_6$) δ 11.83 (s, 1H), 10.13 (s, 1H), 8.49 (br s, 1H), 8.37 (d, J=1.6 Hz, 1H), 8.25-8.19 (m, 1H), 8.13 (t, J=2.0 Hz, 1H), 7.69 (dd, J=8.8 Hz, 1.6 Hz, 1H), 7.65-7.62 (m, 2H), 7.46 (dd, J=3.2 Hz, 2.4 Hz, 1H), 7.17 (dd, J=8.2 Hz, 3.2 Hz, 1H), 6.77 (dd, J=3.2 Hz, 1.6 Hz, 1H), 6.71 (d, J=2.8 Hz, 1H). LCMS: m/z 385.20 [M+H]$^+$.

Compound 75, 1-((1H-indol-5-yl)sulfonyl)-N-(6-chloropyridin-3-yl)-1H-pyrrole-3-carboxamide (43%)

$^1$H NMR (400 MHZ, DMSO-d$_6$) δ 11.83 (s, 1H), 10.18 (s, 1H), 8.69 (d, J=2.4 Hz, 1H), 8.36 (d, J=1.2 Hz, 1H), 8.17-8.14 (m, 2H), 7.69 (dd, J=8.8 Hz, 1.6 Hz, 1H), 7.64-7.62 (m, 2H), 7.49-7.45 (m, 2H), 6.77 (dd, J=3.2 Hz, 1.6 Hz, 1H), 6.71 (br s, 1H). LCMS: m/z 401.18 [M+H]$^+$.

Compound 94, 1-((1H-indol-5-yl)sulfonyl)-N-(4-(sec-butyl)-3-fluorophenyl)-1H-pyrrole-3-carboxamide (29%)

$^1$H NMR (400 MHZ, DMSO-d$_6$) δ 11.82 (s, 1H), 9.94 (s, 1H), 8.36 (br s, 1H), 8.12 (br s, 1H), 7.70-7.57 (m, 4H), 7.44 (t, J=2.6 Hz, 1H), 7.39 (dd, J=8.4 Hz, 1.6 Hz, 1H), 7.23 (t, J=8.4 Hz, 1H), 6.77 (t, J=1.6 Hz, 1H), 6.71 (s, 1H), 2.90-2.82 (m, 1H), 1.56 (quin. J=7.2 Hz, 2H), 1.18 (d, J=6.8 Hz, 3H), 0.77 (t, J=7.2 Hz, 3H). LCMS: m/z 440.19 [M+H]$^+$.

Compound 95, 1-((1H-indol-5-yl)sulfonyl)-N-(3-fluoro-4-isopropylphenyl)-1H-pyrrole-3-carboxamide (25%)

$^1$H NMR (400 MHZ, DMSO-d$_6$) δ 11.82 (s, 1H), 9.94 (s, 1H), 8.36 (d, J=1.6 Hz, 1H), 8.13 (t, J=2.0 Hz, 1H), 7.69 (dd, J=8.8 Hz, 2.0 Hz, 1H), 7.64-7.57 (m, 3H), 7.44-7.42 (m, 1H), 7.38 (dd, J=8.4 Hz, 2.0 Hz, 1H), 7.27 (t, J=8.8 Hz, 1H), 6.76 (dd, J=3.2 Hz, 1.6 Hz, 1H), 6.71 (br s, 1H), 3.14-3.07 (m, 1H), 1.19 (d, J=6.8 Hz, 6H). LCMS: m/z 426.38 [M+H]$^+$.

Compound 96, 1-((1H-indol-5-yl)sulfonyl)-N-(4-propylphenyl)-1H-pyrrole-3-carboxamide (52%)

$^1$H NMR (400 MHZ, DMSO-d$_6$) δ 11.81 (s, 1H), 9.77 (s, 1H), 8.35 (d, J=1.6 Hz, 1H), 8.10 (t, J=2.0 Hz, 1H), 7.68 (dd, J=8.8 Hz, 2.0 Hz, 1H), 7.64-7.62 (m, 2H), 7.56 (d, J=8.4 Hz, 2H), 7.42 (dd, J=3.2 Hz, 2.0 Hz, 1H), 7.12 (d, J=8.4 Hz, 2H), 6.76 (dd, J=3.2 Hz, 1.6 Hz, 1H), 6.70 (dd, J=2.8 Hz, 0.8 Hz, 1H), 2.50-2.48 (m, 2H), 1.56 (sextet, J=7.6 Hz, 2H), 0.88 (t, J=7.6 Hz, 3H). LCMS: m/z 408.36 [M+H]$^+$.

Compound 97, 1-((1H-indol-5-yl)sulfonyl)-N-(3-fluoro-4-propylphenyl)-1H-pyrrole-3-carboxamide (21%)

$^1$H NMR (400 MHZ, DMSO-d$_6$) δ 11.82 (s, 1H), 9.94 (s, 1H), 8.36 (d, J=2.0 Hz, 1H), 8.12 (t, J=1.6 Hz, 1H), 7.69 (dd, J=8.8 Hz, 2.0 Hz, 1H), 7.64-7.58 (m, 3H), 7.44 (dd, J=3.2 Hz, 2.4 Hz, 1H), 7.36 (dd, J=8.4 Hz, 2.0 Hz, 1H), 7.21 (t, J=8.8 Hz, 1H), 6.76 (dd, J=3.2 Hz, 1.6 Hz, 1H), 6.71 (d, J=2.4 Hz, 1H), 2.54-2.50 (m, 2H), 1.55 (sextet, J=7.6 Hz, 2H), 0.88 (t, J=7.6 Hz, 3H). LCMS: m/z 426.17 [M+H]$^+$.

Compound 98, 1-((1H-indol-5-yl)sulfonyl)-N-(4-isobutylphenyl)-1H-pyrrole-3-carboxamide (22%)

$^1$H NMR (400 MHz, DMSO-d$_6$) δ 11.82 (s, 1H), 9.78 (s, 1H), 8.35 (d, J=1.6 Hz, 1H), 8.10 (t, J=2.0 Hz, 1H), 7.69 (dd, J=8.8 Hz, 2.0 Hz, 1H), 7.64-7.62 (t, J=3.9 Hz, 2H), 7.57 (d, J=8.4 Hz, 2H), 7.42 (dd, J=3.2 Hz, 2.4 Hz, 1H), 7.09 (d, J=8.4 Hz, 2H), 6.76 (dd, J=3.2 Hz, 1.6 Hz, 1H), 6.71 (d,

J=2.8 Hz, 1H), 2.39 (d, J=7.2 Hz, 2H), 1.83-1.77 (m, 1H), 0.85 (d, J=6.8 Hz, 6H). LCMS: m/z 422.34 [M+H]⁺.

Compound 99, 1-((1H-indol-5-yl)sulfonyl)-N-(3-fluoro-4-isobutylphenyl)-1H-pyrrole-3-carboxamide (35%)

¹H NMR (400 MHZ, DMSO-d₆) δ 11.82 (s, 1H), 9.94 (s, 1H), 8.36 (d, J=1.6 Hz, 1H), 8.12 (br s, 1H), 7.70-7.58 (m, 4H), 7.43 (dd, J=2.8 Hz, 2.4 Hz, 1H), 7.36 (dd, J=8.4 Hz, 1.6 Hz, 1H), 7.17 (t, J=8.4 Hz, 1H), 6.76 (dd, J=3.2 Hz, 1.6 Hz, 1H), 6.71 (d, J=2.8 Hz, 1H), 2.43 (d, J=7.12 Hz, 2H), 1.85-1.78 (m, 1H), 0.86 (d, J=6.8 Hz, 6H). LCMS: m/z 438.47 [M−H]⁻.

Compound 100, 1-((1H-indol-5-yl)sulfonyl)-N-(4-(tert-butyl)phenyl)-1H-pyrrole-3-carboxamide (24%)

¹H NMR (400 MHZ, DMSO-d₆) δ 11.82 (s, 1H), 9.78 (s, 1H), 8.36 (d, J=1.2 Hz, 1H), 8.11 (br s, 1H), 7.69 (dd, J=8.8 Hz, 1.6 Hz, 1H), 7.64-7.62 (m, 2H), 7.58 (d, J=8.8 Hz, 2H), 7.42 (t, J=2.8 Hz, 1H), 7.32 (d, J=8.4 Hz, 2H), 6.77 (dd, J=3.2 Hz, 1.6 Hz, 1H), 6.71 (br s, 1H), 1.26 (s, 9H). LCMS: m/z 420.33 [M−H]⁻.

Compound 101, 1-((1H-indol-5-yl)sulfonyl)-N-(4-(tert-butyl)-3-fluorophenyl)-1H-pyrrole-3-carboxamide (38%)

¹H NMR (400 MHZ, DMSO-d₆) δ 11.82 (s, 1H), 9.95 (s, 1H), 8.36 (d, J=2.0 Hz, 1H), 8.13 (t, J=2.0 Hz, 1H), 7.69 (dd, J=8.4 Hz, 1.6 Hz, 1H), 7.64-7.56 (m, 3H), 7.44 (dd, J=3.2 Hz, 2.4 Hz, 1H), 7.36 (dd, J=8.8 Hz, 2.4 Hz, 1H), 7.26 (t, J=8.8 Hz, 1H), 6.77 (dd, J=3.2 Hz, 1.6 Hz, 1H), 6.71 (br s, 1H), 1.32 (s, 9H). LCMS: m/z 440.36 [M+H]⁺.

Compound 102, 1-((1H-indol-5-yl)sulfonyl)-N-(4-methoxyphenyl)-1H-pyrrole-3-carboxamide (26%)

¹H NMR (400 MHZ, DMSO-d₆) δ 11.81 (s, 1H), 9.73 (s, 1H), 8.35 (d, J=2.0 Hz, 1H), 8.07 (t, J=2.0 Hz, 1H), 7.68 (dd, J=8.4 Hz, 1.6 Hz, 1H), 7.64-7.62 (m, 2H), 7.56 (d, J=9.2 Hz, 2H), 7.41 (dd, J=3.2 Hz, 2.4 Hz, 1H), 6.90 (d, J=9.2 Hz, 2H), 6.76 (dd, J=3.2 Hz, 1.6 Hz, 1H), 6.70 (d, J=2.8 Hz, 1H), 3.72 (s, 3H). LCMS: m/z 394.29 [M−H]⁻.

Compound 103, 1-((1H-indol-5-yl)sulfonyl)-N-(3-fluoro-4-methoxyphenyl)-1H-pyrrole-3-carboxamide (30%)

¹H NMR (400 MHZ, DMSO-d₆) δ 11.82 (s, 1H), 9.86 (s, 1H), 8.35 (d, J=1.6 Hz, 1H), 8.09 (t, J=2.0 Hz, 1H), 7.70-7.62 (m, 4H), 7.43 (dd, J=3.2 Hz, 2.4 Hz, 1H), 7.39-7.36 (m, 1H), 7.13 (t, J=9.2 Hz, 1H), 6.75 (dd, J=3.2 Hz, 1.6 Hz, 1H), 6.71 (dd, J=3.2 Hz, 0.8 Hz, 1H), 3.80 (s, 3H). LCMS: m/z 414.28 [M+H]⁺.

Compound 104, 1-((1H-indol-5-yl)sulfonyl)-N-(benzo[d][1,3]dioxol-5-yl)-1H-pyrrole-3-carboxamide (21%)

¹H NMR (400 MHZ, DMSO-d₆) δ 11.82 (s, 1H), 9.76 (s, 1H), 8.35 (d, J=1.6 Hz, 1H), 8.07 (t, J=2.0 Hz, 1H), 7.68 (dd, J=8.8 Hz, 2.0 Hz, 1H), 7.64-7.62 (m, 2H), 7.42 (dd, J=2.8 Hz, 2.4 Hz, 1H), 7.35 (d, J=2.0 Hz, 1H), 7.06 (dd, J=8.4 Hz, 2.0 Hz, 1H), 6.86 (d, J=8.4 Hz, 1H), 6.75 (dd, J=3.2 Hz, 1.6 Hz, 1H), 6.70 (br s, 1H), 5.98 (s, 2H). LCMS: m/z 410.29 [M+H]⁺.

Scheme 12. Preparation of Compound 57

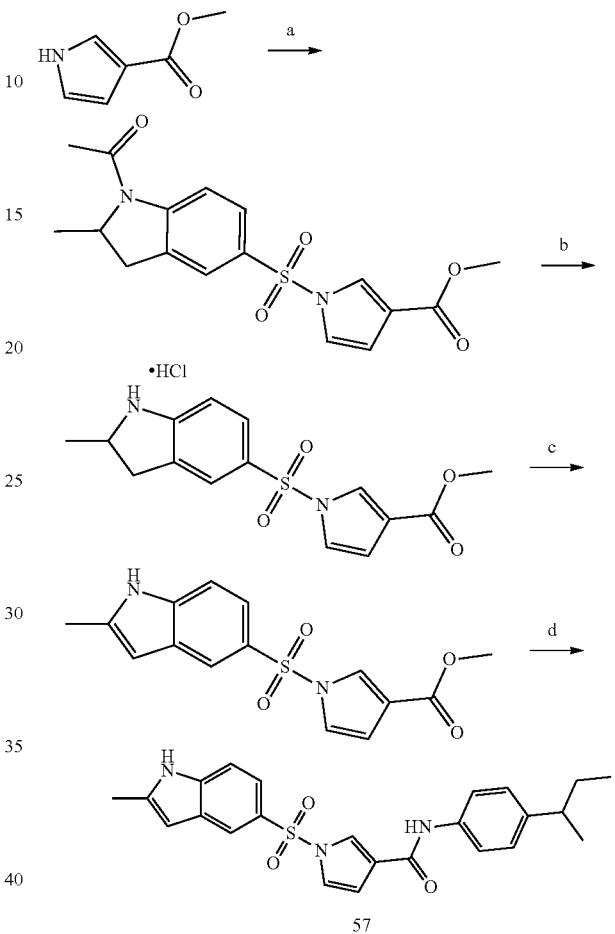

Reagents and conditions:
a) 1-acetyl-2-methylindoline-5-sulfonyl chloride, NaH, DMF, 0° C. to rt;
b) conc. HCl, MeOH, reflux;
c) MnO₂, THF, rt;
d) 4-sec-butylaniline, DABAL-Me₃, Et₃N, toluene, 0° C. to 120° C.

Preparation of methyl 1-((1-acetyl-2-methylindolin-5-yl) sulfonyl)-1H-pyrrole-3-carboxylate To a stirred solution of methyl 1H-pyrrole-3-carboxylate (100 mg, 0.80 mmol) in DMF (2 mL), was added NaH (60% dispersion in mineral oil, 64 mg, 1.60 mmol) at 0° C. The reaction mixture was stirred for 10 min, after which 1-acetyl-2-methylindoline-5-sulfonyl chloride (219 mg, 0.80 mmol) was added portion-wise. The resultant reaction mixture was stirred for 3 h at room temperature. The progress of the reaction was monitored by TLC. After complete consumption of the starting material, the reaction mixture was quenched by the addition of crushed ice. The precipitated solid was filtered off, washed with water and dried under vacuum to obtain the title compound as a pale brown solid (170 mg, 59%), which was used in the next step without further purification. LCMS: m/z 363.05 [M+H]⁺.

Preparation of methyl 1-((2-methylindolin-5-yl)sulfonyl)-1H-pyrrole-3-carboxylate Hydrochloride To a stirred solution of methyl 1-((1-acetyl-2-methylindolin-5-yl)sulfonyl)-1H-pyrrole-3-carboxylate (150 mg, 0.41 mmol) in MeOH (2 mL) was added conc. HCl (0.3 mL) at room temperature. The resultant reaction mixture was heated to 90° C. and stirred for 3 h. The progress of the reaction was monitored by TLC. After complete consumption of the starting material, the reaction mixture was cooled to room temperature and concentrated under reduced pressure to obtain the crude product. Trituration with diethyl ether gave the title compound as an off white solid (120 mg, 82%). LCMS: m/z 321.22 [M+H]+.

Preparation of methyl 1-((2-methyl-1H-indol-5-yl)sulfonyl)-1H-pyrrole-3-carboxylate To a stirred solution of methyl 1-((2-methylindolin-5-yl)sulfonyl)-1H-pyrrole-3-carboxylate hydrochloride (120 mg, 0.34 mmol) in THF (2 mL) was added $MnO_2$ (293 mg, 3.36 mmol). The resultant reaction mixture was stirred for 16 h at room temperature. The progress of the reaction was monitored by TLC. After complete consumption of the starting material, the reaction mixture was passed through a bed of Celite and washed with EtOAc. The filtrate was concentrated under reduced pressure to obtain the crude product. The crude compound was purified by column chromatography (100-200 mesh silica-gel) eluting with 40% EtOAc in petroleum ether to obtain the title compound as an off white solid (90 mg, 84%). LCMS: m/z 319.0 [M+H]+.

Preparation of Compound 57, N-(4-(sec-butyl)phenyl)-1-((2-methyl-1H-indol-5-yl)sulfonyl)-1H-pyrrole-3-carboxamide To a stirred solution of methyl 1-((2-methyl-1H-indol-5-yl)sulfonyl)-1H-pyrrole-3-carboxylate (130 mg, 0.41 mmol) and 4-sec-butylaniline (73 mg, 0.49 mmol) in toluene (2.6 mL) was added $Et_3N$ (0.17 mL, 1.23 mmol), followed by DABAL-$Me_3$ (157 mg, 0.61 mmol) at 0° C. under an atmosphere of nitrogen. The resultant reaction mixture was heated for 2 h at 120° C. The progress of the reaction was monitored by TLC. After complete consumption of the starting material, the reaction mixture was cooled to 0° C., then quenched with 1N HCl solution (20 mL) and extracted with EtOAc (2×50 mL). The combined organic layer was dried over anhydrous $Na_2SO_4$ and concentrated under reduced pressure to obtain the crude product. The crude compound was purified by column chromatography (100-200 mesh silica-gel) eluting with 60% EtOAc in petroleum ether to obtain the title compound as an off-white solid (100 mg, 56%).

$^1$H NMR (400 MHZ, DMSO-$d_6$) δ 11.69 (s, 1H), 9.77 (s, 1H), 8.18 (d, J=2.0 Hz, 1H), 8.09 (t, J=2.0 Hz, 1H), 7.62-7.59 (m, 3H), 7.49 (d, J=8.8 Hz, 1H), 7.40 (dd, J=3.2 Hz, 2.4 Hz, 1H), 7.13 (d, J=8.8 Hz, 2H), 6.76 (dd, J=3.2 Hz, 1.6 Hz, 1H), 6.39 (s, 1H), 2.57-2.55 (m, 1H), 2.41 (s, 3H), 1.57-1.49 (m, 2H), 1.16 (d, J=6.8 Hz, 3H), 0.75 (t, J=7.2 Hz, 3H). LCMS: m/z 436.31 [M+H]+.

Scheme 13. Preparation of Compounds 58-60

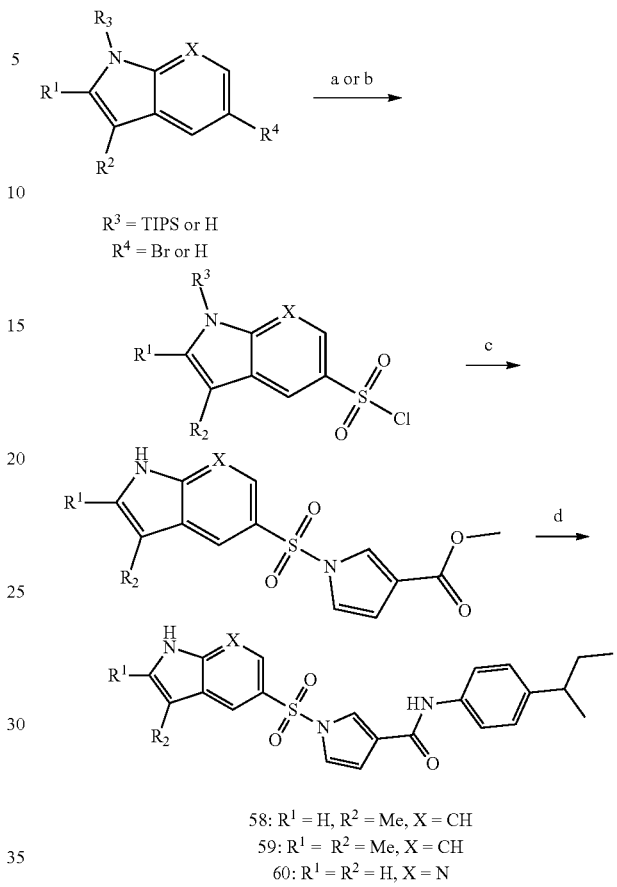

58: $R^1$ = H, $R^2$ = Me, X = CH
59: $R^1$ = $R^2$ = Me, X = CH
60: $R^1$ = $R^2$ = H, X = N

Reagents and conditions:
a) i) n-BuLi, $SO_2$, THF, -78° C.; ii) NCS, $Et_2O$, 0° C. to rt;
b) $ClSO_3H$, 60° C.;
c) methyl 1H-pyrrole-3-carboxylate, NaH, DMF, 0° C. to rt;
d) 4-sec-butylaniline, DABAL-$Me_3$, $Et_3N$, toluene, 0° C. to 120° C.

Preparation of 3-methyl-1-(triisopropylsilyl)-1H-indole-5-sulfonyl Chloride

A stirred solution of 5-bromo-3-methyl-1-(triisopropylsilyl)-1H-indole (800 mg, 2.18 mmol) in THF (8 mL), was cooled in a dry ice and acetone bath for 20 min. To this solution was added n-butyl lithium (0.96 mL, 2.4 mmol), dropwise over 10 min. The resulting mixture was stirred for 30 min, then sulphur dioxide gas was purged through a needle over 15 min. The mixture was then warmed to room temperature and concentrated in vacuo. The residue was dissolved in diethyl ether (8 mL). The mixture was cooled in an ice bath for 10 min, then N-chlorosuccinimide (291 mg, 2.18 mmol) was added in one portion. The resultant reaction mixture was stirred for 4 h at room temperature. The progress of the reaction was monitored by TLC. The reaction mixture was filtered through a bed of Celite and the residue was washed with diethyl ether. The filtrate was evaporated under vacuum to obtain the crude product. The crude compound was purified by column chromatography using 100-200 silica-gel and eluting in 30% EtOAc in petroleum ether to obtain the title compound as an off-white solid (280 mg, 33%).

Other analogues prepared by this method:
1-(Triisopropylsilyl)-1H-pyrrolo[2,3-b]pyridine-5-sulfonyl chloride (26%). LCMS: m/z 373.22 [M+H]+.

Preparation of 2,3-dimethyl-1H-indole-5-sulfonyl Chloride 2,3-dimethyl-1H-indole (200 mg, 1.38 mmol) was added portion-wise, with stirring, to ClSO$_3$H (1 mL) at 0° C. The resultant reaction mixture was heated for 2 h at 60° C. The progress of the reaction was monitored by TLC. After complete consumption of the starting material, the reaction mixture was slowly poured into ice cold water. The precipitated solid was filtered off, washed with water and dried under vacuum to obtain the title compound as an off-white solid (210 mg, 63%), which was used in the next step without further purification. LCMS: m/z 244.14 [M+H]+.

Preparation of methyl 1-((3-methyl-1H-indol-5-yl)sulfonyl)-1H-pyrrole-3-carboxylate To a stirred solution of 3-methyl-1-(triisopropylsilyl)-1H-indole-5-sulfonyl chloride (280 mg, 0.73 mmol) in DMF (3 mL) was added NaH (58 mg, 1.46 mmol, 60% dispersion in mineral oil) at 0° C. The reaction mixture was stirred for 10 min, after which methyl 1H-pyrrole-3-carboxylate (100 mg, 0.80 mmol) was added portion-wise. The reaction mixture was stirred at room temperature for 2 h. The progress of the reaction was monitored by TLC. After complete consumption of the starting material, the reaction mixture cooled to 0° C., then quenched with ice cold water (10 mL) and extracted with EtOAc (2×30 mL). The combined organic layer was dried over anhydrous Na$_2$SO$_4$ and concentrated under reduced pressure to obtain the crude product. The crude compound was purified by column chromatography using 100-200 silica-gel and eluting in 10% EtOAc in petroleum ether to obtain the title compound as an off-white solid (130 mg, 56%). LCMS: m/z 319.16 [M+H]+.

Other analogues prepared by this method:
Methyl 1-((2,3-dimethyl-1H-indol-5-yl)sulfonyl)-1H-pyrrole-3-carboxylate (28%). LCMS: m/z 333.23 [M+H]+.
Methyl 1-((1H-pyrrolo[2,3-b]pyridin-5-yl)sulfonyl)-1H-pyrrole-3-carboxylate (36%). LCMS: m/z 306.23 [M+H]+.

Preparation of Compound 58, N-(4-(sec-butyl)phenyl)-1-((3-methyl-1H-indol-5-yl)sulfonyl)-1H-pyrrole-3-carboxamide To a stirred solution of methyl 1-((3-methyl-1H-indol-5-yl) sulfonyl)-1H-pyrrole-3-carboxylate (130 mg, 0.41 mmol) and 4-sec-butylaniline (79 mg, 0.53 mmol) in toluene (2 mL) was added Et$_3$N (0.11 mL, 0.82 mmol), followed by DABAl-Me$_3$ (158 mg, 0.62 mmol) at 0° C. under an atmosphere of nitrogen. The resultant reaction mixture was heated for 2 h at 120° C. The progress of the reaction was monitored by TLC. After complete consumption of the starting material, the reaction mixture was cooled to 0° C., then quenched with 1N HCl (10 mL) and extracted with EtOAc (2×30 mL). The combined organic layer was dried over anhydrous Na$_2$SO$_4$ and concentrated under reduced pressure to obtain the crude product. The crude compound was purified by column chromatography using 100-200 silica-gel and eluting in 30% EtOAc in petroleum ether to obtain the title compound as an off-white solid (75 mg, 42%).

$^1$H NMR (400 MHZ, DMSO-d$_6$) δ 11.52 (s, 1H), 9.77 (s, 1H), 8.27 (d, J=2.0 Hz, 1H), 8.12 (t, J=2.0 Hz, 1H), 7.66 (dd, J=8.4 Hz, 1.6 Hz, 1H), 7.59-7.55 (m, 3H), 7.45 (dd, J=3.2 Hz, 2.4 Hz, 1H), 7.39 (dd, J=2.0 Hz, 1.2 Hz, 1H), 7.13 (d, J=8.4 Hz, 2H), 6.77 (dd, J=3.2 Hz, 1.6 Hz, 1H), 2.57-2.51 (m, 1H), 2.33 (s, 3H), 1.55-1.50 (m, 2H), 1.17 (d, J=7.2 Hz, 3H), 0.75 (t, J=7.6 Hz, 3H). LCMS: m/z 434.30 [M+H]+.

Other analogues prepared by this method:

Compound 59, N-(4-(sec-butyl)phenyl)-1-((2,3-dimethyl-1H-indol-5-yl)sulfonyl)-1H-pyrrole-3-carboxamide (44%)

$^1$H NMR (400 MHZ, DMSO-d$_6$) δ 11.48 (s, 1H), 9.76 (s, 1H), 8.13-8.10 (m, 2H), 7.60-7.57 (m, 3H), 7.46-7.42 (m, 2H), 7.13 (d, J=8.4 Hz, 2H), 6.75 (dd, J=3.2, 1.6 Hz, 1H), 2.57-2.53 (m, 1H), 2.34 (s, 3H), 2.22 (s, 3H), 1.56-1.49 (m, 2H), 1.16 (d, J=7.2 Hz, 3H), 0.75 (t, J=7.2 Hz, 3H). LCMS: m/z 450.30 [M+H]+.

Compound 60, 1-((1H-pyrrolo[2,3-b]pyridin-5-yl)sulfonyl)-N-(4-(sec-butyl)phenyl)-1H-pyrrole-3-carboxamide (62%)

$^1$H NMR (400 MHZ, DMSO-d$_6$) δ 12.51 (s, 1H), 9.80 (s, 1H), 8.86 (d, J=2.4 Hz, 1H), 8.71 (d, J=2.4 Hz, 1H), 8.16 (t, J=2.0 Hz, 1H), 7.78 (d, J=3.6 Hz, 1H), 7.58 (d, J=8.4 Hz, 2H), 7.52 (dd, J=3.2 Hz, 2.4 Hz, 1H), 7.14 (d, J=8.8 Hz, 2H), 6.81 (dd, J=3.2 Hz, 1.6 Hz, 1H), 6.72 (d, J=3.2 Hz, 1H), 2.55-2.51 (m, 1H), 1.55-1.51 (m, 2H), 1.16 (d, J=6.8 Hz, 3H), 0.75 (t, J=7.2 Hz, 3H). LCMS: m/z 421.27 [M−H]−.

Scheme 14. Preparation of Compounds 61-63

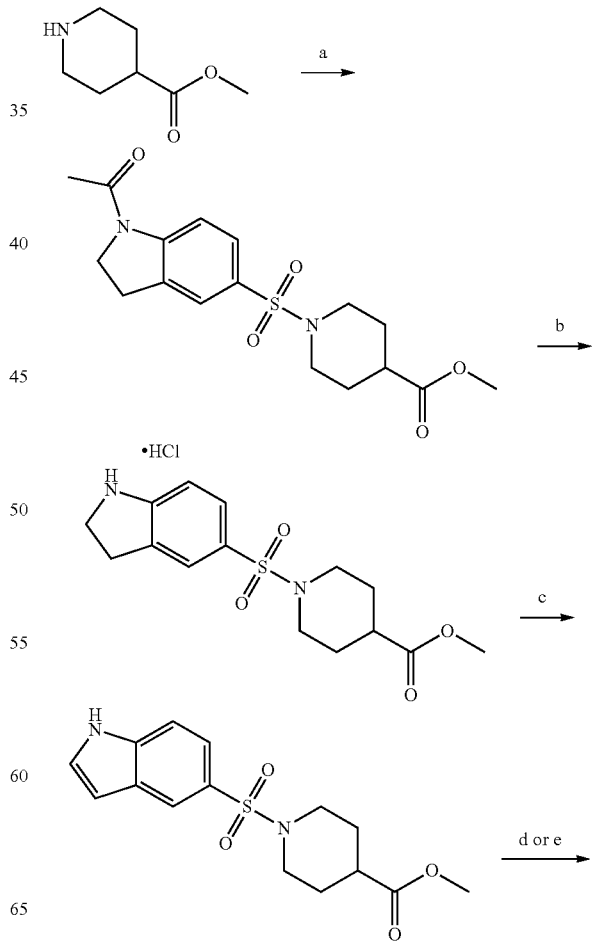

-continued

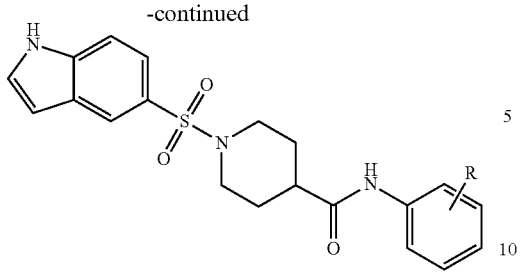

61: R = 2-Et
62: R = 2-Me
63: R = 3-CF₃

Reagents and conditions:
a) 1-acetyl-2-methylindoline-5-sulfonyl chloride, NaH, DMF, 0° C. to rt;
b) conc. HCl, MeOH, reflux;
c) MnO₂, THF, rt;
d) RPhNH₂, DABAL-Me₃, Et₃N, toluene, 0° C. to 120° C.;
e) i) LiOH, THF/H₂O, rt; ii) RPhNH₂, T3P, pyridine, 70° C.

Preparation of methyl 1-((1-acetylindolin-5-yl)sulfonyl) piperidine-4-carboxylate To a stirred solution of 1-acetyl-2-methylindoline-5-sulfonyl chloride (1.00 g, 3.85 mmol) in pyridine (10 mL) was added DMAP (470 mg, 3.85 mmol) followed by methyl piperidine-4-carboxylate (0.55 g, 3.85 mmol) at room temperature. The resultant reaction mixture was stirred at room temperature for 16 h. The progress of the reaction was monitored by TLC. After complete consumption of the starting material, the reaction mixture was cooled to 0° C., quenched with 1N HCl solution (10 mL) and extracted with EtOAc (2×50 mL). The combined organic layer was dried over anhydrous Na₂SO₄ and concentrated under reduced pressure to obtain the crude product. The crude compound was purified by column chromatography using 100-200 silica-gel eluting with 20% EtOAc in petroleum ether to obtain the title compound as an off-white solid (600 mg, 43%). LCMS: m/z 367.22 [M+H]⁺.

Preparation of methyl 1-(indolin-5-ylsulfonyl)piperidine-4-carboxylate Hydrochloride To a stirred solution of methyl 1-((1-acetylindolin-5-yl) sulfonyl)piperidine-4-carboxylate (450 mg, 1.23 mmol) in methanol (5 mL) was added conc. HCl (1 mL) at 0° C. The reaction mixture was heated to 70° C. for 1 h. The progress of the reaction was monitored by TLC. After complete consumption of starting material, the reaction mixture was concentrated under reduced pressure to obtain the title compound as an off-white solid (280 mg, 63%), which was used in the next step without further purification. LCMS: m/z 325.33 [M+H]⁺.

Preparation of methyl 1-((1H-indol-5-yl)sulfonyl) piperidine-4-carboxylate

To a stirred solution of methyl 1-(indolin-5-ylsulfonyl) piperidine-4-carboxylate hydrochloride (180 mg, 0.50 mmol) in THF (4 mL) was added MnO₂ (435 mg, 5.0 mmol) at room temperature. The resultant reaction mixture was stirred at room temperature for 16 h. The progress of the reaction was monitored by TLC. After complete consumption of the starting material, the reaction mixture was filtered through Celite and washed with THF (2×20 mL). The combined organic layer was dried over anhydrous Na₂SO₄ and concentrated under vacuum to obtain the crude product. Trituration with ethyl acetate and petroleum ether gave the title compound as an off-white solid (120 mg, 75%). LCMS: m/z 323.21 [M+H]⁺.

Preparation of Compound 61, 1-((1H-indol-5-yl) sulfonyl)-N-(2-ethylphenyl)piperidine-4-carboxamide To a stirred solution of methyl 1-((1H-indol-5-yl)sulfonyl)piperidine-4-carboxylate (100 mg, 0.31 mmol) and 2-ethylaniline (49 mg, 0.40 mmol) in toluene (2 mL) was added Et₃N (0.09 mL, 0.62 mmol), followed by DABAl-Me₃ (120 mg, 0.47 mmol) at 0° C. under an atmosphere of nitrogen. The resultant reaction mixture was heated for 2 h at 120° C. The progress of the reaction was monitored by TLC. After complete consumption of the starting material, the reaction mixture was cooled to 0° C., then quenched with 1N HCl (10 mL) and extracted with EtOAc (2×25 mL). The combined organic layer was dried over anhydrous Na₂SO₄ and concentrated under reduced pressure to obtain the crude product. The crude compound was purified by column chromatography using 100-200 silica-gel by eluting in 20% EtOAc in petroleum ether to obtain the title compound as an off-white solid (110 mg, 87%).

¹H NMR (400 MHZ, DMSO-d₆) δ 11.65 (s, 1H), 9.10 (s, 1H), 8.02 (d, J=1.2 Hz, 1H), 7.60-7.57 (m, 2H), 7.45 (dd, J=8.4 Hz, 1.6 Hz, 1H), 7.25-7.17 (m, 2H), 7.14-7.09 (m, 2H), 6.67 (d, J=3.2 Hz, 1H), 3.65-3.62 (m, 2H), 2.50-2.45 (m, 2H), 2.30-2.27 (m, 3H), 1.87 (br d, J=10.4 Hz, 2H), 1.72-1.62 (m, 2H), 1.03 (t, J=7.6 Hz, 3H). LCMS: m/z 410.33 [M−H]⁻.

Other analogues prepared by this method:

Compound 62, 1-((1H-indol-5-yl)sulfonyl)-N-(o-tolyl)piperidine-4-carboxamide (89%)

¹H NMR (400 MHZ, DMSO-d₆) δ 11.65 (s, 1H), 9.10 (s, 1H), 8.02 (d, J=1.2 Hz, 1H), 7.61 (d, J=8.4 Hz, 1H), 7.57 (t, J=2.8 Hz, 1H), 7.45 (dd, J=8.4 Hz, 1.6 Hz, 1H), 7.28 (br d, J=7.2 Hz, 1H), 7.16 (br d, J=7.6 Hz, 1H), 7.13-7.03 (m, 2H), 6.67 (t, J=2.0 Hz, 1H), 3.66-3.63 (m, 2H), 2.34-2.25 (m, 3H), 2.09 (s, 3H), 1.89-1.86 (m, 2H), 1.72-1.65 (m, 2H). LCMS: m/z 396.24 [M−H]⁻.

Preparation of 1-((1H-indol-5-yl)sulfonyl)piperidine-4-carboxylic Acid

To a stirred solution of methyl 1-((1H-indol-5-yl)sulfonyl)piperidine-4-carboxylate (200 mg, 0.62 mmol) in THF/Water (2 mL/0.2 mL by vol) was added LiOH. H₂O (52 mg, 1.24 mmol) at 0° C. The resulting mixture was stirred for 16 h at room temperature. The progress of the reaction was monitored by TLC. After complete consumption of the starting material, the reaction mixture was acidified with 1N HCl and the precipitated solid was filtered off, triturated with diethyl ether and dried under vacuum to obtain the title compound as an off-white solid (180 mg, 94%), which was used in the next step without further purification. LCMS: m/z 307.23 [M−H]⁻.

Preparation of Compound 63, 1-((1H-indol-5-yl) sulfonyl)-N-(3-(trifluoromethyl)phenyl) piperidine-4-carboxamide To a stirred solution of 1-((1H-indol-5-yl)sulfonyl)piperidine-4-carboxylic acid (120 mg, 0.39 mmol) and 3-trifluoromethylaniline (69 mg, 0.43 mmol) in pyridine (2 mL) was added 50% T3P in EtOAc (0.5 mL, 0.78 mmol) at room temperature. The reaction mixture was heated to 70° C. and stirred for 1 h under microwave conditions. The progress of the reaction was monitored by TLC. After complete consumption of the starting material, the reaction mixture was cooled to room temperature, then quenched with 1N HCl solution (10 mL) and extracted with EtOAc (2×10 mL). The combined organic layer was dried over anhydrous $Na_2SO_4$, filtered and concentrated under vacuum to obtain the crude product. The crude compound was purified by preparative HPLC to obtain the title compound as an off-white solid (156 mg, 89%).

$^1$H NMR (400 MHZ, DMSO-$d_6$) δ 11.65 (s, 1H), 10.11 (s, 1H), 8.05-8.02 (m, 2H), 7.72 (br d, J=8.8 Hz, 1H), 7.61 (d, J=8.8 Hz, 1H), 7.57 (d, J=3.2 Hz, 1H), 7.51 (t, J=8.0 Hz, 1H), 7.45 (dd, J=8.8 Hz, 2.0 Hz, 1H), 7.36 (br d, J=7.8 Hz, 1H), 6.67 (d, J=2.8 Hz, 1H), 3.69-3.66 (m, 2H), 2.30-2.24 (m, 3H), 1.90-1.86 (m, 2H), 1.70-1.64 (m, 2H). LCMS: m/z 450.1 [M–H]$^-$.

Scheme 15. Preparation of Compound 64

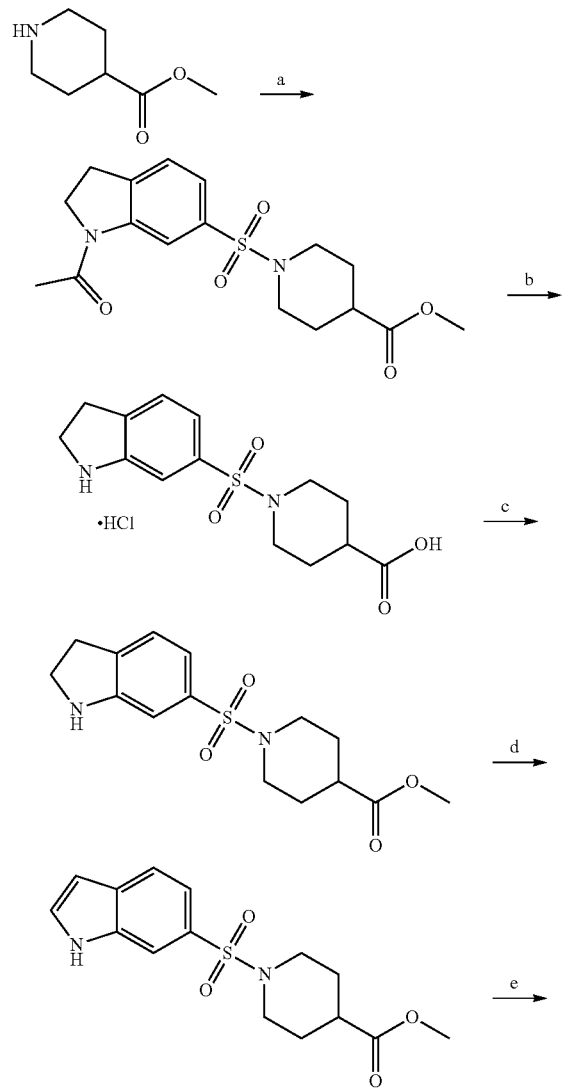

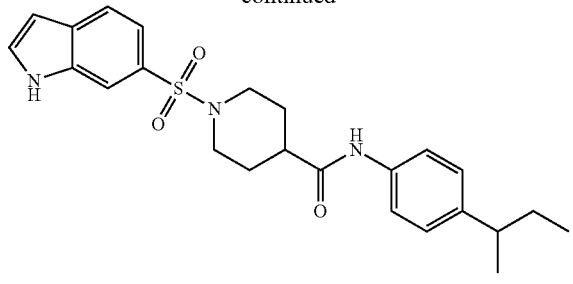

64

Reagents and conditions: a) 1-acetyl-2-methylindoline-6-sulfonyl chloride, NaH, DMF, 0° C. to rt; b) conc. HCl, reflux; c) $SOCl_2$, MeOH, 70° C.; d) $MnO_2$, THF, rt; e) 4-sec-butylaniline, DABAL-Me$_3$, Et$_3$N, toluene, 0° C. to 120° C.

Preparation of methyl 1-((1-acetylindolin-6-yl)sulfonyl)piperidine-4-carboxylate To a stirred solution of methyl piperidine-4-carboxylate (100 mg, 0.70 mmol) in pyridine (0.5 mL) was added DMAP (85 mg, 0.70 mmol), followed by 1-acetyl-2-methylindoline-6-sulfonyl chloride (182 mg, 0.70 mmol) at room temperature. The resultant reaction mixture was stirred at room temperature for 16 h. The progress of the reaction was monitored by TLC. After complete consumption of the starting material, the reaction mixture was cooled to 0° C., quenched with 1N HCl solution (10 mL) and extracted with EtOAc (2×20 mL). The combined organic layer was dried over anhydrous $Na_2SO_4$ and concentrated under reduced pressure to obtain the title compound as an off-white solid (130 mg, 92%), which was used in the next step without further purification. LCMS: m/z 367.34 [M+H]$^+$.

Preparation of 1-(indolin-6-ylsulfonyl)piperidine-4-carboxylic Acid Hydrochloride To a stirred solution of methyl 1-((1-acetylindolin-6-yl)sulfonyl)piperidine-4-carboxylate (130 mg, 0.35 mmol) in methanol (3 mL) was added concentrated hydrochloric acid (0.5 mL) at 0° C. The resulting mixture was stirred for 3 h at 90° C. The progress of the reaction was monitored by TLC. After complete consumption of the starting material, the reaction mixture was concentrated under reduced pressure to obtain the title compound as an off-white solid (100 mg, 91%), which as used in the next step without further purification. LCMS: m/z 309.25 [M–H]$^-$.

Preparation of methyl 1-(indolin-6-ylsulfonyl)piperidine-4-carboxylate

To a stirred solution of 1-(indolin-6-ylsulfonyl)piperidine-4-carboxylic acid hydrochloride (100 mg, 0.29 mmol) in methanol (5 mL) was added $SOCl_2$ (0.06 ml, 0.87 mmol) at room temperature. The reaction mixture heated to 70° C. and stirred for 6 h. The progress of the reaction was monitored by TLC. After complete consumption of the starting material, the reaction mixture was cooled to room temperature, then concentrated under reduced pressure. The residue was diluted in EtOAc (20 mL) and washed with saturated sodium bicarbonate solution (2×10 mL). The organic layer was dried over anhydrous $Na_2SO_4$ and concentrated under reduced pressure to obtain the title compound as an off-white solid (80 mg, 86%). LCMS: m/z 325.29 [M+H]+.

Preparation of methyl 1-((1H-indol-6-yl)sulfonyl) piperidine-4-carboxylate

To a stirred solution of methyl 1-(indolin-6-ylsulfonyl) piperidine-4-carboxylate (200 mg, 0.62 mmol) in THF (2 mL) was added MnO$_2$ (539 mg, 6.2 mmol) at room temperature. The resultant reaction mixture was stirred at room temperature for 24 h. The progress of the reaction was monitored by TLC. After complete consumption of the starting material, the reaction mixture was filtered through Celite and washed with THF (2×20 mL). The combined organic layer was dried over anhydrous Na$_2$SO$_4$ and concentrated under vacuum to obtain the crude product. The crude compound was purified by column chromatography using 100-200 silica-gel eluting with 40% EtOAc in petroleum ether to obtain the title compound as an off-white solid (130 mg, 65%). LCMS: m/z 323.27 [M+H]+.

Preparation of Compound 64, 1-((1H-indol-6-yl) sulfonyl)-N-(4-(sec-butyl)phenyl) piperidine-4-carboxamide To a stirred solution of methyl 1-((1H-indol-6-yl)sulfonyl)piperidine-4-carboxylate (70 mg, 0.22 mmol) and 4-sec-butylaniline (39 mg, 0.26 mmol) in toluene (2 mL) was added Et$_3$N (0.1 mL, 0.66 mmol), followed by DABAl-Me$_3$ (85 mg, 0.33 mmol) at 0° C. under an atmosphere of nitrogen. The resultant reaction mixture was heated for 2 h at 120° C. The progress of the reaction was monitored by TLC. After complete consumption of the starting material, the reaction mixture was cooled to 0° C., then quenched with 1N HCl (10 mL) and extracted with EtOAc (2×20 mL). The combined organic layer was dried over anhydrous Na$_2$SO$_4$ and concentrated under reduced pressure to obtain the crude product. The crude compound was purified by column chromatography (100-200 mesh silica-gel) eluting with 30% EtOAc in petroleum ether to obtain the title compound as an off-white solid (70 mg, 74%).

$^1$H NMR (400 MHZ, DMSO-d$_6$) δ 11.62 (s, 1H), 9.66 (s, 1H), 7.82 (br s, 1H), 7.77 (d, J=8.4 Hz, 1H), 7.67 (d, J=2.8 Hz, 1H), 7.43 (d, J=8.4 Hz, 2H), 7.34 (dd, J=8.4 Hz, 1.6 Hz, 1H), 7.07 (d, J=8.4 Hz, 2H), 6.61 (d, J=3.2 Hz, 1H), 3.67 (br d, J=11.6 Hz, 2H), 2.50-2.48 (m, 1H), 2.31-2.23 (m, 3H), 1.86-1.83 (m, 2H), 1.65-1.62 (m, 2H), 1.52-1.47 (m, 2H), 1.13 (d, J=7.2 Hz, 3H), 0.72 (t, J=7.6 Hz, 3H). LCMS: m/z 440.35 [M+H]+.

Scheme 16. Preparation of Compound 65

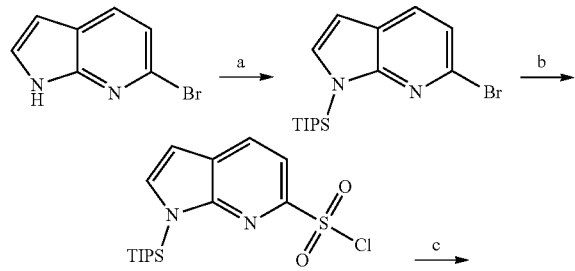

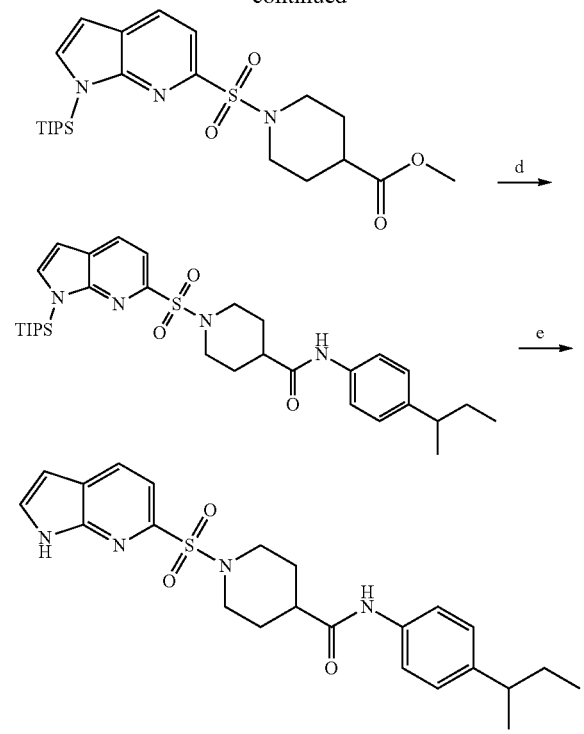

65

Reagents and conditions: a) TIPS—Cl, NaH, THF, 0° C. to rt; b) i) n-BuLi, SO$_2$, THF, -78° C.; ii) NCS, Et$_2$O, 0° C. to rt; c) methyl piperidine-4-carboxylate, pyridine, DMAP, rt; d) 4-sec-butylaniline, DABAL-Me$_3$, Et$_3$N, toluene, 0° C. to 120° C.; e) TFA, DCM, 0° C. to rt.

Preparation of 6-bromo-1-(triisopropylsilyl)-1H-pyrrolo[2,3-b]pyridine

To a stirred solution of 6-bromo-1H-pyrrolo[2,3-b]pyridine (1.0 g, 5.08 mmol) in THF (10 mL) was added NaH (60% dispersion in mineral oil, 406 mg, 10.16 mmol) at 0° C. The mixture was stirred for 10 min, after which TIPS-Cl (1.18 g, 6.10 mmol) was added portion-wise. The reaction mixture was stirred for 3 h at room temperature. The progress of the reaction was monitored by TLC. After complete consumption of the starting material, the reaction mixture was quenched with ice-water and extracted with EtOAc (2×50 mL). The combined organic layer was dried over anhydrous Na$_2$SO$_4$ and concentrated under reduced pressure to obtain the crude product. The crude compound was purified by column chromatography using 100-200 silica-gel and eluting in 10% EtOAc in petroleum ether to obtain the title compound as an off-white solid (600 mg, 33%). LCMS: m/z 354.96 [M+H]+.

Preparation of 1-(triisopropylsilyl)-1H-pyrrolo[2,3-b]pyridine-6-sulfonyl Chloride To a stirred solution of 6-bromo-1-(triisopropylsilyl)-1H-pyrrolo[2,3-b]pyridine (600 mg, 1.70 mmol) in THF (12 mL). The reaction mixture was cooled in a dry ice and acetone bath for 20 min, after which n-butyl lithium (075 ml, 1.87 mmol) was added drop wise over 10 min. The resulting mixture was stirred for 30 min, then sulfur dioxide gas was purged through a needle over 15 min. The mixture was then warmed to room temperature and concentrated in vacuo. The residue was dissolved in diethyl ether (12 mL). The mixture was cooled in an ice bath for 10 min, then N-chlorosuccinimide (250 mg, 1.87 mmol) was added in one portion. The resultant reaction mixture was stirred for 4 h at room temperature. The progress of the reaction was monitored by TLC. The reaction mixture was filtered through Celite and the residue was washed with diethyl ether. The filtrate was evaporated under vacuum to obtain the crude product. The crude compound was purified by column chromatography using 100-200 silica-gel and eluting in 15% EtOAc in petroleum ether to obtain the title compound as an off-white solid (200 mg, 32%). LCMS: m/z 373.0 $[M+H]^+$.

Preparation of methyl 1-((1-(triisopropylsilyl)-1H-pyrrolo[2,3-b]pyridin-6-yl)sulfonyl) piperidine-4-carboxylate To a stirred solution of 1-(triisopropylsilyl)-1H-pyrrolo[2,3-b]pyridine-6-sulfonyl chloride (150 mg, 0.40 mmol) in pyridine (0.5 mL) was added DMAP (49 mg, 0.40 mmol), followed by methyl piperidine-4-carboxylate (57 mg, 0.40 mmol) at room temperature. The resultant reaction mixture was stirred at room temperature for 16 h. The progress of the reaction was monitored by TLC. After complete consumption of the starting material, the reaction mixture was cooled to 0° C., quenched with 1N HCl solution (10 mL) and extracted with EtOAc (2×10 mL). The combined organic layer was dried over anhydrous $Na_2SO_4$ and concentrated under reduced pressure to obtain the crude product. The crude compound was purified by column chromatography using 100-200 silica-gel eluting with 20% EtOAc in petroleum ether to obtain the title compound as an off-white solid (100 mg, 52%). LCMS: m/z 480.80 $[M+H]^+$.

Preparation of N-(4-(sec-butyl)phenyl)-1-((1-(triisopropylsilyl)-1H-pyrrolo[2,3-b]pyridin-6-yl) sulfonyl)piperidine-4-carboxamide To a stirred solution of methyl 1-((1-(triisopropylsilyl)-1H-pyrrolo[2,3-b]pyridin-6-yl)sulfonyl)piperidine-4-carboxylate (200 mg, 0.42 mmol) and 4-sec-butylaniline (82 mg, 0.55 mmol) in toluene (2 mL) was added $Et_3N$ (0.12 mL, 0.84 mmol), followed by $DABAl-Me_3$ (162 mg, 0.63 mmol) at 0° C. under an atmosphere of nitrogen. The resultant reaction mixture was heated for 2 h at 120° C. The progress of the reaction was monitored by TLC. After complete consumption of the starting material, the reaction mixture was cooled to 0° C., then quenched with 1N HCl (10 mL) and extracted with EtOAc (2×50 mL). The combined organic layer was dried over anhydrous $Na_2SO_4$ and concentrated under reduced pressure to obtain the crude product. The crude compound was purified by column chromatography (100-200 mesh silica-gel) eluting with 25% EtOAc in petroleum ether to obtain the title compound as an off-white solid (180 mg, 73%). LCMS: m/z 597.60 $[M+H]^+$.

Preparation of Compound 65, 1-((1H-pyrrolo[2,3-b]pyridin-6-yl) sulfonyl)-N-(4-(sec-butyl)phenyl) piperidine-4-carboxamide To a stirred solution of N-(4-(sec-butyl)phenyl)-1-((1-(triisopropylsilyl)-1H-pyrrolo[2,3-b]pyridin-6-yl)sulfonyl) piperidine-4-carboxamide (220 mg, 0.37 mmol) in DCM (1 mL) was added TFA (1 mL) at 0° C. The reaction mixture was stirred for 16 h at room temperature. The progress of the reaction was monitored by TLC. After complete consumption of the starting material, the reaction mixture was quenched with $NaHCO_3$ solution (20 mL) and extracted with DCM (2×50 mL). The combined organic layer was dried over anhydrous $Na_2SO_4$ and concentrated under reduced pressure to obtain the crude product. This crude compound was purified by column chromatography using 100-200 silica-gel by eluting with 40% EtOAc in petroleum ether to obtain the title compound as an off-white solid (120 mg, 74%).

$^1$H NMR (400 MHZ, DMSO-$d_6$) δ 12.27 (s, 1H), 9.71 (s, 1H), 8.23 (d, J=8.0 Hz, 1H), 7.80 (dd, J=3.6 Hz, 2.8 Hz, 1H), 7.63 (d, J=8.0 Hz, 1H), 7.44 (d, J=8.4 Hz, 2H), 7.08 (d, J=8.4 Hz, 2H), 6.64 (dd, J=3.2 Hz, 1.6 Hz, 1H), 3.80 (br d, J=12.4 Hz, 2H), 2.69-2.53 (m, 2H), 2.51-2.50 (m, 1H), 2.33-2.31 (m, 1H), 1.85-1.82 (m, 2H), 1.67-1.46 (m, 4H), 1.14 (d, J=6.8 Hz, 3H), 0.73 (t, J=7.6 Hz, 3H). LCMS: m/z 439.31 $[M-H]^-$.

Scheme 17. Preparation of Compounds 76-87 and 105-117.

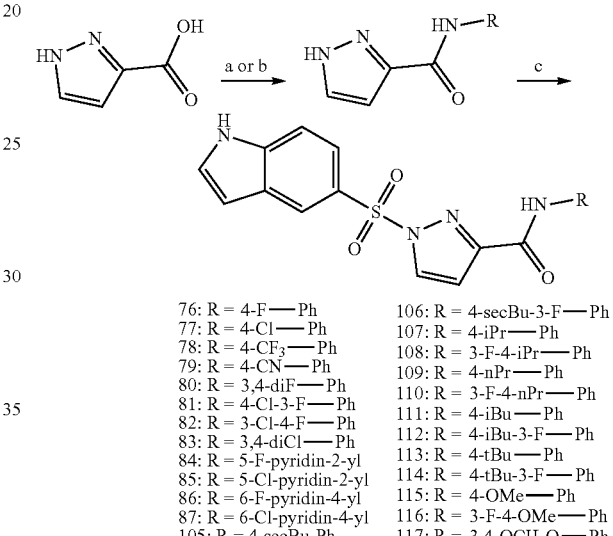

76: R = 4-F—Ph
77: R = 4-Cl—Ph
78: R = 4-CF$_3$—Ph
79: R = 4-CN—Ph
80: R = 3,4-diF—Ph
81: R = 4-Cl-3-F—Ph
82: R = 3-Cl-4-F—Ph
83: R = 3,4-diCl—Ph
84: R = 5-F-pyridin-2-yl
85: R = 5-Cl-pyridin-2-yl
86: R = 6-F-pyridin-4-yl
87: R = 6-Cl-pyridin-4-yl
105: R = 4-secBu-Ph
106: R = 4-secBu-3-F—Ph
107: R = 4-iPr—Ph
108: R = 3-F-4-iPr—Ph
109: R = 4-nPr—Ph
110: R = 3-F-4-nPr—Ph
111: R = 4-iBu—Ph
112: R = 4-iBu-3-F—Ph
113: R = 4-tBu—Ph
114: R = 4-tBu-3-F—Ph
115: R = 4-OMe—Ph
116: R = 3-F-4-OMe—Ph
117: R = 3,4-OCH$_2$O—Ph Reagents and conditions: a) RNH$_2$, HATU, DIPEA, DMF, 0° C. to rt; b) i) oxalyl chloride, DCM, 0° C. to rt; ii) RNH$_2$, NaH, THF, rt; c) 1H-indole-5-sulfonyl chloride, DMAP, DIPEA, DMC, 0° C. to rt.

Preparation of N-(4-fluorophenyl)-1H-pyrazole-3-carboxamide

To a stirred solution of 1H-pyrazole-3-carboxylic acid (400 mg, 3.57 mmol) in DMF (10 mL) was added DIPEA (1.9 mL, 10.71 mmol), HATU (2.04 g, 5.36 mmol) and 4-fluoroaniline (476 mg, 4.28 mmol) at 0° C. under atmosphere of nitrogen. The resultant reaction mixture was stirred at room temperature for 16 h. The progress of the reaction was monitored by TLC. After complete consumption of the starting material, the reaction mixture was quenched with ice water (20 mL) and the precipitated solid was filtered off, dissolved in DCM (40 mL), dried over anhydrous $Na_2SO_4$ and concentrated under reduced pressure to obtain the crude product. Trituration with diethyl ether gave the title compound as an off-white solid (320 mg, 44%). LCMS: m/z 206.19 $[M+H]^+$.

Other analogues prepared by this method:
N-(4-chlorophenyl)-1H-pyrazole-3-carboxamide (43%). LCMS: m/z 220.21 $[M-H]^-$.
N-(4-(trifluoromethyl)phenyl)-1H-pyrazole-3-carboxamide (31%). LCMS: m/z 254.23 $[M-H]^-$.

N-(4-cyanophenyl)-1H-pyrazole-3-carboxamide (30%). LCMS: m/z 213.24 [M+H]⁺.

N-(3,4-difluorophenyl)-1H-pyrazole-3-carboxamide (33%).
¹H NMR (400 MHZ, CDCl₃) δ 8.72 (br s, 1H), 7.82-7.77 (m, 1H), 7.66 (d, J=2.4 Hz, 1H), 7.24-7.11 (m, 2H), 6.98 (d, J=2.4 Hz, 1H).

N-(4-chloro-3-fluorophenyl)-1H-pyrazole-3-carboxamide (43%). LCMS: m/z 240.16 [M+H]⁺.

N-(3-chloro-4-fluorophenyl)-1H-pyrazole-3-carboxamide (29%).
¹H NMR (400 MHZ, CDCl₃) δ 10.44 (br s, 1H), 8.71 (br s, 1H), 7.88 (dd, J=6.4 Hz, 2.4 Hz, 1H), 7.66 (d, J=2.8 Hz, 1H), 7.52-7.48 (m, 1H), 7.24-7.11 (m, 1H), 6.98 (d, J=2.4 Hz, 1H).

N-(3,4-dichlorophenyl)-1H-pyrazole-3-carboxamide (35%).
¹H NMR (400 MHZ, CDCl₃) δ 10.35 (br s, 1H), 8.74 (br s, 1H), 7.94 (d, J=2.4 Hz, 1H), 7.65 (dd, J=8.8 Hz, 2.4 Hz, 1H), 7.54-7.51 (m, 1H), 7.41 (d, J=8.8 Hz, 1H), 6.98 (d, J=2.4 Hz, 1H).

N-(4-(sec-butyl)phenyl)-1H-pyrazole-3-carboxamide (23%). LCMS: m/z 244.27 [M+H]⁺.

N-(4-(sec-butyl)-3-fluorophenyl)-1H-pyrazole-3-carboxamide (34%). LCMS: m/z 262.33 [M+H]⁺.

N-(4-isopropylphenyl)-1H-pyrazole-3-carboxamide (22%). LCMS: m/z 230.33 [M+H]⁺.

N-(3-fluoro-4-isopropylphenyl)-1H-pyrazole-3-carboxamide (23%). LCMS: m/z 248.25 [M+H]⁺.

N-(4-propylphenyl)-1H-pyrazole-3-carboxamide (36%). LCMS: m/z 230.25 [M+H]⁺.

N-(3-fluoro-4-propylphenyl)-1H-pyrazole-3-carboxamide (64%). LCMS: m/z 248.23 [M+H]⁺.

N-(4-isobutylphenyl)-1H-pyrazole-3-carboxamide (34%). LCMS: m/z 244.27 [M+H]⁺.

N-(3-fluoro-4-isobutylphenyl)-1H-pyrazole-3-carboxamide (54%). LCMS: m/z 262.20 [M+H]⁺.

N-(4-(tert-butyl)phenyl)-1H-pyrazole-3-carboxamide (24%). LCMS: m/z 244.36 [M+H]⁺.

N-(4-(tert-butyl)-3-fluorophenyl)-1H-pyrazole-3-carboxamide (31%). LCMS: m/z 262.24 [M+H]⁺.

N-(4-methoxyphenyl)-1H-pyrazole-3-carboxamide (29%). LCMS: m/z 218.24 [M+H]⁺.

N-(3-fluoro-4-methoxyphenyl)-1H-pyrazole-3-carboxamide (29%). LCMS: m/z 236.20 [M+H]⁺.

N-(benzo[d][1,3]dioxol-5-yl)-1H-pyrazole-3-carboxamide (36%). LCMS: m/z 232.22 [M+H]⁺.

Preparation of N-(5-fluoropyridin-2-yl)-1H-pyrazole-3-carboxamide

To a stirred solution of 1H-pyrazole-3-carboxylic acid (500 mg, 4.46 mmol) in DCM (12 mL) was added oxalyl chloride (5.78 mL, 66.90 mmol) at 0° C. under an atmosphere of nitrogen. The resultant reaction mixture was stirred at room temperature for 2 h. The crude reaction mixture was concentrated under reduced pressure (under nitrogen) to obtain the crude 1H-pyrazole-3-carbonyl chloride intermediate. In another flask, NaH (60% dispersion in mineral oil, 267 mg, 6.69 mmol) was added to a stirred solution of 5-fluoropyridin-2-amine (500 mg, 4.46 mmol) in THF (10 mL) at room temperature. The resultant reaction mixture was stirred at room temperature for 1 h. Then the acid chloride prepared above was added slowly at room temperature to this reaction mixture, which was then stirred for 1 h. The progress of the reaction was monitored by TLC. After complete consumption of the starting material, the reaction mixture was diluted with water (15 mL) and extracted with EtOAc (3×30 mL). The combined organic layer was dried over anhydrous Na₂SO₄ and concentrated under reduced pressure to obtain the crude product. This crude compound was purified by column chromatography using 100-200 silica-gel by eluting with 40% EtOAc in petroleum ether to obtain the title compound as an off-white solid (355 mg, 39%). LCMS: m/z 207.34 [M+H]⁺.

Other analogues prepared by this method:

N-(5-chloropyridin-2-yl)-1H-pyrazole-3-carboxamide (30%).
¹H NMR (400 MHZ, DMSO-d₆) δ 13.51 (s, 1H), 10.50 (s, 1H), 8.86 (d, J=2.4 Hz, 1H), 8.30 (dd, J=8.8 Hz, 2.8 Hz, 1H), 7.92 (dd, J=2.4 Hz, 1.2 Hz, 1H), 7.49 (d, J=8.8 Hz, 1H), 6.80 (d, J=2.0 Hz, 1H).

N-(6-fluoropyridin-3-yl)-1H-pyrazole-3-carboxamide (19%). LCMS: m/z 207.15 [M+H]⁺.

N-(6-chloropyridin-3-yl)-1H-pyrazole-3-carboxamide (28%). LCMS: m/z 221.14 [M−H]⁻.

Preparation of Compound 76, 1-((1H-indol-5-yl)sulfonyl)-N-(4-fluorophenyl)-1H-pyrazole-3-carboxamide To a stirred solution of N-(5-fluoropyridin-2-yl)-1H-pyrazole-3-carboxamide (38 mg, 0.19 mmol) in DCM (2.0 mL) was added DIPEA (0.1 mL, 0.57 mmol), DMAP (2.5 mg, 0.02 mmol) and 1H-indole-5-sulfonyl chloride (41 mg, 0.19 mmol) at 0° C. under an atmosphere of nitrogen. The resultant reaction mixture was stirred at room temperature for 16 h. The progress of the reaction was monitored by TLC. After complete consumption of the starting material, reaction mixture was diluted with water (1 mL) extracted with EtOAc (20 mL). The combined organic layer was dried over anhydrous Na₂SO₄ and concentrated under reduced pressure to obtain the crude product. Another batch of crude product was prepared as described above. The two batches were combined and purified by preparative HPLC to obtain the title compound as an off-white solid (40 mg, 28%).
¹H NMR (400 MHZ, DMSO-d₆) δ 11.86 (s, 1H), 10.34 (s, 1H), 8.61 (d, J=2.8 Hz, 1H), 8.41 (d, J=1.6 Hz, 1H), 7.76-7.71 (m, 3H), 7.65-7.63 (m, 2H), 7.17 (t, J=8.8 Hz, 2H), 6.99 (d, J=2.8 Hz, 1H), 6.72 (br s, 1H). LCMS: m/z 383.14 [M−H]⁻.

Other analogues prepared by this method:

Compound 77, 1-((1H-indol-5-yl)sulfonyl)-N-(4-chlorophenyl)-1H-pyrazole-3-carboxamide (33%)

¹H NMR (400 MHZ, DMSO-d₆) δ 11.87 (s, 1H), 10.42 (s, 1H), 8.62 (d, J=2.8 Hz, 1H), 8.41 (d, J=1.6 Hz, 1H), 7.78 (d, J=8.8 Hz, 2H), 7.75 (dd, J=8.8 Hz, 2.0 Hz, 1H), 7.65-7.63 (m, 2H), 7.39 (d, J=8.8 Hz, 2H), 7.00 (d, J=2.8 Hz, 1H), 6.73 (d, J=2.8 Hz, 1H). LCMS: m/z 399.18 [M−H]⁻.

Compound 78, 1-((1H-indol-5-yl)sulfonyl)-N-(4-(trifluoromethyl)phenyl)-1H-pyrazole-3-carboxamide (27%)

¹H NMR (400 MHZ, DMSO-d₆) δ 11.87 (s, 1H), 10.64 (s, 1H), 8.64 (d, J=2.8 Hz, 1H), 8.42 (d, J=1.6 Hz, 1H), 7.98 (d, J=8.4 Hz, 2H), 7.76-7.69 (m, 3H), 7.66-7.64 (m, 2H), 7.04 (d, J=2.4 Hz, 1H), 6.73 (d, J=2.8 Hz, 1H). LCMS: m/z 435.18 [M+H]⁺.

Compound 79, 1-((1H-indol-5-yl)sulfonyl)-N-(4-cyanophenyl)-1H-pyrazole-3-carboxamide (24%)

¹H NMR (400 MHZ, DMSO-d₆) δ 11.86 (s, 1H), 10.69 (s, 1H), 8.63 (d, J=2.8 Hz, 1H), 8.41 (d, J=1.6 Hz, 1H), 7.97 (d,

J=8.8 Hz, 2H), 7.80 (d, J=8.8 Hz, 2H), 7.73 (dd, J=8.8 Hz, 2.0 Hz, 1H), 7.65-7.63 (m, 2H), 7.03 (d, J=2.8 Hz, 1H), 6.73 (d, J=3.2 Hz, 1H). LCMS: m/z 392.21 [M+H]$^+$.

Compound 80, 1-((1H-indol-5-yl)sulfonyl)-N-(3,4-difluorophenyl)-1H-pyrazole-3-carboxamide (26%)

$^1$H NMR (400 MHZ, DMSO-d$_6$) δ 11.86 (s, 1H), 10.51 (s, 1H), 8.62 (d, J=2.8 Hz, 1H), 8.41 (d, J=2.0 Hz, 1H), 7.87 (ddd, J=13.2 Hz, 7.6 Hz, 2.4 Hz, 1H), 7.73 (dd, J=8.4 Hz, 2.4 Hz, 1H), 7.65-7.63 (m, 2H), 7.59-7.55 (m, 1H), 7.44-7.36 (m, 1H), 7.00 (d, J=2.4 Hz, 1H), 6.73 (br s, 1H). LCMS: m/z 401.16 [M−H]$^-$.

Compound 81, 1-((1H-indol-5-yl)sulfonyl)-N-(4-chloro-3-fluorophenyl)-1H-pyrazole-3-carboxamide (41%)

$^1$H NMR (400 MHZ, DMSO-d$_6$) δ 11.87 (s, 1H), 10.62 (s, 1H), 8.63 (d, J=2.8 Hz, 1H), 8.41 (d, J=1.6 Hz, 1H), 7.89 (dd, J=11.6 Hz, 2.0 Hz, 1H), 7.73 (dd, J=8.8 Hz, 2.0 Hz, 1H), 7.66-7.62 (m, 3H), 7.55 (t, J=8.8 Hz, 1H), 7.01 (d, J=2.8 Hz, 1H), 6.73 (d, J=3.2 Hz, 1H). LCMS: m/z 417.12 [M−H]$^-$.

Compound 82, 1-((1H-indol-5-yl)sulfonyl)-N-(3-chloro-4-fluorophenyl)-1H-pyrazole-3-carboxamide (30%)

$^1$H NMR (400 MHZ, DMSO-d$_6$) δ 11.87 (s, 1H), 10.51 (s, 1H), 8.63 (d, J=2.8 Hz, 1H), 8.41 (d, J=1.6 Hz, 1H), 8.02 (dd, J=6.8 Hz, 2.4 Hz, 1H), 7.75-7.71 (m, 2H), 7.66-7.63 (m, 2H), 7.40 (t, J=8.8 Hz, 1H), 7.00 (d, J=2.8 Hz, 1H), 6.73 (d, J=2.8 Hz, 1H). LCMS: m/z 419.13 [M+H]$^+$.

Compound 83, 1-((1H-indol-5-yl)sulfonyl)-N-(3,4-dichlorophenyl)-1H-pyrazole-3-carboxamide (40%)

$^1$H NMR (400 MHZ, DMSO-d$_6$) δ 11.87 (s, 1H), 10.58 (s, 1H), 8.63 (d, J=2.8 Hz, 1H), 8.41 (d, J=1.6 Hz, 1H), 8.11 (d, J=2.4 Hz, 1H), 7.78-7.74 (m, 2H), 7.66-7.63 (m, 2H), 7.60 (d, J=8.8 Hz, 1H), 7.01 (d, J=2.8 Hz, 1H), 6.73 (br s, 1H). LCMS: m/z 433.08 [M−H]$^-$.

Compound 84, 1-((1H-indol-5-yl)sulfonyl)-N-(5-fluoropyridin-2-yl)-1H-pyrazole-3-carboxamide (17%)

$^1$H NMR (400 MHz, DMSO-d$_6$) δ 11.87 (s, 1H), 10.29 (s, 1H), 8.63 (d, J=2.8 Hz, 1H), 8.44 (d, J=2.0 Hz, 1H), 8.40 (d, J=2.8 Hz, 1H), 8.11 (dd, J=8.8 Hz, 4.0 Hz, 1H), 7.83-7.75 (m, 2H), 7.66-7.63 (m, 2H), 7.12 (d, J=2.8 Hz, 1H), 6.73 (d, J=2.8 Hz, 1H). LCMS: m/z 384.15 [M−H]$^-$.

Compound 86, 1-((1H-indol-5-yl)sulfonyl)-N-(6-fluoropyridin-3-yl)-1H-pyrazole-3-carboxamide (14%)

$^1$H NMR (400 MHZ, DMSO-d$_6$) δ 11.87 (s, 1H), 10.63 (s, 1H), 8.64 (d, J=2.4 Hz, 1H), 8.55 (br s, 1H), 8.41 (d, J=0.8 Hz, 1H), 8.30-8.25 (m, 1H), 7.73 (dd, J=8.8 Hz, 2.0 Hz, 1H), 7.66-7.64 (m, 2H), 7.19 (dd, J=8.8 Hz, 3.2 Hz, 1H), 7.02 (d, J=2.8 Hz, 1H), 6.73 (br s, 1H). LCMS: m/z 384.15 [M−H]$^-$.

Compound 87, 1-((1H-indol-5-yl)sulfonyl)-N-(6-chloropyridin-3-yl)-1H-pyrazole-3-carboxamide (16%)

$^1$H NMR (400 MHZ, DMSO-d$_6$) δ 11.87 (s, 1H), 10.69 (s, 1H), 8.77 (d, J=2.4 Hz, 1H), 8.64 (d, J=2.8 Hz, 1H), 8.41 (d, J=1.6 Hz, 1H), 8.21 (dd, J=8.8 Hz, 2.8 Hz, 1H), 7.73 (dd, J=8.8 Hz, 2.0 Hz, 1H), 7.66-7.63 (m, 2H), 7.50 (d, J=8.8 Hz, 1H), 7.02 (d, J=2.8 Hz, 1H), 6.73 (d, J=3.2 Hz, 1H). LCMS: m/z 402.17 [M+H]$^+$.

Compound 105, 1-((1H-indol-5-yl)sulfonyl)-N-(4-(sec-butyl)phenyl)-1H-pyrazole-3-carboxamide (30%)

$^1$H NMR (400 MHZ, DMSO-d$_6$) δ 11.86 (s, 1H), 10.17 (s, 1H), 8.60 (d, J=2.8 Hz, 1H), 8.41 (d, J=1.6 Hz, 1H), 7.73 (dd, J=8.8 Hz, 2.0 Hz, 1H), 7.66-7.61 (m, 4H), 7.15 (d, J=8.4 Hz, 2H), 6.99 (d, J=2.4 Hz, 1H), 6.73 (d, J=2.4 Hz, 1H), 2.57-2.50 (m, 1H), 1.55-1.51 (m, 2H), 1.16 (d, J=6.8 Hz, 3H), 0.75 (t, J=7.2 Hz, 3H). LCMS: m/z 421.19 [M−H]$^-$.

Compound 106, 1-((1H-indol-5-yl)sulfonyl)-N-(4-(sec-butyl)-3-fluorophenyl)-1H-pyrazole-3-carboxamide (39%)

$^1$H NMR (400 MHZ, DMSO-d$_6$) δ 11.86 (s, 1H), 10.39 (s, 1H), 8.61 (d, J=2.8 Hz, 1H), 8.41 (d, J=1.2 Hz, 1H), 7.73 (dd, J=8.8 Hz, 1.6 Hz, 1H), 7.66-7.59 (m, 3H), 7.51 (d, J=8.4 Hz, 1H), 7.25 (t, J=8.4 Hz, 1H), 7.00 (d, J=2.8 Hz, 1H), 6.73 (br s, 1H), 2.89-2.84 (m, 1H), 1.60-1.53 (m, 2H), 1.18 (d, J=7.2 Hz, 3H), 0.77 (t, J=7.2 Hz, 3H). LCMS: m/z 439.23 [M−H]$^-$.

Compound 107, 1-((1H-indol-5-yl)sulfonyl)-N-(4-isopropylphenyl)-1H-pyrazole-3-carboxamide (15%)

$^1$H NMR (400 MHZ, DMSO-d$_6$) δ 11.86 (s, 1H), 10.17 (s, 1H), 8.60 (d, J=2.8 Hz, 1H), 8.41 (d, J=1.6 Hz, 1H), 7.73 (dd, J=8.8 Hz, 1.6 Hz, 1H), 7.66-7.61 (m, 4H), 7.19 (d, J=8.8 Hz, 2H), 6.99 (d, J=2.8 Hz, 1H), 6.73 (d, J=3.2 Hz, 1H), 2.85 (septet, J=6.8 Hz, 1H), 1.18 (d, J=6.8 Hz, 6H). LCMS: m/z 407.31 [M−H]$^-$.

Compound 108, 1-((1H-indol-5-yl)sulfonyl)-N-(3-fluoro-4-isopropylphenyl)-1H-pyrazole-3-carboxamide (29%)

$^1$H NMR (400 MHZ, DMSO-d$_6$) δ 11.87 (s, 1H), 10.39 (s, 1H), 8.62 (d, J=2.8 Hz, 1H), 8.41 (d, J=2.0 Hz, 1H), 7.73 (dd, J=8.8 Hz, 2.0 Hz, 1H), 7.66-7.59 (m, 3H), 7.50 (dd, J=8.8 Hz, 2.0 Hz, 1H), 7.28 (t, J=8.8 Hz, 1H), 7.00 (d, J=2.8 Hz, 1H), 6.73 (dd, J=3.2 Hz, 0.8 Hz, 1H), 3.11 (septet, J=6.8 Hz, 1H), 1.19 (d, J=6.8 Hz, 6H). LCMS: m/z 427.20 [M+H]$^+$.

Compound 109, 1-((1H-indol-5-yl)sulfonyl)-N-(4-propylphenyl)-1H-pyrazole-3-carboxamide (40%)

$^1$H NMR (400 MHZ, DMSO-d$_6$) δ 11.86 (s, 1H), 10.17 (s, 1H), 8.60 (d, J=2.8 Hz, 1H), 8.41 (d, J=2.0 Hz, 1H), 7.73 (dd, J=8.8 Hz, 2.0 Hz, 1H), 7.65-7.60 (m, 4H), 7.14 (d, J=8.4 Hz, 2H), 6.99 (d, J=2.8 Hz, 1H), 6.73 (d, J=0.8 Hz, 1H), 2.53-2.50 (m, 2H), 1.56 (sextet, J=7.2 Hz, 2H), 0.88 (t, J=7.2 Hz, 3H). LCMS: m/z 407.31 [M−H]$^-$.

Compound 110, 1-((1H-indol-5-yl)sulfonyl)-N-(3-fluoro-4-propylphenyl)-1H-pyrazole-3-carboxamide (30%)

$^1$H NMR (400 MHZ, DMSO-d$_6$) δ 11.86 (s, 1H), 10.39 (s, 1H), 8.61 (d, J=2.8 Hz, 1H), 8.41 (d, J=1.6 Hz, 1H), 7.73 (dd, J=8.8 Hz, 1.6 Hz, 1H), 7.66-7.60 (m, 3H), 7.48 (dd,

J=8.4 Hz, 1.6 Hz, 1H), 7.22 (t, J=8.4 Hz, 1H), 7.00 (d, J=2.8 Hz, 1H), 6.73 (d, J=2.4 Hz, 1H), 2.54 (d, J=7.5 Hz, 2H), 1.55 (sextet, J=7.2 Hz, 2H), 0.88 (t, J=7.2 Hz, 3H). LCMS: m/z 425.26 [M−H]⁻.

Compound 111, 1-((1H-indol-5-yl)sulfonyl)-N-(4-isobutylphenyl)-1H-pyrazole-3-carboxamide (19%)

¹H NMR (400 MHZ, DMSO-d₆) δ 11.86 (s, 1H), 10.18 (s, 1H), 8.60 (d, J=2.8 Hz, 1H), 8.41 (d, J=2.0 Hz, 1H), 7.73 (dd, J=8.8 Hz, 2.0 Hz, 1H), 7.65-7.61 (m, 4H), 7.10 (d, J=8.4 Hz, 2H), 6.99 (d, J=2.8 Hz, 1H), 6.73 (br s, 1H), 2.40 (d, J=7.2 Hz, 2H), 1.85-1.75 (m, 1H), 0.85 (d, J=6.4 Hz, 6H). LCMS: m/z 423.25 [M+H]⁺.

Compound 112, 1-((1H-indol-5-yl)sulfonyl)-N-(3-fluoro-4-isobutylphenyl)-1H-pyrazole-3-carboxamide (34%)

¹H NMR (400 MHZ, DMSO-d₆) δ 11.86 (s, 1H), 10.39 (s, 1H), 8.61 (d, J=2.4 Hz, 1H), 8.41 (s, 1H), 7.73 (dd, J=8.8 Hz, 1.2 Hz, 3H), 7.65-7.61 (m, 3H), 7.48 (d, J=8.0 Hz, 1H), 7.19 (t, J=8.4 Hz, 1H), 7.00 (d, J=2.4 Hz, 1H), 6.73 (br s, 1H), 2.43 (d, J=6.8 Hz, 2H), 1.84-1.79 (m, 1H), 0.86 (d, J=6.4 Hz, 6H). LCMS: m/z 439.47 [M−H]⁻.

Compound 113, 1-((1H-indol-5-yl)sulfonyl)-N-(4-(tert-butyl)phenyl)-1H-pyrazole-3-carboxamide (36%)

¹H NMR (400 MHZ, DMSO-d₆) δ 11.86 (s, 1H), 10.18 (s, 1H), 8.60 (d, J=2.8 Hz, 1H), 8.41 (d, J=2.0 Hz, 1H), 7.73 (dd, J=8.8 Hz, 2.0 Hz, 1H), 7.66-7.62 (m, 4H), 7.34 (d, J=8.8 Hz, 2H), 7.00 (d, J=2.8 Hz, 1H), 6.73 (d, J=2.8 Hz, 1H), 1.26 (s, 9H). LCMS: m/z 421.34 [M−H]⁻.

Compound 114, 1-((1H-indol-5-yl)sulfonyl)-N-(4-(tert-butyl)-3-fluorophenyl)-1H-pyrazole-3-carboxamide (24%)

¹H NMR (400 MHZ, DMSO-d₆) δ 11.86 (s, 1H), 10.39 (s, 1H), 8.62 (d, J=2.8 Hz, 1H), 8.41 (d, J=1.6 Hz, 1H), 7.73 (dd, J=8.8 Hz, 2.0 Hz, 1H), 7.66-7.62 (m, 3H), 7.49 (dd, J=8.4 Hz, 2.0 Hz, 1H), 7.28 (t, J=9.2 Hz, 1H), 7.00 (d, J=2.8 Hz, 1H), 6.73 (dd, J=3.2 Hz, 0.8 Hz, 1H), 1.32 (s, 9H). LCMS: m/z 441.23 [M+H]⁺.

Compound 115, 1-((1H-indol-5-yl)sulfonyl)-N-(4-methoxyphenyl)-1H-pyrazole-3-carboxamide (45%)

¹H NMR (400 MHZ, DMSO-d₆) δ 11.91 (br s, 1H), 10.14 (s, 1H), 8.59 (d, J=2.8 Hz, 1H), 8.40 (d, J=2.0 Hz, 1H), 7.73 (dd, J=8.8 Hz, 1.6 Hz, 1H), 7.66-7.60 (m, 4H), 6.98 (d, J=2.8 Hz, 1H), 6.90 (d, J=9.2 Hz, 2H), 6.72 (d, J=2.8 Hz, 1H), 3.73 (s, 3H). LCMS: m/z 395.26 [M−H]⁻.

Compound 116, 1-((1H-indol-5-yl)sulfonyl)-N-(3-fluoro-4-methoxyphenyl)-1H-pyrazole-3-carboxamide (39%)

¹H NMR (400 MHZ, DMSO-d₆) δ 11.86 (br s, 1H), 10.31 (br s, 1H), 8.61 (d, J=2.8 Hz, 1H), 8.40 (d, J=1.6 Hz, 1H), 7.73 (dd, J=8.8 Hz, 1.6 Hz, 1H), 7.69-7.63 (m, 3H), 7.51-7.49 (m, 1H), 7.13 (t, J=9.2 Hz, 1H), 6.98 (d, J=2.8 Hz, 1H), 6.73 (dd, J=3.2 Hz, 0.8 Hz, 1H), 3.81 (s, 3H). LCMS: m/z 413.13 [M−H]⁻.

Compound 117, 1-((1H-indol-5-yl)sulfonyl)-N-(benzo[d][1,3]dioxol-5-yl)-1H-pyrazole-3-carboxamide (18%)

¹H NMR (400 MHZ, DMSO-d₆) δ 11.86 (s, 1H), 10.17 (s, 1H), 8.60 (d, J=2.8 Hz, 1H), 8.40 (d, J=1.6 Hz, 1H), 7.73 (dd, J=8.8 Hz, 2.0 Hz, 1H), 7.65-7.63 (m, 2H), 7.36 (d, J=1.6 Hz, 1H), 7.17 (dd, J=8.4 Hz, 2.0 Hz, 1H), 6.97 (d, J=2.8 Hz, 1H), 6.87 (d, J=8.4 Hz, 1H), 6.73 (br s, 1H), 5.99 (s, 2H). LCMS: m/z 409.09 [M−H]⁻.

Scheme 18. Preparation of Compounds 88-93

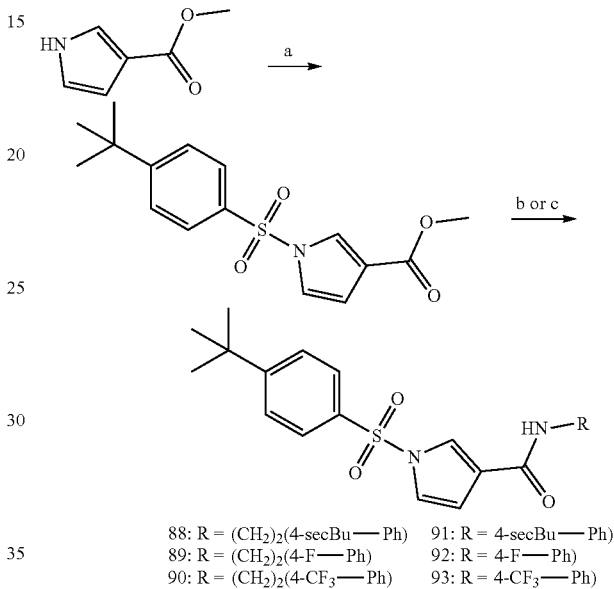

88: R = (CH₂)₂(4-secBu—Ph)
89: R = (CH₂)₂(4-F—Ph)
90: R = (CH₂)₂(4-CF₃—Ph)
91: R = 4-secBu—Ph
92: R = 4-F—Ph
93: R = 4-CF₃—Ph Reagents and conditions: a) 4-(tert-butyl)benzenesulfonyl chloride, NaH, DMF, 0° C. to rt; b) RNH₂, DABAL-Me₃, Et₃N, toluene, 0° C. to 120° C.; c) i) LiOH, THF/H₂O, 0° C. to rt; ii) RNH₂, HATU, DIPEA, DMF, rt.

Preparation of methyl 1-((4-(tert-butyl)phenyl)sulfonyl)-1H-pyrrole-3-carboxylate To a stirred solution of methyl 1H-pyrrole-3-carboxylate (1.5 g, 11.99 mmol) in DMF (15 mL), was added NaH (60% dispersion in mineral oil, 0.96 g, 23.98 mmol) at 0° C. The resulting mixture was stirred for 10 min, after which 4-(tert-butyl)benzenesulfonyl chloride (2.79 g, 11.99 mmol) was added portion-wise. The reaction mixture was stirred for 2 h at room temperature. The progress of the reaction was monitored by TLC. After complete consumption of the starting material, the reaction mixture was quenched with ice-water. The precipitated solid was filtered off, washed with water and dried under vacuum to obtain the title compound as an off-white solid (800 mg, 21%). LCMS: m/z 322.27 [M+H]⁺.

Preparation of Compound 88, N-(4-(sec-butyl)phenethyl)-1-((4-(tert-butyl)phenyl) sulfonyl)-1H-pyrrole-3-carboxamide To a stirred solution of methyl 1-((4-(tert-butyl)phenyl)sulfonyl)-1H-pyrrole-3-carboxylate (150 mg, 0.47 mmol) and 2-(4-(sec-butyl)phenyl)ethan-1-amine hydrochloride (100 mg, 0.47 mmol) in toluene (4 mL) was added Et₃N (0.2 mL, 1.41 mmol), followed by DABAL-Me₃ (143 mg, 0.56 mmol) at 0° C. under an atmosphere of nitrogen. The resultant reaction mixture was heated for 2 h at 120° C. The progress of the reaction was monitored by TLC. After complete consumption of the starting material, the reaction mixture cooled to 0° C., then quenched with $H_2O$ (20 mL) and extracted with EtOAc (2×50 mL). The combined organic layer was dried over anhydrous $Na_2SO_4$ and concentrated under reduced pressure to obtain the crude product. The crude compound thus obtained was purified by column chromatography (100-200 mesh silica-gel) eluting with 58% EtOAc in petroleum ether to obtain the title compound as an off-white solid (93 mg, 43%).

$^1H$ NMR (400 MHZ, DMSO-$d_6$) δ 8.27 (t, J=5.6 Hz, 1H), 7.92 (d, J=8.8 Hz, 2H), 7.84 (dd, J=2.4 Hz, 1.6 Hz, 1H), 7.69 (d, J=8.8 Hz, 2H), 7.38 (dd, J=3.2 Hz, 2.0 Hz, 1H), 7.13-7.08 (m, 4H), 6.68 (dd, J=3.2 Hz, 1.6 Hz, 1H), 3.35-3.33 (m, 2H), 2.73 (t, J=7.2 Hz, 2H), 2.54-2.51 (m, 1H), 1.55-1.48 (m, 2H), 1.28 (s, 9H), 1.15 (d, J=6.8 Hz, 3H), 0.74 (t, J=7.2 Hz, 3H). LCMS: m/z 467.36 $[M+H]^+$.

Other analogues prepared by this method:

Compound 89, 1-((4-(tert-butyl)phenyl)sulfonyl)-N-(4-fluorophenethyl)-1H-pyrrole-3-carboxamide (58%)

$^1H$ NMR (400 MHZ, DMSO-$d_6$) δ 8.24 (t, J=5.6 Hz, 1H), 7.92 (d, J=8.8 Hz, 2H), 7.83 (dd, J=2.0 Hz, 1.6 Hz, 1H), 7.69 (d, J=8.8 Hz, 2H), 7.38 (dd, J=3.2 Hz, 1.6 Hz, 1H), 7.24 (dd, J=8.8 Hz, 5.6 Hz, 2H), 7.09 (t, J=8.8 Hz, 2H), 6.66 (dd, J=3.2 Hz, 1.6 Hz, 1H), 3.39-3.32 (m, 2H), 2.76 (t, J=7.2 Hz, 2H), 1.28 (s, 9H). LCMS: m/z 429.25 $[M+H]^+$.

Compound 90, 1-((4-(tert-butyl)phenyl)sulfonyl)-N-(4-(trifluoromethyl)phenethyl)-1H-pyrrole-3-carboxamide (54%)

$^1H$ NMR (400 MHZ, DMSO-$d_6$) δ 8.27 (t, J=5.6 Hz, 1H), 7.92 (d, J=8.8 Hz, 2H), 7.83 (t, J=2.0 Hz, 1H), 7.69 (d, J=8.8 Hz, 2H), 7.63 (d, J=8.0 Hz, 2H), 7.44 (d, J=8.0 Hz, 2H), 7.38 (dd, J=3.2 Hz, 2.4 Hz, 1H), 6.66 (dd, J=3.2 Hz, 1.6 Hz, 1H), 3.43 (q, J=6.4 Hz, 2H), 2.88 (t, J=7.2 Hz, 2H), 1.28 (s, 9H). LCMS: m/z 479.78 $[M+H]^+$.

Compound 91, N-(4-(sec-butyl)phenyl)-1-((4-(tert-butyl)phenyl)sulfonyl)-1H-pyrrole-3-carboxamide (68%)

$^1H$ NMR (400 MHZ, DMSO-$d_6$) δ 9.81 (s, 1H), 8.12 (t, J=2.0 Hz, 1H), 7.96 (d, J=8.8 Hz, 2H), 7.71 (d, J=8.8 Hz, 2H), 7.58 (d, J=8.4 Hz, 2H), 7.46 (dd, J=3.2 Hz, 2.4 Hz, 1H), 7.14 (d, J=8.8 Hz, 2H), 6.82 (dd, J=3.2 Hz, 1.6 Hz, 1H), 2.59-2.50 (m, 1H), 1.55-1.51 (m, 2H), 1.28 (s, 9H), 1.17 (d, J=6.8 Hz, 3H), 0.76 (t, J=7.2 Hz, 3H). LCMS: m/z 439.29 $[M+H]^+$.

Compound 92, 1-((4-(tert-butyl)phenyl)sulfonyl)-N-(4-fluorophenyl)-1H-pyrrole-3-carboxamide (60%)

$^1H$ NMR (400 MHZ, DMSO-$d_6$) δ 9.94 (s, 1H), 8.12 (t, J=2.0 Hz, 1H), 7.96 (d, J=8.8 Hz, 2H), 7.73-7.68 (m, 4H), 7.47 (dd, J=3.2 Hz, 2.4 Hz, 1H), 7.17 (t, J=8.8 Hz, 2H), 6.82 (dd, J=3.2 Hz, 1.6 Hz, 1H), 1.28 (s, 9H). LCMS: m/z 399.17 $[M+H]^+$.

Preparation of 1-((4-(tert-butyl)phenyl)sulfonyl)-1H-pyrrole-3-carboxylic Acid

To a stirred solution of methyl 1-((4-(tert-butyl)phenyl) sulfonyl)-1H-pyrrole-3-carboxylate (700 mg, 2.18 mmol) in THF/water (6.3 mL/0.7 mL) was added LiOH·$H_2O$ (183 mg, 4.36 mmol) at 0° C. The resulting mixture was stirred for 16 h at room temperature. The progress of the reaction was monitored by TLC. After complete consumption of the starting material, the reaction mixture was acidified with 1N HCl and the precipitated solid was filtered off, triturated with diethyl ether and dried under vacuum to obtain the title compound as an off-white solid (420 mg, 63%), which was used in the next step without further purification. LCMS: m/z 306.0 $[M-H]^-$.

Preparation of Compound 93, 1-((4-(tert-butyl)phenyl) sulfonyl)-N-(4-(trifluoromethyl)phenyl)-1H-pyrrole-3-carboxamide To a stirred solution of 1-((4-(tert-butyl)phenyl)sulfonyl)-1H-pyrrole-3-carboxylic acid (110 mg, 0.36 mmol) in DMF (2 mL) at room temperature was added DIPEA (0.19 ml, 1.07 mmol), HATU (272 mg, 0.72 mmol) and 4-trifluoromethylaniline (69 mg, 0.43 mmol). The resultant mixture was stirred for 16 h at room temperature. The progress of the reaction was monitored by TLC. After complete consumption of starting material, the reaction mixture was cooled to 0° C., quenched with water (20 mL) and extracted with EtOAc (2×50 mL). The combined organic layer was dried over anhydrous $Na_2SO_4$ and concentrated under reduced pressure to obtain the crude product. The crude compound was purified by column chromatography using 100-200 silica-gel eluting with 30% EtOAc in petroleum ether to obtain the title compound as an off-white solid (23 mg, 16%).

$^1H$ NMR (400 MHZ, DMSO-$d_6$) δ 10.20 (s, 1H), 8.21 (t, J=2.0 Hz, 1H), 7.97 (d, J=8.8 Hz, 2H), 7.92 (d, J=8.4 Hz, 2H), 7.73-7.69 (m, 4H), 7.49 (dd, J=3.2 Hz, 2.4 Hz, 1H), 6.84 (dd, J=3.2 Hz, 1.6 Hz, 1H), 1.28 (s, 9H). LCMS: m/z 451.26 $[M+H]^+$.

Example 2—Activity of Anti-Tropomyosin Compounds as Monotherapy

The ability of compounds of the disclosure to inhibit the proliferation of cancer cells representative of non-small cell lung cancer and ovarian cancer (Table 1), and pancreatic cancer, colorectal cancer and prostate cancer (Table 2) was assessed. Briefly, a predetermined number of cells as calculated from cell growth assays for each of the cell lines employed were seeded into their respective culture medium (using ATCC culture parameters—http://www.atcc.org) and cultured for 24 h at 37° C. and 5% $CO_2$ in 96-well culture plates. Once attached, each cell line was then exposed to various concentrations of each respective analogue (100, 30, 10, 3, 1 and 0.3 UM or 30, 10, 3, 1, 0.3 and 0.1 μM), cultured for a further 72 h and exposed to Cell-Titre luminescent reagent (100 μL/well) for a further 30 min. Luminescence was captured using an EnVision multilabel reader and the data for each analogue concentration compared against no treatment control. Cell viability was normalised to control (vehicle alone) and dose response curves, and half maximal effective concentration ($EC_{50}$) values were determined using Graph Pad Prism 6 (nonlinear regression sigmoidal dose-response variable slope).

TABLE 1

Anti-proliferative activity of compounds of the disclosure against non-small cell lung cancer and ovarian cancer cells

| Compound ID | IC$_{50}$/μM A549 (NSCLC) | IC$_{50}$/μM A2780 (ovarian) | Compound ID | IC$_{50}$/μM A549 (NSCLC) | IC$_{50}$/μM A2780 (ovarian) |
|---|---|---|---|---|---|
| 1 | >100 | >100 | 40 | 11.3 | 11.0 |
| 2 | 33.7 | 13.9 | 41 | 12.8 | 1.1 |
| 3 | 19.9 | >100 | 42 | 9.8 | 13.4 |
| 4 | >100 | >100 | 43 | 18.0 | 1.9 |
| 5 | 39.6 | 14.8 | 44 | 8.7 | 2.5 |
| 6 | 24.9 | 15.1 | 45 | 5.2 | 2.2 |
| 7 | 44.4 | 41.4 | 46 | 7.7 | 7.1 |
| 8 | 12.1 | 11.7 | 67 | 14.1 | 6.23 |
| 9 | >100 | >100 | 68 | 16.6 | 8.53 |
| 10 | >100 | >100 | 69 | 13.3 | 8.66 |
| 11 | >100 | 48.4 | 70 | 13.8 | 12.2 |
| 12 | >100 | >100 | 71 | 9.28 | 7.49 |
| 13 | >100 | >100 | 72 | 3.45 | >30 |
| 14 | 33.1 | 24.8 | 73 | 2.62 | 11.2 |
| 15 | 25.8 | 22.3 | 74 | >30 | 3.9 |
| 16 | 17.3 | 28.8 | 75 | 18.6 | 26.7 |
| 17 | 6.5 | 13.9 | 76 | >30 | 23.8 |
| 18 | 27.6 | 6.8 | 77 | 19 | >30 |
| 19 | >100 | 100 | 78 | 18.4 | 5.44 |
| 20 | >100 | 24.7 | 79 | 6.72 | >30 |
| 21 | 37.4 | 20.0 | 80 | 4.84 | 13.2 |
| 22 | >100 | >100 | 81 | >30 | 9.33 |
| 23 | 11.6 | 5.3 | 82 | 16.1 | 10.5 |
| 24 | 6.0 | 2.5 | 83 | 14.3 | 9.31 |
| 25 | >100 | >100 | 84 | >30 | >30 |
| 26 | 6.8 | 4.9 | 85 | 11.1 | 21.3 |
| 27 | >100 | >100 | 86 | >30 | >30 |
| 28 | 13.0 | 24.7 | 87 | >30 | 30 |
| 29 | >100 | >100 | 88 | >30 | >30 |
| 30 | >100 | >100 | 89 | 6.7 | 2.8 |
| 31 | >100 | >100 | 90 | >30 | >30 |
| 32 | >100 | >100 | 91 | >30 | >30 |
| 33 | >100 | 12.1 | 92 | 17.3 | 4.0 |
| 34 | 3.2 | 5.4 | 93 | 12.8 | 3.2 |
| 35 | 3.6 | 2.2 | 94 | 7.92 | 4.32 |
| 36 | 8.9 | 6.1 | 95 | 7.84 | 5.28 |
| 37 | 5.8 | 4.3 | 96 | 12.8 | 8.85 |
| 38 | 5.4 | 6.7 | 97 | 10.7 | 8.31 |
| 39 | >30 | >30 | 98 | 13.2 | 5.07 |
| 47 | 2.3 | 1.6 | 99 | 7.47 | 4.9 |
| 48 | 3.3 | 2.5 | 100 | 11 | 8.87 |
| 49 | 6.3 | 4.1 | 101 | 5.17 | 4.53 |
| 50 | 4.0 | 1.8 | 102 | 16.1 | 13.4 |
| 51 | 17.9 | 7.2 | 103 | >30 | >30 |
| 52 | 10.7 | 11.8 | 104 | >30 | 8.92 |
| 53 | >30 | >30 | 105 | 8.51 | 7.51 |
| 54 | 13.1 | 8.2 | 106 | 5.44 | 9.85 |
| 55 | >30 | >30 | 107 | 6.58 | 8.11 |
| 56 | 17.9 | 19.5 | 108 | 4.09 | 8.71 |
| 57 | 3.9 | 3.9 | 109 | 5.53 | 8.65 |
| 58 | 3.8 | 2.1 | 110 | 8.06 | 7.5 |
| 59 | 6.2 | 4.6 | 111 | 6.85 | 11.4 |
| 60 | 3.9 | 3.8 | 112 | 5.11 | 8.81 |
| 61 | >30 | >30 | 113 | 7.22 | 8.37 |
| 62 | >30 | >30 | 114 | 5.93 | 10.5 |
| 63 | 12.6 | 10.9 | 115 | >30 | >30 |
| 64 | 14.0 | 9.8 | 116 | 13.4 | >30 |
| 65 | 16.2 | 22.3 | 117 | >30 | >30 |
| 66 | 15.9 | 13.6 | | | |

TABLE 2

Anti-proliferative activity of compounds 24, 26 and 143 against colorectal cancer, pancreatic cancer and prostate cancer cells

| Compound ID | IC$_{50}$/μM Caco-2 (colorectal) | IC$_{50}$/μM MIA PaCa-2 (pancreatic) | IC$_{50}$/μM PC3 (prostate) |
|---|---|---|---|
| 24 | 8.45 | 8.16 | 6.20 |
| 26 | 6.10 | 10.10 | 7.70 |
| 143 | 6.09 | 6.17 | 8.60 |

The ability of compounds of the disclosure to inhibit the proliferation of SK—N—SH neuroblastoma cells was assessed. The SK—N—SH cell line was maintained as a monolayer in Dulbeccos Modified Eagles medium (DMEM) supplemented with 10% foetal bovine serum (FBS) and grown at 37° C. in a humidified atmosphere with 5% $CO_2$. For the cytotoxicity assay, SK—N—SH cells were seeded at a density of $2 \times 10^3$ cells per well in 96-well plates. The cells were treated with serial dilutions of the test compounds (1:2 starting concentration 100 UM) and viability measured after 72 hours using a standard MTS assay. Cell viability was normalised to control (vehicle alone) and dose response curves and EC$_{50}$ values (Table 3) were determined using Graph Pad Prism 6.

TABLE 3

Anti-proliferative activity of compounds of the disclosure against SK-N-SH neuroblastoma cells

| Compound ID | IC$_{50}$/μM |
|---|---|
| 2 | 26.37 |
| 3 | 19.31 |
| 5 | 27.45 |
| 6 | 5.66 |
| 7 | 32.59 |
| 8 | 11.40 |
| 11 | >100 |
| 14 | 26.64 |
| 15 | 14.94 |
| 16 | 31.48 |
| 17 | 22.89 |
| 18 | 22.32 |
| 21 | 27.14 |
| 22 | 57.58 |
| 23 | 12.78 |
| 24 | 7.40 |
| 25 | 30.01 |
| 26 | 7.87 |
| 28 | 11.65 |
| 29 | >100 |
| 34 | 46.24 |
| 35 | 6.81 |
| 36 | 22.17 |
| 37 | 10.85 |
| 38 | 11.96 |
| 41 | 16.22 |
| 43 | 17.39 |
| 44 | 15.20 |
| 45 | 26.98 |
| 46 | 14.69 |
| 47 | 27.81 |
| 48 | 7.56 |
| 49 | 15.39 |
| 50 | 11.52 |
| 57 | 7.22 |
| 58 | 14.03 |
| 59 | 10.33 |
| 60 | 13.22 |
| 63 | 13.45 |
| 64 | 4.05 |
| 65 | 12.49 |

TABLE 3-continued

Anti-proliferative activity of compounds of the disclosure against SK-N-SH neuroblastoma cells

| Compound ID | $IC_{50}/\mu M$ |
| --- | --- |
| 67 | 15.69 |
| 68 | 19.10 |
| 69 | 17.31 |
| 71 | 8.90 |
| 78 | 21.56 |
| 83 | 13.14 |
| 89 | 15.57 |
| 92 | 16.62 |
| 93 | 18.19 |
| 96 | 12.17 |
| 100 | 7.51 |
| 107 | 6.22 |
| 108 | 9.71 |
| 109 | 11.01 |
| 113 | 9.41 |

The actin depolymerisation assay was used to confirm the ability of compound 26 to inhibit the ability of Tpm3.1 to protect actin filaments from depolymerisation. A 12 µmol/L solution of labelled F-actin was prepared by polymerising the monomeric actin (35% pyrene labelled Rabbit Muscle (Cytoskeleton Inc)) into filaments in the presence of buffer T (100 mmol/L NaCl; 10 mmol/L Tris HCl PH 7.5; 2 mmol/L $MgCl_2$; 1 mmol/L EGTA; 0.5 mmol/L DTT) with added ATP (0.2 mmol/L), for 1 hour in the dark at room temperature. Tpm3.1 (10 µmol/L) was reduced in buffer T containing 1 mmol/L DTT at 70° C. for 6 minutes and centrifuged at 60,000 rpm for 30 minutes to remove nonreduced dimers. Prior to the addition to polymerized pyrene-labelled F-actin (3 µmol/L), Tpm3.1 dimers (5 µmol/L) were incubated (overnight, room temperature) with or without 50 µmol/L of the test compound. The F-actin/Tpm3.1±test compound was incubated for one hour at room temperature and samples were then transferred to a black walled 96-well plate. Duplicate samples were diluted 12-fold using an F-actin polymerisation buffer (100 mmol/L NaCl; 10 mmol/L Tris HCl PH 7; 2 mmol/L $MgCl_2$; 1 mmol/L EGTA; 0.2 mmol/L ATP; 1 mmol/L DTT) and the depolymerisation rates of F-actin alone, F-actin/Tpm3.1, and the F-actin/Tpm3.1/test compound filament complex were measured using a Costar 3915 fluorescence plate reader (407 nm) at 36-second intervals for 160 minutes at room temperature. Data were normalized to the initial fluorescence value and polymerisation curves of duplicate samples were fitted to a two-phase exponential decay model using OriginPro 9.1 (OriginLab) (FIG. 1A). Percent polymerisation was determined at $t_{160}$ as a function of to (100%) (FIG. 1B, $p<0.0001$).

Figure 2:
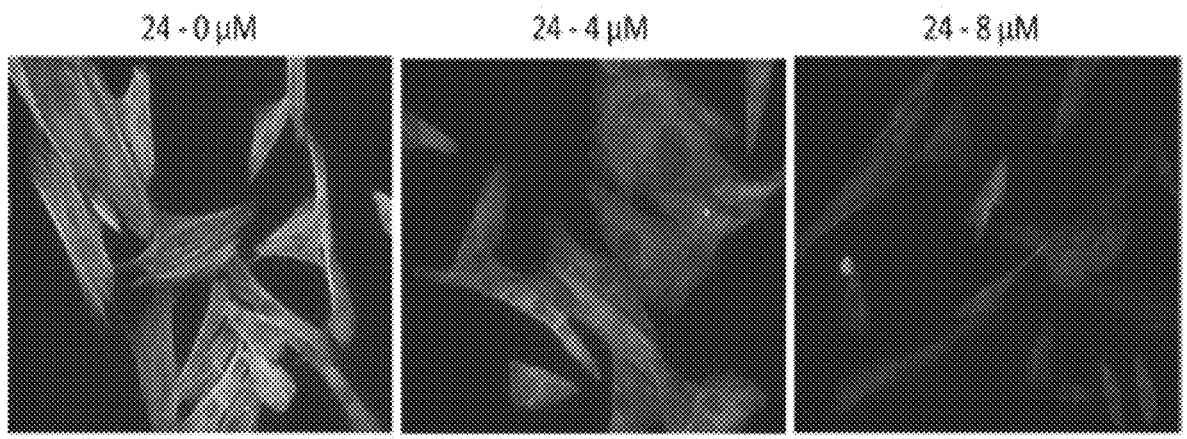
FIG. 2: Imaging and quantitation of actin filaments in SK—N—SH neuroblastoma cells treated with compounds 24 (A), 26 (B) and 143 (C). Cells were transfected with Tpm3.1 tagged with the mCherry fluorophore.
Figure 2:
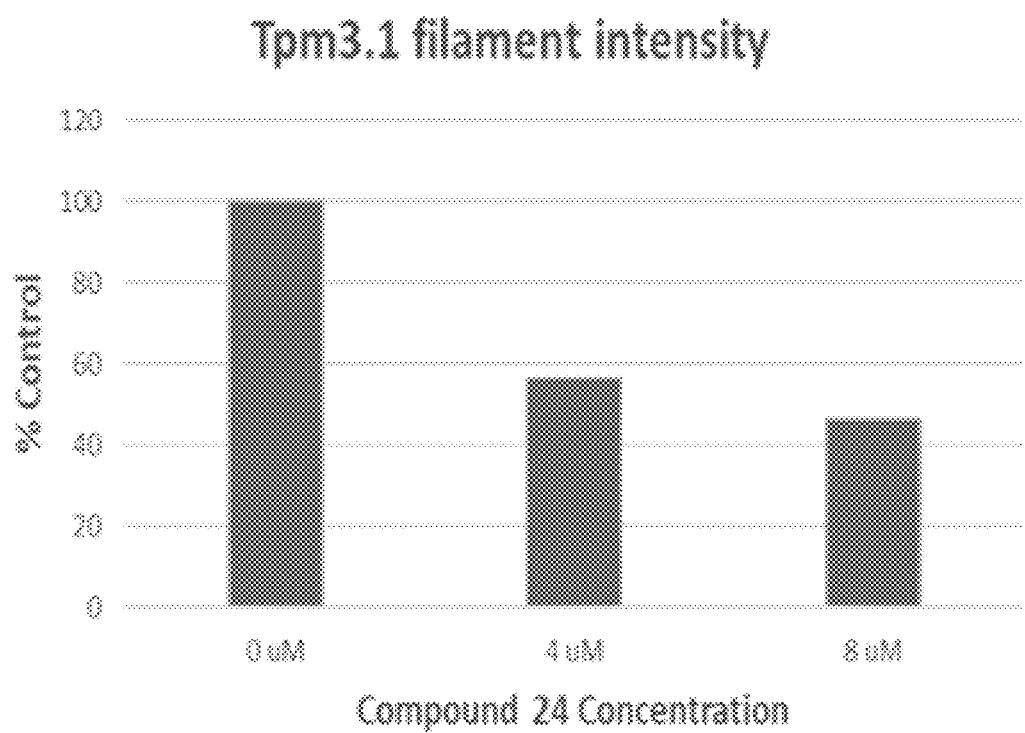
Figure 2:
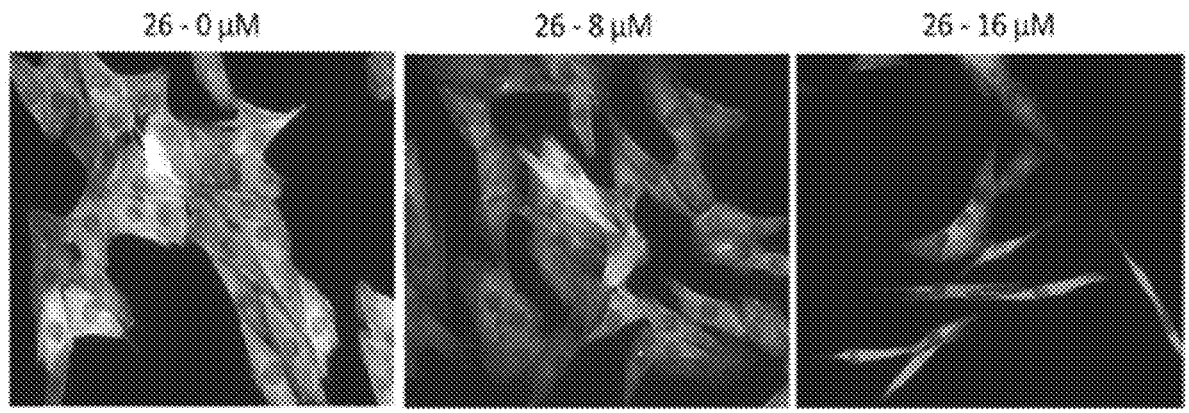
Figure 2:
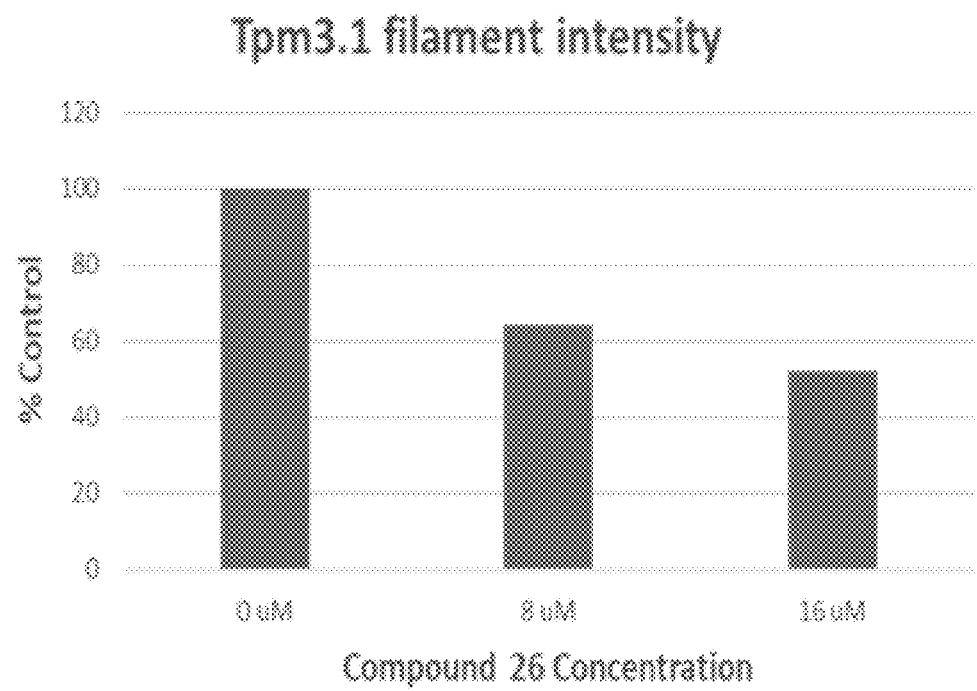
Figure 2:
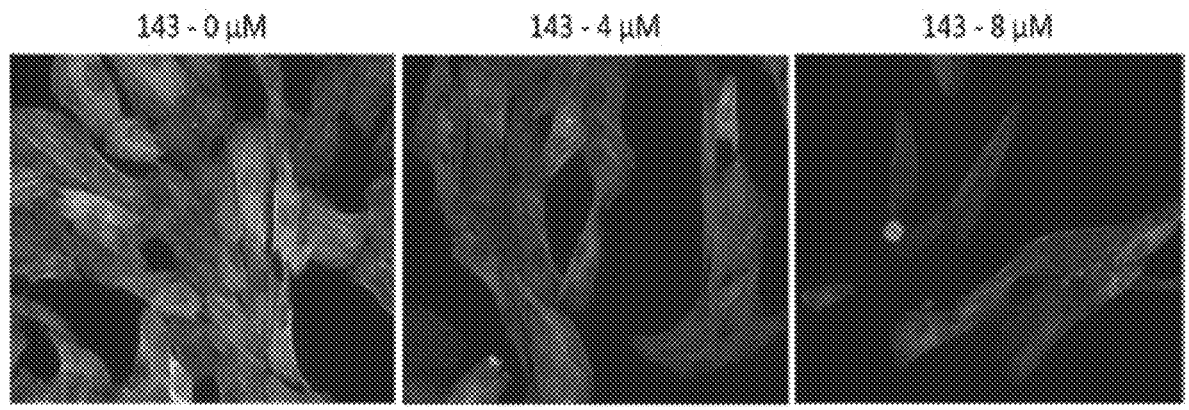
Figure 2:
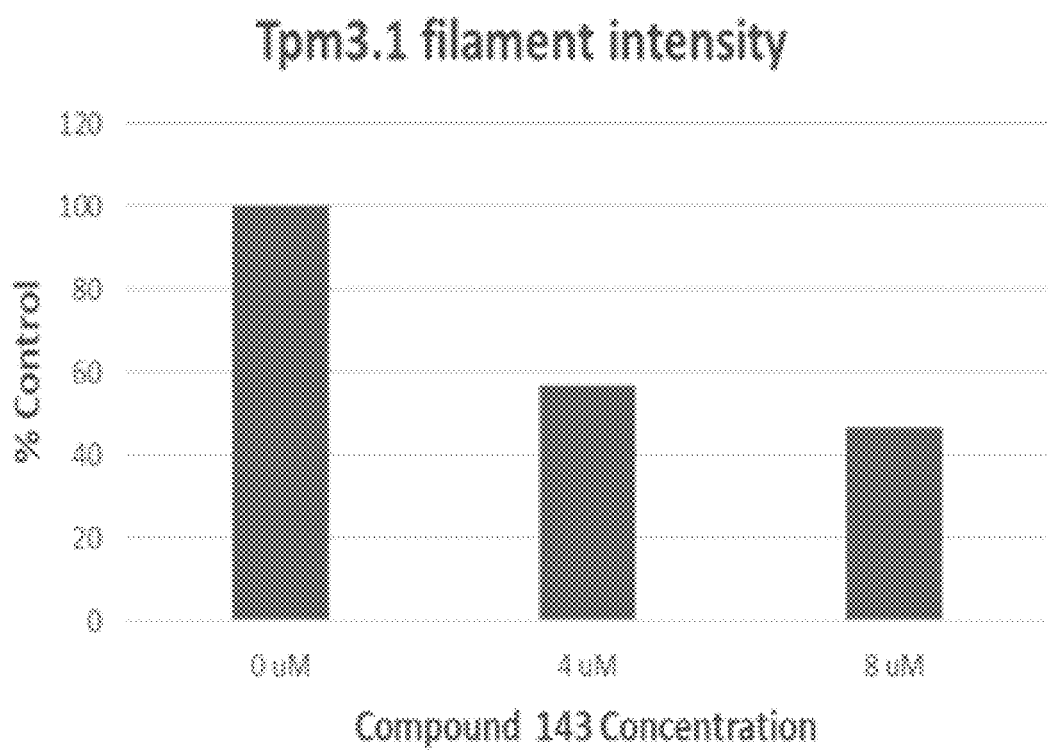
Figure 3:
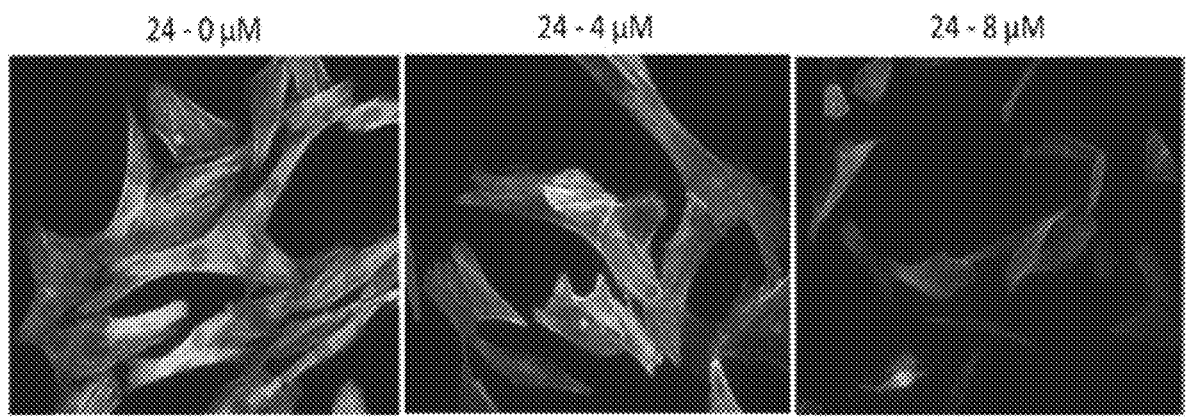
FIG. 3: Imaging and quantitation of actin filaments in SK—N—SH neuroblastoma cells treated with compounds 24 (A), 26 (B) and 143 (C). Cells were stained with 488-Atto-Phalloidin.
Figure 3:
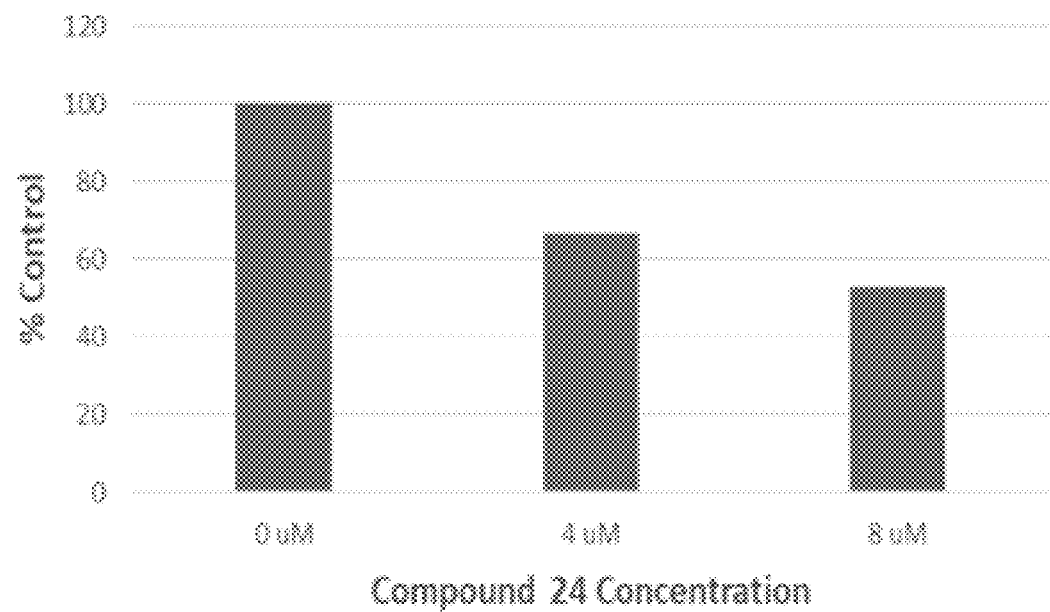
Figure 3:
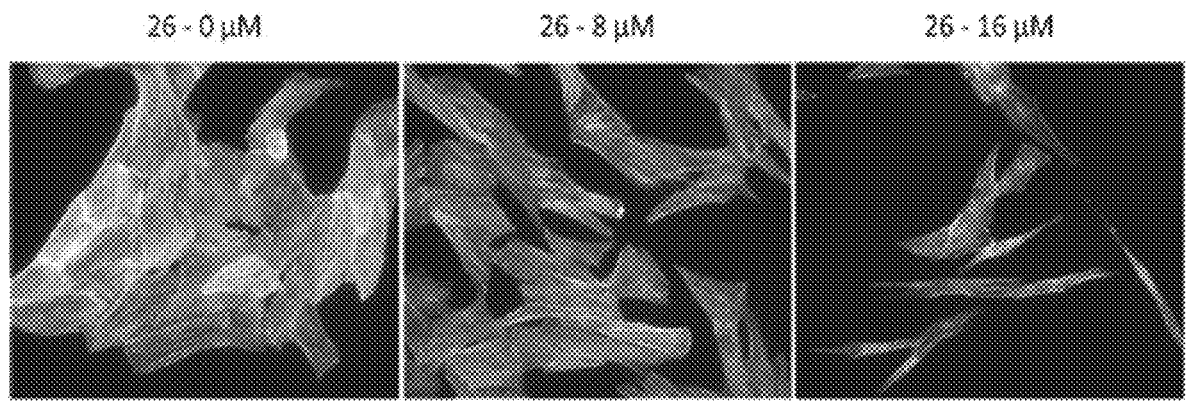
Figure 3:
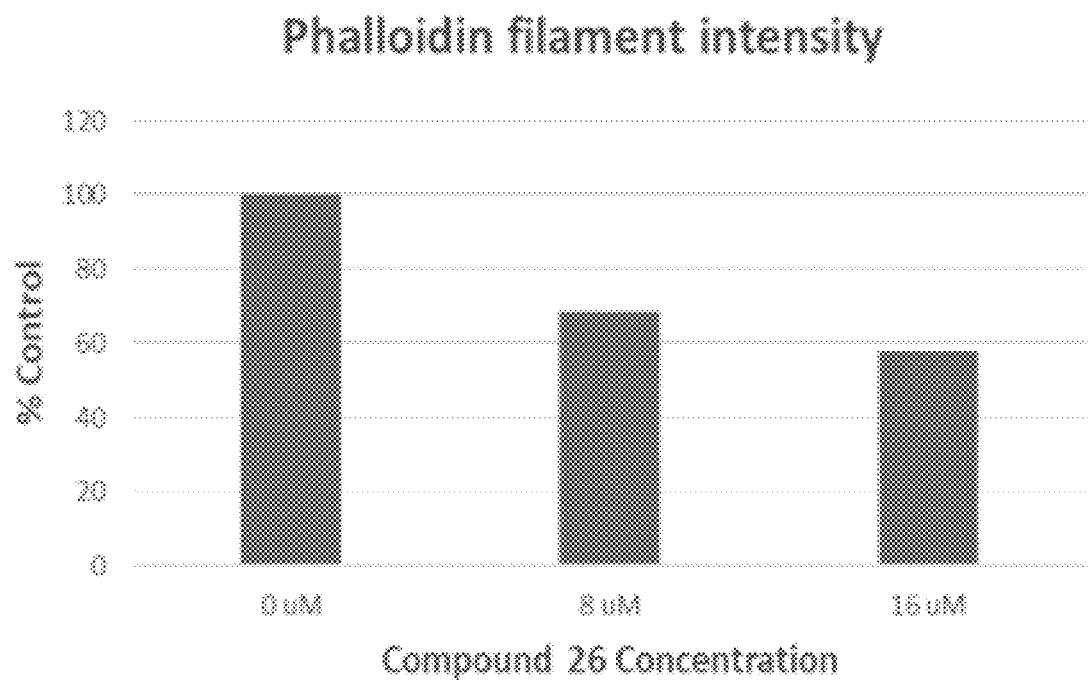
Figure 3:
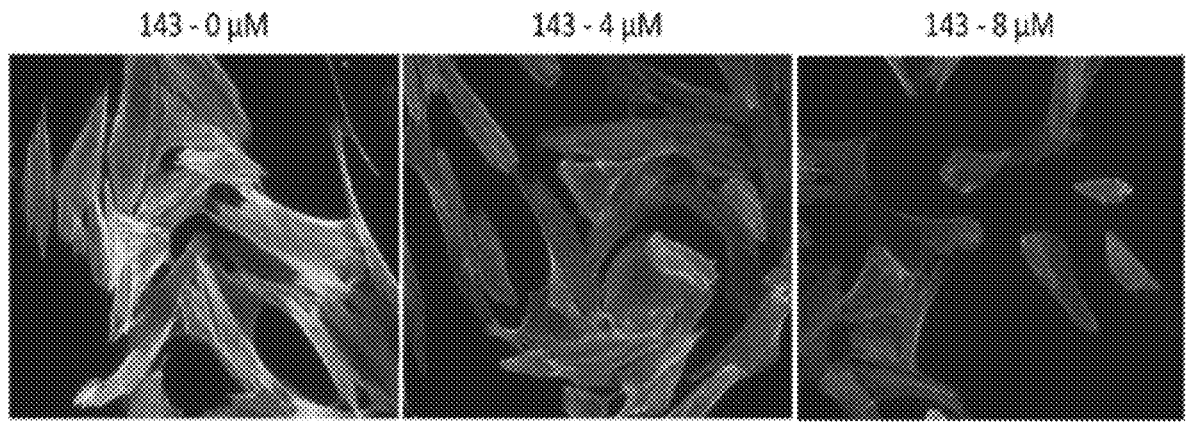
Figure 3:
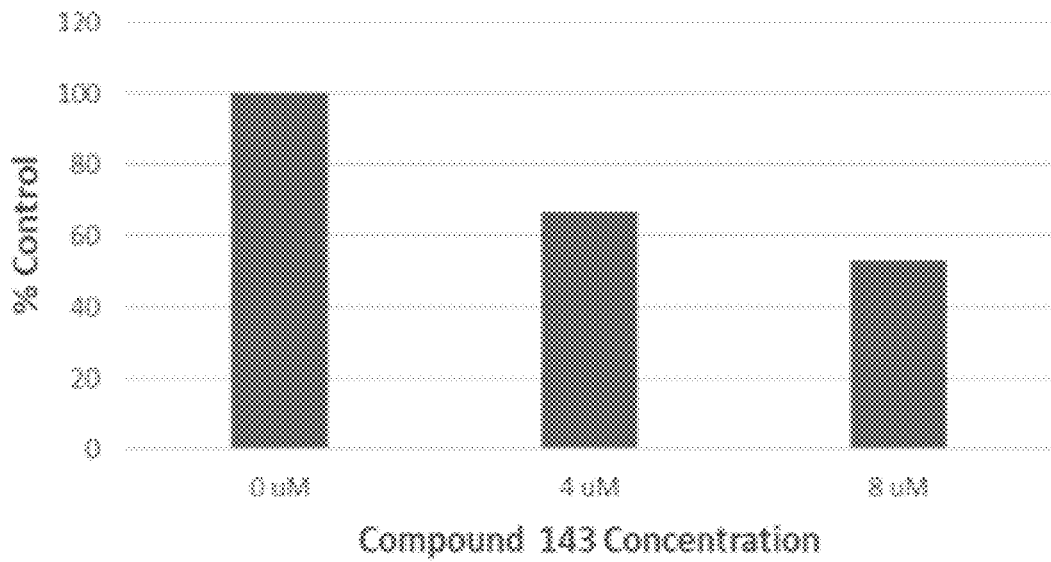

The ability of compounds 24, 26 and 143 to disrupt Tpm3.1-containing actin microfilaments was investigated in SK—N—SH neuroblastoma cells that express Tpm3.1 labelled with the mCherry fluorophore. Cells were seeded at 3×104 cells per well in a volume of 1000 µL complete media onto a 12 well plate containing 13 mm coverslips and left to plate down for 24 hours prior to treatment. Cells were then treated with DMSO and two concentrations of the test compounds. 24 hours post-treatment, cells were fixed with 16% paraformaldehyde (PBS) and stained with 488-Atto-Phalloidin to visualise the actin filament bundles. Single plane images were obtained using the Olympus IX83 epifluorescence microscope. Ten fields of view were collected for both Tpm3.1 mCherry fluorophore (FIG. 2) and 488-Atto-Phalloidin (FIG. 3) with each treatment condition.

Quantitation of either Tpm3.1 mCherry filaments or 488-Atto-Phalloidin filaments was performed using ImageJ 1.52p software (ImageJ, NIH). The mean pixel intensity from a cell was measured by using a line across the entire cell cytoplasmic area above or below the nuclear region. The line was made to cross the filament bundles at a 90° angle for the measurement rather than run along a single filament. A total of n=100 cells were measured from ten fields of view. Cells with pixel intensities that were more than twice the average intensity in the field were excluded from the measurement. The mean pixel intensity from n=100 cells was imported into Microsoft Excel to obtain the average intensity of either Tpm3.1 mCherry filaments or 488-Atto-Phalloidin filaments from each treatment condition. Values were normalised as a percent of the 0 µM control in order to generate a bar graph. Data demonstrate that compounds 24, 26 and 143 disrupt Tpm3.1-containing actin microfilaments in a dose-dependent manner.

Example 3—Activity of Compounds of the Disclosure in Combination with Vinorelbine and Paclitaxel A study was performed to determine synergistic drug interactions between the cytotoxic agents vinorelbine and paclitaxel in combination with compounds 6, 8, 24, 43 and 48 against the A2780 ovarian cancer cell line.

3.1 Materials and Methods

In Vitro Growth Inhibition Assay

In vitro growth inhibition assays were performed as technical triplicate in two independent experiments and cell viability was assessed by Alamar Blue assay readout. Briefly, cells in logarithmic phase growth were seeded in 384-well plates in a 50 µL/well assay volume. Cells were seeded at 1,200 cells/well using a Multidrop 384 (Thermo Scientific) and allowed to adhere at 37° C. with 5% $CO_2$, in a humidified atmosphere (LiCONIC incubator). After 24 hours incubation, test compounds, positive control (20 µM Thonzonium bromide, 100% kill) and vehicle only (0.4% DMSO) were added into wells of each assay plate using a Tecan HP D300 Digital Dispenser in technical triplicate under minimum light. Following 72 hours drug exposure, metabolic activity was detected by addition of 10% (v/v) Alamar Blue reagent to each assay well using a Multidrop Cambi (Thermo Scientific) and determined by measurement of fluorescence intensity (excitation 555 nm, emission 585 nm) using an EnSpire (Perkin Elmer) plate reader. Readings were performed at 0 hour (background) and after 6 hours alamar blue incubation at 37° C.

$IC_{50}$ Determination $IC_{50}$ concentrations of the compounds together with vinorelbine and paclitaxel as single agents against all cell lines were determined for a 72 h drug exposure using the growth inhibition assay with Alamar Blue readout in triplicate in two independent experiments. Each drug was tested as a 10-point concentration series with two-fold serial dilutions of each drug. The concentration series for compounds 6 and 8 was 100, 50, 25, 12.5, 6.25, 3.125, 1.563, 0.781, 0.391 and 0.195 µM and for compounds 24, 43 and 48 was 50, 25, 12.5, 6.25, 3.125, 1.563, 0.781, 0.391, 0.195 and 0.098 µM for the two independent experiments. The concentration series for vinorelbine and paclitaxel was 100, 50, 25, 12.5, 6.25, 3.125, 1.5625, 0.781, 0.391 and 0.195 nM. Thonzonium bromide (20 µM) and 0.4% DMSO were used as positive and vehicle controls, respectively. The $IC_{50}$ value was calculated by derivation of the best-fit line using a sigmoidal dose response model (Activity Base Software Suite, IDES).

Drug Combination Screen

Each drug combination was tested against A2780 cells using a 6×6 dose matrix with 2-fold dilution steps based on the calculated $IC_{50}$ values using the growth inhibition assay with 72 h drug exposure in a 384-well format. The two drugs in each combination matrix were dispensed using a Tecan HP D300 Digital Dispenser. Assays were performed in triplicate for each drug combination (test compound/vinorelbine and test compound/paclitaxel combinations). Synergistic drug interactions were calculated from the averaged cell viability data using the methodology described below.

3.2 Data Analyses

Activity Base software suite (IDES, version 8.3.0.175) was used for data analysis. Cell survival is expressed as a percentage of viable cells. $IC_{50}$ concentrations were calculated by derivation of the best-fit line using a sigmoidal dose response model with technical triplicate data points.

Methodology for Calculation of Synergistic Drug Interactions

Synergistic drug interactions were determined for each pairwise drug combination by applying the Bliss-independence model that assumes independence of drug mechanisms. Prior to the analysis, percent cell viability (CV) for combination data were converted to fractional cell growth inhibition (GI) by the formula:

$$GI = 1 - (CV/100)$$

The Bliss additivism model was used to calculate a predicted combined response C to two single agents with responses A and B (using GI values), as follows:

$$C = A + B - (A \times B)$$

Experimentally observed values in excess of the predicted additive value for each combination demonstrated a synergistic effect while values that were lower than the predicted additive value demonstrated antagonism of inhibition of cell viability relative to single agent alone. The final score for any combination was reported as the difference between the value predicted by the additive model and the experimentally observed value, normalised to 100. Using GI values the maximum possible synergy score is 100, with 0 indicating no synergy and negative indicating possible antagonism. Scores were also reported as a "Max synergy" score, which is the highest individual synergy score for each combination matrix, and a "Total synergy" score, which was obtained by summation of each individual synergy score for the matrix.

3.3 Results

The single agent $IC_{50}$ values for the test compounds and their synergy scores in combination with vinorelbine and paclitaxel are presented in Table 4. The data is listed as $IC_{50}$ mean from technical triplicates for two independent experiments. The averaged $IC_{50}$ concentrations for the single agents from both runs were then used to generate the 6×6 dose matrices in the synergy experiment. Synergy scores for each drug combination were calculated by the Bliss-independence model. The maximum synergy and total synergy scores for each combination in A2780 cells are listed.

TABLE 4

Single-agent $IC_{50}$ values and synergy scores for drug combinations in A2780 ovarian cancer cells.

| | | Vinorelbine | | Paclitaxel | |
|---|---|---|---|---|---|
| Compound ID | $IC_{50}/\mu M$ | Max. Synergy | Total Synergy | Max. Synergy | Total Synergy |
| 6 | 12.0 | 42.36 | 250.66 | 6.78 | −46.04 |
| 8 | 14.5 | 32.29 | 225.43 | 8.95 | −3.62 |
| 24 | 7.54 | 14.27 | 61.75 | 16.56 | 111.86 |
| 26* | 12.5 | 10.86 | 60.91 | 7.83 | 61.23 |
| 43 | 13.0 | 10.94 | 73.13 | 12.46 | 3.06 |
| 48 | 14.9 | 17.28 | 68.74 | 31.55 | 263.84 |

*Assay performed in 96-well plate format. Dose matrix $IC_{50}$ concentrations: 26: 12.5 µM; vinorelbine and paclitaxel: 4 nM.

Embodiments of the disclosure include the following:
1. A compound having the following formula (I):

$$R—(SO_2)-T-X—Y—Z \qquad (I)$$

or a pharmaceutically acceptable salt, hydrate, derivative, solvate or prodrug thereof, wherein:

R is selected from the group consisting of: $C_1$-$C_6$ alkyl, phenyl, a heteroaryl group having between 5 and 14 ring atoms in which one or more of the ring atoms are nitrogen and a heterocyclyl group having between 5 and 14 ring atoms in which one or more of the ring atoms are nitrogen, wherein the phenyl, heteroaryl and heterocyclyl groups are optionally substituted with one or more substituents independently selected from the group consisting of: $C_1$-$C_6$ alkyl and —C(=O)—$NR_1R_2$;

T is selected from the group consisting of: a heteroaryl group having 5 or 6 ring atoms in which one or more of the ring atoms are nitrogen and a heterocyclyl group having 5 or 6 ring atoms in which one or more of the ring atoms are nitrogen;

X is selected from the group consisting of: C=O and a straight-chain or branched-chain alkanediyl group having between 1 and 4 carbon atoms;

Y is selected from the group consisting of: NH, O, S and a straight-chain or branched-chain alkanediyl group having between 1 and 4 carbon atoms;

Z is selected from the group consisting of: $C_1$-$C_6$ alkyl, $C_3$-$C_6$ cycloalkyl, phenyl, —$(CH_2)_n$ phenyl, pyridyl, pyrimidinyl, pyridazinyl and pyrazinyl, wherein the $C_3$-$C_6$ cycloalkyl, phenyl, —$(CH_2)_n$ phenyl, pyridyl, pyrimidinyl, pyridazinyl and pyrazinyl groups are optionally substituted with one or more substituents independently selected from the group consisting of: $C_1$-$C_6$ alkyl, $C_2$-$C_6$ alkenyl, OH, halo$C_1$-$C_6$ alkyl, halo, CN, $NH_2$ and $C_1$-$C_6$ alkoxy, n is an integer between 1 and 6; and $R_1$ and $R_2$ are independently selected from the group consisting of: H and $C_1$-$C_6$ alkyl, with the proviso that the following compounds are disclaimed:

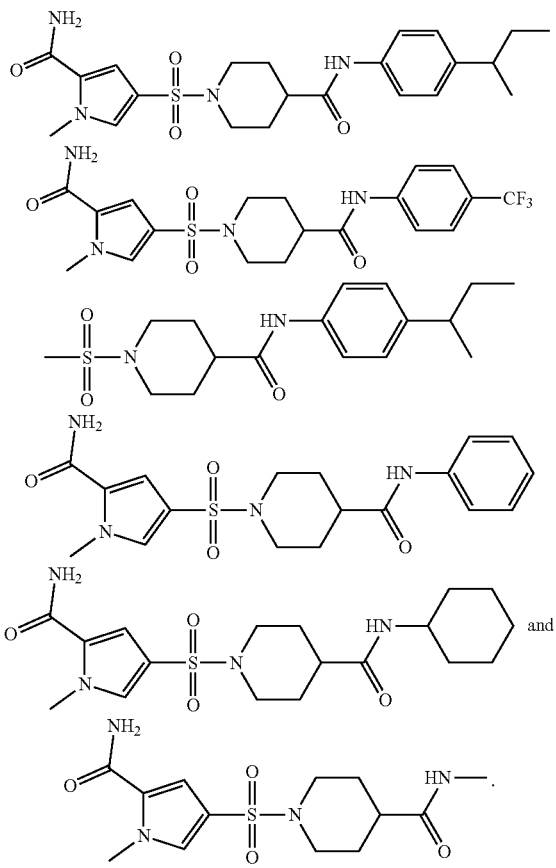

2. The compound of claim 1, wherein X is C=O or a straight-chain or branched-chain alkanediyl group having between 1 and 3 carbon atoms.

3. The compound of claim 2, wherein X is C=O, —$CH_2$— or —$CH_2CH_2$—.

4. The compound of claim 3, wherein X is C=O or —$CH_2$—.

5. The compound of any one of claims 1 to 4, wherein Y is NH, O, S or a straight-chain or branched-chain alkanediyl group having between 1 and 3 carbon atoms.

6. The compound of claim 5, wherein Y is NH, O or —$CH_2$—.

7. The compound of claim 6, wherein Y is NH or —$CH_2$—.

8. The compound of any one of claims 1 to 7, wherein T is selected from the group consisting of: a heteroaryl group having 5 or 6 ring atoms in which between one and three of the ring atoms are nitrogen and a heterocyclyl group having 5 or 6 ring atoms in which between one and three of the ring atoms are nitrogen.

9. The compound of claim 8, wherein T is selected from the group consisting of: a heteroaryl group having 5 or 6 ring atoms in which one or two of the ring atoms are nitrogen and a heterocyclyl group having 5 or 6 ring atoms in which one or two of the ring atoms are nitrogen.

10. The compound of claim 9, wherein T is selected from the group consisting of: a heteroaryl group having 5 ring atoms in which one or two of the ring atoms are nitrogen and a heterocyclyl group having 6 ring atoms in which one or two of the ring atoms are nitrogen.

11. The compound of any one of claims 1 to 10, wherein T is connected to X or $SO_2$ via a nitrogen atom of T.

12. The compound of any one of claims 1 to 11, wherein T is selected from the group consisting of:

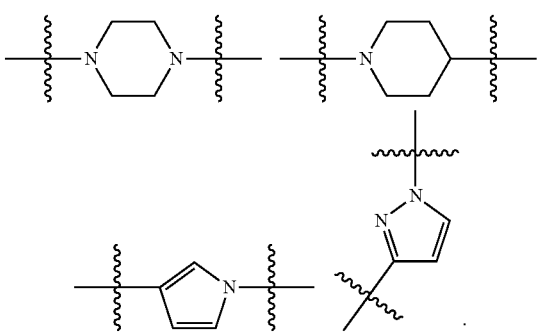

13. The compound of any one of claims 1 to 12, wherein Z is selected from the group consisting of: $C_1$-$C_6$ alkyl, $C_3$-$C_6$ cycloalkyl, phenyl, —$(CH_2)_n$ phenyl, pyridyl, pyrimidinyl, pyridazinyl and pyrazinyl, wherein the $C_3$-$C_6$ cycloalkyl, phenyl, —$(CH_2)_n$ phenyl, pyridyl, pyrimidinyl, pyridazinyl and pyrazinyl groups are optionally substituted with one or more substituents independently selected from the group consisting of: $C_1$-$C_6$ alkyl, OH, halo$C_1$-$C_6$ alkyl, halo, CN and OMe.

14. The compound of claim 13, wherein Z is selected from the group consisting of: $C_1$-$C_6$ alkyl, $C_3$-$C_6$ cycloalkyl, phenyl, —$(CH_2)$phenyl, pyridyl, pyrimidinyl, pyridazinyl and pyrazinyl, wherein the $C_3$-$C_6$ cycloalkyl, phenyl, —$(CH_2)_n$ phenyl, pyridyl, pyrimidinyl, pyridazinyl and pyrazinyl groups are optionally substituted with one or more substituents independently selected from the group consisting of: $C_1$-$C_4$ alkyl, OH, $CF_3$, halo and CN.

15. The compound of claim 14, wherein Z is selected from the group consisting of: $C_1$-$C_6$ alkyl, $C_3$-$C_6$ cycloalkyl, phenyl, —$(CH_2)_n$ phenyl, pyridyl, pyrimidinyl, pyridazinyl and pyrazinyl, wherein the $C_3$-$C_6$ cycloalkyl, phenyl, —$(CH_2)_n$ phenyl, pyridyl, pyrimidinyl, pyridazinyl and pyrazinyl groups are optionally substituted with one or more substituents independently selected from the group consisting of: $C_1$-$C_4$ alkyl, OH, $CF_3$, F, Cl and CN.

16. The compound of claim 15, wherein Z is selected from the group consisting of: $C_1$-$C_3$ alkyl, $C_3$-$C_6$ cycloalkyl, phenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or more substituents independently selected from the group consisting of: $C_1$-$C_6$ alkyl, OH, halo$C_1$-$C_3$ alkyl, halo, CN and OMe.

17. The compound of claim 16, wherein Z is selected from the group consisting of: $C_1$-$C_3$ alkyl, $C_3$-$C_6$ cycloalkyl, phenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or more substituents independently selected from the group consisting of: $C_1$-$C_4$ alkyl, OH, $CF_3$, halo and CN.

18. The compound of claim 17, wherein Z is selected from the group consisting of: $C_1$-$C_3$ alkyl, $C_3$-$C_6$ cycloalkyl, phenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or two substituents independently selected from the group consisting of: $C_1$-$C_6$ alkyl, OH, halo$C_1$-$C_6$ alkyl, halo, CN and OMe.

19. The compound of claim 18, wherein Z is selected from the group consisting of: $C_1$-$C_3$ alkyl, $C_3$-$C_6$ cycloalkyl, phenyl, —$(CH_2)_n$ phenyl and pyridyl, wherein the $C_3$-$C_6$ cycloalkyl, phenyl, —$(CH_2)_n$ phenyl and pyridyl groups are optionally substituted with one or two substituents independently selected from the group consisting of: $C_1$-$C_4$ alkyl, OH, $CF_3$, F, Cl and CN.

20. The compound of any one of claims 1 to 12, wherein Z is selected from the group consisting of: methyl, ethyl, $C_5$-$C_6$ cycloalkyl, phenyl and pyridyl, wherein the $C_5$-$C_6$ cycloalkyl, phenyl and pyridyl groups are optionally substituted with one or more substituents independently selected from the group consisting of: $C_1$-$C_6$ alkyl, OH, halo$C_1$-$C_6$ alkyl, halo, CN and OMe.

21. The compound of claim 20, wherein Z is selected from the group consisting of: methyl, ethyl, $C_5$-$C_6$ cycloalkyl, phenyl and pyridyl, wherein the $C_5$-$C_6$ cycloalkyl, phenyl and pyridyl groups are optionally substituted with one or more substituents independently selected from the group consisting of: $C_1$-$C_6$ alkyl, OH, halo$C_1$-$C_3$ alkyl, halo, CN and OMe.

22. The compound of claim 21, wherein Z is selected from the group consisting of: methyl, ethyl, $C_5$-$C_6$ cycloalkyl, phenyl and pyridyl, wherein the $C_5$-$C_6$ cycloalkyl, phenyl and pyridyl groups are optionally substituted with one or more substituents independently selected from the group consisting of: $C_1$-$C_4$ alkyl, OH, $CF_3$, F, Cl and CN.

23. The compound of any one of claims 1 to 12, wherein Z is selected from the group consisting of: methyl, cyclohexyl, phenyl and pyridyl, wherein the cyclohexyl, phenyl and pyridyl groups are optionally substituted with one or more substituents independently selected from the group consisting of: $C_1$-$C_6$ alkyl, OH, halo$C_1$-$C_6$ alkyl, halo, CN and OMe.

24. The compound of claim 23, wherein Z is selected from the group consisting of: methyl, cyclohexyl, phenyl and pyridyl, wherein the cyclohexyl, phenyl and pyridyl groups are optionally substituted with one or more substituents independently selected from the group consisting of: $C_1$-$C_4$ alkyl, OH, $CF_3$, F, Cl and CN.

25. The compound of any one of claims 1 to 12, wherein Z is selected from the group consisting of: methyl, cyclohexyl, phenyl and pyridyl, wherein the cyclohexyl, phenyl and pyridyl groups are optionally substituted with one or two substituents independently selected from the group consisting of: $C_1$-$C_6$ alkyl, OH, halo$C_1$-$C_6$ alkyl, halo, CN and OMe.

26. The compound of claim 25, wherein Z is selected from the group consisting of: methyl, cyclohexyl, phenyl and pyridyl, wherein the cyclohexyl, phenyl and pyridyl groups are optionally substituted with one or two substituents independently selected from the group consisting of: $C_1$-$C_4$ alkyl, OH, $CF_3$, F, Cl and CN.

27. The compound of any one of claims 1 to 12, wherein Z is selected from the group consisting of: phenyl and pyridyl, wherein the phenyl and pyridyl groups are optionally substituted with one or more substituents independently selected from the group consisting of: $C_1$-$C_6$ alkyl, OH, halo$C_1$-$C_6$ alkyl, halo, CN and OMe.

28. The compound of claim 27, wherein Z is selected from the group consisting of: phenyl and pyridyl, wherein the phenyl and pyridyl groups are optionally substituted with one or more substituents independently selected from the group consisting of: $C_1$-$C_4$ alkyl, OH, $CF_3$, F, Cl and CN.

29. The compound of any one of claims 1 to 12, wherein Z is selected from the group consisting of: phenyl and pyridyl, wherein the phenyl and pyridyl groups are optionally substituted with one or two substituents independently selected from the group consisting of: $C_1$-$C_6$ alkyl, OH, halo$C_1$-$C_6$ alkyl, halo, CN and OMe.

30. The compound of claim 29, wherein Z is selected from the group consisting of: phenyl and pyridyl, wherein the phenyl and pyridyl groups are optionally substituted with one or two substituents independently selected from the group consisting of: $C_1$-$C_4$ alkyl, OH, $CF_3$, F, Cl and CN.

31. The compound of any one of claims 1 to 12, wherein Z is selected from the group consisting of:

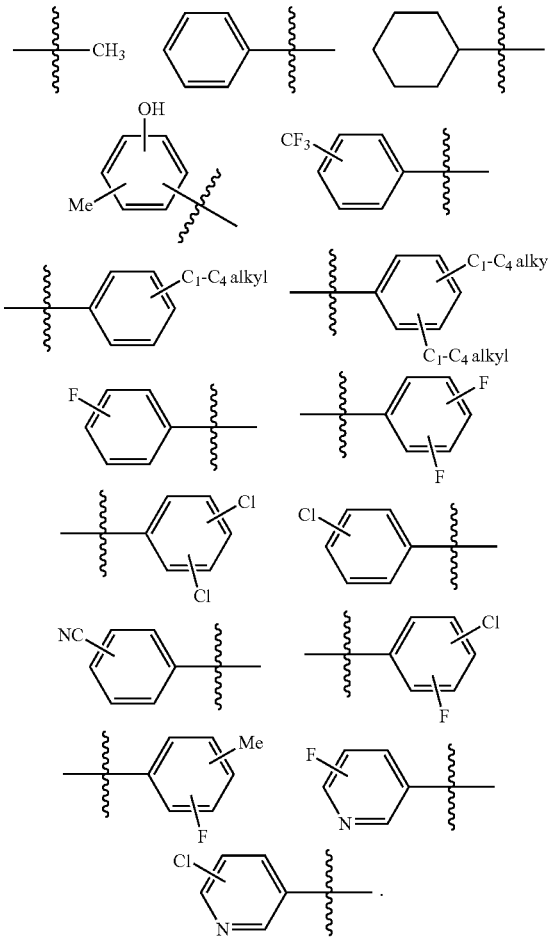

32. The compound of any one of claims 1 to 12, wherein Z is selected from the group consisting of:

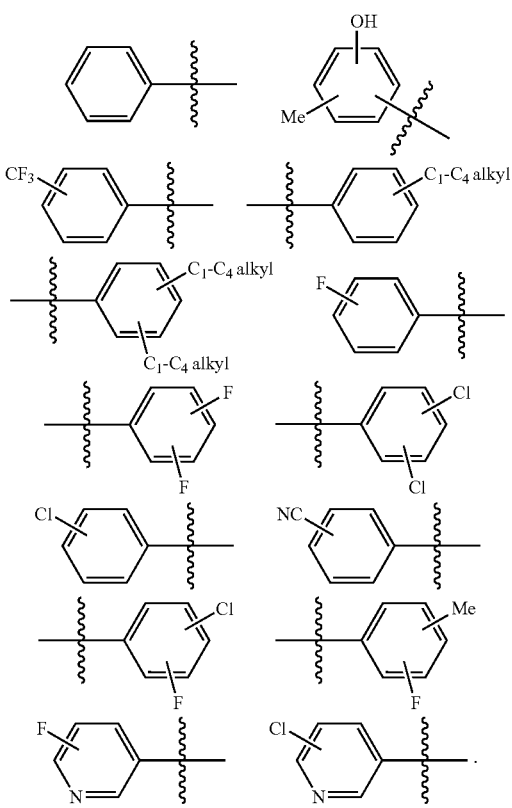

33. The compound of any one of claims 1 to 32, wherein R is selected from the group consisting of: $C_1$-$C_6$ alkyl, phenyl, a heteroaryl group having between 5 and 14 ring atoms in which one or more of the ring atoms are nitrogen and a heterocyclyl group having between 5 and 14 ring atoms in which one or more of the ring atoms are nitrogen, wherein the phenyl, heteroaryl and heterocyclyl groups are optionally substituted with one or more substituents independently selected from the group consisting of: $C_1$-$C_6$ alkyl and —C(=O)—$NR_1R_2$.

34. The compound of claim 33, wherein R is selected from the group consisting of: methyl, phenyl, a heteroaryl group having between 5 and 10 ring atoms in which between one and three of the ring atoms are nitrogen and a heterocyclyl group having between 5 and 10 ring atoms in which between one and three of the ring atoms are nitrogen, wherein the phenyl, heteroaryl and heterocyclyl groups are optionally substituted with one or more substituents independently selected from the group consisting of: $C_1$-$C_4$ alkyl and —C(=O)—$NR_1R_2$.

35. The compound of claim 34, wherein R is selected from the group consisting of: methyl, phenyl, a heteroaryl group having between 5 and 10 ring atoms in which one or two of the ring atoms are nitrogen and a heterocyclyl group having 9 or 10 ring atoms in which one or two of the ring atoms are nitrogen, wherein the phenyl, heteroaryl and heterocyclyl groups are optionally substituted with one or more substituents independently selected from the group consisting of: $C_1$-$C_4$ alkyl and —C(=O)—$NR_1R_2$.

36. The compound of any one of claims 1 to 32, wherein R is selected from the group consisting of: $C_1$-$C_6$ alkyl, a heteroaryl group having between 5 and 14 ring atoms in which one or more of the ring atoms are nitrogen and a heterocyclyl group having between 5 and 14 ring atoms in which one or more of the ring atoms are nitrogen, wherein the heteroaryl and heterocyclyl groups are optionally substituted with one or more substituents independently selected from the group consisting of: $C_1$-$C_6$ alkyl and —C(=O)—$NR_1R_2$.

37. The compound of claim 36, wherein R is selected from the group consisting of: methyl, a heteroaryl group having between 5 and 10 ring atoms in which between one and three of the ring atoms are nitrogen and a heterocyclyl group having between 5 and 10 ring atoms in which between one and three of the ring atoms are nitrogen, wherein the heteroaryl and heterocyclyl groups are optionally substituted with one or more substituents independently selected from the group consisting of: $C_1$-$C_4$ alkyl and —C(=O)—$NR_1R_2$.

38. The compound of claim 37, wherein R is selected from the group consisting of: methyl, a heteroaryl group having between 5 and 10 ring atoms in which one or two of the ring atoms are nitrogen and a heterocyclyl group having 9 or 10 ring atoms in which one or two of the ring atoms are nitrogen, wherein the heteroaryl and heterocyclyl groups are optionally substituted with one or more substituents independently selected from the group consisting of: $C_1$-$C_4$ alkyl and —C(=O)—$NR_1R_2$.

39. The compound of any one of claims 1 to 32, wherein R is selected from the group consisting of: $C_1$-$C_6$ alkyl, a heteroaryl group having between 5 and 14 ring atoms in which one or more of the ring atoms are nitrogen and a heterocyclyl group having between 5 and 14 ring atoms in which one or more of the ring atoms are nitrogen, wherein the heteroaryl and heterocyclyl groups are optionally substituted with one or two substituents independently selected from the group consisting of: $C_1$-$C_6$ alkyl and —C(=O)—$NR_1R_2$.

40. The compound of claim 39, wherein R is selected from the group consisting of: methyl, a heteroaryl group having between 5 and 10 ring atoms in which between one and three of the ring atoms are nitrogen and a heterocyclyl group having between 5 and 10 ring atoms in which between one and three of the ring atoms are nitrogen, wherein the heteroaryl and heterocyclyl groups are optionally substituted with one or two substituents independently selected from the group consisting of: $C_1$-$C_4$ alkyl and —C(=O)—$NR_1R_2$.

41. The compound of claim 40, wherein R is selected from the group consisting of: methyl, a heteroaryl group having between 5 and 10 ring atoms in which one or two of the ring atoms are nitrogen and a heterocyclyl group having 9 or 10 ring atoms in which one or two of the ring atoms are nitrogen, wherein the heteroaryl and heterocyclyl groups are optionally substituted with one or two substituents independently selected from the group consisting of: $C_1$-$C_4$ alkyl and —C(=O)—$NR_1R_2$.

42. The compound of any one of claims 1 to 32, wherein R is selected from the group consisting of: a heteroaryl group having between 5 and 14 ring atoms in which one or more of the ring atoms are nitrogen and a heterocyclyl group having between 5 and 14 ring atoms in which one or more of the ring atoms are nitrogen, wherein the heteroaryl and heterocyclyl groups are optionally substituted with one or more substituents independently selected from the group consisting of: $C_1$-$C_6$ alkyl and —C(=O)—$NR_1R_2$.

43. The compound of claim 42, wherein R is selected from the group consisting of: a heteroaryl group having between 5 and 10 ring atoms in which between one and three of the ring atoms are nitrogen and a heterocyclyl group having between 5 and 10 ring atoms in which between one and three of the ring atoms are nitrogen, wherein the heteroaryl and heterocyclyl groups are optionally substituted with one or more substituents independently selected from the group consisting of: $C_1$-$C_4$ alkyl and —C(=O)—$NR_1R_2$.

44. The compound of claim 43, wherein R is selected from the group consisting of: a heteroaryl group having between 5 and 10 ring atoms in which one or two of the ring atoms are nitrogen and a heterocyclyl group having between 5 and 10 ring atoms in which one or two of the ring atoms are nitrogen, wherein the heteroaryl and heterocyclyl groups are optionally substituted with one or more substituents independently selected from the group consisting of: $C_1$-$C_4$ alkyl and —C(=O)—$NR_1R_2$.

45. The compound of claim 44, wherein R is selected from the group consisting of: a heteroaryl group having between 5 and 10 ring atoms in which one or two of the ring atoms are nitrogen and a heterocyclyl group having between 5 and 10 ring atoms in which one or two of the ring atoms are nitrogen, wherein the heteroaryl and heterocyclyl groups are optionally substituted with one or two substituents independently selected from the group consisting of: $C_1$-$C_4$ alkyl and —C(=O)—$NR_1R_2$.

46. The compound of claim 45, wherein R is selected from the group consisting of: a heteroaryl group having between 5 and 10 ring atoms in which one or two of the ring atoms are nitrogen and a heterocyclyl group having 9 or 10 ring atoms in which one or two of the ring atoms are nitrogen, wherein the heteroaryl and heterocyclyl groups are optionally substituted with one or two substituents independently selected from the group consisting of: $C_1$-$C_4$ alkyl and —C(=O)—$NR_1R_2$.

47. The compound of any one of claims 1 to 32, wherein R is selected from the group consisting of: $C_1$-$C_6$ alkyl, a heteroaryl group having between 5 and 14 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

48. The compound of claim 47, wherein R is selected from the group consisting of: methyl, a heteroaryl group having between 5 and 10 ring atoms in which between one and three of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

49. The compound of claim 48, wherein R is selected from the group consisting of: methyl, a heteroaryl group having between 5 and 10 ring atoms in which one or two of the ring atoms are nitrogen and 2,3-dihydroindolyl, wherein the heteroaryl and 2,3-dihydroindolyl groups are optionally substituted with one or more substituents independently selected from the group consisting of: $C_1$-$C_2$ alkyl and —C(=O)—$NR_1R_2$.

50. The compound of any one of claims 1 to 32, wherein R is selected from the group consisting of: a heteroaryl group having between 5 and 14 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

51. The compound of claim 50, wherein R is selected from the group consisting of: a heteroaryl group having between 5 and 10 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

52. The compound of claim 51, wherein R is selected from the group consisting of: a heteroaryl group having between 5 and 10 ring atoms in which between one and three of the ring atoms are nitrogen and 2,3-dihydroindolyl, wherein the heteroaryl and 2,3-dihydroindolyl groups are optionally substituted with one or more substituents independently selected from the group consisting of: $C_1$-$C_3$ alkyl and —C(=O)—$NR_1R_2$.

53. The compound of claim 52, wherein R is selected from the group consisting of: a heteroaryl group having between 5 and 10 ring atoms in which one or two of the ring atoms are nitrogen and 2,3-dihydroindolyl, wherein the heteroaryl and 2,3-dihydroindolyl groups are optionally substituted with one or more substituents independently selected from the group consisting of: $C_1$-$C_2$ alkyl and —C(=O)—$NR_1R_2$.

54. The compound of any one of claims 1 to 32, wherein R is selected from the group consisting of: $C_1$-$C_6$ alkyl, a heteroaryl group having between 5 and 14 ring atoms in which one or more of the ring atoms are nitrogen and 2,3-dihydroindolyl, wherein the heteroaryl and 2,3-dihydroindolyl groups are optionally substituted with one or more substituents independently selected from the group consisting of: methyl, —C(=O)—$NH_2$ and —C(=O)—$NMe_2$.

55. The compound of claim 54, wherein R is selected from the group consisting of: methyl, a heteroaryl group having between 5 and 9 ring atoms in which between one and three of the ring atoms are nitrogen and 2,3-dihydroindolyl, wherein the heteroaryl and 2,3-dihydroindolyl groups are optionally substituted with one or two substituents independently selected from the group consisting of: methyl, —C(=O)—$NH_2$ and —C(=O)—$NMe_2$.

56. The compound of claim 55, wherein R is selected from the group consisting of: methyl, a heteroaryl group having between 5 and 9 ring atoms in which one or two of the ring atoms are nitrogen and 2,3-dihydroindolyl, wherein the heteroaryl and 2,3-dihydroindolyl groups are optionally substituted with one or two substituents independently selected from the group consisting of: methyl, —C(=O)—$NH_2$ and —C(=O)—$NMe_2$.

57. The compound of any one of claims 1 to 32, wherein R is selected from the group consisting of:

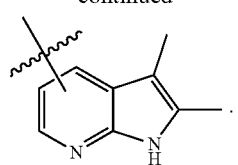
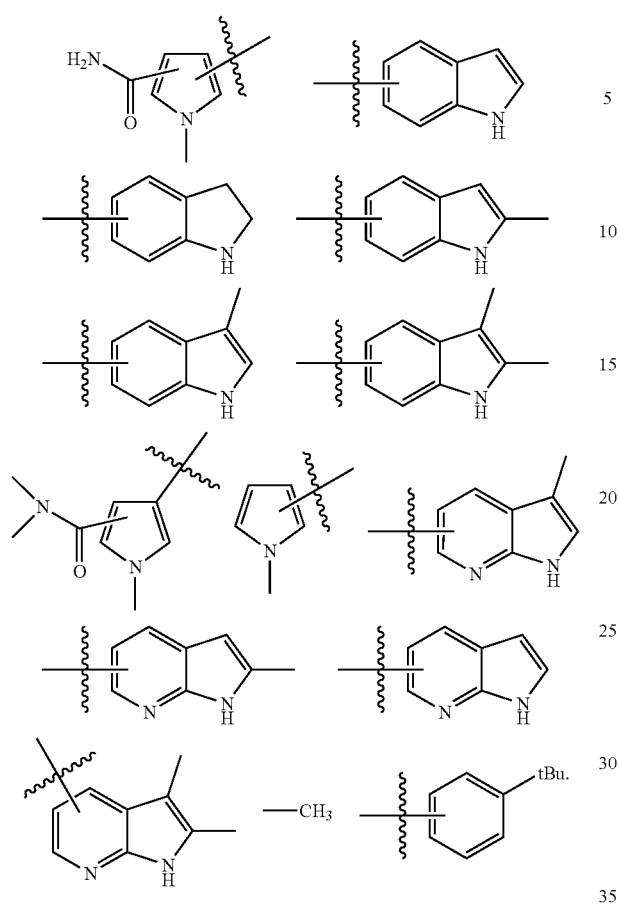
58. The compound of any one of claims 1 to 32, wherein R is selected from the group consisting of:
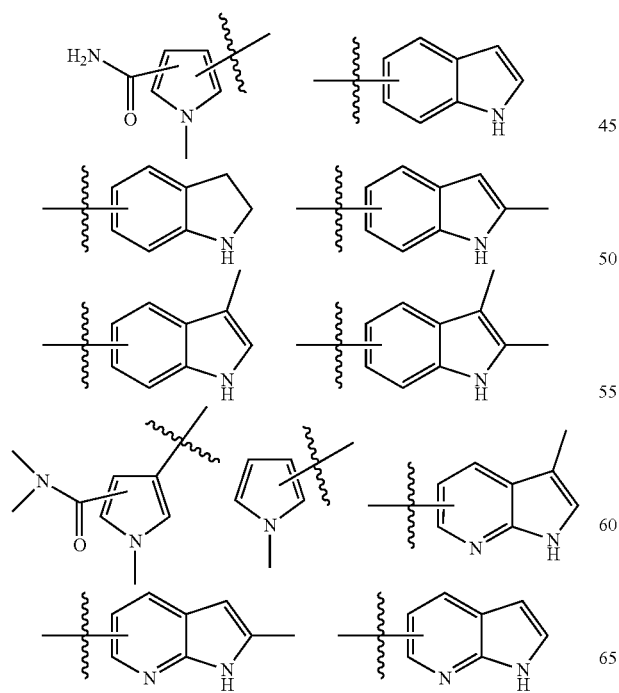
59. The compound of any one of claims 1 to 32, wherein R is selected from the group consisting of:
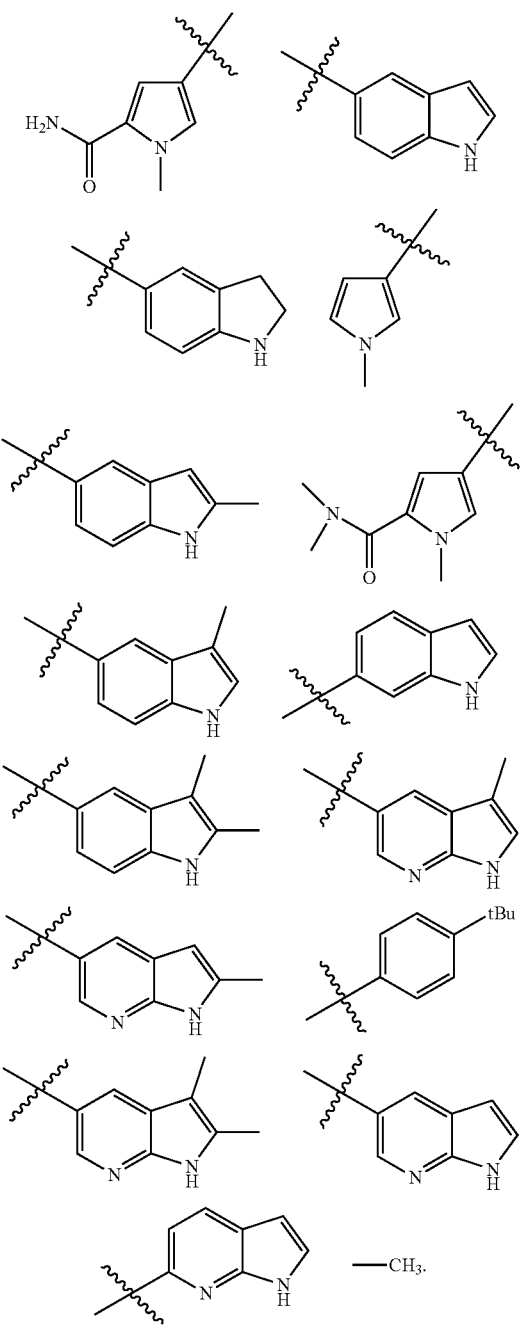
60. The compound of any one of claims 1 to 32, wherein R is selected from the group consisting of:

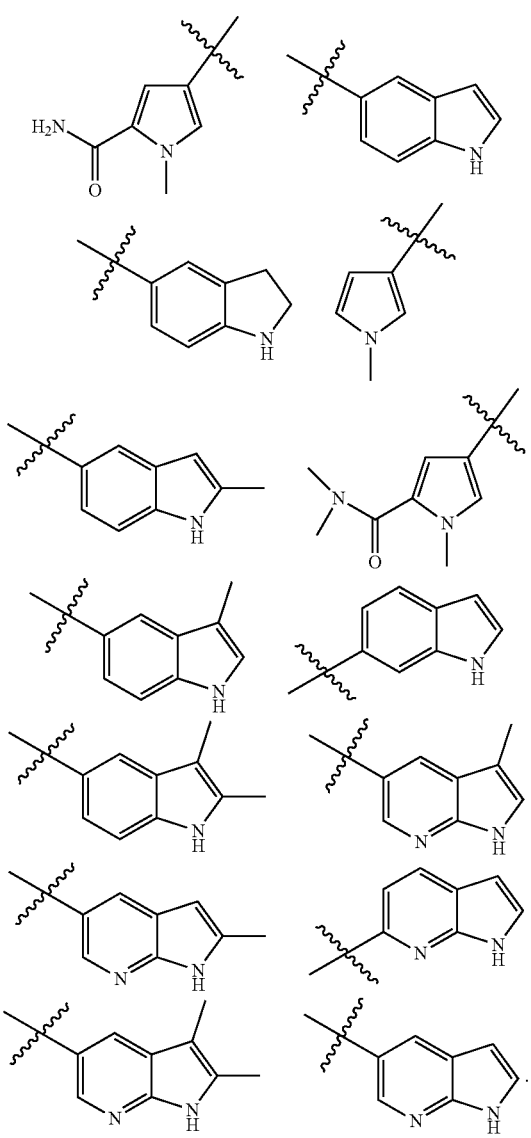

61. The compound of any one of claims 1 to 60, wherein n is an integer between 1 and 4.
62. The compound of claim 61, wherein n is 1 or 2.
63. The compound of any one of claims 1 to 62, wherein $R_1$ and $R_2$ are independently selected from H and methyl.
64. A compound of formula (I) selected from the group consisting of compounds 1, 3 to 28 and 33 to 93.
65. A pharmaceutical composition comprising a compound of formula (I) according to any one of claims 1 to 65, together with a pharmaceutically acceptable carrier, diluent or excipient.
66. The composition of claim 65, further comprising a vinca alkaloid or a taxane.
67. The composition of claim 66, wherein the vinca alkaloid is vinorelbine and the taxane is paclitaxel.
68. A method for the treatment of cancer in a subject in need thereof, the method comprising administration to the subject of a therapeutically effective amount of a compound of formula (I) according to any one of claims 1 to 64, or a composition of any one of claims 65 to 67.
69. The method of claim 68, further comprising administration of a vinca alkaloid or a taxane.
70. The method of claim 69, wherein the vinca alkaloid is vinorelbine and the taxane is paclitaxel.
71. The method of any one of claims 68 to 70, wherein the cancer is neuroblastoma, sarcoma, breast cancer, lung cancer, prostate cancer, ovarian cancer, bone cancer, uterine cancer, peritoneal cancer, brain cancer, skin cancer, colon cancer, testicular cancer, colorectal cancer, cervical cancer, renal cancer, bladder cancer, gastric cancer, pancreatic cancer, gall bladder cancer, liver cancer, pancreatic cancer, head and neck cancer, throat cancer or esophageal cancer.
72. The method of claim 71, wherein the cancer is neuroblastoma, ovarian cancer or lung cancer.
73. Use of a compound of formula (I) according to any one of claims 1 to 64 in the manufacture of medicament for the treatment of cancer.
74. The use of claim 73, wherein the medicament further comprises, or is administered with a vinca alkaloid or a taxane.
75. The use of claim 74, wherein the vinca alkaloid is vinorelbine and the taxane is paclitaxel.
76. A compound of formula (I) according to any one of claims 1 to 64, for use in the treatment of cancer.
77. A method for reducing incidences of, or risk of, cancer recurrence in a subject deemed to be at risk of cancer recurrence, the method comprising administration to the subject of an effective amount of a compound of formula (I) according to any one of claims 1 to 64, or a composition of any one of claims 65 to 67.
78. Use of a compound of formula (I) according to any one of claims 1 to 64 in the manufacture of a medicament for reducing incidences of, or risk of, cancer recurrence in a subject deemed to be at risk of cancer recurrence.
79. A compound of formula (I) according to any one of claims 1 to 64 for use in reducing incidences of, or risk of, cancer recurrence in a subject deemed to be at risk of cancer recurrence.

The citation of any reference herein should not be construed as an admission that such reference is available as prior art to the present application. Further, the reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates.

Those skilled in the art will appreciate that the disclosure described herein is susceptible to variations and modifications other than those specifically described. It is to be understood that the disclosure includes all such variations and modifications. The disclosure also includes all of the steps, features, compositions and compounds referred to or indicated in this specification, individually or collectively, and any and all combinations of an two or more of said steps, features, compositions and compounds.

What is claimed is:
1. A compound having the following formula (I):

or a pharmaceutically acceptable salt, hydrate, derivative, solvate or prodrug thereof, wherein:

R is selected from the group consisting of:

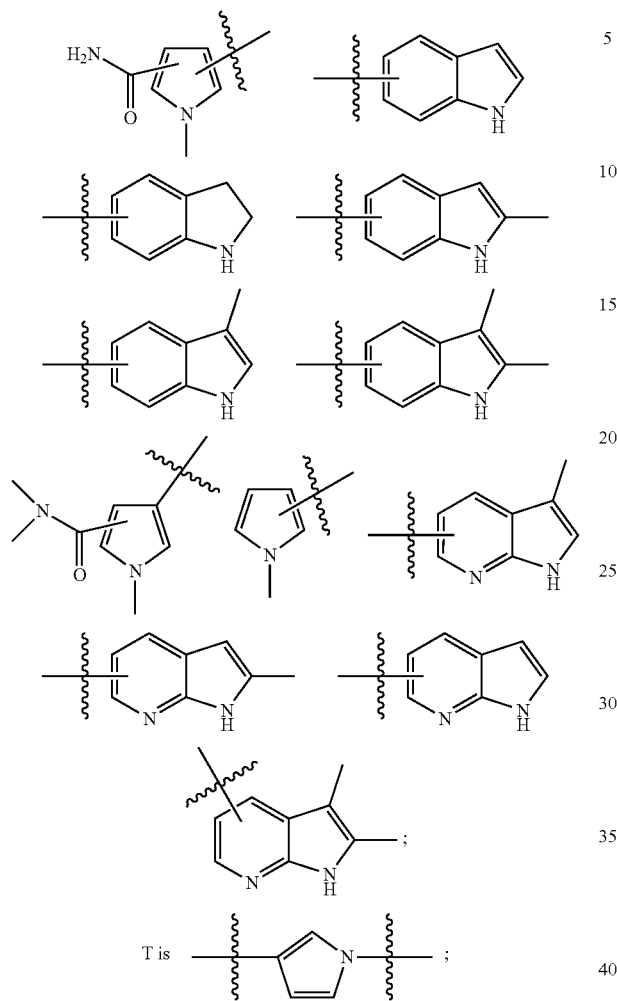

T is

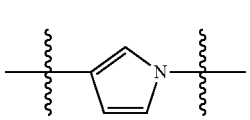 [SMILES: *c1ccn(*)c1]

X is selected from the group consisting of: C=O and a straight-chain or branched-chain alkanediyl group having between 1 and 4 carbon atoms;

Y is NH or —CH$_2$; and

Z is selected from the group consisting of: phenyl and pyridyl, wherein the phenyl and pyridyl groups are optionally substituted with one or more substituents independently selected from the group consisting of: $C_1$-$C_6$ alkyl, OH, halo$C_1$-$C_6$ alkyl, halo, CN and OMe.

2. The compound of claim 1, wherein X is C=O or a straight-chain or branched-chain alkanediyl group having between 1 and 3 carbon atoms.

3. The compound of claim 2, wherein X is C=O or —CH$_2$—.

4. The compound of claim 1, wherein Z is selected from the group consisting of:

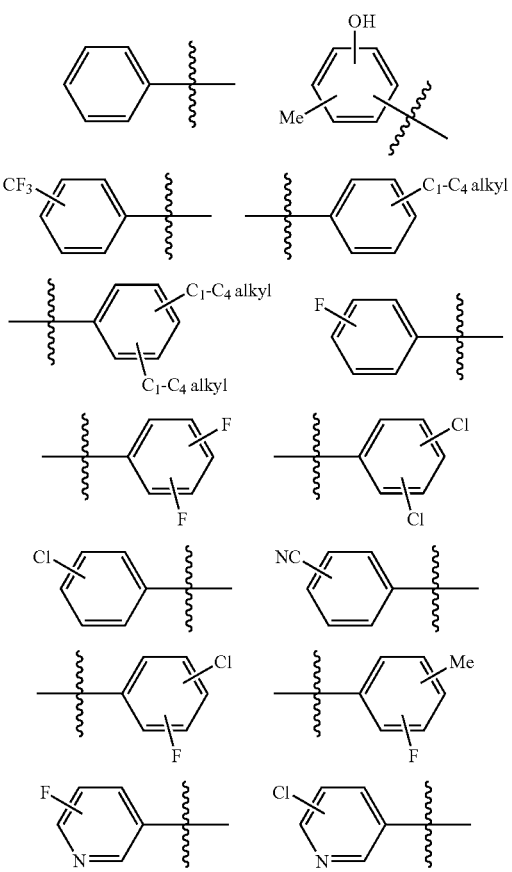

and 3,4-methylenedioxyphenyl.

5. A compound of formula (I) selected from the group consisting of:

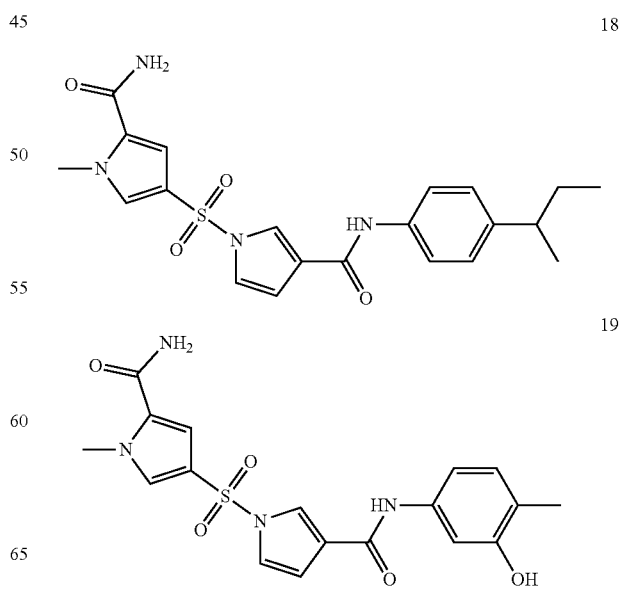

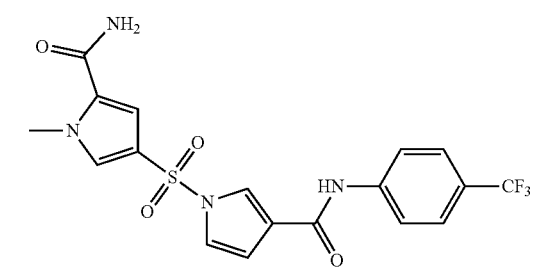
20
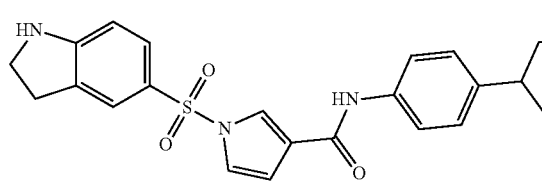
21
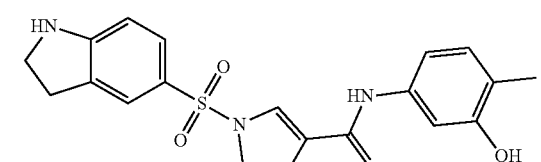
22
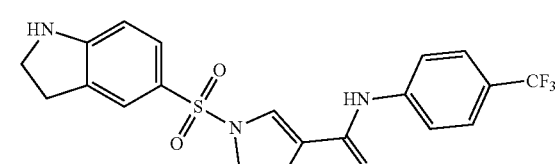
23
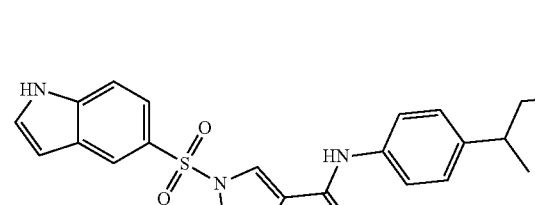
24
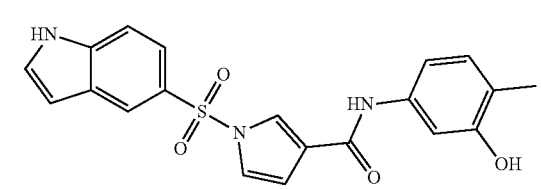
25
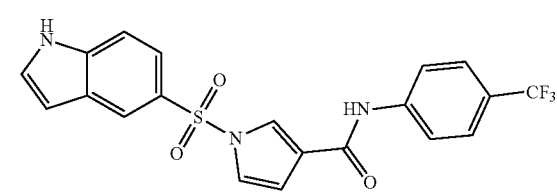
26
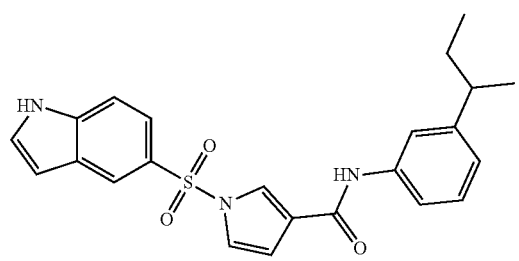
35
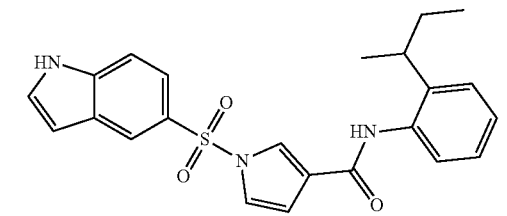
36
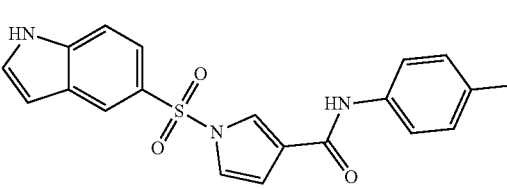
37
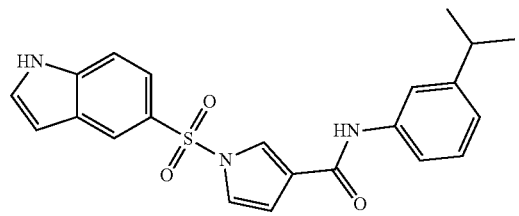
38
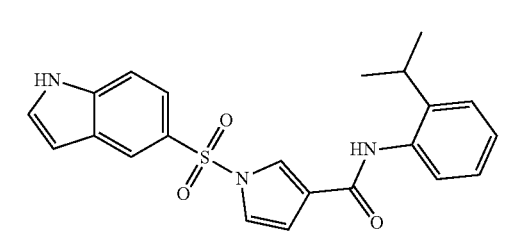
39
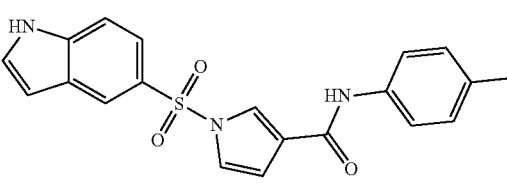
40
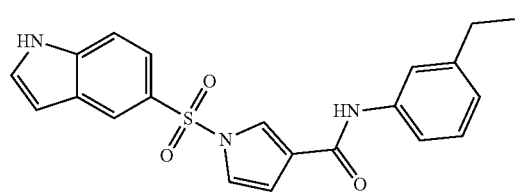
41

-continued
58
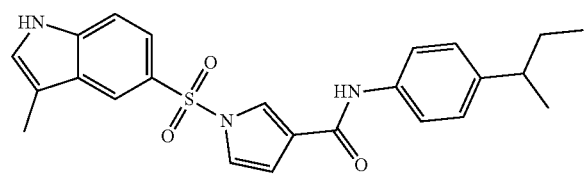
59
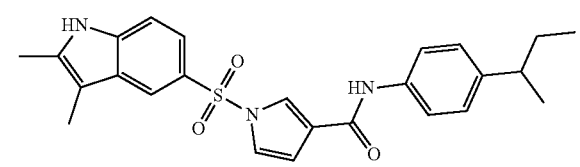
60
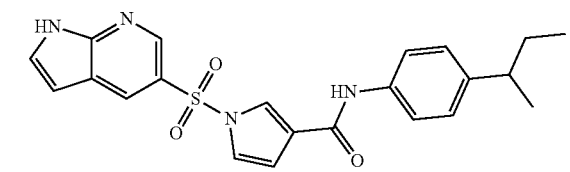
66
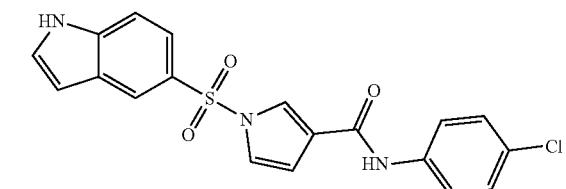
67
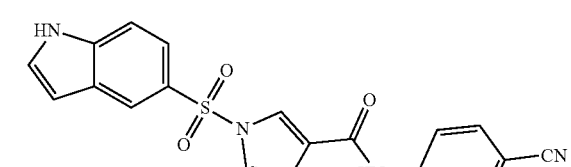
68
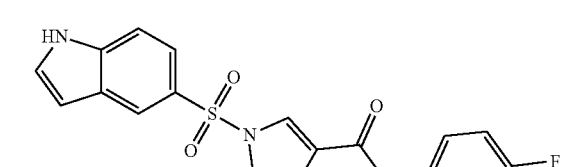
69
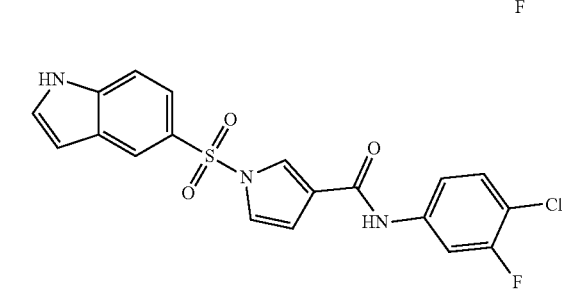
-continued
70
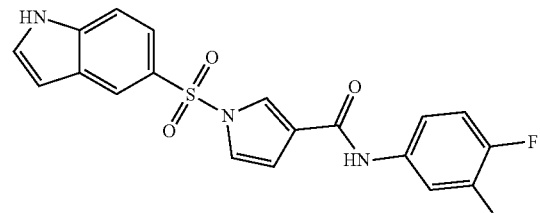
71
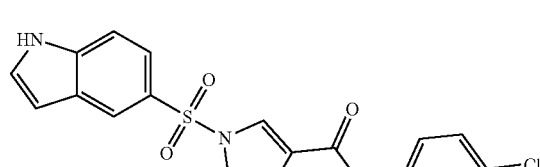
72
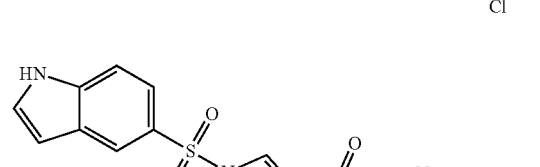
73
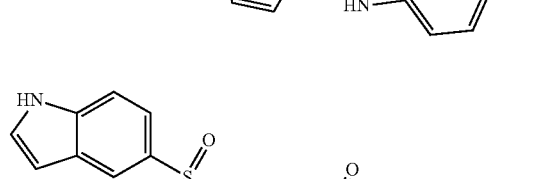
74
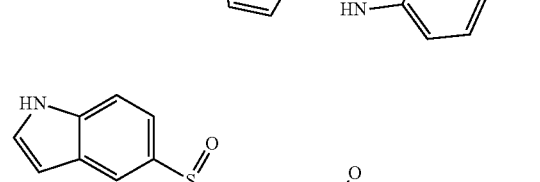
75
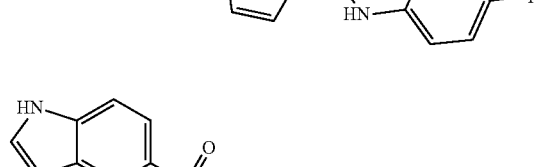
94
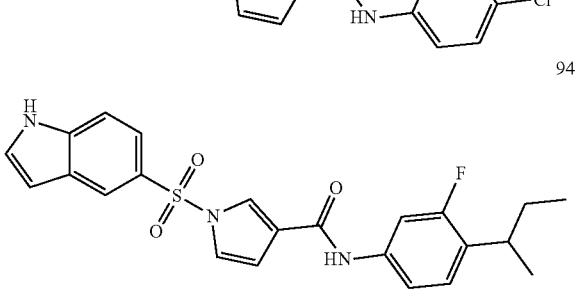

95
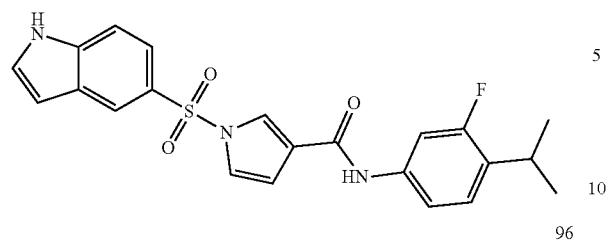
96
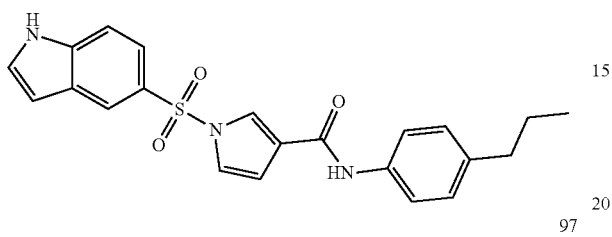
97
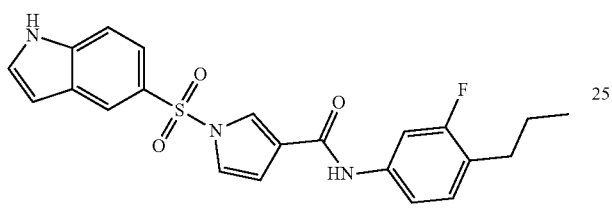
98
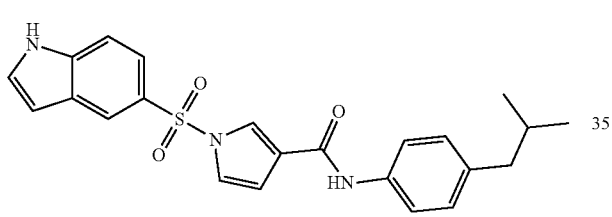
99
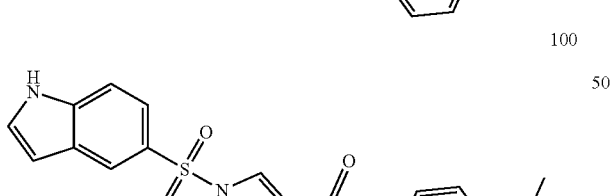
100
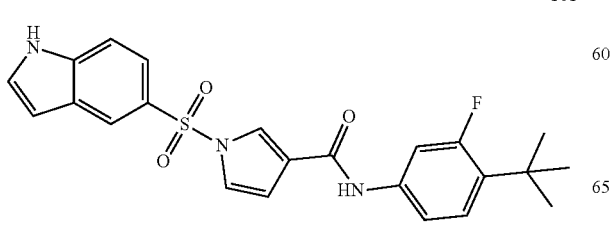
101
102
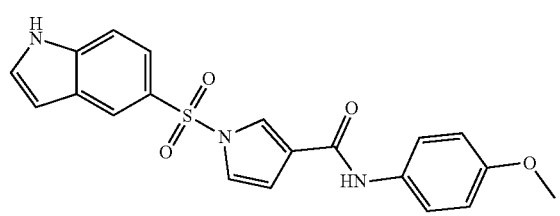
103
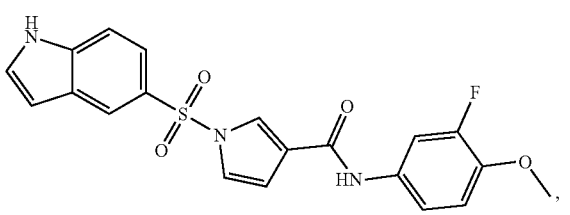
and
104
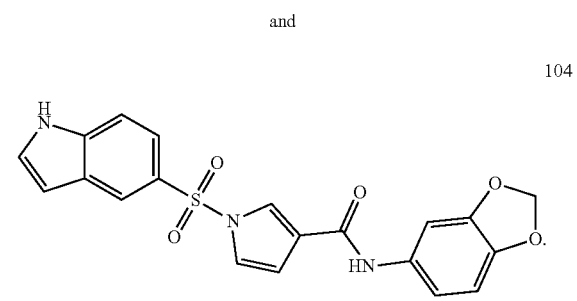
67
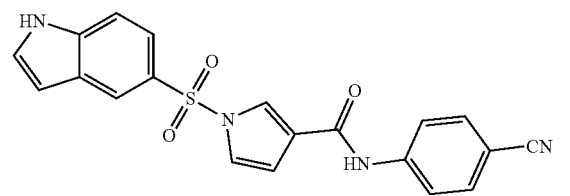
68
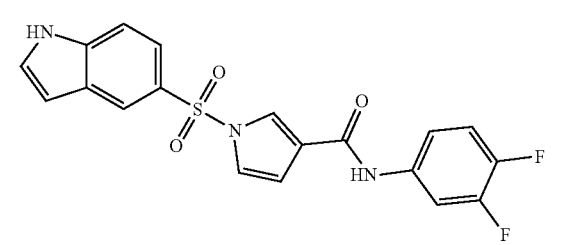
69
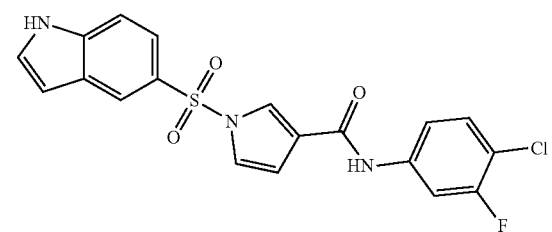

125
-continued
70
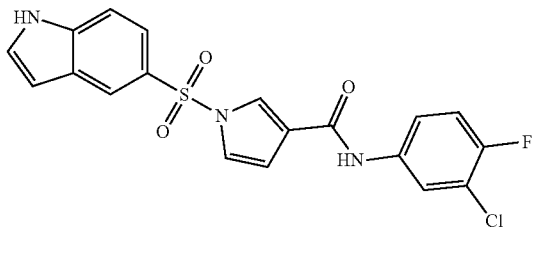
71
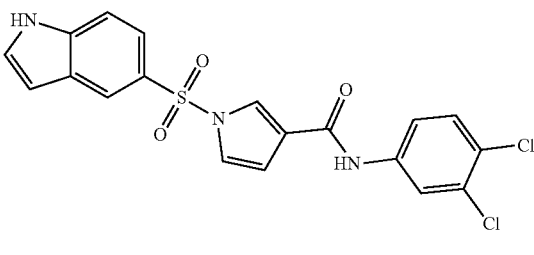
72
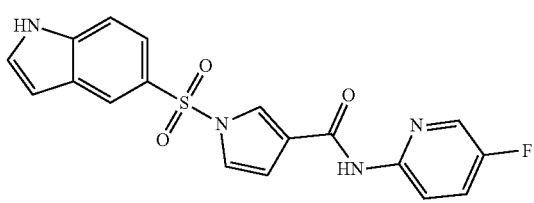
73
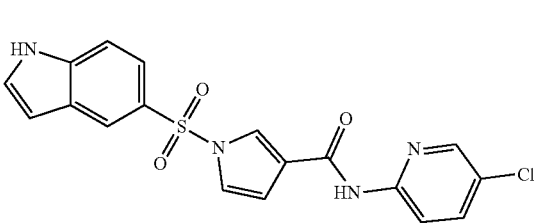
74
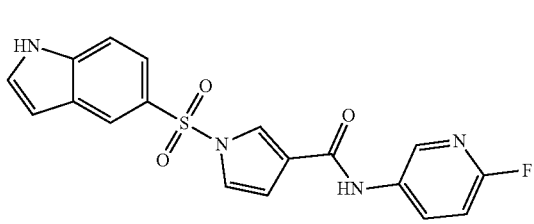
75
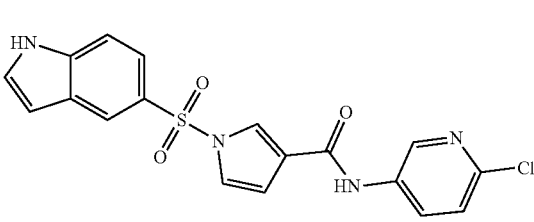
94
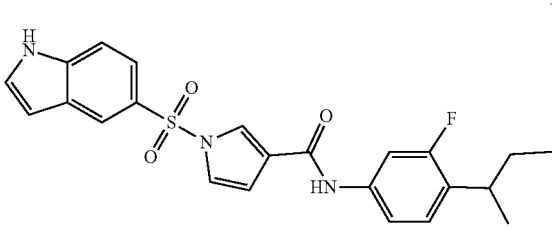
126
-continued
95
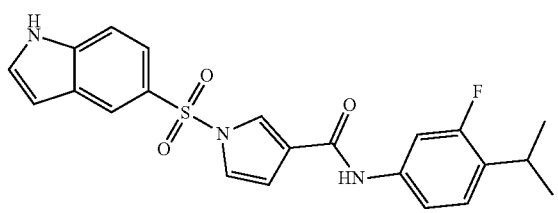
96
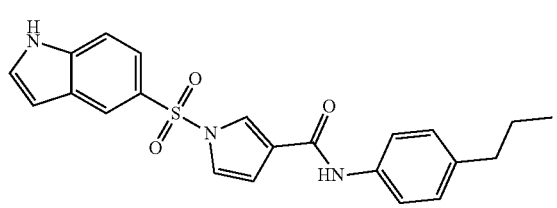
97
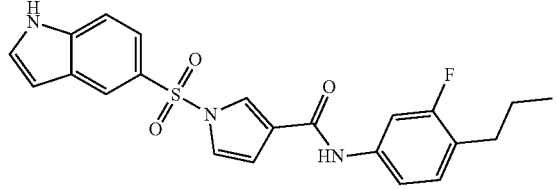
98
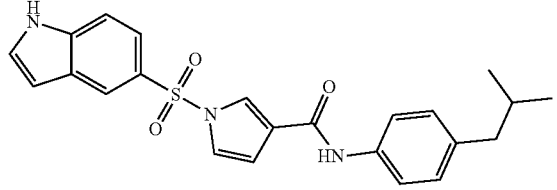
99
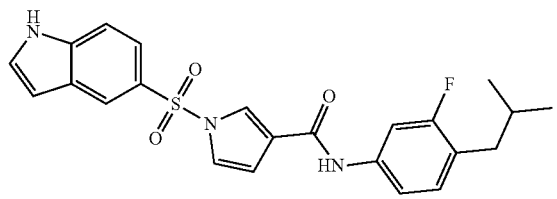
100
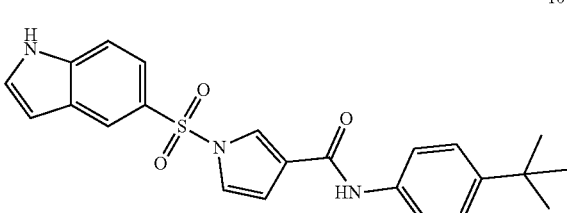
101
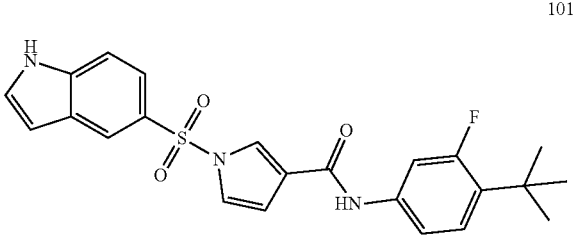

127
-continued
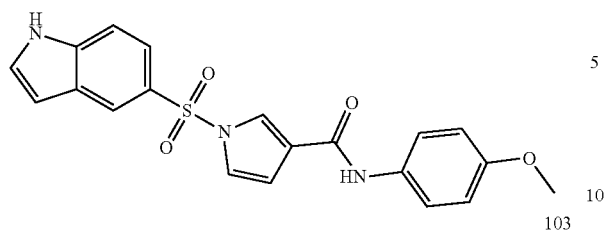
102
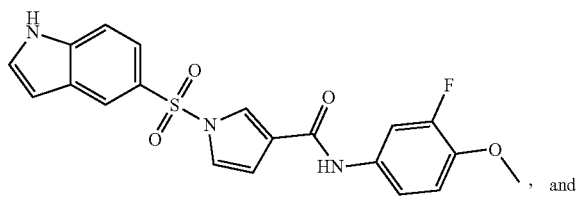
103
, and
128
-continued
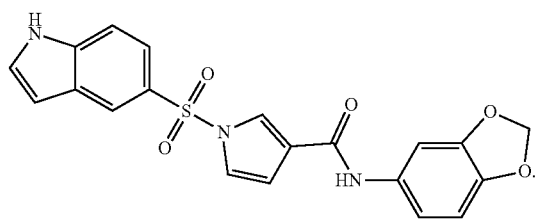
104
6. A pharmaceutical composition comprising a compound of formula (I) according to claim 1, together with a pharmaceutically acceptable carrier, diluent or excipient.
* * * * *